US007575172B2

(12) United States Patent
Silverbrook et al.

(10) Patent No.: US 7,575,172 B2
(45) **Date of Patent: *Aug. 18, 2009**

(54) PRINTING A GREETING CARD USING A MOBILE DEVICE

(75) Inventors: Kia Silverbrook, Balmain (AU); Paul Lapstun, Balmain (AU); Simon Robert Walmsley, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 0 days.

This patent is subject to a terminal disclaimer.

(21) Appl. No.: 11/228,477

(22) Filed: Sep. 19, 2005

(65) Prior Publication Data

US 2007/0063031 A1 Mar. 22, 2007

(51) Int. Cl.
*G06K 19/00* (2006.01)
*G06F 15/00* (2006.01)
*H04N 1/60* (2006.01)

(52) U.S. Cl. ............... 235/487; 235/462.01; 455/550.1; 455/556.1; 455/575.1; 358/1.15; 358/1.9

(58) Field of Classification Search ............ 235/462.01, 235/462.09, 375, 380, 381, 493, 387, 492; 380/23, 51; 704/3; 705/23; 206/232; 358/1.15, 358/473, 305, 448; 379/114, 29.1; 455/556, 455/557, 414, 550.1, 556.1, 575.1; 382/305, 382/100; 283/74
See application file for complete search history.

(56) References Cited

U.S. PATENT DOCUMENTS

| | | | | |
|---|---|---|---|---|
| 5,490,217 | A * | 2/1996 | Wang et al. | 380/51 |
| 5,511,114 | A * | 4/1996 | Stimson et al. | 235/380 |
| 5,783,809 | A * | 7/1998 | Niino et al. | 235/380 |
| 5,938,727 | A * | 8/1999 | Ikeda | 709/218 |
| 6,829,596 | B1 * | 12/2004 | Frazee | 705/66 |
| 6,922,258 | B2 * | 7/2005 | Pineau | 358/1.15 |
| 2001/0044324 | A1 * | 11/2001 | Carayiannis et al. | 455/564 |
| 2002/0140993 | A1 * | 10/2002 | Silverbrook | 358/473 |
| 2002/0181010 | A1 | 12/2002 | Pineau | |
| 2005/0062769 | A1 | 3/2005 | Silverbrook et al. | |
| 2005/0131959 | A1 * | 6/2005 | Thorman et al. | 707/200 |
| 2005/0145700 | A1 | 7/2005 | Silverbrook et al. | |
| 2005/0200637 | A1 | 9/2005 | Silverbrook et al. | |
| 2005/0218216 | A1 * | 10/2005 | Arias | 235/381 |
| 2006/0026535 | A1 * | 2/2006 | Hotelling et al. | 715/863 |
| 2006/0243609 | A1 * | 11/2006 | Cole et al. | 206/232 |

FOREIGN PATENT DOCUMENTS

EP 1291786 A2 3/2003

OTHER PUBLICATIONS

Wikipedia.org, "Microsoft Windows", pp. 1-3.*
www.wikipedia.org, "Windows Mobile", all pages.*

* cited by examiner

*Primary Examiner*—Daniel Walsh
*Assistant Examiner*—Thien T Mai

(57) ABSTRACT

A system for printing a greeting card on a print medium, the system comprising: a mobile telecommunications device which comprises: a printer module to print the greeting card on the print medium; and, a sensor module to sense a print media identifier of the print medium.

17 Claims, 74 Drawing Sheets

| | | |
|---|---|---|
| target | office-personal-printer | |
| operation | print | |
| parameters | | |
| | | |
| | | |

521

| | | |
|---|---|---|
| target | | |
| operation | | |
| parameters | image/jpeg<br>category = "photo" | <binary contents of jpeg image> |
| | | |
| | | |

858

PRINTING A GREETING CARD USING A MOBILE DEVICE

FIELD OF THE INVENTION

The present invention generally relates to a mobile device incorporating a printer. The invention more specifically relates to a mobile device such as a mobile telecommunications device, for example a mobile or cellular telephone that incorporates a printer which is able to print a wide variety of content on a print medium. However, it will be appreciated by those skilled in the art that the present invention can be used by other types of portable or mobile devices, or even non-portable devices.

COPENDING APPLICATIONS

The following applications have been filed by the applicant simultaneously with the present application:

| | | | | |
|---|---|---|---|---|
| 11/228,540 | 11/228,500 | 11/228,501 | 11/228,530 | 11/228,490 |
| 11/228,531 | 11/228,504 | 11/228,533 | 11/228,502 | 11/228,507 |
| 11/228,482 | 11/228,505 | 11/228,497 | 11/228,487 | 11/228,529 |
| 11/228,485 | 11/228,489 | 11/228,518 | 11/228,536 | 11/228,496 |
| 11/228,488 | 11/228,506 | 11/228,516 | 11/228,526 | 11/228,539 |
| 11/228,538 | 11/228,524 | 11/228,523 | 11/228,519 | 11/228,528 |
| 11/228,527 | 11/228,525 | 11/228,520 | 11/228,498 | 11/228,511 |
| 11/228,522 | 11/228,515 | 11/228,537 | 11/228,534 | 11/228,491 |
| 11/228,499 | 11/228,509 | 11/228,492 | 11/228,493 | 11/228,510 |
| 11/228,508 | 11/228,512 | 11/228,514 | 11/228,514 | 11/228,495 |
| 11/228,486 | 11/228,481 | 11/228,485 | 11/228,483 | 11/228,521 |
| 11/228,517 | 11/228,532 | 11/228,513 | 11/228,503 | 11/228,480 |
| 11/228,535 | 11/228,478 | | | |

The disclosures of these copending applications are incorporated herein by reference.

CROSS REFERENCES

The following patents or patent applications filed by the applicant or assignee of the present invention are hereby incorporated by cross-reference:

| | | | | |
|---|---|---|---|---|
| 6,405,055 | 6,628,430 | 7,136,186 | 10/920,372 | 7,145,689 |
| 7,130,075 | 7,081,974 | 7,177,055 | 10/919,243 | 7,161,715 |
| 7,154,632 | 7,158,258 | 7,148,993 | 7,075,684 | 10/503,924 |
| 7,108,437 | 6,915,140 | 6,999,206 | 7,136,198 | 7,092,130 |
| 6,750,901 | 6,476,863 | 6,788,336 | 09/517,539 | 6,566,858 |
| 6,331,946 | 6,246,970 | 6,442,525 | 09/517,384 | 09/505,951 |
| 6,374,354 | 09/517,608 | 6,816,968 | 6,757,832 | 6,334,190 |
| 6,745,331 | 09/517,541 | 10/203,559 | 10/203,560 | 7,093,139 |
| 10/636,263 | 10/636,283 | 10/866,608 | 10/902,889 | 10/902,833 |
| 10/940,653 | 10/942,858 | 7,170,652 | 6,967,750 | 6,995,876 |
| 7,099,051 | 11/107,942 | 11/107,943 | 11/209,711 | 7,095,533 |
| 6,914,686 | 7,161,709 | 7,099,033 | 11/003,786 | 11/003,616 |
| 11/003,418 | 11/003,334 | 11/003,600 | 11/003,404 | 11/003,419 |
| 11/003,700 | 11/003,601 | 11/003,618 | 11/003,615 | 11/003,337 |
| 11/003,698 | 11/003,420 | 6,984,017 | 11/003,699 | 11/071,473 |
| 11/003,463 | 11/003,701 | 11/003,683 | 11/003,614 | 11/003,702 |
| 11/003,684 | 11/003,619 | 11/003,617 | 10/815,621 | 10/815,612 |
| 10/815,630 | 10/815,637 | 10/815,638 | 10/815,640 | 10/815,642 |
| 7,097,094 | 7,137,549 | 10/815,618 | 7,156,292 | 10/815,635 |
| 10/815,647 | 10/815,634 | 7,137,566 | 7,131,596 | 7,128,265 |
| 10/815,641 | 10/815,645 | 7,175,089 | 10/815,617 | 10/815,620 |
| 10/815,615 | 10/815,613 | 10/815,633 | 10/815,619 | 10/815,616 |
| 10/815,614 | 10/815,636 | 7,128,270 | 11/041,650 | 11/041,651 |
| 11/041,652 | 11/041,649 | 11/041,610 | 11/041,609 | 11/041,626 |
| 11/041,627 | 11/041,624 | 11/041,625 | 11/041,556 | 11/041,580 |
| 11/041,723 | 11/041,698 | 11/041,648 | 10/815,609 | 7,150,398 |
| 7,159,777 | 10/815,610 | 10/815,611 | 7,097,106 | 7,070,110 |

-continued

| | | | | |
|---|---|---|---|---|
| 10/815,629 | 6,623,101 | 6,406,129 | 6,505,916 | 6,457,809 |
| 6,550,895 | 6,457,812 | 7,152,962 | 6,428,133 | 10/815,625 |
| 10/815,624 | 10/815,628 | 10/913,375 | 10/913,373 | 10/913,374 |
| 10/913,372 | 7,138,391 | 7,153,956 | 10/913,380 | 10/913,379 |
| 10/913,376 | 7,122,076 | 7,148,345 | 11/172,816 | 11/172,815 |
| 11/172,814 | 10/407,212 | 10/407,207 | 10/683,064 | 10/683,041 |
| 11/124,158 | 11/124,196 | 11/124,199 | 11/124,162 | 11/124,202 |
| 11/124,197 | 11/124,154 | 11/124,198 | 11/124,153 | 11/124,151 |
| 11/124,160 | 11/124,192 | 11/124,175 | 11/124,163 | 11/124,149 |
| 11/124,152 | 11/124,173 | 11/124,155 | 11/124,157 | 11/124,174 |
| 11/124,194 | 11/124,164 | 11/124,200 | 11/124,195 | 11/124,166 |
| 11/124,150 | 11/124,172 | 11/124,165 | 11/124,186 | 11/124,185 |
| 11/124,184 | 11/124,182 | 11/124,201 | 11/124,171 | 11/124,181 |
| 11/124,161 | 11/124,156 | 11/124,191 | 11/124,159 | 11/124,176 |
| 11/124,188 | 11/124,170 | 11/124,187 | 11/124,189 | 11/124,190 |
| 11/124,180 | 11/124,193 | 11/124,183 | 11/124,178 | 11/124,177 |
| 11/124,148 | 11/124,168 | 11/124,167 | 11/124,179 | 11/124,169 |
| 11/187,976 | 11/188,011 | 11/188,014 | 6,746,105 | 7,156,508 |
| 7,159,972 | 7,083,271 | 7,165,834 | 7,080,894 | 10/760,218 |
| 7,090,336 | 7,156,489 | 10/760,233 | 10/760,246 | 7,083,257 |
| 10/760,243 | 10/760,201 | 10/760,185 | 10/760,253 | 10/760,255 |
| 10/760,209 | 7,118,192 | 10/760,194 | 10/760,238 | 7,077,505 |
| 10/760,235 | 7,077,504 | 10/760,189 | 10/760,262 | 10/760,232 |
| 10/760,231 | 7,152,959 | 10/760,190 | 10/760,191 | 10/760,227 |
| 7,108,353 | 7,104,629 | 10/728,804 | 7,128,400 | 7,108,355 |
| 6,991,322 | 10/728,790 | 7,118,197 | 10/728,970 | 10/728,784 |
| 10/728,783 | 7,077,493 | 6,962,402 | 10/728,803 | 7,147,308 |
| 10/728,779 | 7,118,198 | 7,168,790 | 7,172,270 | 10/773,199 |
| 6,830,318 | 10/773,201 | 10/773,191 | 10/773,183 | 7,108,356 |
| 7,118,202 | 10/773,186 | 7,134,744 | 10/773,185 | 7,134,743 |
| 10/773,197 | 10/773,203 | 10/773,187 | 7,134,745 | 7,156,484 |
| 7,118,201 | 7,111,926 | 10/773,184 | 7,018,021 | 11/060,751 |
| 11/060,805 | 11/188,017 | 11/097,308 | 11/097,309 | 11/097,335 |
| 11/097,299 | 11/097,310 | 11/097,213 | 11/210,687 | 11/097,212 |
| 7,147,306 | 7,156,289 | 10/409,848 | 10/409,845 | 11/084,796 |
| 11/084,742 | 11/084,806 | 09/575,197 | 7,079,712 | 09/575,123 |
| 6,825,945 | 09/575,165 | 6,813,039 | 09/693,415 | 6,987,506 |
| 6,824,044 | 7,038,797 | 6,980,318 | 6,816,274 | 7,102,772 |
| 09/575,186 | 6,681,045 | 6,678,499 | 6,679,420 | 6,963,845 |
| 6,976,220 | 6,728,000 | 7,110,126 | 7,173,722 | 6,976,035 |
| 6,813,558 | 6,766,942 | 6,965,454 | 6,995,859 | 7,088,459 |
| 6,720,985 | 09/609,303 | 6,922,779 | 6,978,019 | 6,847,883 |
| 7,131,058 | 09/721,895 | 09/607,843 | 09/693,690 | 6,959,298 |
| 6,973,450 | 7,150,404 | 6,965,882 | 09/608,022 | 09/575,181 |
| 09/722,174 | 7,175,079 | 7,162,259 | 6,718,061 | 10/291,523 |
| 10/291,471 | 7,012,710 | 6,825,956 | 10/291,481 | 10/291,509 |
| 10/291,825 | 10/291,519 | 7,031,010 | 6,972,864 | 6,862,105 |
| 7,009,738 | 6,989,911 | 6,982,807 | 10/291,576 | 6,829,387 |
| 6,714,678 | 6,644,545 | 6,609,653 | 6,651,879 | 10/291,555 |
| 10/291,510 | 10/291,592 | 10/291,542 | 7,044,363 | 7,004,390 |
| 6,867,880 | 7,034,953 | 6,987,581 | 10/291,556 | 10/291,821 |
| 7,162,269 | 7,162,222 | 10/291,822 | 10/291,524 | 10/291,553 |
| 6,850,931 | 6,865,570 | 6,847,961 | 10/685,523 | 10/685,583 |
| 7,162,442 | 10/685,584 | 7,159,784 | 10/804,034 | 10/793,933 |
| 6,889,896 | 10/831,232 | 7,174,056 | 6,996,274 | 7,162,088 |
| 10/943,874 | 10/943,872 | 10/944,044 | 10/943,942 | 10/944,043 |
| 7,167,270 | 10/943,877 | 6,986,459 | 10/954,170 | 10/981,773 |
| 10/981,626 | 10/981,616 | 10/981,627 | 10/974,730 | 7,174,329 |
| 10/992,713 | 11/006,536 | 11/020,256 | 11/020,106 | 11/020,260 |
| 11/020,321 | 11/020,319 | 11/026,045 | 11/059,696 | 11/051,032 |
| 11/059,674 | 11/107,944 | 11/107,941 | 11/082,940 | 11/082,815 |
| 11/082,827 | 11/082,829 | 6,991,153 | 6,991,154 | 11/124,256 |
| 11/123,136 | 11/154,676 | 11/159,196 | 11/182,002 | 11/202,251 |
| 11/202,252 | 11/202,253 | 11/203,200 | 11/202,218 | 11/206,778 |
| 11/203,424 | 11/222,977 | 7,068,382 | 7,007,851 | 6,957,921 |
| 6,457,883 | 10/743,671 | 7,044,381 | 7,094,910 | 7,091,344 |
| 7,122,685 | 7,038,066 | 7,099,019 | 7,062,651 | 6,789,194 |
| 6,789,191 | 10/900,129 | 10/900,127 | 10/913,328 | 10/913,350 |
| 10/982,975 | 10/983,029 | 6,644,642 | 6,502,614 | 6,622,999 |
| 6,669,385 | 6,827,116 | 7,011,128 | 10/949,307 | 6,549,935 |
| 6,987,573 | 6,727,996 | 6,591,884 | 6,439,706 | 6,760,119 |
| 09/575,198 | 7,064,851 | 6,826,547 | 6,290,349 | 6,428,155 |
| 6,785,016 | 6,831,682 | 6,741,871 | 6,927,871 | 6,980,306 |
| 6,965,439 | 6,840,606 | 7,036,918 | 6,977,746 | 6,970,264 |
| 7,068,389 | 7,093,991 | 10/659,026 | 10/884,885 | 10/884,883 |
| 10/901,154 | 10/932,044 | 10/962,412 | 7,177,054 | 10/962,552 |
| 10/965,733 | 10/965,933 | 10/974,742 | 10/982,974 | 10/983,018 |
| 10/986,375 | 11/107,817 | 11/148,238 | 11/149,160 | 6,982,798 |
| 6,870,966 | 6,822,639 | 6,474,888 | 6,627,870 | 6,724,374 |

-continued

| | | | | |
|---|---|---|---|---|
| 6,788,982 | 09/722,141 | 6,788,293 | 6,946,672 | 6,737,591 |
| 7,091,960 | 09/693,514 | 6,792,165 | 7,105,753 | 6,795,593 |
| 6,980,704 | 6,768,821 | 7,132,612 | 7,041,916 | 6,797,895 |
| 7,015,901 | 10/782,894 | 7,148,644 | 10/778,056 | 10/778,058 |
| 10/778,060 | 10/778,059 | 10/778,063 | 10/778,062 | 10/778,061 |
| 10/778,057 | 7,096,199 | 10/917,468 | 10/917,467 | 10/917,466 |
| 10/917,465 | 10/917,356 | 10/948,169 | 10/948,253 | 10/948,157 |
| 10/917,436 | 10/943,856 | 10/919,379 | 7,019,319 | 10/943,878 |
| 10/943,849 | 7,043,096 | 7,148,499 | 11/144,840 | 11/155,556 |
| 11/155,557 | 11/193,481 | 11/193,435 | 11/193,482 | 11/193,479 |
| 7,055,739 | 09/575,129 | 6,830,196 | 6,832,717 | 09/721,862 |
| 7,120,853 | 7,082,562 | 6,843,420 | 10/291,718 | 6,789,731 |
| 7,057,608 | 6,766,944 | 6,766,945 | 10/291,715 | 10/291,559 |
| 10/291,660 | 10/531,734 | 10/409,864 | 7,108,192 | 10/537,159 |
| 7,111,791 | 7,077,333 | 6,983,878 | 10/786,631 | 7,134,598 |
| 10/893,372 | 6,929,186 | 6,994,264 | 7,017,826 | 7,014,123 |
| 7,134,601 | 7,150,396 | 10/971,146 | 7,017,823 | 7,025,276 |
| 10/990,459 | 7,080,780 | 11/074,802 | 10/492,169 | 10/492,152 |
| 10/492,168 | 10/492,161 | 10/492,154 | 10/502,575 | 10/531,229 |
| 10/683,151 | 10/531,733 | 10/683,040 | 10/510,391 | 10/510,392 |
| 10/919,261 | 10/778,090 | 6,957,768 | 09/575,162 | 09/575,172 |
| 7,170,499 | 7,106,888 | 7,123,239 | 6,982,701 | 6,982,703 |
| 10/291,538 | 6,786,397 | 6,947,027 | 6,975,299 | 7,139,431 |
| 7,048,178 | 7,118,025 | 6,839,053 | 7,015,900 | 7,010,147 |
| 7,133,557 | 6,914,593 | 10/291,546 | 6,938,826 | 10/913,340 |
| 7,123,245 | 6,992,662 | 11/039,897 | 11/074,800 | 11/074,782 |
| 11/074,777 | 11/075,917 | 11/102,698 | 11/102,843 | 11/202,112 |
| 6,593,166 | 7,132,679 | 6,940,088 | 7,119,357 | 10/727,181 |
| 10/727,162 | 10/727,163 | 10/727,245 | 7,121,639 | 7,165,824 |
| 7,152,942 | 10/727,157 | 10/727,178 | 7,096,137 | 10/727,257 |
| 10/727,238 | 10/727,251 | 10/727,159 | 10/727,180 | 10/727,179 |
| 10/727,192 | 10/727,274 | 10/727,164 | 10/727,161 | 10/727,198 |
| 10/727,158 | 10/754,536 | 10/754,938 | 10/727,227 | 10/727,160 |
| 10/934,720 | 7,171,323 | 10/296,522 | 6,795,215 | 7,070,098 |
| 7,154,638 | 6,805,419 | 6,859,289 | 6,977,751 | 6,398,332 |
| 6,394,573 | 6,622,923 | 6,747,760 | 6,821,144 | 10/884,881 |
| 7,092,112 | 10/949,294 | 11/039,866 | 7,173,739 | 6,986,560 |
| 7,008,033 | 11/148,237 | 10/922,846 | 10/922,845 | 10/854,521 |
| 10/854,522 | 10/854,488 | 10/854,487 | 10/854,503 | 10/854,504 |
| 10/854,509 | 10/854,510 | 7,093,989 | 10/854,497 | 10/854,495 |
| 10/854,498 | 10/854,511 | 10/854,512 | 10/854,525 | 10/854,526 |
| 10/854,516 | 10/854,508 | 10/854,507 | 10/854,515 | 10/354,506 |
| 10/854,505 | 10/854,493 | 10/854,494 | 10/854,489 | 10/854,490 |
| 10/354,492 | 10/854,491 | 10/854,528 | 10/854,523 | 10/854,527 |
| 10/854,524 | 10/854,520 | 10/854,514 | 10/854,519 | 10/854,513 |
| 10/854,499 | 10/854,501 | 10/854,500 | 10/854,502 | 10/854,518 |
| 10/854,517 | 10/934,628 | 7,163,345 | 10/760,254 | 10/760,210 |
| 10/760,202 | 10/760,197 | 10/760,198 | 10/760,249 | 10/760,263 |
| 10/760,196 | 10/760,247 | 7,156,511 | 10/760,264 | 10/760,244 |
| 7,097,291 | 10/160,222 | 10/760,248 | 7,083,273 | 10/760,192 |
| 10/760,203 | 10/760,204 | 10/760,205 | 10/760,206 | 10/760,267 |
| 10/760,270 | 10/760,259 | 10/760,271 | 10/760,215 | 10/760,274 |
| 7,121,655 | 10/760,184 | 10/760,195 | 10/760,186 | 10/760,261 |
| 7,083,272 | 11/014,764 | 11/014,763 | 11/014,748 | 11/014,747 |
| 11/014,761 | 11/014,760 | 11/014,757 | 11/014,714 | 11/014,713 |
| 11/014,701 | 11/014,724 | 11/014,723 | 11/014,756 | 11/014,736 |
| 11/014,759 | 11/014,758 | 11/014,725 | 11/014,739 | 11/014,738 |
| 11/014,737 | 11/014,726 | 11/014,745 | 11/014,712 | 11/014,715 |
| 11/014,751 | 11/014,735 | 11/014,734 | 11/014,719 | 11/014,750 |
| 11/014,749 | 11/014,746 | 11/014,769 | 11/014,729 | 11/014,743 |
| 11/014,733 | 11/014,754 | 11/014,755 | 11/014,765 | 11/014,766 |
| 11/014,740 | 11/014,720 | 11/014,753 | 11/014,752 | 11/014,744 |
| 11/014,741 | 11/014,768 | 11/014,767 | 11/014,718 | 11/014,717 |
| 11/014,716 | 11/014,732 | 11/014,742 | 11/097,268 | 11/097,185 |
| 11/097,184 | 6,454,482 | 6,808,330 | 6,527,365 | 6,474,773 |
| 6,550,997 | 7,093,923 | 6,957,923 | 7,131,724 | 10/949,288 |
| 7,168,867 | 7,125,098 | 11/185,722 | 11/181,754 | 11/203,180 |
| 7,079,292 | | | | |

BACKGROUND OF THE INVENTION

The assignee has developed mobile or cellular telephones, Personal Data Assistants (PDAs) and other mobile telecommunication devices, with the ability to print hard copies of content, such as images or information stored or accessed by the device, (see for example, U.S. Pat. No. 6,405,055, filed on Nov. 9, 1999). Likewise, the assignee has also designed digital cameras with the ability to print captured images with an in-built printer (see for example, U.S. Pat. No. 6,750,901, filed on Jul. 10, 1998). As the prevalence of mobile telecommunications devices increases, the functionality of these devices is further enhanced by the ability to print hard copies.

As these devices are portable, they should be compact for user convenience. Accordingly, any printer incorporated into the device needs to maintain a small form factor. Also, the additional load on the battery should be relatively small. Furthermore, the consumables (such as ink, paper, etc.) should be relatively inexpensive and simple to replenish. It is these factors that strongly influence the commercial success or otherwise of products of this type.

The assignee of the present invention has also developed the Netpage system for enabling interaction with computer software using a printed interface and a proprietary stylus-shaped sensing device. As described in detail in U.S. Pat. No. 6,792,165, filed on Nov. 25, 2000 and U.S. Ser. No. 10/778,056, filed on Feb. 17, 2004, a Netpage pen captures, identifies and decodes tags of coded data printed onto a surface such as a page. In a preferred Netpage implementation, each tag encodes a position and an identity of the document. By decoding at least one of the tags and transmitting the position (or a refined version of the position, representing a higher resolution position of the pen) and identity referred to by the decoded tag, a remote computer can determine an action to perform. Such actions can include, for example, causing information to be saved remotely for subsequent retrieval, downloading of a webpage for printing or display via a computer, bill payment or even the performance of handwriting recognition based on a series of locations of the Netpage pen relative to the surface.

When printing a Netpage, a printer in a mobile telecommunications device can print the Netpage tags simultaneously with visible user information. The association between the tags and information can already exist on a remote Netpage server, such as where the printer is printing a fully rendered page (including tags) provided by the Netpage server or another computer. Alternatively, the mobile telecommunications device can generate the tags (or source them remotely) and define an association between the tags and user information. The association is then recorded in the remote Netpage server.

A problem with these options is that they require the mobile telecommunications device to include Netpage tag printing capabilities. This requires an additional row of print nozzles in the printhead, and reduces the amounts of ink that can be stored for non-tag use. Whilst this is less of an issue with large, mains-powered printers, it can be an issue in small form-factor articles such as mobile telecommunications devices. Alternatively, the mobile telecommunications device can be configured to print on print media that is pre-printed with Netpage tags. That way the printer need only print the user information and record an association between the visible information and the pre-printed tags.

It is desirable to provide functional applications making use of the mobile telecommunications device. Such applications can include, for example, mobile printing applications, linking, capturing and/or printing generic or specific objects to a print medium, and many other applications providing functionality to the mobile telecommunications device and various uses of types of print media.

SUMMARY OF THE INVENTION

In one particular, but non-limiting, aspect, an M-Print device is a mobile device such as a telephone or PDA which incorporates a printer. Paper is either manually presented or auto-fed from a cartridge, depending on device form factor. The printer may or may not print tags, for example infrared tags, and the printer or a sensor detects tags printed, for example pre-printed, onto blank media. The paper path either includes a tag reader, or it includes a simpler sensor for reading a linear data track on the card. The data track can encode the same identifier as the tags. Reading the identifier allows the M-Print device to associate the card's graphic and/or interactive content with the identifier. This allows subsequent interactions with the card to be properly interpreted. The graphic and/or interactive content is stored on a network-based server, indexed by the identifier.

It should be noted that the media identifier (i.e. print media identifier) may correspond to a range of 2D coordinates without an explicit single media identifier. Hence, reference to the media identifier is to be read as a reference to an explicit or defined one or more media identifiers, or, as a reference to a range of 2D coordinates.

The device also optionally incorporates a pointer. The pointer may be used to click on a hyperlink, but generally doesn't operate at a sufficiently high rate to capture motion. Alternatively, the telephone may incorporate a fully-functional Netpage-type pen. Even when the M-Print device doesn't incorporate a pointer, the user can interact with printed cards by feeding them through the paper path. The data track reader or tag reader in the paper path extracts the identifier, which allows the device to identify the graphic and/or interactive content of the card, and object(s) linked to the card. Not all M-Print cards have to be produced by an M-Print device. For example, pre-printed M-Print cards of a collectible or promotional nature may be included in cereal packets or magazines. And even blank media may bear advertising on the reverse side. Not all M-Print cards have to be interacted with via a pointer in an M-Print device. They can be interacted with via any device, or another scanning device altogether which can read the data track or an application-specific printed barcode.

An M-Print card acts as a token for the graphic and/or interactive content of the card, including any objects linked to the card. A user can easily obtain the original digital content of the card by clicking on the card or 'virtually scanning' the card through the paper path. For example, a photo acts as a token for the original digital image, and a business card acts as a token for the contact details linked to the card. By acting as a token for its own content, a card allows a user to obtain a perfect re-print. In addition to the identifier, the data track and the tags encode a digital signature which allows the card to be authenticated. This has two purposes. Firstly, it allows a blank card to be authenticated during printing to prevent the use of non-sanctioned blanks. Secondly, it allows a card to be authenticated when used as a token, to prevent fraudulent access to the content of the card or objects linked to the card.

Various applications are possible using aspects, components or features of the mobile telecommunications device and associated coded print medium. Such applications can include mobile printing applications, linking, capturing and/or printing generic or specific objects to a print medium, and many other applications providing practical uses for the coded print medium and/or the mobile telecommunications device. Various particular applications are herein described.

In a first aspect the present invention provides a system for printing a greeting card on a print medium, the system comprising:

a mobile telecommunications device which comprises:

- a printer module to print the greeting card on the print medium; and,
- a sensor module to sense a print media identifier of the print medium.

Optionally information associated with the greeting card is optionally stored in an archive.

Optionally the sensor module is used to link the greeting card to the print media identifier.

Optionally the print medium is provided with coded data in a format, the coded data encoding information, at least some of the information being indicative of the print media identifier.

Optionally the format is a linear pattern.

Optionally the information is further indicative of a two-dimensional coordinate grid, and the format is a two-dimensional pattern.

Optionally the printer module prints at least some of the coded data on the print medium.

Optionally the system including use of a database to store an association of the greeting card with the print media identifier.

Optionally the print medium is provided with first coded data in a first format and second coded data in a second format, the first coded data encoding first information and the second coded data encoding second information, at least some of the first information being indicative of the print media identifier, the first format being a linear pattern, at least some of the second information being indicative of the print media identifier and of a two-dimensional coordinate grid, the second format being a two-dimensional pattern.

Optionally the database is at least one of stored locally at the mobile telecommunications device and stored remotely at a server.

Optionally the mobile telecommunications device including:

a media feed path, such that when the print medium is presented in the media feed path at least some of the coded data is read using the sensor module, and the print media identifier is determined using the at least some read coded data.

Optionally information associated with the greeting card can be subsequently retrieved from the archive using the print media identifier.

Optionally the print medium includes at least one interactive element associated with a linked object, and the linked object is associated with a region of the print medium using the second coded data, and the linked object is stored in an object repository.

Optionally printing requires paying for the greeting card using the mobile telecommunications device.

Optionally the information is further indicative of at least part of a digital signature associated with the print-media identifier, the sensor module determining, by reading at least some of the coded data, at least part of the digital signature, and the printer module printing, if the digital signature is authentic, the greeting card.

Optionally the printed greeting card is a permission token readable using the sensor module to retrieve information associated with the greeting card, the information including at least one of: a name; an address; a telephone number; a facsimile number; an e-mail address; a web address; a photograph; and contact details.

Optionally printing the greeting card causes information associated with the greeting card to be archived.

Optionally the information associated with the greeting card includes one or more of: the greeting card; a visual description of the greeting card; an image of the greeting card; an interactive description of the greeting card; contents of the greeting card; and greeting card details.

Optionally the greeting card includes at least one of: a message; a name; an address; a telephone number; a facsimile number; an e-mail address; a web address; a photograph; and contact details printed on the print medium.

Optionally the greeting card is printed periodically by the mobile communications device.

BRIEF DESCRIPTION THE DRAWINGS

An example embodiment of the present invention should become apparent from the following description, which is given by way of example only, of a preferred but non-limiting embodiment, described in connection with the accompanying figures.

DETAILED DESCRIPTION OF THE PREFERRED EMBODIMENTS

Figure 1:
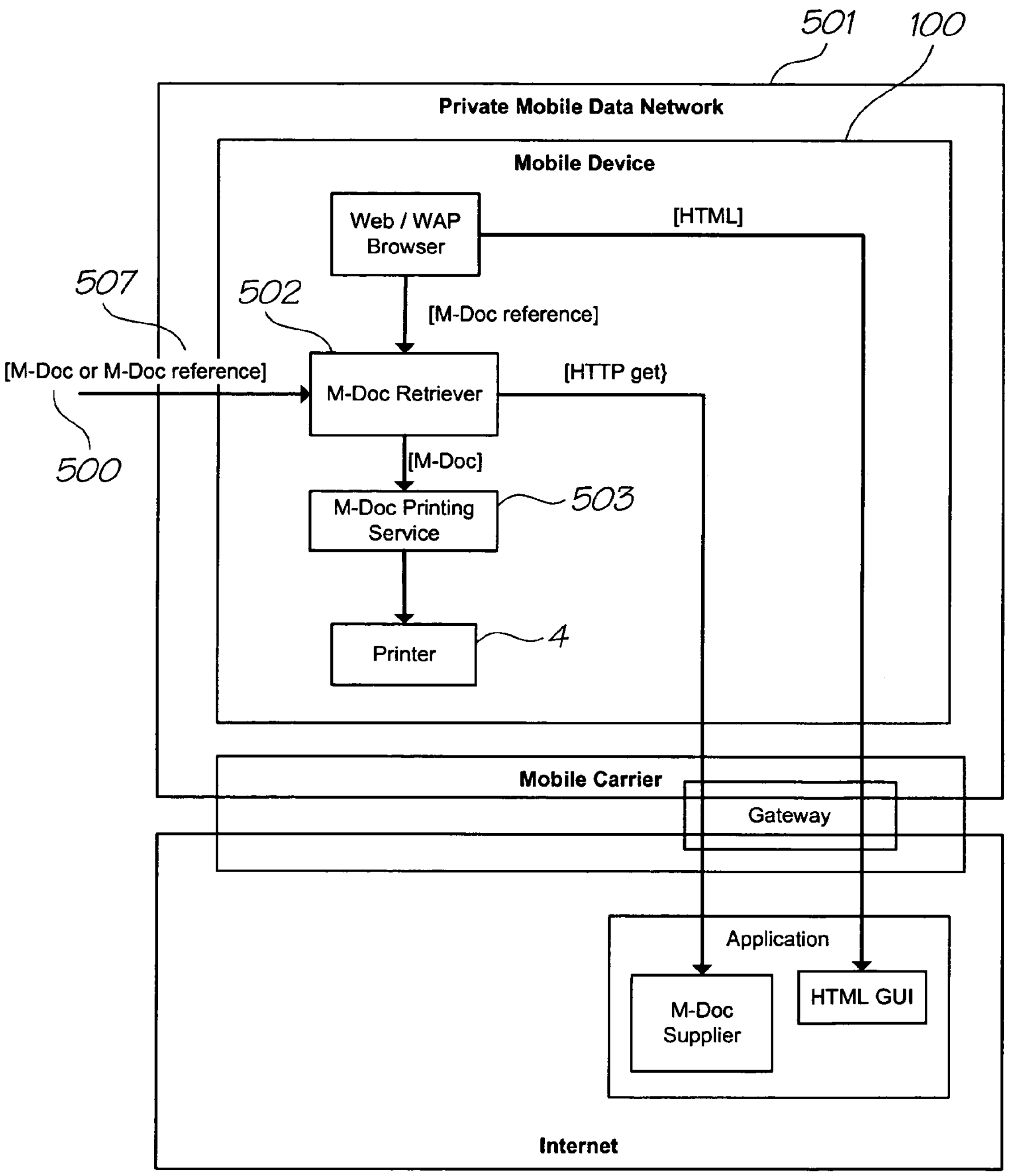
FIG. 1 illustrates an example High Level Architecture.

The following modes, given by way of example only, are described in order to provide a more precise understanding of the subject matter of a preferred embodiment or embodiments. In the figures, incorporated to illustrate features of an example embodiment, like reference numerals are used to identify like parts throughout the figures.

1.0 Printing Internet Based Content Product Architecture

An example of a M-Print print media is the size of a business card. In general, documents or web based materials that have been designed for display on a desktop monitor or to be printed on A4 or Letter paper and may not print well on such sized media. If the content is reduced for the business card media then the content may be too small for easy reading. If multiple pages of media are used to print a page then the user is required to assemble the pages in the correct order before the printout is meaningful. To have presentable, effective content on a business card sized media the content should be specifically authored for that sized media. Described herein is a general mechanism to allow the authors and providers of web applications and web sites to make explicit use of the new media size, such as a business card.

The term "Mobile Document" or M-Doc is herein used to refer to documents specifically authored to be printed via M-Print. The format of a "Mobile Document" (i.e print medium) may vary, it can be pre-rendered and in a format ready to be sent directly to the printer, or it can be in a higher level format that requires rendering before printing. On some mobile devices it is not be possible to render the "Mobile Document" on the device, thus the "Mobile Document" is rendered before being sent to the mobile device. In regard of other mobile devices, the "Mobile Document" can be sent in the high level format and rendered on the mobile device. In general, to be able to render on the device the "Mobile Document" format is provided in an encapsulated format that contains the data necessary to render the M-Doc. Thus, by providing the M-Doc in an encapsulated format, the M-Doc does not necessarily have to rely on a particular font or bitmap being available on the mobile device (i.e. mobile telecommunications device).

A common usage of a "Mobile Document" is for the author of a web page to summarise contents of the web-page in a "Mobile Document", which will herein be referred to as a "Nugget", and to provide a link on the page for users to print the nugget. When the web page is static HTML the content of the nugget can also be static. If the web page is dynamic HTML then it is likely the content of the nugget may also have to be dynamically created.

Current 2.5 G mobile data networks have low bandwidth, high latency, and are expensive to transfer data over. The emerging 3 G networks improve the bandwidth and latency but are still expensive to transfer data over. Mobile carriers tend to subsidise some of the data transfer mechanisms to encourage use, so it is possible to have a situation where it is significantly cheaper to send data via an MMS than it is to transfer it via a HTTP request over the same network. For this reason the proposed architecture supports multiple ways of delivering an M-Doc to a mobile device. The architecture is also designed to minimise the number of requests that need to be made from the device to retrieve a M-Doc and to also to minimise the amount of data that needs to be transferred to the device to transmit an M-Doc.

There are three messaging services in common use in the mobile networks at the moment: SMS (Short Message Service), EMS (Enhanced Message Service and MMS) (Multimedia Message Service). SMS is generally designed for sending text only messages up to 160 characters long. EMS is an enhanced version of SMS consisting of several SMS messages clustered together. This mechanism is used to deliver ring tones, etc to handsets. Both SMS and EMS are implemented using existing mechanisms in the GSM or CDMA networks and do not require IP based bearers such as GPRS. MMS provides the ability to send a mixture of multimedia formats such as images, sound and movies along with a definition of how to use these multimedia formats using the Synchronized Multimedia Integration Language, SMIL. MMS does not have any theoretical size limits. MMS is implemented on top of IP bearers and requires GPRS or one the 3 G equivalents to be deployed. Since MMS uses IP bearers it is not able to self-transfer or "push" itself out to a handset, instead it uses SMS to alert the user to the fact that an MMS message is waiting in the network for the user to retrieve, so it requires a "push" and "pull" to retrieve the message, whereas SMS requires a single "push" and EMS is delivered by multiple "pushes".

1.1 High Level Architecture

Referring to FIG. 1, a M-Doc 500 residing in the network 501 generally requires delivery to the mobile device 100 before it can be printed. There are two ways in which a request to retrieve and print an M-Doc 500 can originate:

1-direct user action, typically clicking on a link on a web page; or 2-the arrival of an SMS or MMS containing a M-Doc reference 507 or an M-Doc 500 itself.

A M-Doc Retriever 502 is a component responsible for fetching an M-Doc 500. The M-Doc 500 is then passed to the M-Doc Printing Service 503 and printed. The following sections explain each of these major components and their inputs and outputs in more detail.

1.1.1 Web/WAP Browser

The Web Browser 504 is a third party application available on the mobile device 100. It is used by the user to browse web pages. A web site that supports printing M-Docs 500 includes web pages that contain M-Doc Reference links. When the user clicks on a M-Doc Reference link, a M-Doc 500 reference is returned to the browser 504. The M-Doc reference 507 can be handled by the browser 504 in a number of ways dependent upon the operating system running on the mobile device 100.

It is also possible for the M-Doc Retriever 502 to be activated directly by passing the M-Doc Retriever 502 a web page reference. This triggers a Nugget Creation service 506 to generate a Nugget for the website which the web page reference is associated with. The ability to generate a meaningful Nugget for a website depends on the content of the website.

1.1.2 M-Doc Retriever

The M-Doc retriever 502 is activated by the arrival of M-Doc reference 507 to the device.

Figure 2:
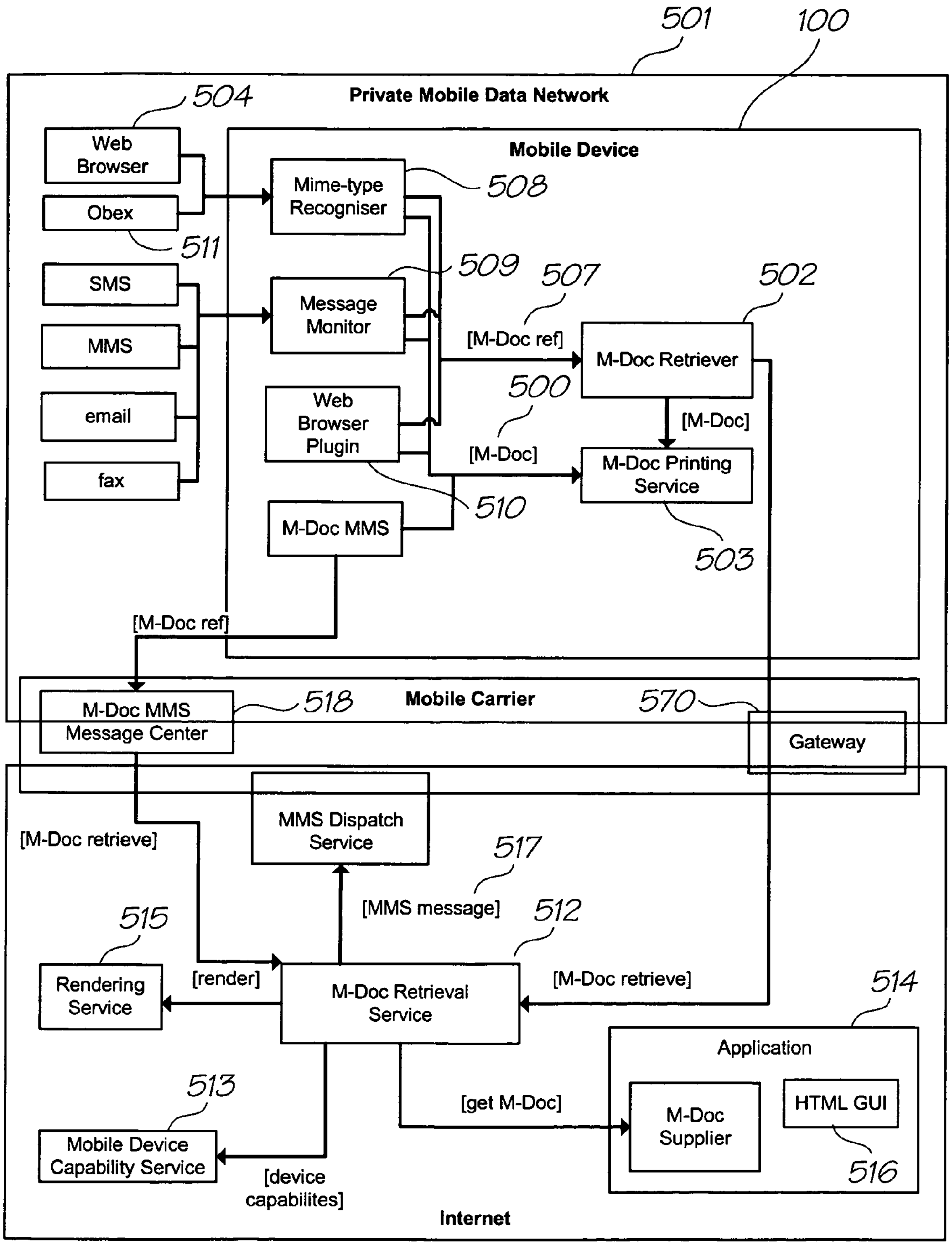
FIG. 2 illustrates example M-Doc Retriever Components.

Referring to FIG. 2, the M-Doc Retriever 502 is responsible for taking a M-Doc Reference 507 and resolving it to an M-Doc 500 to be passed onto the M-Doc Printing Service 503. There are a number of ways that a M-Doc Reference 507 can be supplied to the M-Doc Retriever 502:

1. MIME type recogniser 508—This can be activated either by clicking on a link in a web page that causes an "HTTP Get" of an object whose MIME type is an M-Doc reference 507. Or it can be activated by the arrival on the mobile device of an Obex transfer 511.
2. Message Monitor 509—This is a component that monitors the Inbox of the Messaging Service on the mobile device. When it receives a message from any source that contains an M-Doc reference 507, the Message Monitor 504 passes the M-Doc reference 507 onto the M-Doc Retriever 502.
3. Web browser plugin 510—This is triggered by explicit scripting code in a web page being browsed on a web browser 504. When the Web browser plugin is activated, it is passed a M-Doc reference 507 which is passed onto the M-Doc Retriever 502.

The M-Doc Retriever 502 receives the M-Doc Reference 507 which is in the format of a URI (Uniform Resource Identifier). The M-Doc Retriever 502 appends device specific information to URI and is dispatched via an HTTP request to the M-Doc Retrieval Service 512 running on the device. Device specific information that is appended to the URI is dependent upon how the system has been deployed and the capabilities of the device.

If a Mobile Device Capability Service 513 is deployed in the network 501 then the device specific information appended only requires identification the handset, via IMEI. If the Mobile Device Capability Service 513 is not deployed in the network 501 then the device 100 is required to append information relating to the printer 4, the formats of M-Doc's 500 the device 100 is capable of printing and the preferred delivery method. The printer information required is deployment specific. If the renderer is able to look up the printer characteristics based on the handset or a printer version number then only those need to be provided, but if not, then information relating the printers resolution and colour space parameters are required.

The M-Doc URI that is supplied by the application is used to retrieve the M-Doc 500. This URI contains information needed to retrieve or generate the M-Doc 500 from the application 514. If the format of the returned M-Doc 500 matches the format(s) the device 100 is capable of printing, then the document 500 is delivered to the device 100. If there is an unsuccessful match, the M-Doc 500 is rendered. This is performed by passing the document 500 to the rendering service 515 along with the printer information. The rendering service returns the document in a pre-rendered format which can be printed by a mobile device 100 containing a printer 4.

The way in which the M-Doc 500 is delivered back to the M-Doc retriever 502 can also vary. It may be returned in the reply to the original HTTP request or it may be sent via an MMS or e-mail. These later two cases are most likely to be used in an environment where the pricing policy of a carrier encourages MMS or email use over general web browsing. The preferred delivery method may be included in the retrieval request or it may be looked up via the Mobile Device Capability Service 513.

The Rendering Service 515 may also be used directly by application writers who want to provide pre-rendered M-Doc's within their application. In this case the Rendering Service 515 is accessed via SOAP (Simple Object Access Protocol) as a web service, providing the M-Doc 500 in its authored format and obtaining the pre-rendered print format document and a thumbnail image for use in a GUI 516 of the application 514 running on the device 100.

When an MMS 517 is sent to the mobile device 100, the MMS 517 is stored in the mobile network at a MMS Message Centre 518 and an SMS is sent to the device to alert the user an MMS 517 is waiting to be fetched. With a modification this notification mechanism can be used to deliver an M-Doc 500 to a phone 100. The SMS notification can contain both an M-Doc reference 507 and an MMS notification. The request to fetch the MMS from the Message Centre 518 can be enhanced with the M-Doc reference 509, allowing the Message Centre 518 to contact the M-Doc Retrieval Service 512 to retrieve the M-Doc 500 in the body of the MMS 517. This service is called an M-Doc MMS service.

Any email, MMS, Obex or web page may contain a direct M-Doc 500 rather than an M-Doc Reference 507. In this case the M-Doc 500 is passed directly onto the M-Doc Printing Service 503. Unless the sender of the message knows the capability of the handset receiving the M-Doc 500, the M-Doc 500 may not be able to be rendered appropriately, hence the M-Doc Reference 507 approach is preferred, but in some cases, such as a subscription, the sender may know the capabilities of the handset and hence be able to by-pass the M-Doc Retrieval process and deliver the M-Doc 500 directly.

1.1.3 M-Doc Printing Service

The M-Doc Printing Service 503 prints the document 500 to the printer 4 in the mobile device 100. M-Doc's 500 may have different document formats, but the M-Doc Retriever stage ensures that it retrieves an M-Doc 500 in a format that can be printed by the mobile device 100 without any further network interactions.

1.1.4 Nugget Production

A Nugget is the distillation of the content of a web page onto an M-Print sized printout. In general this not only involves reducing the web layout so that the content fits onto the M-Print printout. The process also involves selecting the key pieces of information on the web page and explicitly composing an M-Doc 500 that presents the information appropriately. Nugget support can be provided in two ways:

1. As part of the design of the application 514
2. By a nugget generating service 519.

Providing nugget support as part of the design of web application 514 requires the author of the web interface to provide a link to a nugget on the web page. Depending on the nature of the web content the nugget could either be statically authored along with the page or it could be dynamically authored based on the dynamic content on the web page.

For web sites that do not support Nuggets as part of the interface, nuggets can be generated by a nugget generation service 519.

Figure 3:
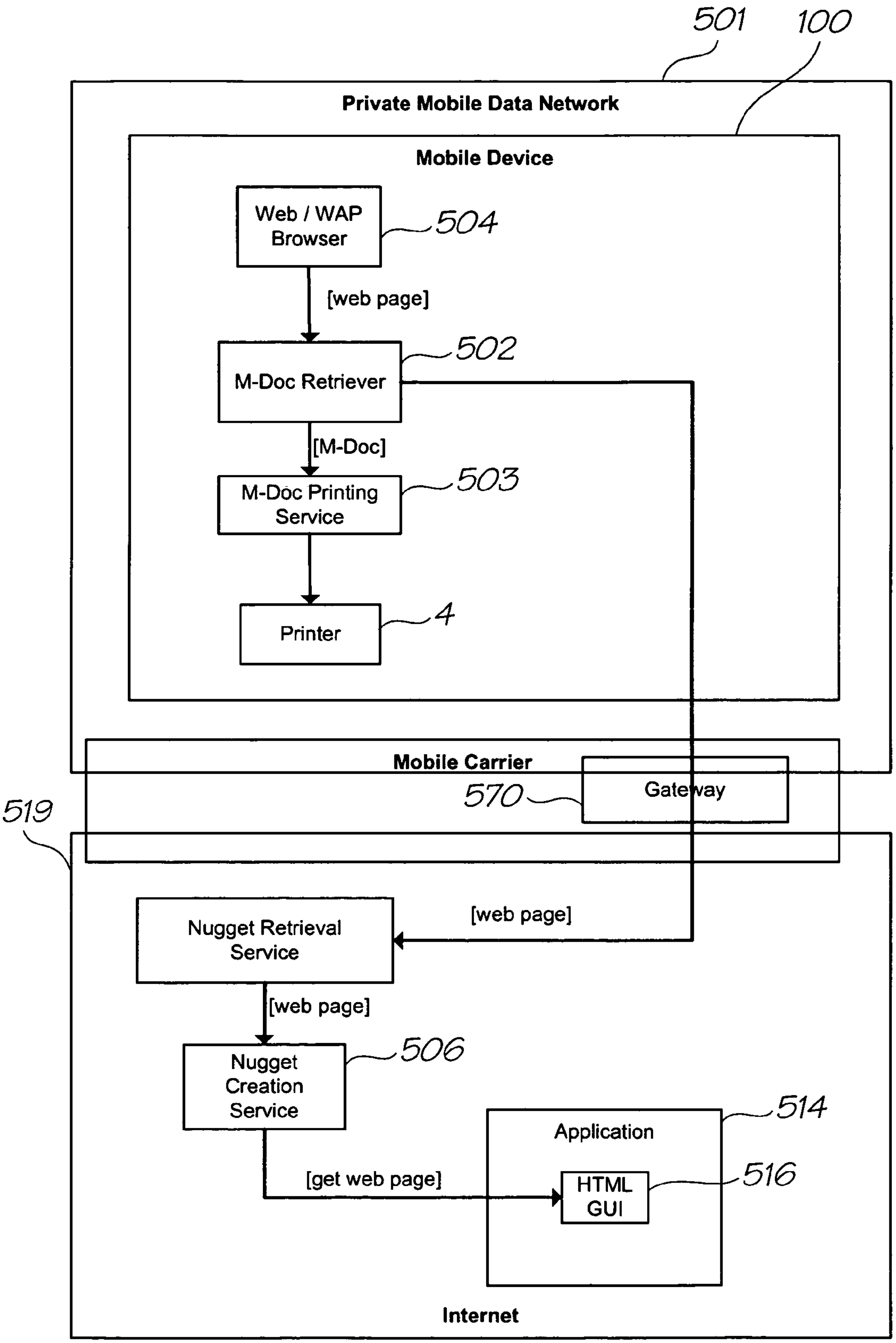
FIG. 3 illustrates an example Nugget Generation Service.

Referring to FIG. 3, the Nugget Generation Service 519 is activated when a special form of a M-Doc Reference 507 is passed to the M-Doc Retriever 502 on the mobile device 100, which references a web page rather than an M-Doc. The Nugget Retrieval Service detects this and passes the request onto the Nugget Creation Service 519.

The Nugget Creation Service 519 generates a nugget for the supplied web page in one of two ways:

1. If the supplied web page comes from an explicitly supported web application, it passes the web page onto the nugget generator for that web application. Common web applications such as: Google, e-bay, Yahoo, Wikipedia and Amazon could be supported.
2. If the web page is not from a supported application, then the contents is scaled to fit into an M-Doc 500.

The nugget generator for supported applications include knowledge of the structure of the web page and the main purpose of the web application, and thus be able to extract information from the key fields and present that in a nugget. For example:

A Google web page could be distilled to a nugget by showing the: search criteria; the top ten hits; how many other hits where returned.

An Amazon web page could be distilled to showing the contents of the shopping cart.

A Wikipedia web page could be distilled to the term and the definition.

1.2 Applications

This section discusses some applications of Internet Based M-Document printing architecture. Any M-Doc 500 can be Netpage enabled.

1.2.1 Daily Subscription Services

Many people buy the daily newspapers to access a few small sections of the paper, eg. puzzles, crosswords or cartoons. Using M-Doc printing it is possible for a user to browse online to the content and then request a printout of the content of their choice. To avoid having to browse each day, a subscription service that "pushes" the user's desired sections out to them each day can be set up. The service could use: SMS, MMS or e-mail to "push" the M-Doc References out to the mobile device. The user can then print then content of the subscription when required.

Some of the sections of a newspaper that would suit this form of distribution are:

Crossword puzzles: Crossword grid on one sheet; clues on another.

Number puzzles, eg. Sudoku

Jokes

Cartoons

Local Weather 1.2.2 Navigation and Location Based Services

Web services such as "WhereIs" (www.whereis.com) provide both the ability to get a list of directions to go from one location to another and/or a map. Using a mobile device's browser 504 the user can enter the destination and their current location and then have the map and directions delivered as an M-Doc 500 to be printed.

This gives a more convenient presentation of the map and directions to refer to while driving. Also in many regions in the world it is illegal to look at a mobile phone while driving, but it is not illegal to consult a map or written directions.

Mobile devices 100 that support location services are able to supply their location automatically. In this case it is only necessary to specify the destination to receive a map and/or a set of directions to print.

As well as assisting navigation, location based services can be used to present of list of possible destinations. For example:

A service that prints out the list of restaurants within walking distance;

Directions to the closest Service Station (or any type of shop);

Directions to the closest public transport stop.

1.2.3 Company Business Cards

Corporate websites often promote a company's public image, this can be extended by providing the ability to print a "Company Business Card" that gives the general information about the company and its general contact details. As well as a general "Company Business Card", individual departments could easily have their own business cards, eg. the Service Department contact details.

Web sites for companies normally have a page dedicated to how to find them, that is, directions on how to get to their buildings from major transport hubs. These sites could easily include M-Documents 500 showing maps of:

How to get to the company's premises

Where the closest parking is

Where the closest Hotel is

Directions on how to navigate from one building to another.

1.2.4 Discount Coupon/Voucher

Discount coupons can be delivered by M-Documents 500. These can be delivered via the web as part of an advertisement, either directly with the advertisement containing a link to a M-Document 500 or a coupon could be delivered to the mobile device as a reward for clicking through an advertisement to the companies web site.

A company could "push" out via SMS, MMS or e-mail vouchers to members of their loyalty scheme or just to the general public as a promotion. Another variation on this scheme is the ability to deliver a voucher or coupon to a user who enters a competition or votes on-line. For example, using an SMS to vote on a reality TV show could result in an MMS being returned with a coupon for a prize, or voting from a web site could return an M-Doc 500 with an advertisement and the possibility of a prize.

1.2.5 On-line Receipts

When performing on-line transactions from a mobile device 100 a receipt for the transaction can be returned via an M-Doc 500. This gives a printout that can be filed with a user's other receipts. The receipts can contain bar codes and/or be Netpage enabled to allow the transaction to be recalled on-line on demand. Some example on-line transactions this could be used for are:

Betting, the nugget can record: the selected options, the odds, the money wagered and the possible payouts;

Banking, the nugget can be similar to an EFTPOS receipt;

Purchasing, the nugget can be similar to a shop receipt;

Paying bills;

Taxi payment 1.2.6 Ticketing

For tickets that do not require magnetic stripes it is possible to deliver them over-the-air at the time of purchase. This could included: Public transport tickets; Theme park ride tickets; Theatre tickets; Cinema tickets.

1.2.7 Web CAM Print

While viewing a web cam on your mobile device, a user can select print and have an M-Document 500 of the image at that time sent to the users phone.

1.2.8 On-line Gaming

On-line games can use Nuggets to provide additional information about the game. They can be used to provide: Cheat sheets; Maps; Character summaries; Brag cards, to demonstrate what level you have reached; Vouchers or Coupons as rewards for achievement.

2. Player Architecture

A Netpage Player 520 is a physical or virtual device capable of "playing" requests of various types. A play request 521 consists of three parts:

1. The target 522, which specifies which player 520 the request 521 should be played.
2. The operation 523, which specifies the action to be performed.
3. A set of values 524, which are supplied as parameters to the operation 523'.

Typically play requests 521 arise in response to user actions. For example, the user clicks on a tagged surface with a Netpage pointer, or interacts with an application that is in contact with the Netpage system. Play requests 521 can be used to provide a simple feedback mechanism (such as a request to display a text string to the user), or may be used to cause more sophisticated interactions with physical devices (such as setting the thermostat temperature on a home air conditioning system).

Figure 4:
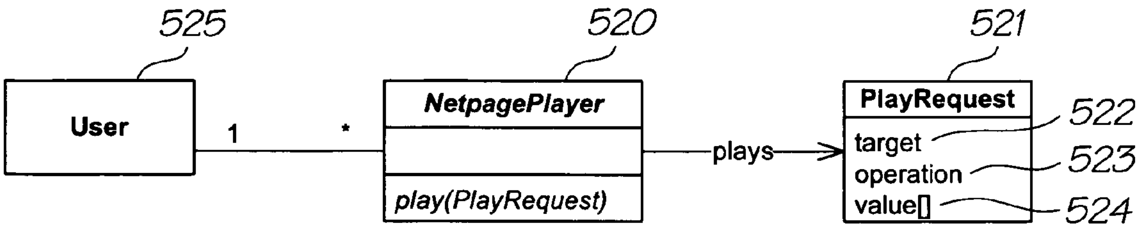
FIG. 4 illustrates an example Player.

Individual players 520 can be associated with a user 525 as shown in FIG. 4. A user 525 may be associated with multiple players 520 each of which supports the playing of possibly overlapping sets of PlayRequests 521.

It is likely that in many cases a single physical Netpage-Player device 520 is shared between multiple users 525. For example, a hi-fi audio system in a family room may be configured as an audio player for multiple members of the family. For the sake of brevity, this section focuses on cases where physical players are exclusively used by a single user, however, it will be appreciated that this section may be applied to multiple users.

Central to the NetpagePlayer 520 concept is the notion of a PlayRequest 521 which are objects that represent a request to perform an operation on some device. This sections describes various details related to PlayRequests 521.

2.1 Structure of a PlayRequest

Figure 5:
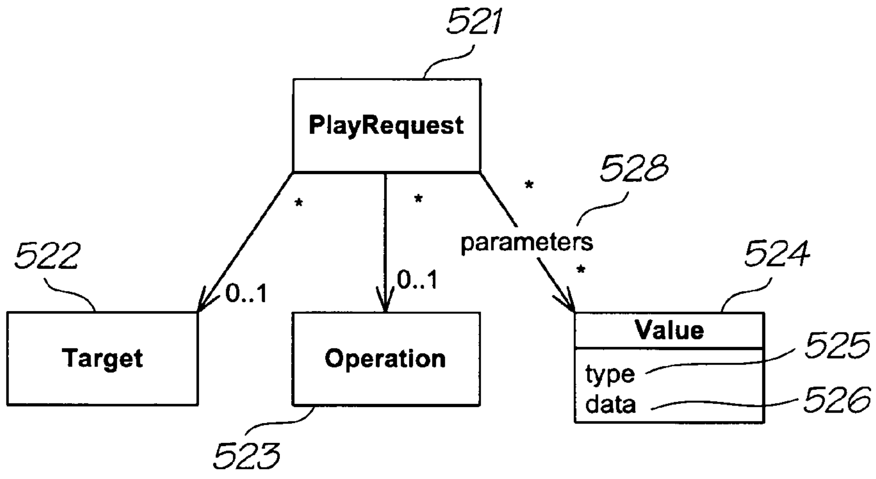
FIG. 5 illustrates an example PlayRequest.

A PlayRequest (see FIG. 5) consists of three parts, each of which is optional:

1. An optional target 522 which specifies which Netpage player 520 the request 521 should be played,
2. An optional operation 523 which specifies the type of action to be performed on the target player 522, and 3. An optional list of values 524 which are supplied as parameters to the operation 523.

A play request 521 may either be fully or partially specified. A fully specified play request completely specifies all of the information (target, operation, and parameters) required to unambiguously deliver the request to the target 522 and to perform the desired operation 532. A partially specified play request provides some indication of the request 521 to be played, but does not provide enough information in order for the play request 521 to be successfully delivered and played without further processing.

A target 522 may either fully or partially specify the target 522 of a play request 521. A fully specified target completely identifies the physical player 520 on which the request 521 should be played. A partially specified target provides some indication of the desired target 522, but does not provide enough information in order for the play request 521 to be delivered without further processing. An operation 523 can also be fully or partially specified. A Value 524 consists of a physical type 525 and associated data 526. For example, the physical type 525 might be "image/jpeg" and the data 526 would be the binary image data.

2.2 Values and Types

A Value 524 represents an instance of some physical type 525. Each Value 524 has an associated physical type 525 and zero or more associated type categories. The physical type identifies the structure of the data element of the Value 524. A possible mechanism would be to use MIME types. For example, if the physical type 525 is image/jpeg then the data element would contain the binary data of an image in jpeg format.

Figure 6:
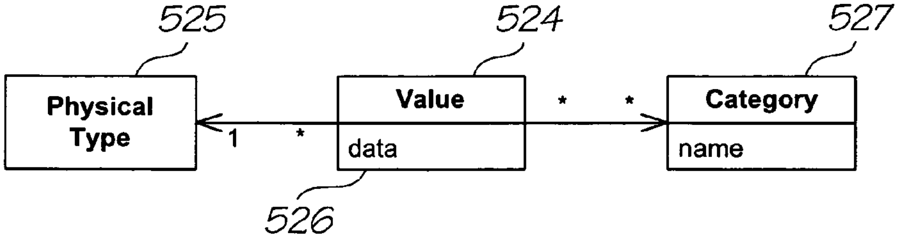
FIG. 6 illustrates example Values, Types and Categories.

Referring to FIG. 6, a Value is also optionally associated with one or more Categories 527. A Category 527 is used to provide additional information about the value 524 which may allow it to be handled more sensibly by the system (i.e. to allow a PlayRequest to be better matched against the capabilities of candidate targets during request routing).

As an example, an image value produced by a digital camera may have the physical type 525 image/jpeg, but may also be associated with a category 527 of "photo", whereas an image value produced by a fax package might also have the physical type 525 image/jpeg, but could be associated with a category 527 of "facsimile" or with no category at all.

RequestRouters can take into account both the physical type 525 of a value 524 and the categories 527 to which it belongs when determining the most appropriate way to handle a request 521.

2.3 Sample PlayRequests

To better demonstrate the PlayRequest concept, this section provides a number of sample PlayRequests 521. A PlayRequest 521 can be viewed in tabular form as shown below by example in Table 1.

TABLE 1

| | | |
|---|---|---|
| target | <identification of the target of the request> | |
| operation | <the name of the operation to be performed> | |
| parameters | <physical type and categories of parameter 1> | <value of parameter 1> |
| | . . . | . . . |
| | <physical type and categories of parameter n> | <value of parameter n> |

Firstly, the Request 1 shows a fully specified PlayRequest 521 for dialling a number on a specific mobile phone.

Request 1

| | | |
|---|---|---|
| target | mobile-phone-xyz56474238 | |
| operation | dial | |
| parameters | phone-number | "555 6754" |

The target field 522 is fully specified and indicates that the request 521 is to be performed on the device 520 identified by the name/address "mobile-phone-xyz56474238". Note that for simplicity, simple text strings to indicate the address of each physical target 522. The play request 521 contains an operation of "dial" which is understood by the mobile phone's NetpagePlayer 520. The request 521 also includes a phone number which is a required parameter 528 to the "dial" operation 523.

As shown below, Request 2 is only partially specified due to only containing a partially specified target 522. The target 522 specifies that the request 521 should be played on a mobile phone, but does not specify which mobile phone.

Request 2

| | | |
|---|---|---|
| target | mobile phone | |
| operation | dial | |
| parameters | phone-number | "555 6754" |

Request 3 shown below is also only partially specified. In this case, the target 522 has been completely left out. Although only being partially specified, the request 521 has a definite meaning: "dial the phone number 555 6754". The device to be used to dial the number is still to be determined.

Request 3

| | | |
|---|---|---|
| target | | |
| operation | dial | |
| parameters | phone-number | "555 6754" |

Request 4 is even less filly specified that Request 3. Request 4 simply contains the phone number "555 6754". The operation to be performed with the number and the device to handle the request (the target) is still to be determined and the device to handle the request (the target) is still to be determined.

Request 4

| | | |
|---|---|---|
| target | | |
| operation | | |
| parameters | phone-number | "555 6754" |

Request 5 contains a filly specified target 522, but does not specify an operation 523. Thus, the target of the request 521 is known, but what the target 522 is to do with the request (the operation) is still to be determined.

Request 5

| | | |
|---|---|---|
| target | mobile-phone-xyz56474238 | |
| operation | | |
| parameters | phone-number | "555 6754" |

Request 6 can be used to send a simple text message to the user. The target 522 is not specified, so the request means display the following message on whichever player is the most appropriate at the current time.

| Request 6 | | |
|---|---|---|
| target | | |
| operation | display | |
| parameters | text | "Temperature in Sydney is 28° C." |

2.4 Invocation of PlayRequests

Play requests 521 can arise in one of two ways:

1. The user interacts with a printed Netpage form that has been authored to include invocations of play requests 521.
2. An arbitrary application sends a play request 521 to a Netpage Server 529.

These are discussed in the following sections.

2.4.1 Authored PlayRequests

Figure 7:
FIG. 7 illustrates an example interactive business card.

PlayRequests 521 can be authored directly into a printed Netpage document. FIG. 7 provides an example of an interactive business card 530. The business card 530 contains interactive elements 531 that can be triggered by clicking on them with a Netpage pointer. Each interactive element causes a PlayRequest 521 to be invoked. The Netpage Server 529 then arranges for the request 521 to be played by routing it to the appropriate player device 520.

For example, referring to FIG. 7, consider a user with a Netpage-enabled mobile phone device 100 with a built-in Netpage pointer. The user clicks on the mobile phone icon 532 on the business card 530 which causes the PlayRequest 521 to be triggered. The server 529 routes the play request 521 to the user's mobile phone 100 and upon receiving the request 521, the mobile phone 100 commences dialling the required number.

2.4.2 Application Invoked PlayRequests

Figure 8:
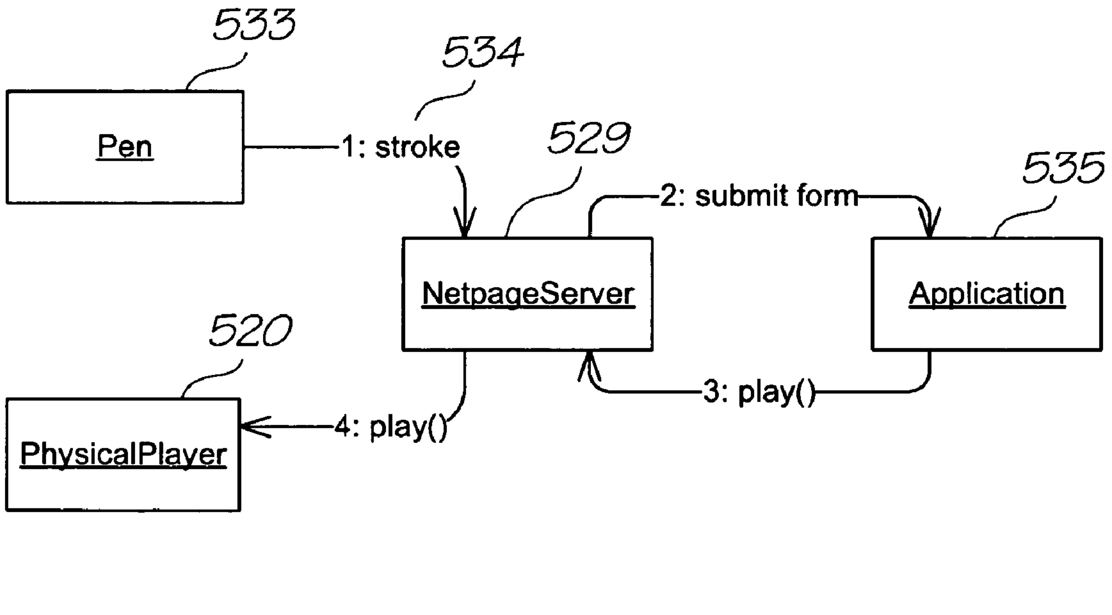
FIG. 8 illustrates an example Player Sequence.

FIG. 8 shows a typical example of an application invoked PlayRequest 521. The steps are as follows:

1. A Netpage pen 533 transmits a digital ink stroke 534 to the Netpage Server 529.
2. The stroke 534 is determined to be a request 521 to submit a Netpage form for processing.
3. The form is submitted to the corresponding Application 535.
4. As part of the form submission processing, the application 535 requests that a play request 521 be played by a Netpage Player 520 associated with the user 525 who made the submission.
5. The Server 529 determines the target device 522 and relays the play request 521 to that device 522.

2.5 Player Devices

Netpage Player instances can be deployed on various Player devices (platforms). Individual players support some subset of the full range of PlayRequests 521 supported by Netpage. Table 2 shows some examples of Netpage Player Devices.

TABLE 2

Example Netpage Player Devices

| Player Device | Comments |
|---|---|
| Desktop Player 585 | This device is a powerful computing unit usually with fixed network connectivity. A desktop player is capable of playing a wide range of PlayRequests (e.g. audio, video, image, html, etc). The player can interact with various external software/hardware components running on the device. |
| Thin Mobile Player 587 | This device is a mobile unit with limited computing power such as web-enabled or low-end mobile phones.<br>The thin player running on such mobile device is capable of playing various PlayRequests by utilizing the capabilities of the device. Examples include sending SMS objects, dialling phone number objects, etc.<br>Due to the processing limitations of the device, a remote server (Netpage and Application Server) processes the input strokes/clicks and provides the objects to the player. |
| Smart Mobile Player 588 | This device is a mobile unit with more computing and storage capabilities, such as a high-end smart mobile phone or a PDA.<br>Such device is capable of enabling most of the Netpage functionality by running a Micro edition of the Netpage Server locally.<br>In such an environment, the player can receive PlayRequests from the local server (running on the device) and no on-line connectivity to a remote server peer would be necessarily required at the time of playing. |
| Embedded Player | An embedded player is a custom device that is built for a specific application.<br>Examples of such players are Digital Camera, capable of playing (i.e. showing) images and possibly video; or Audio Player, capable of playing audio. The Netpage player is either built into the device or as a detachable unit. |

Note that while some of the devices mentioned in Table 2 are also capable of recording/capturing objects (e.g. a digital camera of a mobile phone is capable of capturing images), access to such captured data is not accessible via the Netpage Player concept, but can be accessed via a Netpage Clipboard, which will be discussed in more detail.

2.6 Request Processing

This sections describes how PlayRequest objects 521 are processed throughout the Netpage system. The processing of requests includes two operations:

1. The routing of requests 521 from one NetpagePlayer 520 to another.
2. The transformation of PlayRequests 521 (for example to change a partially specified request more specified) as they are being routed.

2.6.1 Request Routing

Figure 9:
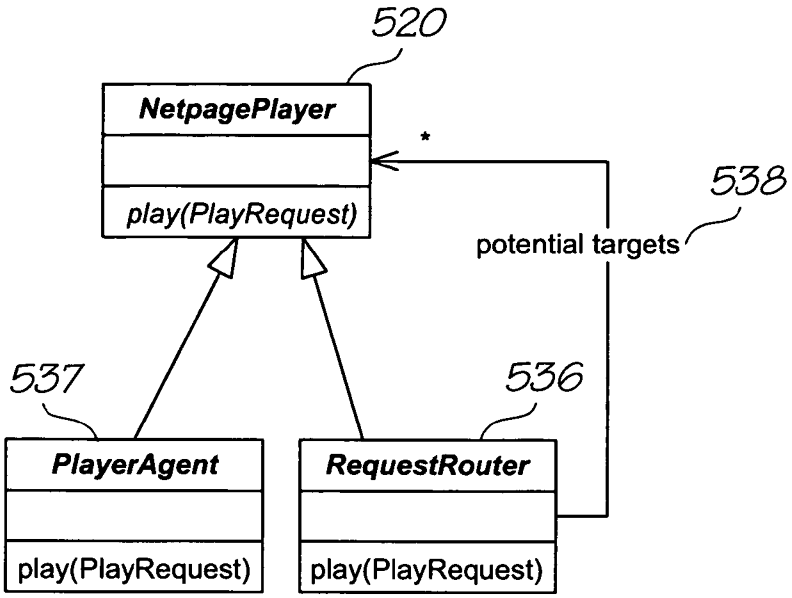
FIG. 9 illustrates an example RequestRouter and related classes.

A play request 521 is routed from source to the eventual destination via one or more intermediary RequestRouters 536 as shown in FIG. 9. RequestRouters 536 implement the NetpagePlayer interface, and are responsible for routing each PlayRequest 521 they receive to an appropriate target NetpagePlayer 520. Each RequestRouter 536 maintains a set of potential targets 538. Eventually a PlayRequest 521 arrives at a PlayerAgent 537 which is responsible for actually performing the play request 521.

Figure 10:
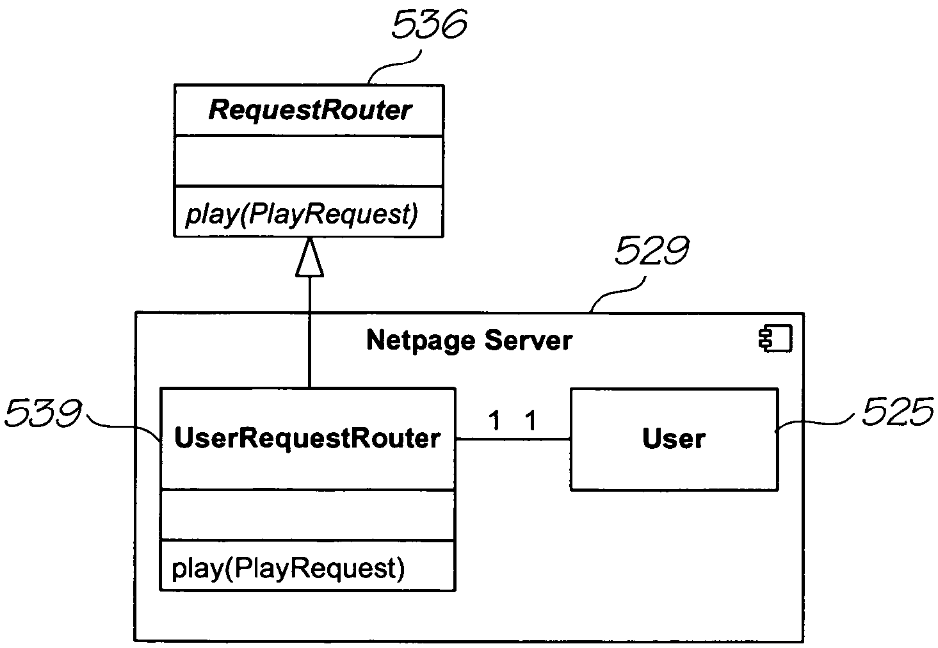
FIG. 10 illustrates an example UserRequestRouter.

All PlayRequests 521 from (or on behalf of) a user 525 are initially handled by a RequestRouter 536 inside the Netpage Server 529. This router is called the UserRequestRouter 539 (see FIG. 10). Typically the UserRequestRouter 539 forwards requests to a RequestRouter 536 residing on a physical device, although such forwarding may pass through an arbitrary number of intermediary RequestRouters 536 along the way. Device based RequestRouters 536 are responsible for routing requests 521 to the various player agents 537 running on the device.

Figure 11:
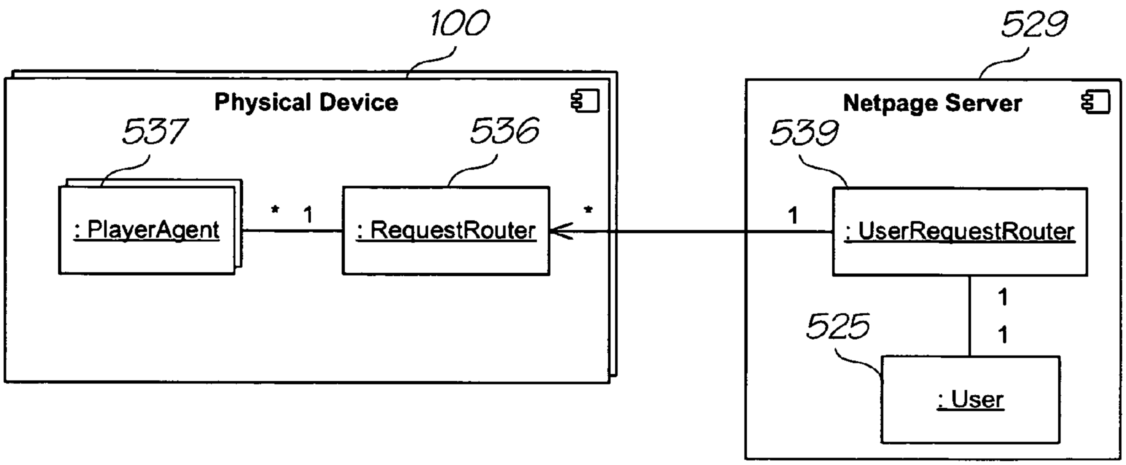
FIG. 11 illustrates a typical arrangement of routers and player agents in a Netpage system.

The typical scenario is shown in FIG. 11. The UserRequestRouter 539 has a set of potential targets 538 which are all RequestRouters 536 residing on physical devices. Each device's RequestRouter 536 then has a set of potential PlayerAgent targets. The PlayerAgents are the NetpagePlayers 520 that actually play requests 521.

2.6.2 Request Transformation

Each RequestRouter 536 can optionally transform the PlayRequest 521 it receives before passing it on to a subsequent NetpagePlayer 520. The transformation typically produces a more fully specified version of the supplied PlayRequest 521, but may also produce a completely new PlayRequest 521 with no fields in common with the source PlayRequest 521.

2.6.3 Player Capabilities

Different players have different capabilities. That is, each player is capable of playing a different set of PlayRequests 521. The capabilities of a NetpagePlayer 520 are specified in a CapabilitySpecification 540. The capabilities 541 of each child player are taken into account by RequestRouters 536 when handling PlayRequests 521. The capabilities 541 of different players may overlap, potentially resulting in ambiguous PlayRequests 521. Such ambiguities are resolved by RequestRouters using methods described in further detail below.

The CapabilitySpecification 540 is not limited to simply specifying which operations 523 can be performed on which value types 524. It may also specify finer grained details. For a specific PlayRequest 521 the CapabilitySpecification 540 might specify that it can only handle a subset of possible values. For example, a player 520 that supports the playing of audio objects could place a limitation on the size of audio objects supported.

2.6.3.1 Capability and Request Propagation

Figure 12:
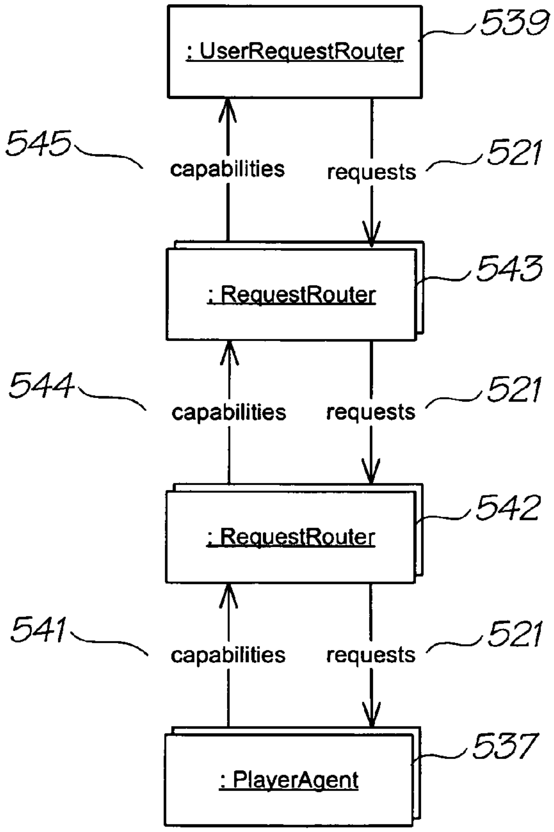
FIG. 12 illustrates example Capability and Request Propagation.

As shown in FIG. 12, a PlayerAgent 537 advertises its capabilities 541 to its parent RequestRouter 542 which in turn propagates the aggregation of its children's capabilities 544 to its parent RequestRouter 543. Eventually the propagation reaches the UserRequestRouter 539 which then has an overall view of the capabilities 545 of all of the players at its disposal. PlayRequest propagation moves in the opposite direction. Requests 521 start at the UserRequestRouter which determines the most appropriate child to which the request should be sent. The (possibly transformed) request is sent to the selected child which in turn propagates the request to one of its children. Eventually the request reaches a PlayerAgent 537 which is responsible for actually playing the request.

2.6.3.2 Capability Aggregation and Transformation

As a RequestRouter propagates player capabilities (541, 544, 545) to its parent RequestRouter 536, it may perform capability aggregation and transformation. Capability Aggregation is where the router 536 combines the capabilities of its children into a single capability specification 548. Capability Transformation is where the router 536 modifies the advertised capabilities of its children due to capabilities (or perhaps limitations) of the router itself.

Figure 13:
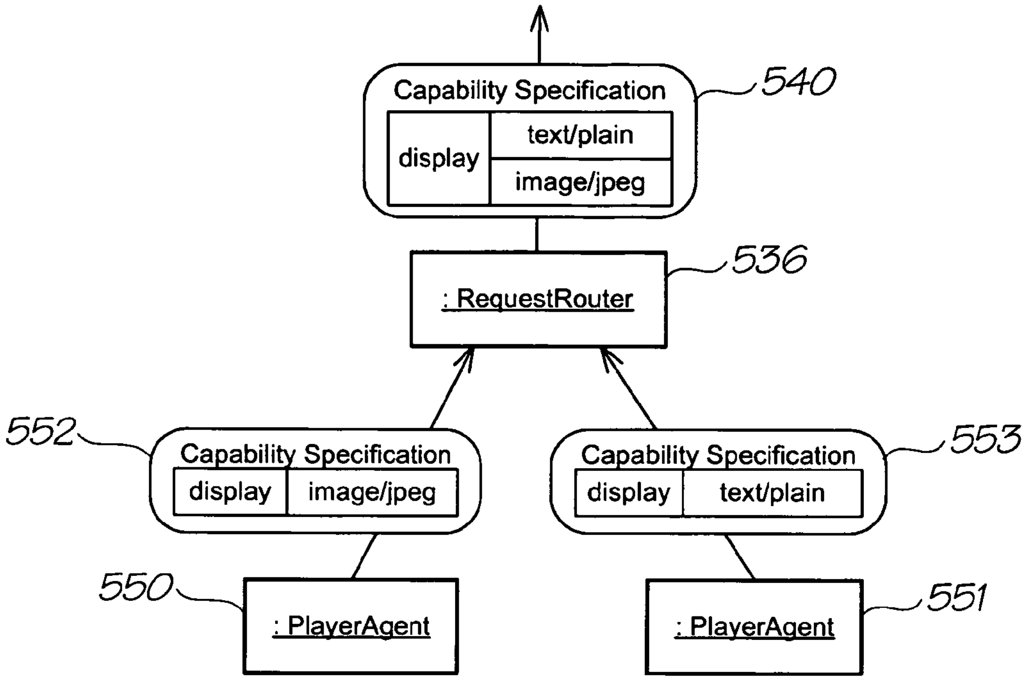
FIG. 13 illustrates an example Capability Aggregation.

FIG. 13 provides an example of a simple capability aggregation. The router has two children 550, 551, the first child 550 of which advertises the capability to display jpeg images, the second child advertises the capability 553 to display plain text. The router 536 then aggregates the child capabilities 552, 553 into a single capability specification 540 which is capable of displaying both jpeg images and plain text.

Figure 14:
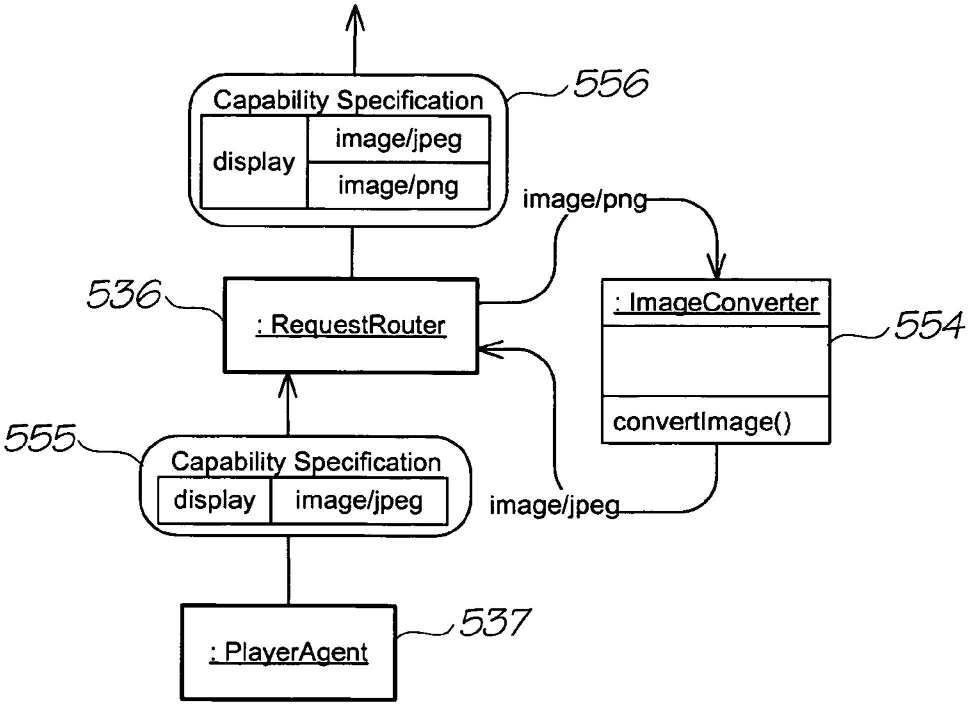
FIG. 14 illustrates an example Capability Transformation.

FIG. 14 provides an example of a capability transformation. The PlayerAgent 537 advertises its capability 555 to display image/jpegs. The RequestRouter 536 has access to an image converter 559 that can convert images in png format to jpeg format. As such, the capability specification 555 is transformed before propagation into a capability specification 556 that includes the ability to display files in png format as well as in jpeg format.

2.6.4 Dynamic Capabilities

The capabilities advertised by a particular NetpagePlayer 520 can change over time. For example:

1. Additional hardware or software can be installed/removed to/from a device, enabling the player to support more/less PlayRequests 521.
2. The maximum object size supported by a player may change depending on the spare capacity in the player's memory.
3. A mobile player might be capable of receiving streaming media when it is connected to the network through a high-bandwidth network.
4. Common user interactions with the player (e.g. starting an application, changing a setting) can cause the player to advertise more or less capabilities.

Such changes in capabilities are to be communicated to the player's parent RequestRouter 536, and potentially, but not always, to the parent's parent, and so on all the way to the UserRequestRouter 539.

At the same time, as dynamic capability changes are being propagated, requests 521 are being routed in the opposite direction (as shown in FIG. 12). This creates a race condition between capability propagation and request routing, such that by the time a request arrives at a RequestRouter 536, either the request can no longer be handled by the player 520, or the player 520 is no longer the most appropriate recipient for that request 521. Either case may require that a request 521 be rejected by the player 520 (be it a router or an agent) and re-routed to the appropriate player 520.

Additionally, dynamic propagation of capability changes could potentially cause an undesirable level of network traffic, harming overall system performance.

2.6.5 Request Handling by the UserRequestRouter

As already discussed, all PlayRequests 521 presented to the NetpageServer 529 are handled by the UserRequestRouter 539. The purpose of the UserRequestRouter 539 is twofold: (i) To determine the most appropriate child NetpagePlayer (the target 522) to which the request 521 should be routed; and (ii) To determine any required transformations to the request 521 that are necessary in order for the selected target 521 to be able to handle the request 521.

In order to determine both of the above, the UserRequestRouter 539 takes into account the content of the PlayRequest 521 and the context within which it is handled. The context includes a large range of factors, including, but not limited to the following:

1. The capabilities of each of the available children NetpagePlayers. Availability being partially determined by the user identity.
2. The current contents of the Netpage clipboard.
3. The originating source of the request (e.g. the Netpage pointer device which triggered the play request) and/or the route via which the request arrived.
4. The current player profile.
5. The current date and time.

2.6.6 Player Profiles

It is possible that multiple players registered with a user support the same PlayRequests 521. As a concrete example, consider the following scenario where a user has registered the following players. The user 525 has three registered players 520 all of which are capable of playing images:

A camera phone for playing phone numbers, plain text, and images.

A digital camera for playing images.

A desktop application for playing plain text, html, images, video and audio.

Now consider the case where the UserRequestRouter 539 receives the following partially specified PlayRequest 521:

| | | |
|---|---|---|
| target | | |
| operation | display | |
| parameters | image | contents of image |

The request 521 could potentially be played on any of the devices 520 mentioned. As such, the request 521 is ambiguous.

Figure 15:
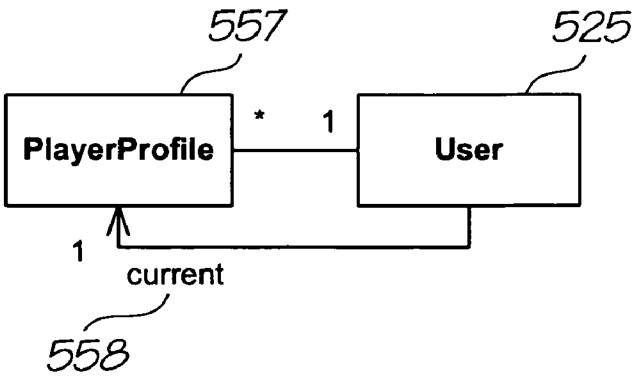
FIG. 15 illustrates example PlayerProfiles.

PlayerProfiles 557 are one mechanism which can be used in order to allow the UserRequestRouter 539 to resolve such ambiguities. A PlayerProfile 557 provides a (typically restricted) view of the set of players 520 available for a particular user 525 and the set of PlayRequests 521 that can be played on those players 520. A user 525 may have multiple player profiles 525 indicating the various scenarios within which they use the Netpage system. At any point 30 in time, one of these profiles 525 is set as the Current Profile 558 as shown in FIG. 15.

For example, a user might have the following profiles:

An "office" profile that directs most player requests to their desktop PC.

A "home" profile that directs requests to various devices throughout the user's house.

A "mobile" profile that directs player requests to various portable devices (e.g. a smart phone).

A "car" profile that directs player requests to devices within the user's automobile.

Figure 16:
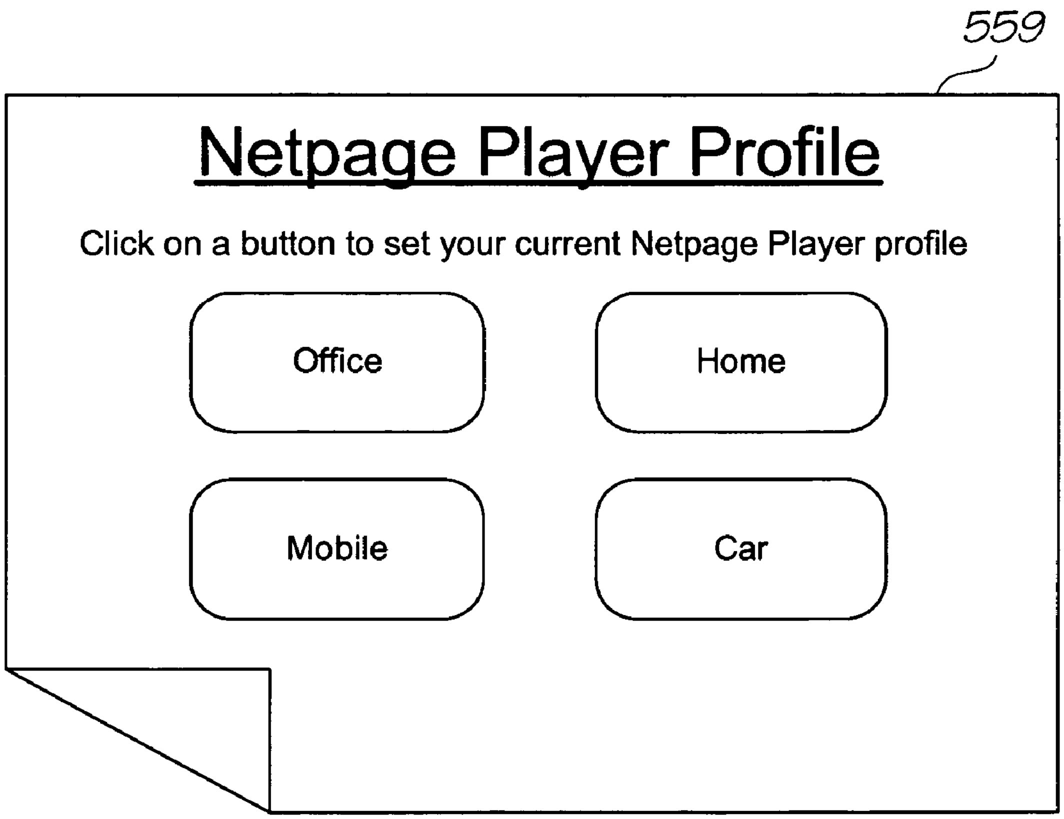
FIG. 16 illustrates an example Printed Interface for selecting the current player profile.

A user can quickly change their current profile by a simple user action. For example, if in the office, the user could select the profile via a desktop GUI. Alternatively the user could use their Netpage pen/pointer to select a profile from a printed interface 559 such as that shown in FIG. 16. The system could also allow a user to specify regular scheduled times at which their current profile should switch.

2.6.7 An Example Request Routing

Figure 17:
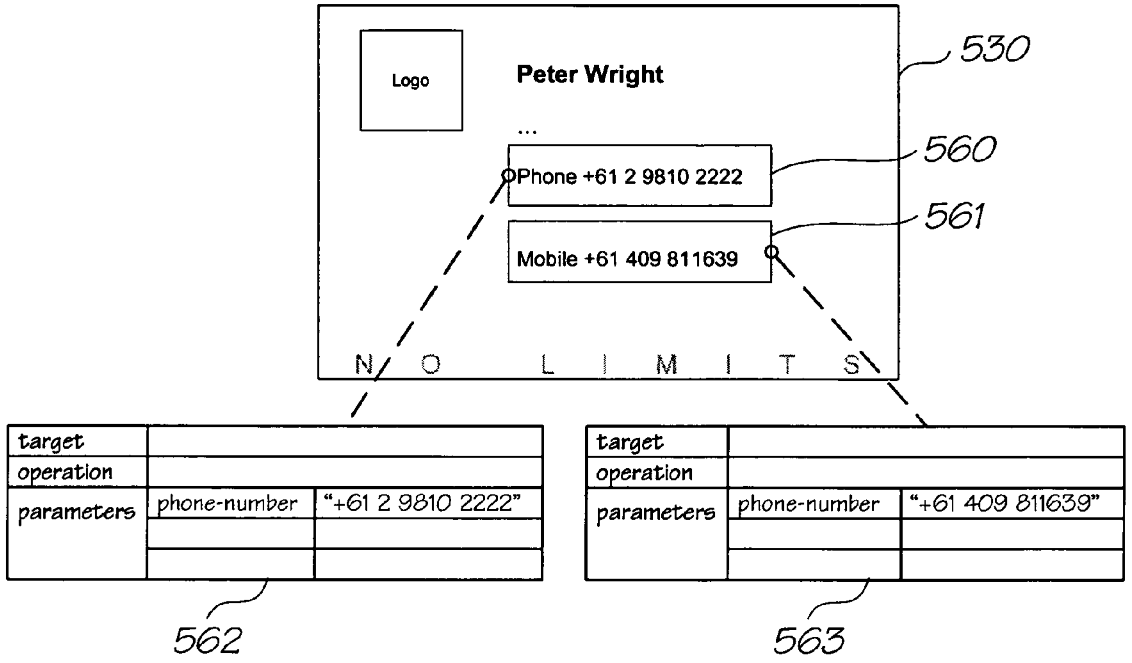
FIG. 17 illustrates example PlayRequests embedded in an interactive document.

Consider the interactive business card 530 shown in FIG. 7. The business card contains a number of interactive elements including the two fields 560, 561 highlighted in FIG. 17. Each of the fields 560, 561 is represented by a partially specified PlayRequest 562, 563. Clicking on either field 560, 561 with a Netpage pointer causes the corresponding play request 562, 563 to be submitted to the Netpage Server 529 for processing.

Figure 18:
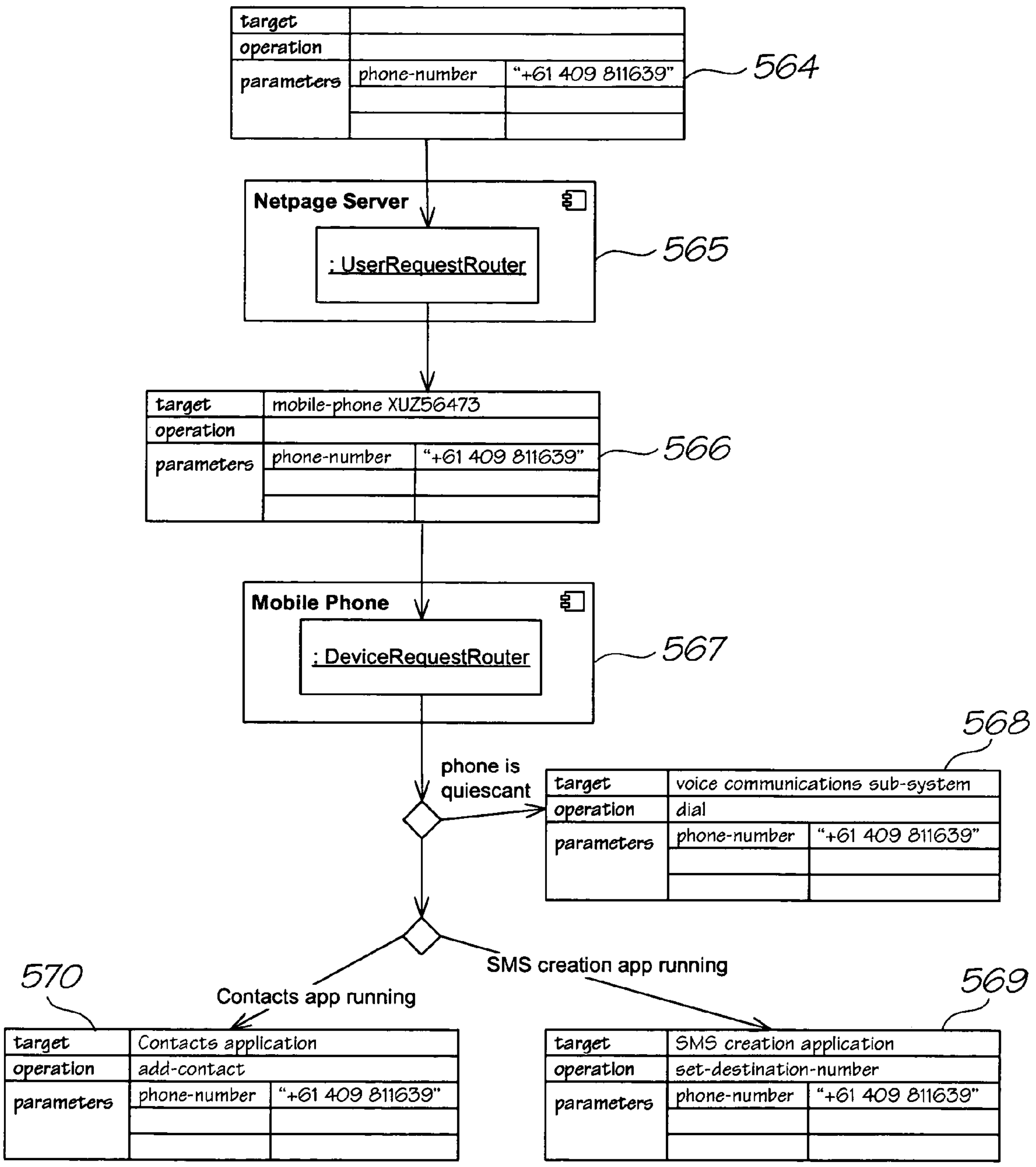
FIG. 18 illustrates an example Request Routing.

FIG. 18 provides an example of how such a field might be routed. At step 564 we have the original play request as submitted to the server. At step 565 the UserRequestRouter interrogates the PlayRequest and the current context. and determines that the request should be routed to the user's mobile phone. As such it transforms the original PlayRequest to produce the request shown in step 566 and routes the play request to the RequestRouter on the mobile phone. At step 567 the mobile phone's RequestRouter checks whether the phone is in a quiescent state (i.e. no applications running). If so, it transforms the PlayRequest by setting the operation to "dial", and is routed to the voice communications sub-system agent 568. If, however, the SMS creation application is running, then the PlayRequest is transformed by setting the operation to "set-destination-number", and it is routed to the running SMS creation application 569. Lastly, if instead the Contacts application is running, then the PlayRequest is transformed by setting the operation to "add-contact", and it is routed to the Contacts application 570.

The end result is that the act of clicking on a telephone number on the business card can have very different results depending on the context within which it is applied. In this example, both the current context within the Netpage Server 529 and the current context on the mobile phone were taken into account when processing the PlayRequest 521.

2.7 Communicating with Players

Various communication methods are used between a Netpage Server 529, intermediate gateways 570 and the Netpage client to enable the playing of PlayRequests 521 on the Player device520. Environmental factors such as the following affect the selected communication mechanism:

Available network connectivity.

Type of player device being targeted.

Size and type of objects being transferred and the nature of the operation being played.

This section describes categories of messaging mechanisms. Note that in a single play scenario a combination of messaging methods can be used.

2.7.1 RPC (Synchronous) Messaging

Figure 19:
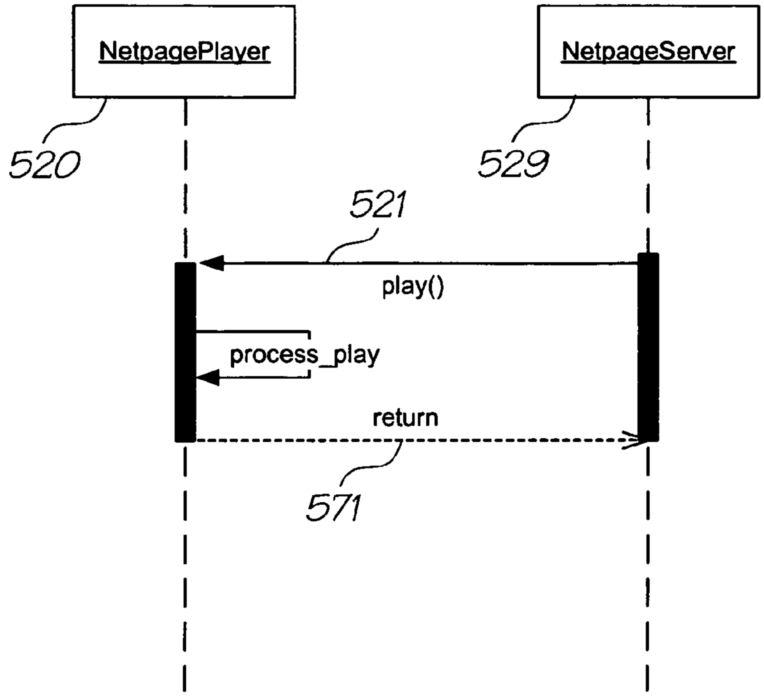
FIG. 19 illustrates an example Synchronous Messaging Sequence Diagram.

Referring to FIG. 19, in an environment where a persistent connection can be maintained between the Netpage Server 529 and the Player 520, the server 529 can send the play request 521 to the player, block till play a request is handled and a response 571 is returned. A Desktop Player in an active session can communicate to the server 529 using this method.

2.7.2 Notification (Asynchronous) Messaging

Figure 20:
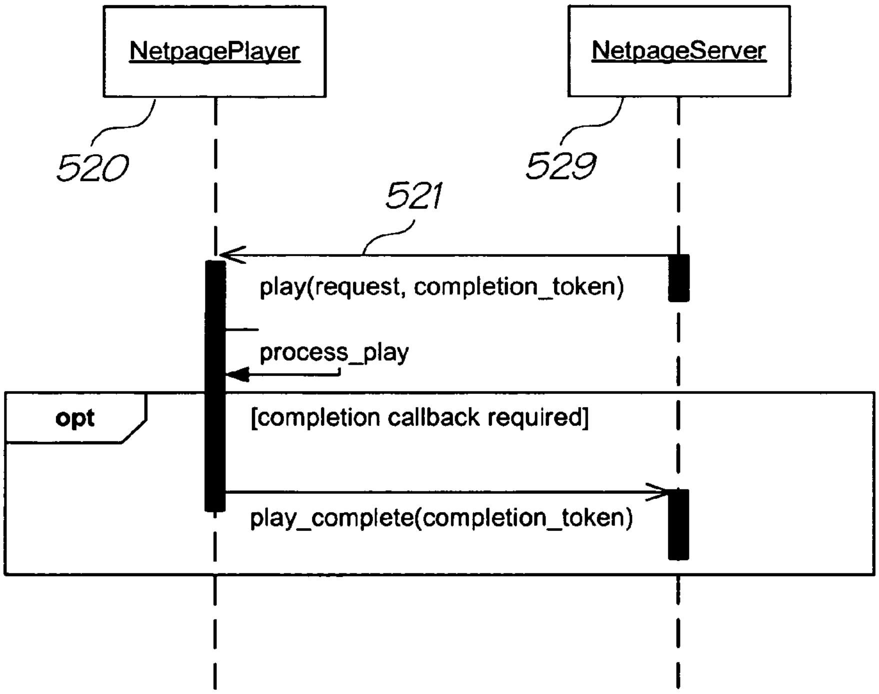
FIG. 20 illustrates an example Asynchronous Messaging Communication Sequence.

Referring to FIG. 20, notification messaging is used when the environment allows playing of an Object through an asynchronous play( ) request 521 initiated from the Netpage Server 529 to the Netpage Player 520, delivering the object to be played. The server 529 may continue its activities and optionally receive a future response from the Player. The example of a notification based request delivery is when Netpage server pushes an image to a Netpage Player.

Depending on the underlying network infrastructure, a suitable protocol is used to push notifications to the Netpage Player, i.e. WAP push, SMS, etc.

2.7.3 Streaming

Figure 21:
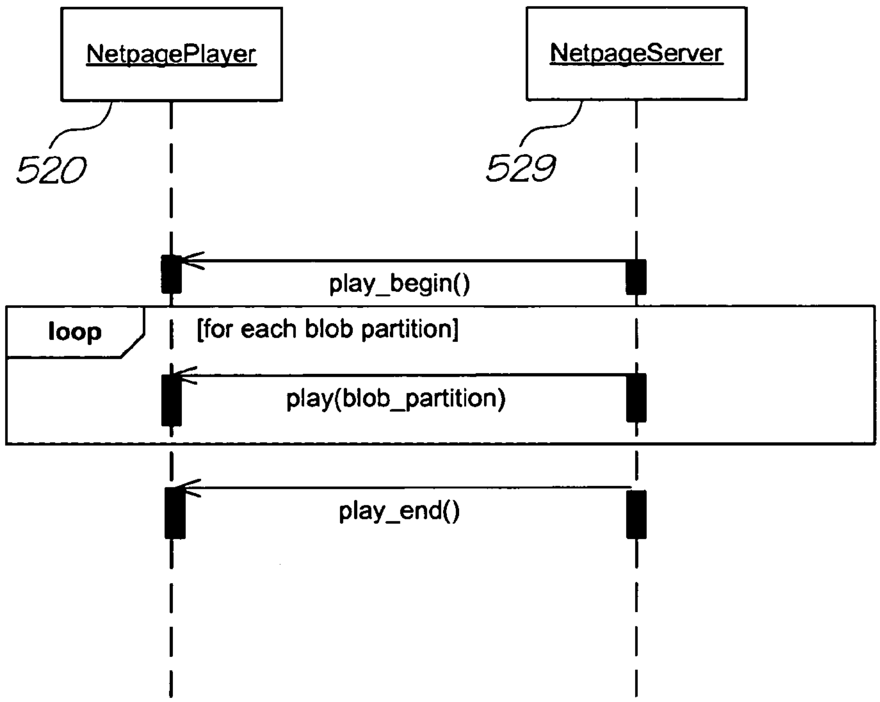
FIG. 21 illustrates an example Streaming Messaging Sequence.

Referring to FIG. 21, for certain media types, it is preferable to be able to stream data to a player rather than transmitting the entire object before playing commences. The reasons are that:

Large objects may take significant time to transmit in their entirety to the player. Streaming allows for playing to take place before the entire object has arrived at the player thereby reducing latency.

Target player devices may not have the capacity to hold the entire object. In that case, streaming is one option for playing the object on the device due to this limitation.

Unbounded objects such as live video can be transmitted by streaming.

Video and audio provide the most significant examples of types that are typically better suited to streaming. To enable the streaming Netpage Server would be involved in the player selection process and would then leave actual streaming up to the two parties. Otherwise the server is likely to be a bottleneck and a source of additional latency.

Player can perform read-ahead operations to buffer the data ahead of playing and avoid network delays and jitters which can affect the user's experience.

2.7.4 Interactive Messaging

Figure 22:
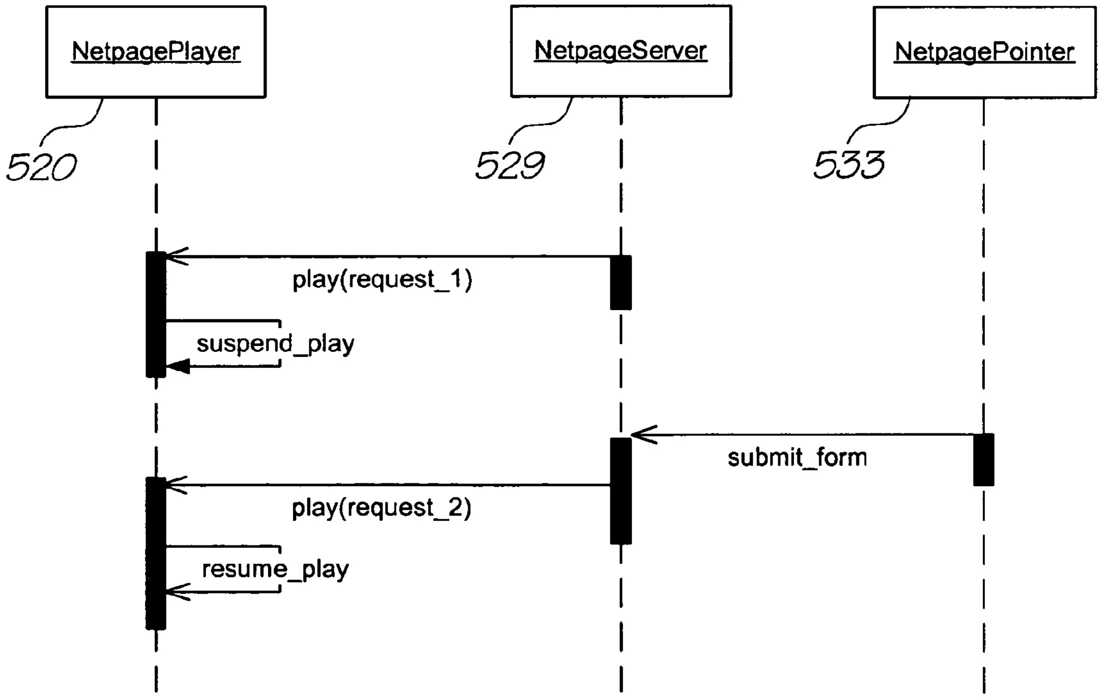
FIG. 22 illustrates an example Interactive Messaging Sequence.

Referring to FIG. 22, in some scenarios multiple user/pointer interactions with the Netpage Server 529 invoking multiple play requests is required to complete a user play experience. For instance consider a scenario where a user has a Netpage printout photo that he/she would like to send as a MMS message to a friend. One way of achieving this is by the user clicking on the friend's business card's MMS hyperlink. This action sends a play request to the player activating the MMS editor with the phone number to which the message is being sent. At this point user can choose to click on the photo to attach it to the MMS message. This results in the photo being sent as a second play request to the Player, wherein the photo is attached to the MMS content. The state of the player 520 allows chaining multiple play requests 521 to complete a transaction.

2.7.5 Hybrid Messaging

Figure 23:
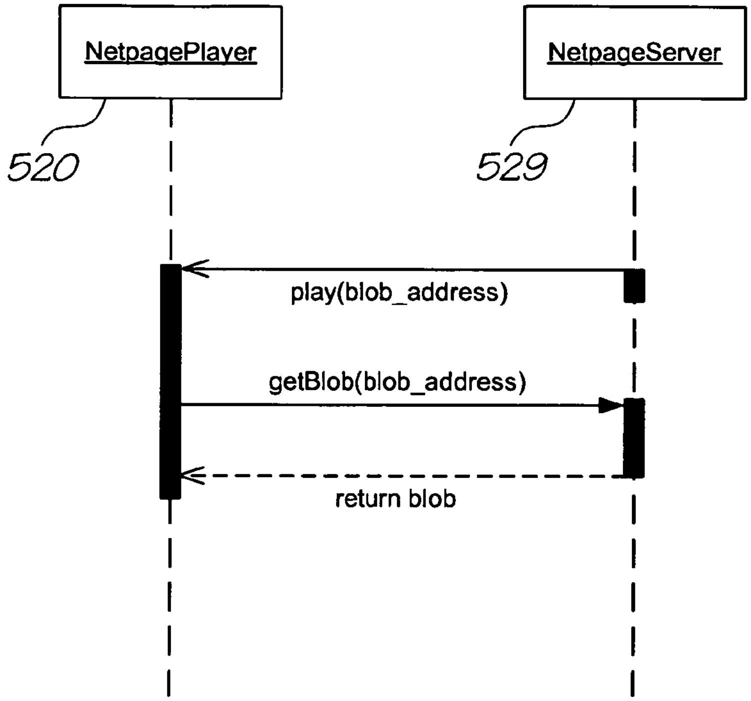
FIG. 23 illustrates an example Hybrid Messaging Sequence.

Referring to FIG. 23, in some scenarios a multi-transaction messaging without user interaction is performed to play an object. Some examples of hybrid messaging are:

Consider a scenario where a low-end mobile phone player without support for the suitable push-based notification, wishes to play an unbounded object. A hybrid solution can be adopted to push a small notification to the device, notifying the player application (i.e. through SMS) to initiate a stream-based communication to the Netpage Server request (i.e. WSP) for delivery of the object.

Displaying a URL object also uses a multi-transaction hybrid messaging, where the original object (the URI) is pushed to the device using a Notification message. At this point the player (without user interaction) retrieves the URI content by sending a synchronous request/response message through HTTP.

2.7.6 Player Session Establishment

When players 520 are instantiated on devices (for instance during user login on a desktop player or on-demand by the mobile user), the player 520 registers the mobile device 100 is available for play requests by initiating a player session 580 with the Netpage Server 529.

Figure 24:
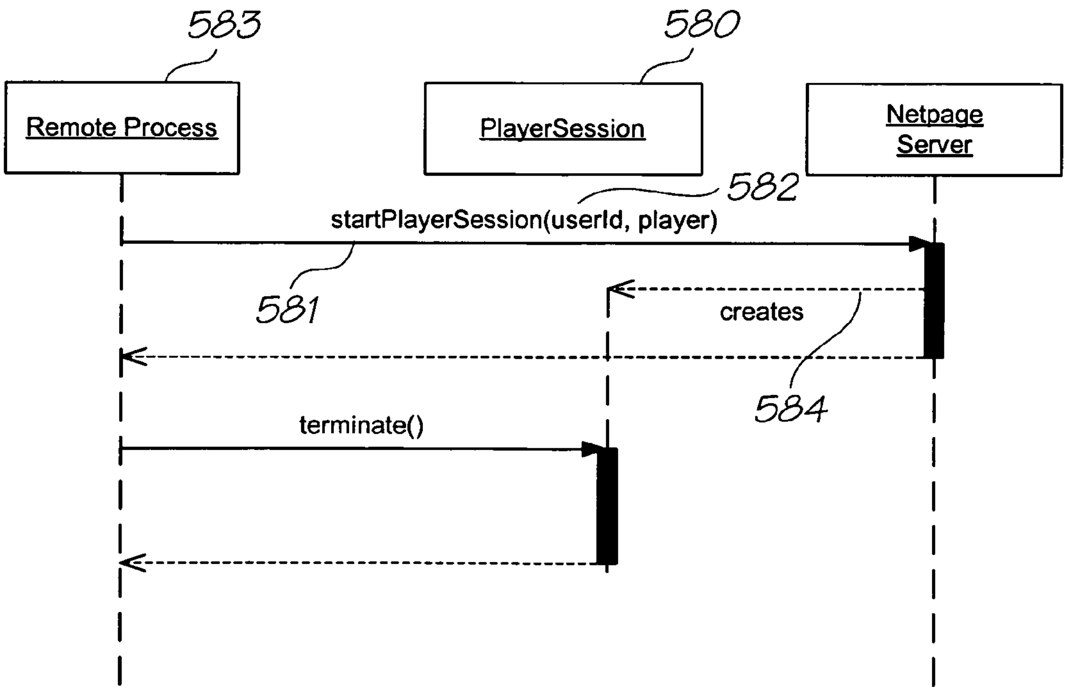
FIG. 24 illustrates an example Player Session Sequence Diagram.

FIG. 24 shows the basic lifecycle of a NetpagePlayer session 580. First, a process, which is typically running on a remote machine/device, calls the startPlayerSession( ) method 581 to commence a NetpagePlayer session 581 with the Netpage Server 529. A userid 582 is provided which indicates the user 525 to which the supplied player 520 should be associated. Upon reception of a startPlayerSession( ) request 581, the server 529 creates a PlayerSession object which is returned to the remote process 583. This object can be used at some later time to terminate the session by calling the terminate ( ) method.

Figure 25:
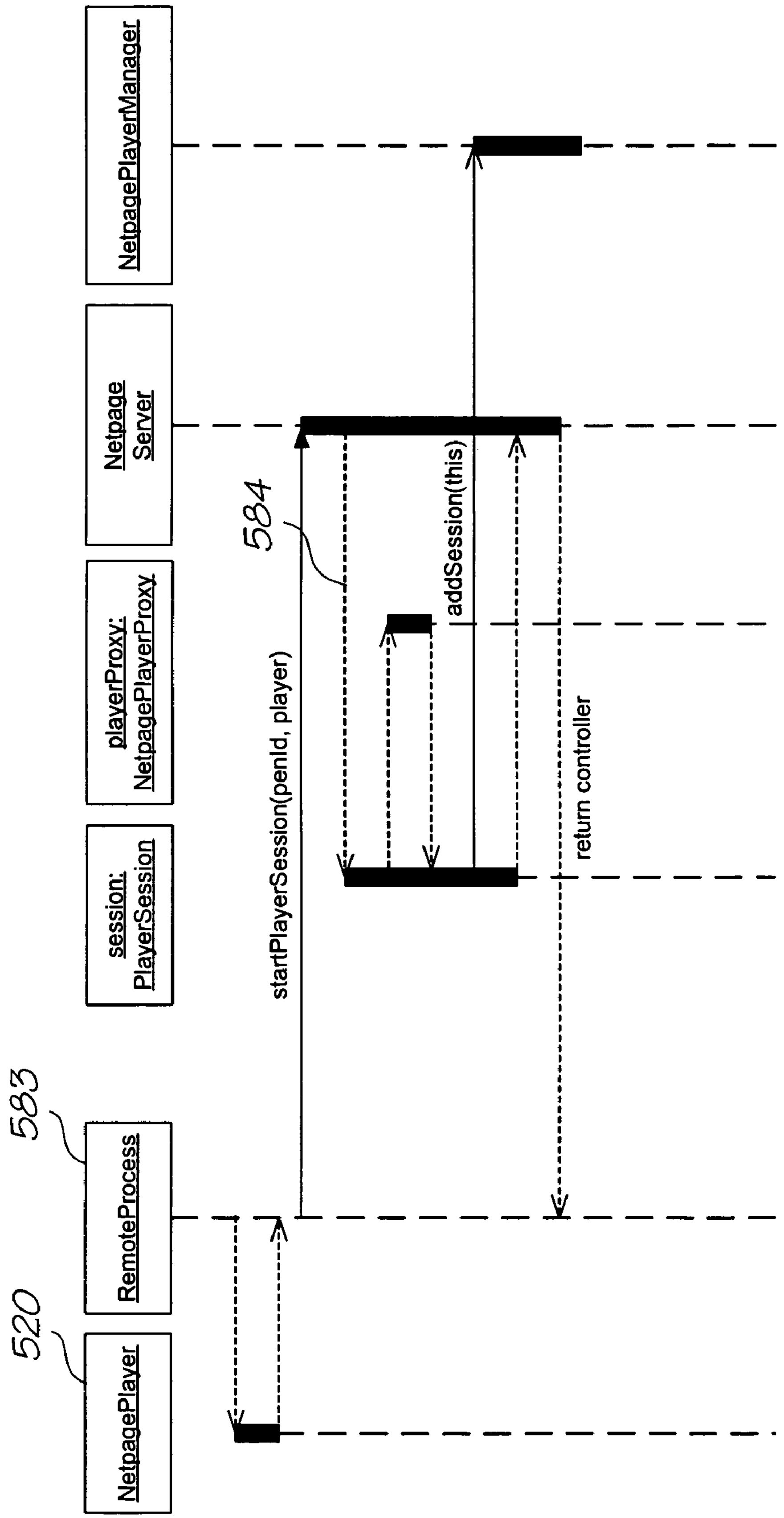
FIG. 25 illustrates an example Player Session Detailed Sequence Diagram.
Figure 26:
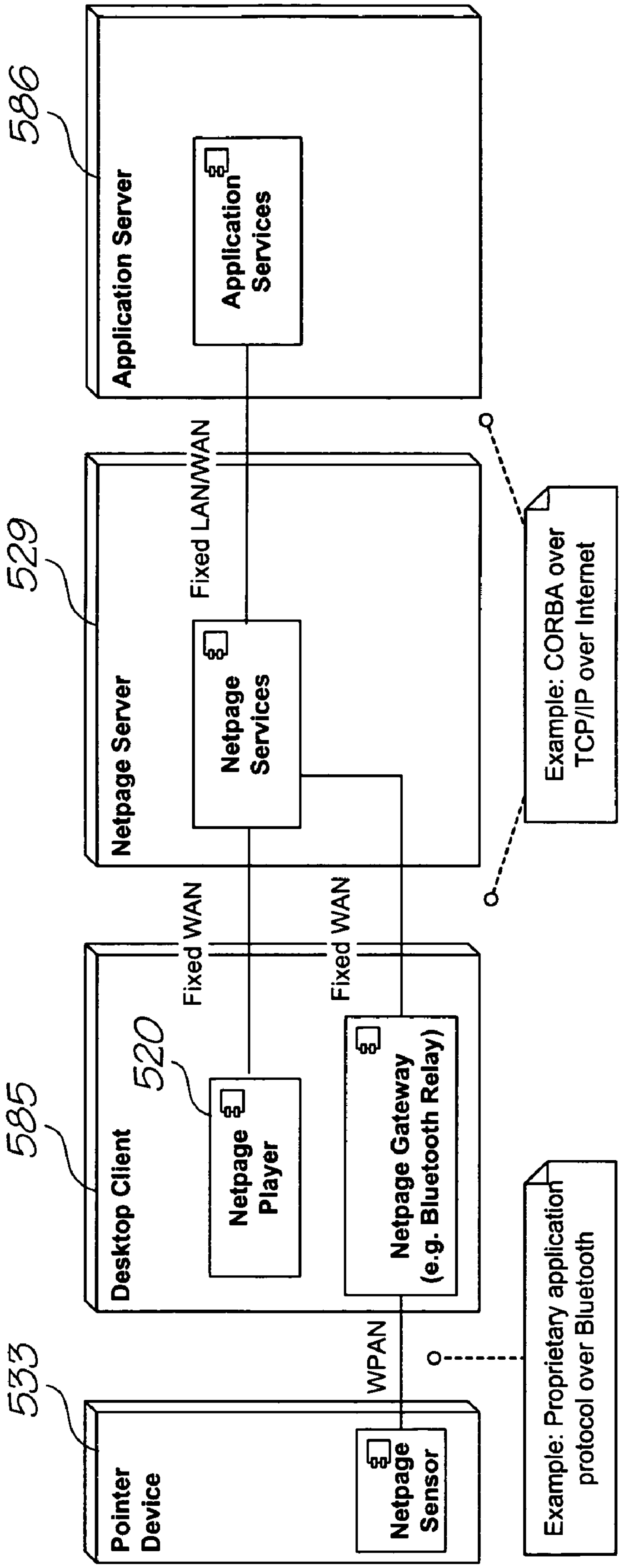
FIG. 26 illustrates an example Desktop Player Deployment.
Figure 27:
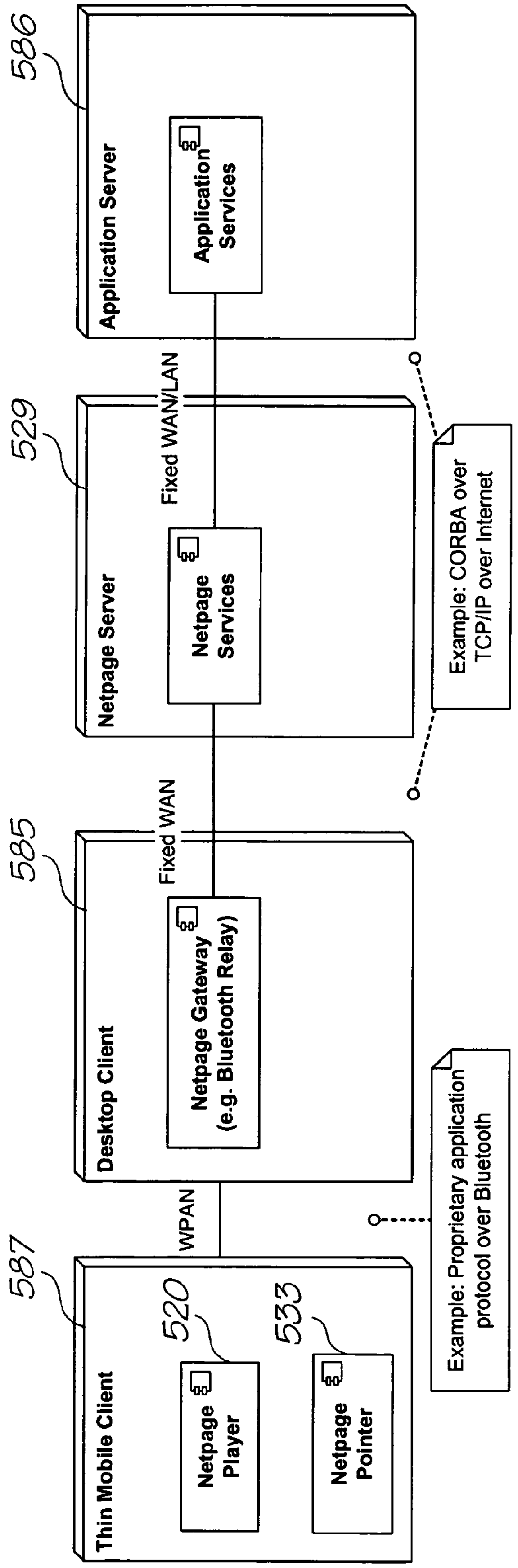
FIG. 27 illustrates an example Short-Range Thin Mobile Player Deployment.
Figure 28:
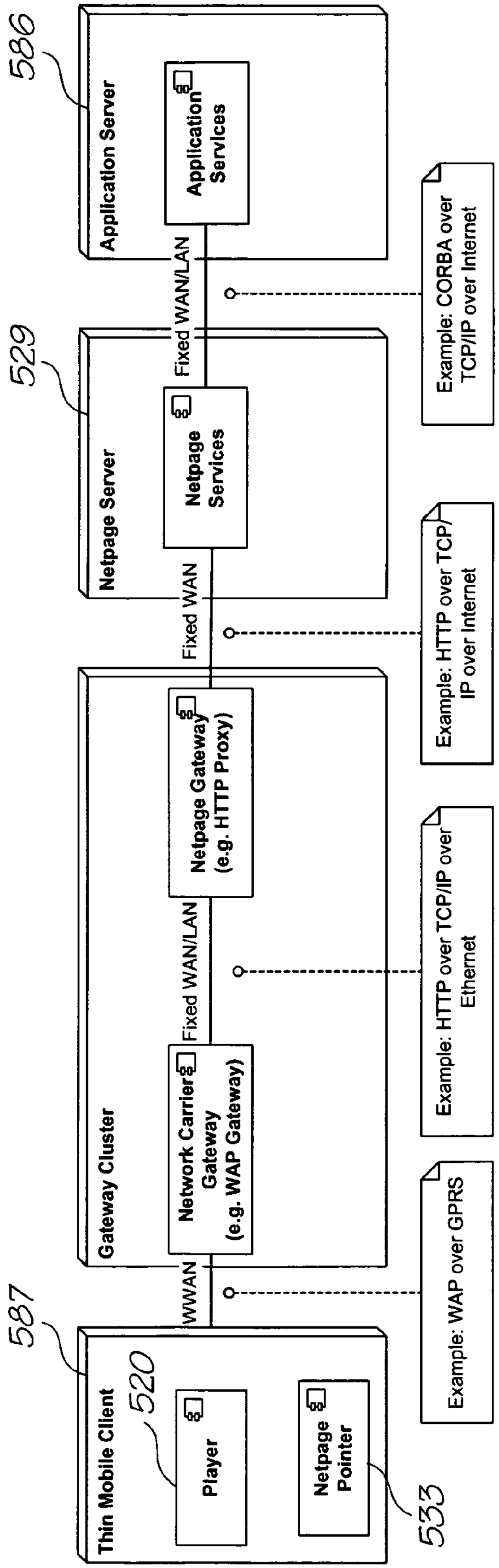
FIG. 28 illustrates an example Long-Range Thin Mobile Player Deployment.
Figure 29:
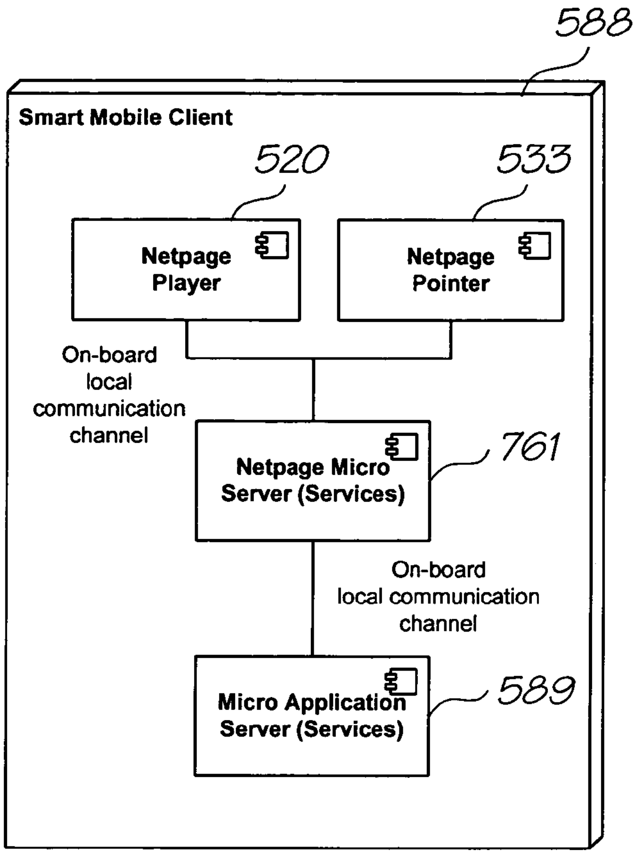
FIG. 29 illustrates an example Smart Mobile Player.

FIG. 25 shows more details of the handling a player session 580 within the server 529. As shown previously, a player session is created 589 by calling the startPlayerSession( ) method on the Netpage Server's CommandProcessor. This causes the creation of a PlayerSession which in turn creates a NetpagePlayerProxy which is run within the server and acts as a proxy for the real player by implementing the NetpagePlayer interface and passing all requests on to the real player. NetpagePlayerManager::addSession( ) is called to register the session with the NetpagePlayerManager. The NetpagePlayerManager is a singleton object responsible for managing all NetpagePlayer sessions and also for coordinating all NetpagePlayer traffic within the server.

2.8 Player Deployment 2.8.1 Player Connectivity

Netpage Player 520 can be deployed on various devices with different network connectivity capabilities. Table 3 lists some examples of player network connectivity and transmission mechanisms. Note that a deployment environment may utilize a combination of connectivity types. Each connectivity type explains how one hop communicates to the next hop. For instance a player communicates with a wireless gateway on the path to the Netpage Server.

TABLE 3

Netpage Player Connectivity Types

| Player Connectivity | Comments | Example Standards |
|---|---|---|
| Local | On a desktop device or a smart mobile, the player communicates with the next hop locally through the on-board IPC mechanisms. The next hop could be the server running on the same desktop, or the micro server running on the smart mobile, or the gateway to the remote server running locally. | Shared memory, TCP/IP on the loop-back interface, etc. |
| Fixed Network | The connectivity to the next hop is over a fixed (wired) network. For instance the desktop player communicates to the remote server through IP-based protocols over Internet. | TCP over the Internet through a dial-up serial link, etc. |

TABLE 3-continued

Netpage Player Connectivity Types

| Player Connectivity | Comments | Example Standards |
|---|---|---|
| Short-range wireless | The player connects to the next hop through a Wireless Personal Area network (WPAN). For instance a player running on a PDA uses Bluetooth to communicate to a Relay module running on a local desktop. | IrDA, Bluetooth, 802.15, etc. |
| Long-range wireless | The player communicates with the next hop through a long-range wireless network with national (WLAN) or global (WWAN and Satellite) coverage. For instance the player is a WAP-enabled cell phone connecting to the remote server over GPRS wireless network. | 802.11a, b, g, GPRS, WCDMA, etc. |

2.8.2 Player Deployment Configuration

Different combinations of player devices and connectivity types can be configured to provide a suitable Netpage Player and Server integration environment. FIGS. 26 to 29 demonstrate some of the more widely applicable types of deployment environments. Example pen connectivity is demonstrated for clarity.

3. Object Association Design 3.1 Object Associations Overview

A Netpage object association allows content (objects 601) to be associated with locations 513 on Netpage documents 603 and printouts. Arbitrary content types can be supported, but common examples include pictures/photos, audio, and video.

An object 601 can either be associated 616 with a document during the authoring of the document (static association) or can be associated with a particular document printout at some arbitrary time after that printout has been created (dynamic association).

Additionally, an association 616 may either be an impression association or a field association. An impression association is a dynamic association that is associated with a particular {x,y} location 613 on an impression. A field association is associated with a particular field of a form (static association) or form instance (dynamic association).

3.2 Communicating Status to the User

At times the mechanisms described require communication of status information (often errors) to the user. The simplest way to achieve this is to make use of the Netpage Player infrastructure. Special operations (e.g. show-status-ok-message and show-status-error-message) can be designated for transmitting status information to the user. The player architecture would determine, for each message, the most appropriate device (or devices) on which to display the message and the way in which to display it. For example, it may be that in certain situations the pointer is the only available player, in which case an error status might be "played" by illuminating a red LED on the pointer or playing a short sound.

3.3 Impression Associations

An object 601 can be associated dynamically with a specific {x,y} location 613 on an impression. The associations 616 are stored inside the Netpage Server 529 and can then be viewed in a number of ways:

1. By interacting with the physical impression using a device that communicates with the Netpage Server 529 to retrieve the associated objects 601.
2. By interacting with a virtual view of the impression from within a graphical software application 602.

3.4 Interacting with Dynamic Associations

Figure 30:
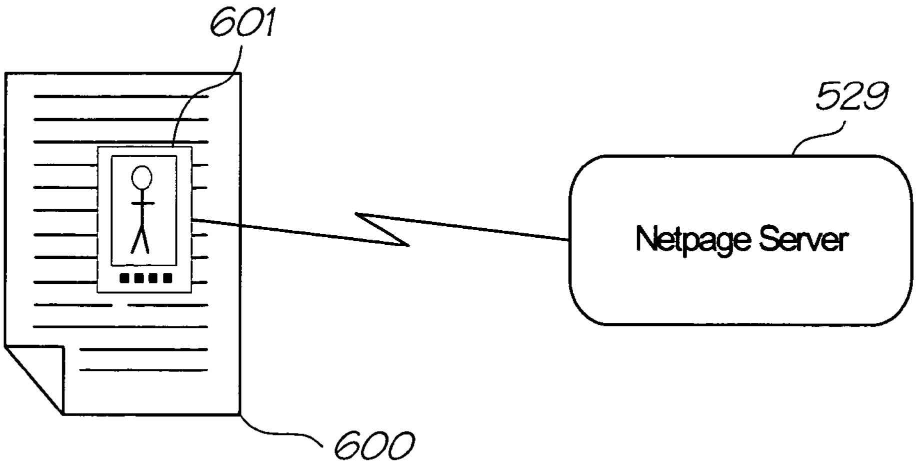
FIG. 30 illustrates an Object association being displayed in a physical Player Device.

Referring to FIG. 30, an associated object 601 can be viewed by interacting with the physical impression using a Netpage Tag aware device. This shows an example where a tag reading device with built in screen is passed over a physical impression. The device communicates impression locations to the Netpage server 529 which responds with information regarding any associated object 601 that is currently sensed by the device. Depending on configuration, the device might begin immediately playing each associated object or present the user 525 with the option of playing the object 601. If multiple objects 601 are within the device's field of view, then the device could present the user with a list of the objects 601 for selection.

Associated objects 601 can also be viewed by interacting with a virtual view of the impression from within a graphical software application 602. There are a number of possible mechanisms for displaying associated objects 601 in such an application 602. Each mechanism is responsible for:

Indicating the presence of an associated object (or objects 601), and

Displaying the actual content of an associated object 601.

Figure 31:
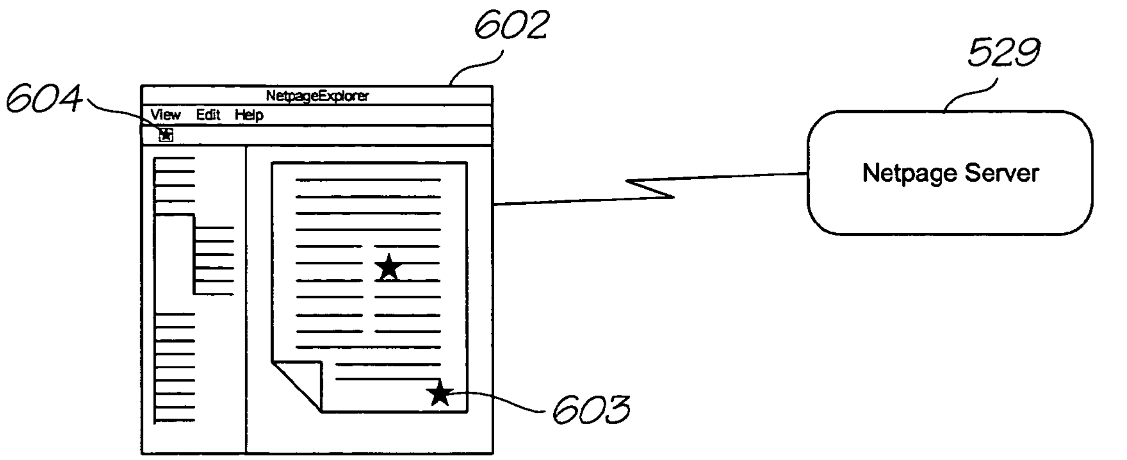
FIG. 31 illustrates an Object association being displayed in the Explorer application.

An example mechanism is shown in FIG. 31 where a graphical "Netpage Explorer" application 602 is being used to view an impression which contains associated objects 601. The example shows an approach in which some visible token 603 (in this case a black star) is displayed that indicates the locations that contain object associations 616 . The display of the tokens 603 can be toggled by clicking on a toolbar button 609. To view an associated object 601 the user clicks (or alternatively double-clicks) on the relevant token 603 which causes the Netpage Explorer application 602 to retrieve the associated object 601 from the Netpage Server 529 and to then play the object 601. Depending on the capabilities of the Netpage Explorer application 602, the object 601 can either be played within the Netpage Explorer application 602 itself, or by an external application.

3.5 Methods for Creating Impression Associations

This section describes various alternative techniques that may be provided to allow users to dynamically associate content with a location on an impression. They include:

Modal association mechanisms

Sticker based mechanisms

Swipe Based mechanisms

Swipe Based Stickers 3.5.1 Modal Association

A Modal Association involves first placing the user/pen session in a mode in which the next pointer click is interpreted as the specification of an impression location to which a current clipboard object 601 should be associated.

Figure 32:
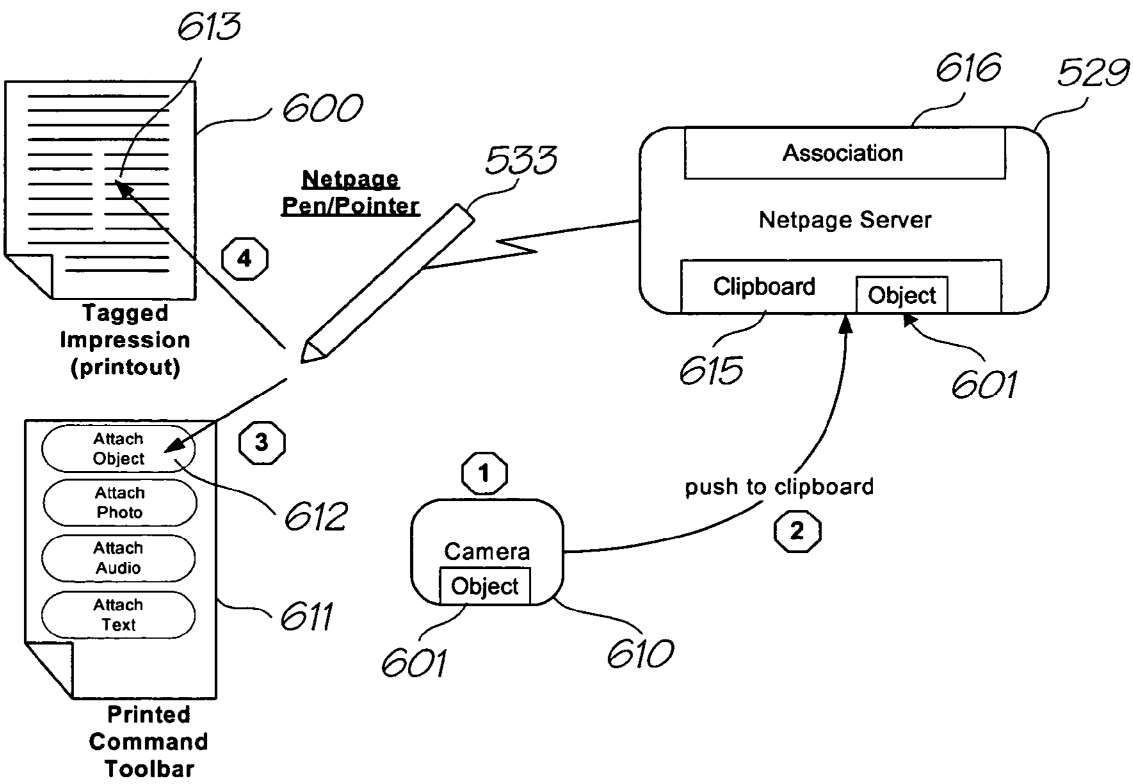
FIG. 32 illustrates a Creation of an impression object association.

FIG. 32 shows an example of how an impression object association 617 might be created modally. In this case, the user attaches a photo to an impression. The steps are as follows:

1. The user takes a photograph using their digital camera 610.
2. The user pushes the photograph to the Netpage clipboard on the Netpage Server 529 (possibly implicitly).
3. The user clicks with their Netpage pointer 533 on a printed toolbar 611. In this case, the user clicks on the "Attach Object" button 612. This places the pointer session into a mode in which the next click with the pointer 533 is interpreted as the specification of an impression location to which the current clipboard object 601 should be associated.
4. The user clicks on the desired location 613 on a printed page 614. This causes the Netpage Server 527 to retrieve the current object 601 from the user's clipboard 615 and to associate the object with the impression location selected in step 3.

An alternative approach requires steps 3 and 4 to be performed in the opposite order. That is, the "Attach Object" command is interpreted to mean associate the object with the impression location most recently touched by the user.

Modal association mechanisms can be implemented on top of the Netpage Clipboard 615 mechanism.

3.5.2 Tagged Stickers

A tagged sticker 620 is a physical adhesive sticker which is Netpage tag encoded 617. That is, it is a Netpage impression printed onto a physical sticker. Clicking on a tagged sticker causes an object to be associated with that sticker (impression). Tagged stickers 620 can be physically attached to any surface whether it be tagged or otherwise (eg. books, desks, walls, etc) and thus provide a very flexible mechanism for dynamically associating objects with locations.

Figure 33:
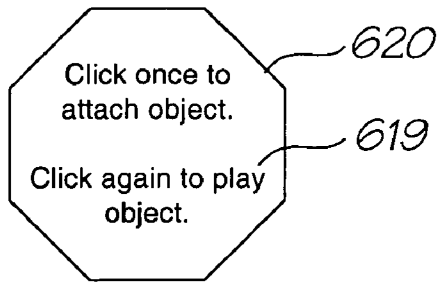
FIG. 33 illustrates an example Tagged Sticker.

FIG. 33 shows an example of a simple tagged sticker 620. In order to associate an object 601 with the sticker 620, the user would perform the following steps.

1. Push object 601 into Netpage Clipboard 615
2. Physically paste sticker 620 onto any surface
3. Use Netpage pointer 533 to click on the sticker 620 to associate the object 620.

Once an object 601 has been associated with a sticker 620, there are various ways in which the user can retrieve/play the object 601. Firstly, the object 601 can be interacted with using a physical Netpage Player device 520. Secondly, simply clicking on the sticker 620 with a Netpage pointer 533 would cause the object 601 to be played. This latter behaviour suggests that sticker associations would actually be implemented as field associations 618.

3.5.3 Reusable Stickers

Figure 34:
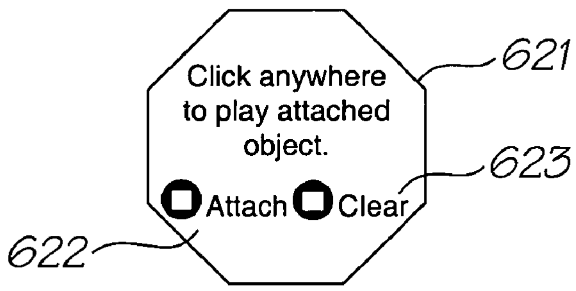
FIG. 34 illustrates an example Reusable Sticker.

As so far described, once an object 601 is associated with a sticker 620, that association 616 cannot be altered. A reusable sticker 621 allows for the object associated with a sticker to be changed, or erased. Such a sticker 621 is shown in FIG. 34. The "Attach" button 622 is used to associate an object 601 with the sticker 621 and allows for a new object 601 to be associated with the sticker 621, overwriting any previous association 616. The "Clear" button 623 allows for any association 616 to be removed.

Both "Attach" 622 and "Clear" 623 are destructive operations in that they remove any association 616 that may have been in place before the operation took place. As such, it may be desirable to be able to protect against accidental invocation of such operations, especially in the sticker scenario in which the entire sticker is a clickable area.

Figure 35:
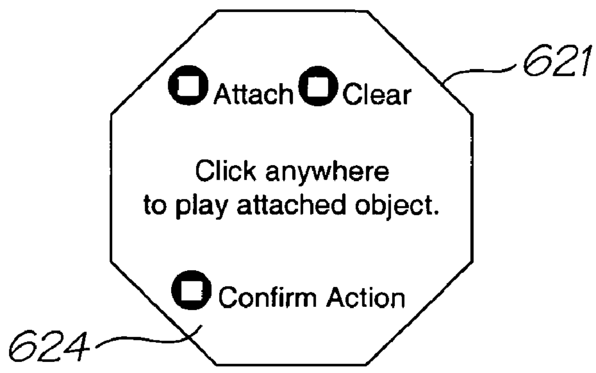
FIG. 35 illustrates an example Sticker with "Confirm Action"

One mechanism for doing that is shown in FIG. 35 in which a sticker 621 has a "Confirm Action" button 624. In order for a destructive operation to be confirmed, the user must first select the operation and subsequently select the "Confirm Action" button 624. A suitable timeout (say 10 seconds) can be used such that confirmations must take place within the timeout period in order to be valid.

Figure 36:
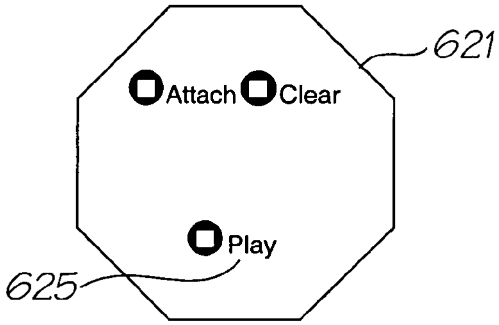
FIG. 36 illustrates an example Sticker with limited interactive areas to prevent accidental invocation of destructive operations.

An alternative for preventing accidental invocation of destructive operations is to limit the interactivity of the sticker to small areas within the sticker as shown in FIG. 36. The associated object 601 is only played when the user selects the "Play" operation 625. The overall sticker 621 is not interactive. As such, accidental invocation of destructive operations should be much less likely.

3.5.4 Category Specific Stickers

So far we have described stickers which retrieve the object 601 most recently assigned to the Netpage Clipboard 615. The Netpage Clipboard 615 can store multiple objects 601 per user 625 with each object 601 falling into an object category or set of categories. As such, it is possible to have Category Specific Stickers 627 that retrieve current objects from the Netpage Clipboard 615 by category.

Figure 37:
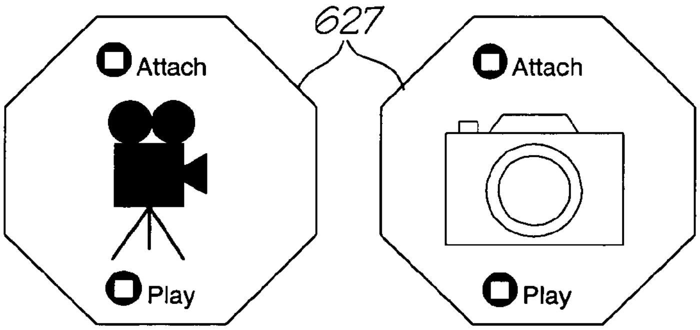
FIG. 37 illustrates example Category Specific Stickers.

FIG. 37 provides examples. Clicking "Attach" on the left sticker causes the current clipboard object 601 with a category of "video" to be associated with the sticker 620. The sticker on the right achieves a similar effect for objects in the "photo" category.

3.5.5 Swipe Based Mechanisms

Figure 38:
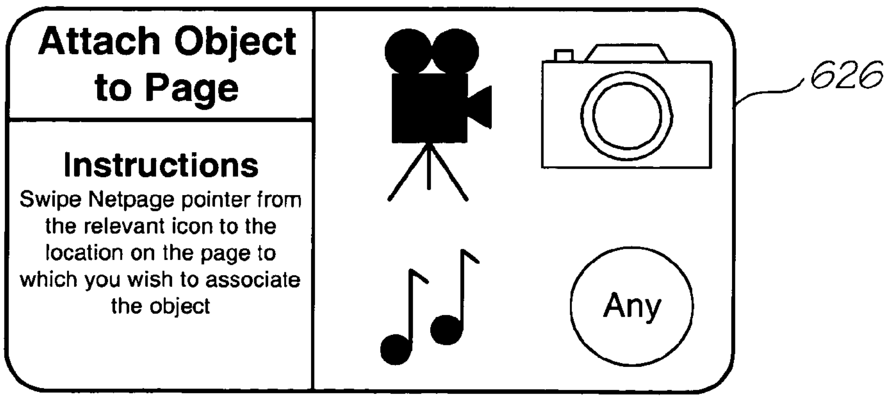
FIG. 38 illustrates an example Swipe based printed toolbar for creating impression associations.

The printed toolbar in FIG. 38 allows an impression association 617 to be created by swiping a command from a printed toolbar 626 to the location on an impression to which the object 601 is to be associated. The user temporarily places the toolbar 626 on top of the destination impression and swipes from the toolbar 626 to the impression. The swiping action provides the system with digital ink samples from both the toolbar and the destination impression. These samples enable the determination of both which object 601 is to be associated (for the card shown the possibilities being the current video clip, current photo, current audio clip, or in the case of the "Any" icon, the current object regardless of type) and to which impression and location on that impression the object 601 is to be associated.

3.5.6 Swipe Based Stickers

A limitation of the stickers described earlier is that they do not actually create an association 616 between the object 601 and the underlying impression on which the sticker is applied. For example, consider the situation where a sticker has been applied to a tagged impression, and subsequently an object 601 is associated with the sticker. If the underlying impression is viewed within the Netpage Explorer application, then the sticker and associated object 601 is not be displayed since the Netpage Server 529 is not aware that the sticker has been applied to that impression.

The above problem can be solved by applying the swipe based approach to stickers. The user steps involved are:

1. Push object 601 into Netpage Clipboard 615
2. Physically paste sticker 620 onto a tagged impression 600
3. Use Netpage pointer 533 to swipe from sticker 620 to impression 600.

The action of swiping across both the sticker 620 and the impression 600 creates a triple association between the impression 600, the sticker 620, and the object 601. Specifically, the Netpage server 529 is now aware of:

The sticker 620 to which the object 601 has been associated, and

The impression 600 on which the sticker 620 has been placed, and the location 613 on the impression 600 at which the sticker 620 has been placed, and thereby the location 613 on the impression 600 to which the object 601 is associated.

The above associations 616 allow the object 601 and sticker 620 to be displayed inside tools such as Netpage Explorer 602.

Figure 39:
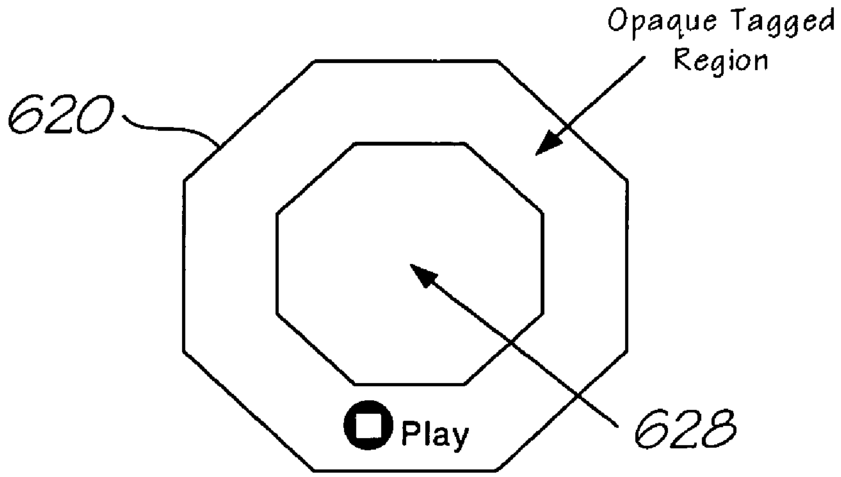
FIG. 39 illustrates an example Swipe Based Sticker with Transparent Region.

A variant of the swipe based sticker is shown in FIG. 39. It includes a transparent region 628 which allows the tags of the underlying impression 600 to be seen through the sticker 620. This makes it possible to create a triple association 616 with a swipe that remains within the confines of the sticker 620.

Figure 40:
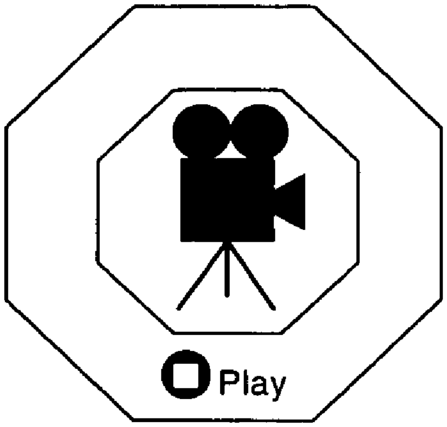
FIG. 40 illustrates an example Swipe Based Sticker with Graphics over the Transparent Region.

In addition, the transparent region 628 may be transparent in the infrared spectrum in order for the Netpage pointer 533 to be able to see the Netpage tags on the underlying impression 600. This allows for the transparent region 628 to be non-transparent in the visible spectrum. As such, graphics can be printed over the transparent region 628. For example, a swipe based category specific sticker can be constructed which includes indicative graphics printed over the transparent region 628 as shown in FIG. 40. It is also possible that the instead of using a transparent region 628, the sticker 620 may alternatively include a hole.

3.5.7 Impression Associations Object Model

Figure 41:
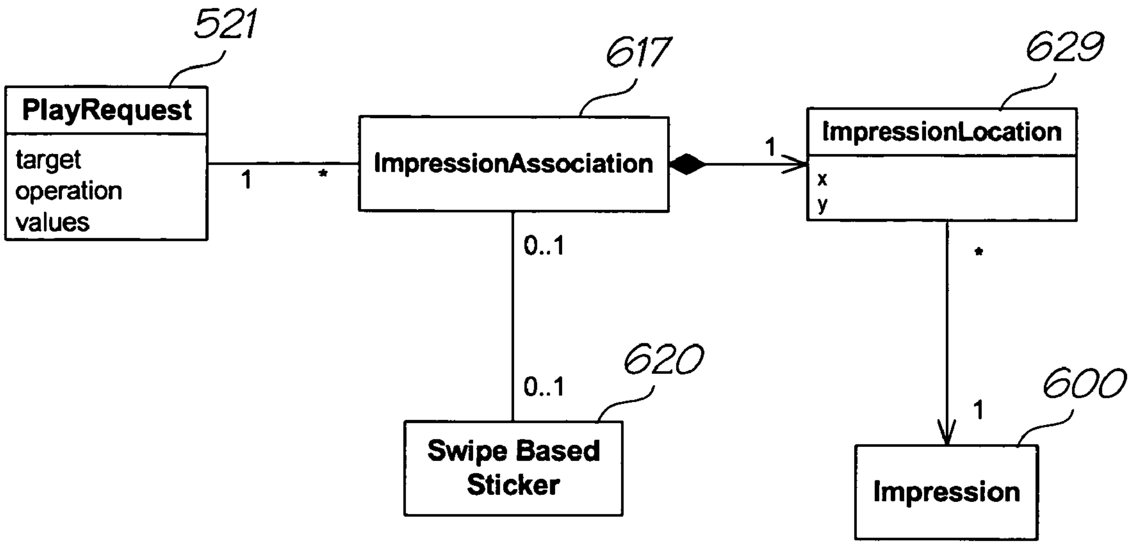
FIG. 41 illustrates an example Impression Associations Object Model.

FIG. 41 shows the basic object model representation of impression associations 617. An ImpressionAssociation 617 includes a location and the object's content. An ImpressionLocation includes an {impression,x,y} tuple 629. The content of an associated object is represented as a PlayRequest 521. In the common case, the PlayRequest 521 includes a single value, but it also possible to associate targets and operations. For example, any PlayRequest 521 can be associated with an impression.

A swipe based sticker is associated with an ImpressionAssociation on the underlying impression.

3.6 Field Associations

An object 601 can be dynamically associated with a particular field of a form instance 630. Such an associated object 601 is then delivered to the relevant application as part of a submission of the form instance 630. This can be used, for example, to dynamically attach images (e.g. photos) to a Netpage form 632 and to then have those images sent to the application when the user clicks on the "submit" form command.

Figure 42:
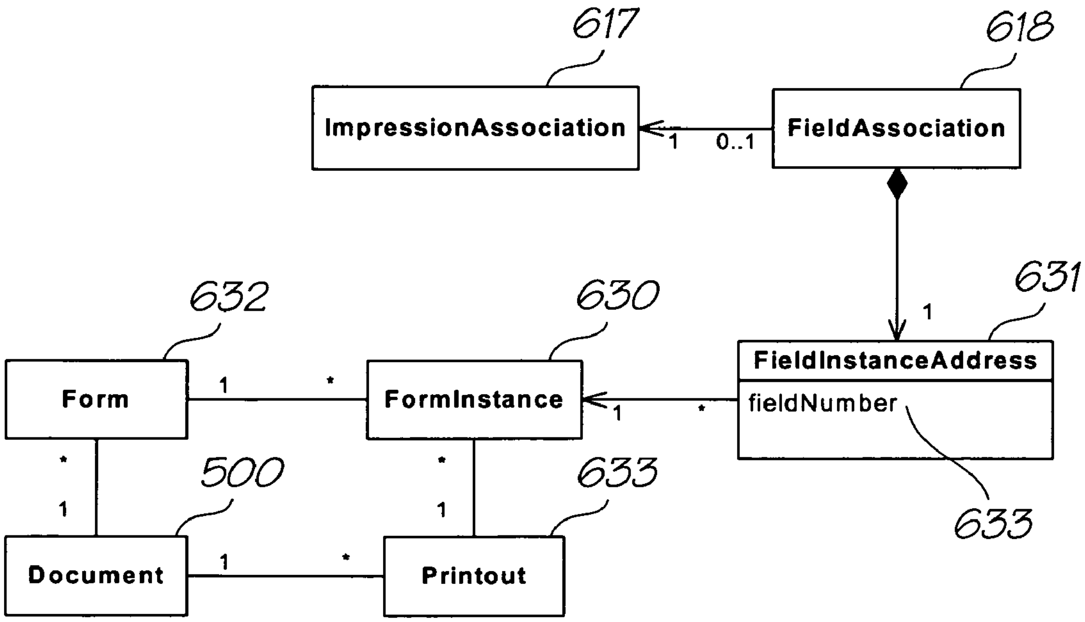
FIG. 42 illustrates example Field Associations in the Netpage Server.

The relationship between field associations 618 and impression associations 617 is shown in FIG. 42. A FieldAssociation 618 consists of a specification of the field with which the object 601 is associated and a reference to the underlying impression association 617 which provides details of the actual object 601. The ImpressionAssociation 617 structure has been described. The field is specified by a FieldInstanceAddress 631 which specifies a form 632 instance 630 and a field number 633 within that form instance 630. A FormInstance 630 is a specific instance of a Form 632 which is printed on to a Printout 633.

3.6.1 A Sample Application

Figure 43:
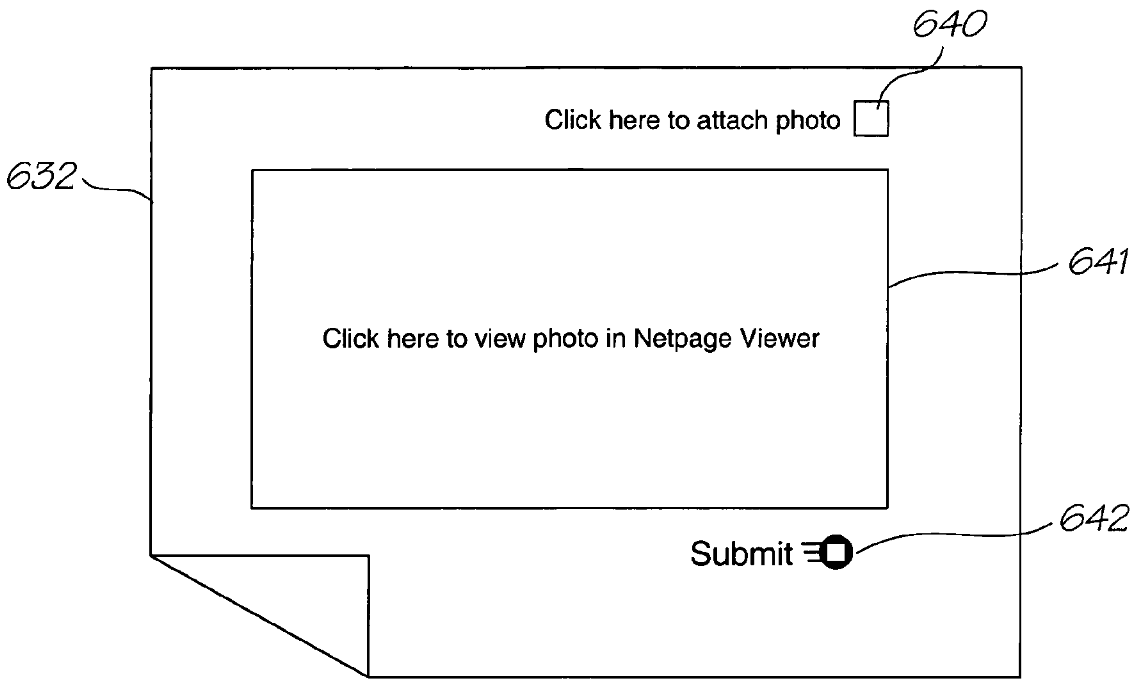
FIG. 43 illustrates an example Object Association Sample Application.

FIG. 43 shows a simple application that demonstrates the use of field associations 618. Use of the application proceeds as follows:

1. The user clicks on the "Click here to attach photo" button 640 with a Netpage pen 533 or pointing device. This causes the application to request the current photo from the Netpage clipboard 615 associated with the user 525. That photo is then associated with the large rectangular field 641.
2. The user can click on the large field 641 in order to retrieve the associated photo and display it on a suitable Netpage Player device associated with that user 525.
3. The overall form can be submitted by clicking on the "Submit" button 642. This causes a form submission to be sent to the relevant application. The form submission includes the photo currently associated with the large field 641.

The following sections use the sample application to describe the remaining details of the field association mechanism.

3.6.2 Form Design for the Sample Application

In order to design a form 632 that supports a simple application, two forms are specified. The first form 643 is a standard application form. The second form 644 is a special form that include fields that share the same impression coordinates as elements from the first form, but are overlayed on top of the first form's fields.

Figure 44:
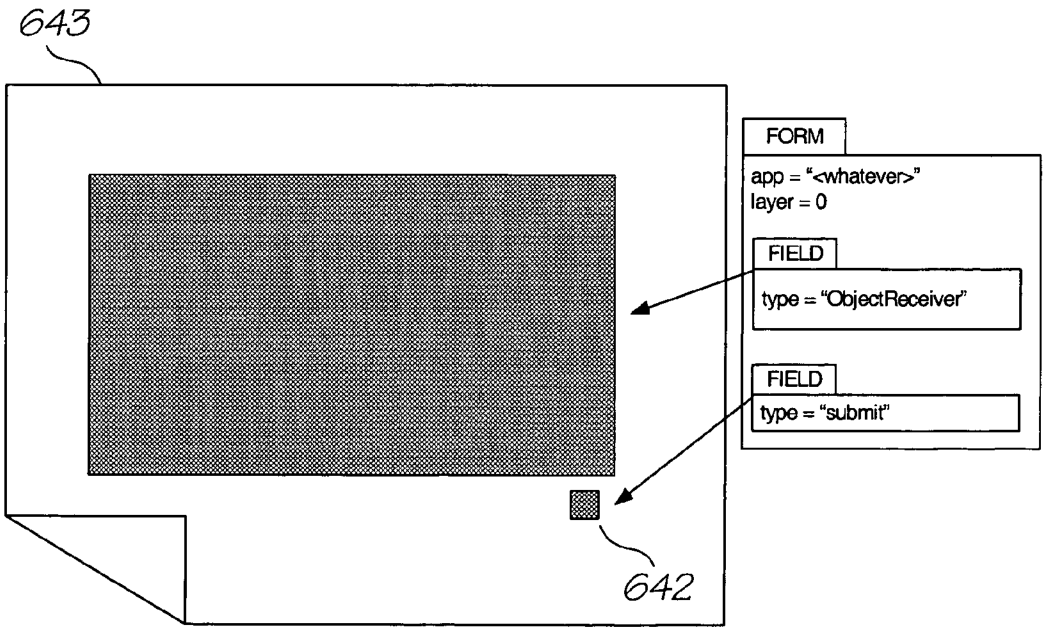
FIG. 44 illustrates an example Underlying Form.

The underlying (first) form 643 is shown in FIG. 44. This includes a submit button 642 for the application and also a field of type ObjectReceiver 644. It is to this second field 644 that an object is to be assigned. The actual assignment occurs as a result of user interaction with the overlayed form as described below.

Figure 45:
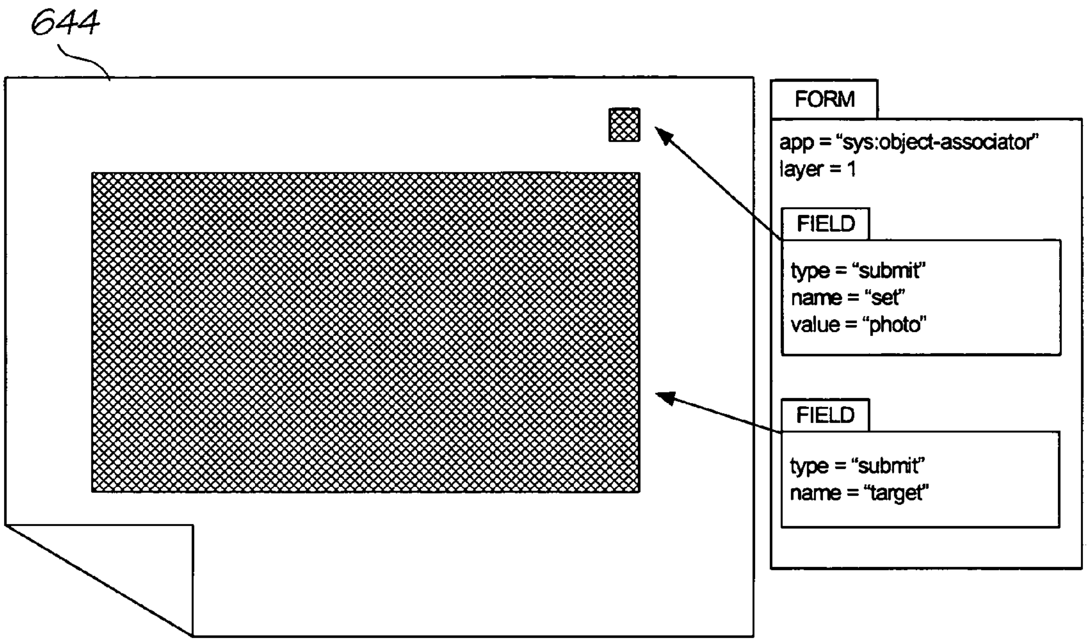
FIG. 45 illustrates an example Overlayed Form.

The overlayed form 644 is shown in FIG. 45. The application name for the overlayed form 644 is the system supplied "sys:object-associator" application. This is a standard internal application that expects to receive a form submission with a "submit" button having one of the names as shown in Table 4. The table describes the meanings of each of the possible submit buttons. Note that an object-associator form does not need to provide all four submit buttons, although it must minimally provide both a "set" and a "target" button.

TABLE 4

Submit buttons supported by the sys: object-associator application

| Name | Description |
|---|---|
| set | The set command indicates that an object of the specified type is to be fetched from the Netpage clipboard and associated with an ObjectReceiver field on the underlying form. The location of the relevant ObjectReceiver field is indicated by the "target" field that must also be part of this form.<br>The type of object to be associated is indicated by the field's value. If it is left blank, then the current clipboard object (regardless of type) is retrieved and associated. |
| clear | The clear command indicates that the object association currently assigned to the "target" field should be removed. |
| show | The show command causes the object associated with the target field (if any) to be displayed on a suitable Netpage Player. |
| target | The target field has two roles. Firstly it indicates the location/field on which the set, clear and show commands should act. Secondly, if the target field is clicked then it behaves as if it is a show command. |

The below pseudo code outlines the handling of the set command. The main principle to note is that the center of the target field provides the {x,y} location to which the retrieved object should be associated. This {x,y} location is also used to locate a form field with which the object is to be associated. This is achieved by determining the uppermost field on the page that intersects with {x,y} and that is also receptive to object associations. In the case of the example, the uppermost field on the page that intersects {x,y} is the target field itself, but it being a submit field, is not receptive to object associations. The next uppermost field that intersects {x,y} is the ObjectReceiver field on the underlying form. The end result is that the object is associated with a field on the underlying application form rather than the overlayed sys:object-associator form.

```
ObjectAssociatorApp::handleSetCommand(a_submission,
a_formDescription)
{
  let l_setField = a_submission.getSubmitButton( )
    // fetch the target field for the current form
  let l_targetField = a_formDescription.fetchField("target")
    // Calculate the impression location to which the object is to be
    // associated. The center of the "target" field is used as the
    // location to place the object.
  let l_targetCenter = l_targetField.center( )
  let l_location =
      ImpressionLocation(a_submission.getImpressionId( ),
      targetCenter);
    // Look for a receptive field to which we can associate the object.
    // A receptive field is a field with a type that indicates it is
    // receptive to object associations. "submit" fields are not
    // receptive, but most other field types are. N.B. The receptive
    // field is typically on another form.
  let l_targetField =
            (the uppermost receptive field on the page that includes
l_location)
    // Retrieve an object of the appropriate type from the
NetpageClipboard.
    // The type to retrieve is indicated by the "value" element of the
    // "set" field
  let l_objectRequestType = l_setField.value( )
  let l_clipboard = getClipboard(l_submission.userId( ))
  let l_object = l_clipboard.fetchObject(l_objectRequestType)
    // create the associations
  let l_impressionAssoc = createImpressionAssociation(l_location,
  l_object)
  createFieldAssociation(l_targetField, l_impressionAssoc)
}
```

3.6.3 Field Associations and Form Submissions

Netpage forms 632 generally have one or more form submission buttons 642. Clicking on such a button 642 with a pointer 533 causes the Netpage server 529 to perform handwriting recognition of the digital ink (if any) assigned to the form 632, and to bundle the result into a form submission which is then posted to the application associated with the form 632. The handwriting recognition largely involves converting handwriting fields (such as textual combs, and check boxes) into their digital equivalents (for example digital ink in textual combs is converted to text).

Associated objects 601 can optionally be submitted as part of such form submissions. The requirement to transfer an associated object 601 (or otherwise) as part of the form submission is specified in the form definition for that form.

3.7 Static Associations (Embedded Objects)

Objects 601 can be associated with a document at document creation time. As with dynamic associations, such associations can either be impression associations 617 or field associations 618. Static associations are specified in the Interface Description for the document. Static associations are represented as PlayRequests 521.

4. Netpage Clipboard

The Netpage Clipboard 615 is a system supplied, per user object repository to which the user can push an object 601. The object 601 thus pushed is considered to be the user's "current object" which may then be accessed by applications, in particular by the UserRequestRouter, but in general by any application that is acting on behalf of the user.

4.1 Representation of Clipboard Objects

Clipboard objects are stored as Netpage Player PlayRequest objects 521. A PlayRequest 521 corresponds to a request to perform an action. It consists of three parts:

1. A target, which specifies on which player (device) the request should be executed.
2. The operation, which specifies the action to be taken.
3. A set of values, which are supplied as parameters to the operation.

A Value represents an instance of some physical type and consists of a type specification and data. The type specification has a physical type and zero or more associated type categories. The physical type identifies the structure of the data element of the Value. This document does not specify a particular representation for physical types. A possible mechanism would be to use MIME types. For example, if the physical type is image/jpeg then the data element would contain the binary data of an image in jpeg format.

A shorthand form of specifying PlayRequests will now be used in this section. As an example, instead of using the tabular form this section will use the following syntax for PlayRequests that only have a single item:

value {phone-number, "555 3473"}

| | | |
|---|---|---|
| target | | |
| operation | | |
| values | phone-number | "555 3473" |

4.2 Mechanisms for Pushing Values to the Clipboard

In general, a user performs an explicit user action in order to push a value to the clipboard. Such actions may take various forms as described in the following sections. Once a value is in the clipboard any application can access the value. For example the value can be dynamically associated with a form field on a printed impression.

4.2.1 Push via Printed Netpage Form

Figure 46:
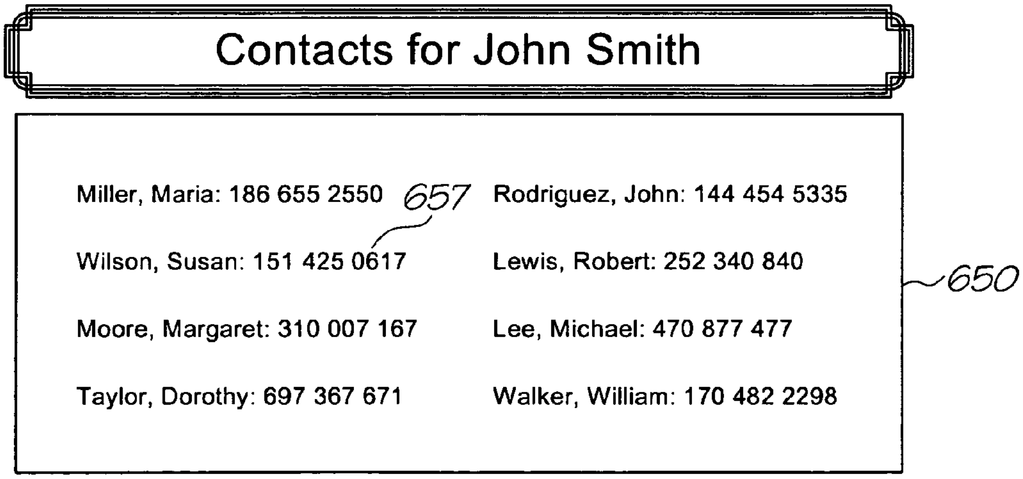
FIG. 46 illustrates an example Printed Contacts with Phone Numbers.

Values can be pushed to the clipboard by interacting with a printed Netpage form such as that shown in FIG. 46. The form has been authored such that clicking on any of the phone numbers causes that phone number to be sent to the Netpage clipboard 615 for that user 525. For example, clicking on the phone number for "Susan Wilson " 615 causes the following value to be pushed to the clipboard 615:

value {phone-number, "151 425 0617"}

4.2.2 Push via Physical Device

Values 524 can be pushed to the clipboard 615 by Netpage aware devices that are capable of capturing and/or storing typed objects. Table 5 provides some example devices and scenarios in which they might push values to the Netpage clipboard 615.

TABLE 5

Examples of Netpage aware devices capable of pushing objects to the clipboard

| Device | Example scenario |
|---|---|
| Digital Camera | User takes a photo with the digital camera and then selects "Send to Netpage" from a menu. |

TABLE 5-continued

| Examples of Netpage aware devices capable of pushing objects to the clipboard | |
|---|---|
| Device | Example scenario |
| | This results in the photo being added to the Netpage clipboard (say with type: image/jpeg). |
| mp3 audio players | User chooses a favourite song (or song collection) on the audio player and selects "Send to Netpage" from a menu. |
| Video camera | Similar to the digital camera scenario, but for video instead of still photo. |
| Dictation device | User records a message and then pushes the audio file to the Netpage clipboard. |

4.2.3 Implicit Push

To improve usability, it may be possible for certain devices to support implicit (or auto) push which is where certain user interactions with a device cause a value to be automatically pushed to the Netpage clipboard 615. As an example, the user may configure their digital camera so that taking a photo causes the photo to be pushed to the Netpage clipboard 615.

4.3 Netpage Clipboard Interface

In order for a device or application to push a value to the Netpage clipboard 615 or retrieve the current object 601, the device or application first retrieves a reference to a Netpage-Clipboard object for that user from the Netpage server 629. The following listing shows the NetpageClipboard interface in its most basic form. The interface allows the current clipboard value to be set, fetched and cleared.

```
interface NetpageClipboard
  {
    void
    setObject(in PlayRequest a_object);
    PlayRequest
    fetchObject( );
    void
    clear( );
  };
```

The sections that follow discuss alternatives for various aspects of the Netpage clipboard interface.

4.3.1 Multiple Values Per User

The Netpage clipboard 615 is able to support multiple current values each of which belong to a different category. For example, the clipboard 615 can hold a current audio and current video at the same time. PlayRequest values can specify one or more categories to which that value belongs. Note that an object category is generally independent of the specific physical type of the value being added to the clipboard. For example, setObject( ) might be called with a value that has a category of "photo", and a physical type of image/jpeg.

This listing shows a NetpageClipboard interface that supports multiple current values.

```
interface NetpageClipboard
  {
    void
    setObject(in PlayRequest);
    PlayRequest
    fetchObject( );
```

-continued

```
    PlayRequest
    fetchObject(in ObjectCategory);
    void
    clear(in ObjectCategory);
    void
    clearAll( );
  };
```

Such a clipboard would still support the current object concept which would return the most recently added object. To that end, the clipboard interface in the listing has two fetchObject( ) methods. The first takes no parameters and returns the most recently added object. The second takes an ObjectCategory as a parameter and returns the most recently added object which belongs to the specified object category.

More generally the clipboard could reuse the general capability matching mechanism required by RequestRouters in the Netpage Player architecture. This would provide the clipboard with a very powerful interface for retrieving PlayRequests.

4.3.2 Multiple Representations of Values

As with clipboards in standard desktop environments, it may be desirable to allow the Netpage clipboard to support multiple representations of values, each of which would have a different MIME type. For example, a text object could be stored as both a text/plain and a text/rtf document.

4.3.3 Using Values from the Netpage Clipboard

Figure 47:
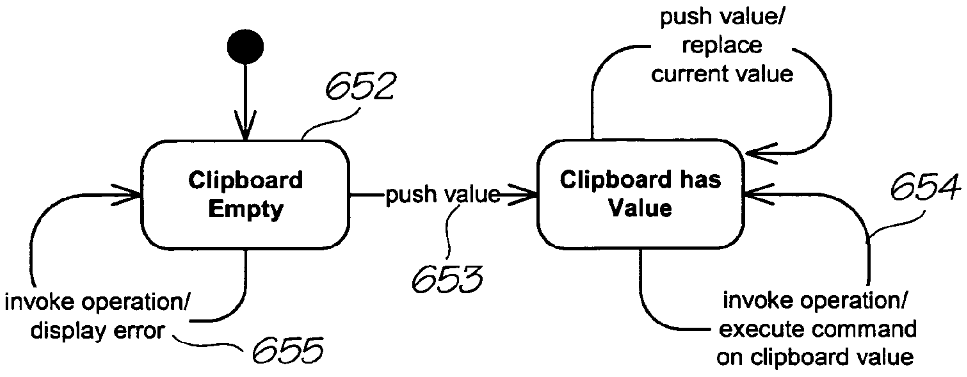
FIG. 47 illustrates an example State machine for basic clipboard interaction.
Figure 48:
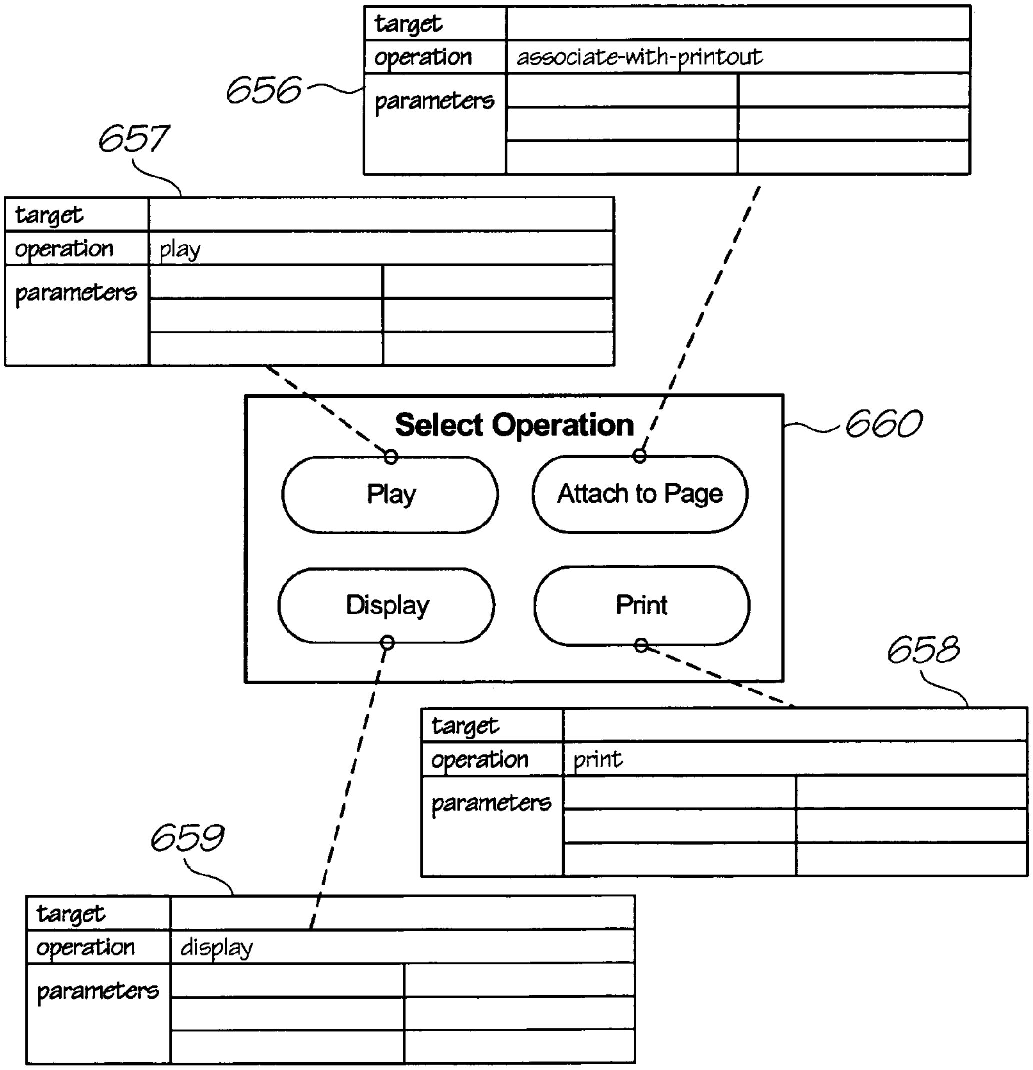
FIG. 48 illustrates an example interactive Netpage card with common operations.

Once a user places a value in the clipboard, the value can be accessed by applications in response to actions by the user. The basic clipboard interaction model is shown in FIG. 47. Referring to FIGS. 47 and 48, the clipboard starts empty 652. A value can then be pushed 653 into the clipboard 615. At that point an operation can be selected 654 by the user at which point the selected operation is executed against the current value in the clipboard. If an operation is selected while the clipboard is empty, then an error 655 is returned to the user.

The model presented in FIG. 47 is called the value first model as it requires the user to first select the parameter to an operation, and to then select the operation itself.

One way in which an operation can be invoked by a user is for the user to interact with a printed Netpage form 660 which contains a set of PlayRequests which specify operations. FIG. 48 shows such a printed command sheet and Table 6 describes the meaning of each operation. When a field is selected by the user (by clicking on it with a Netpage pointer), the corresponding operation is performed on the value currently stored in the clipboard

TABLE 6

| Description of commands | |
|---|---|
| Command | Descriptions |
| Play | Executes the default action for the current clipboard value. For example, for a phone number object, the default action might be to dial the number, while for an image it might be to display the image on a device capable of image display. |
| Display | Display the current clipboard value. This is different to play, since for a phone number, for example, the phone number is displayed rather than dialled. |
| Attach to Page | Associate the current clipboard value with a location on a printed page. |
| Print | Print the current value. |

4.4 Placing Operations and Targets in the Clipboard

As clipboard entries are actually stored as PlayRequests 521 it is also possible to push operations and targets to the clipboard 615.

4.4.1 Adding Operations to the Clipboard

Figure 49:
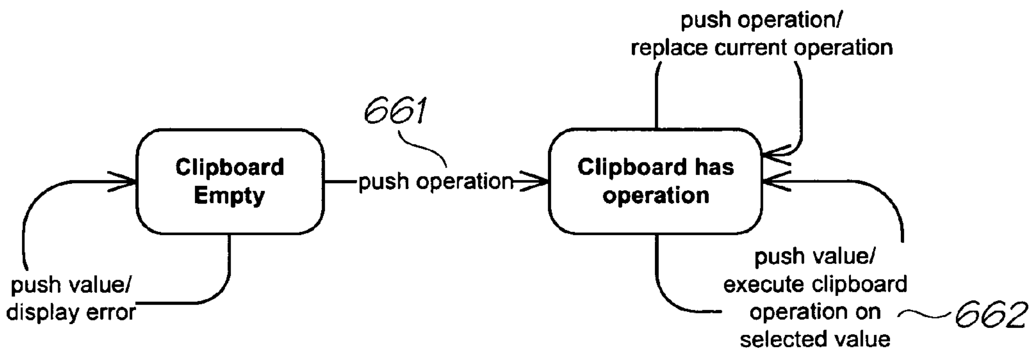
FIG. 49 illustrates an example State machine for operation based clipboard.

FIG. 49 shows a clipboard model which allows operations 523 to be stored in the clipboard 615 rather than values. In this model, the user pushes an operation 523 to the clipboard 615 at step 661, and then selects the value 524 to which the command 523 should be applied at step 662. So, for example, a "play" operation could be pushed to the clipboard 615, and then a phone number could be subsequently selected from a contacts list as already shown in FIG. 46. This model is called the operation first model as it requires the user to first select an operation 523, and to then select the parameter 524 for the operation 523.

4.4.2 Allowing Both Value First and Operation First Models

Figure 50:
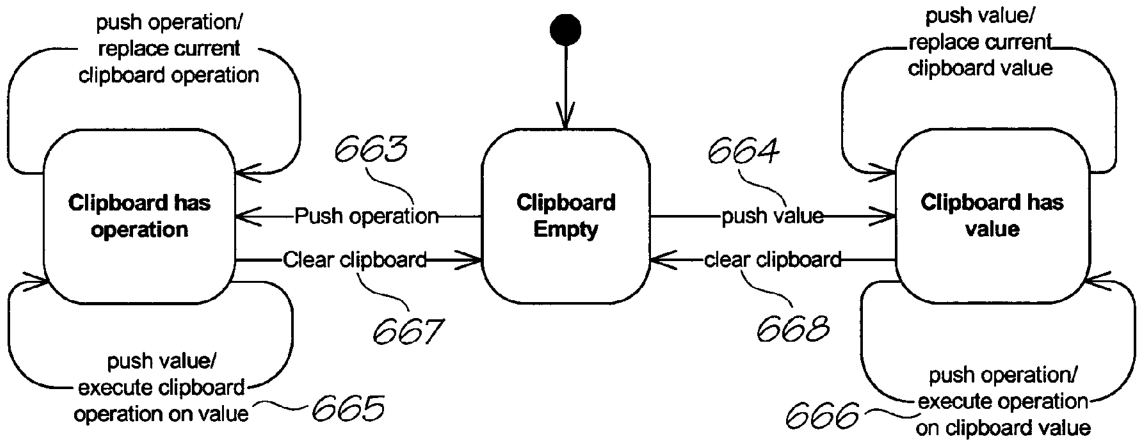
FIG. 50 illustrates simultaneously supporting both object first and command first models.

It is possible to simultaneously support both the value first and operation first models as shown in FIG. 50. In this model an empty clipboard 615 allows an operation 523 or a value 524 to be pushed at steps 663 or 664. This gives the user the freedom to perform operations 523 in whichever order seems natural. Also, if a user is using operation first, then once the user has placed an operation 523 in the clipboard 615, they can perform that operation 523 on as many values 623 as required simply by pushing values to the clipboard 615 at step 665 (and vice-versa for value first at step 666). In order for a user to switch between models, however, the clipboard 615 must be explicitly cleared at steps 667 and 668.

The following examples show the two models in action. In each case, the user's steps are shown numbered and the contents of the clipboard 615 are shown after each step. In the first case, the user uses the value first model by first pushing a phone number to the clipboard 615, and then selecting the operation 523 to be applied to that object:

```
Push value
value { phone-number, "555 1287" }
Push operation
value { phone-number, "555 1287" }
operation { play }
```

At this point, an observer of the clipboard 615 (likely the UserRequestHandler) determines that the PlayRequest 521 as shown below can be produced by combining the operation 523 and value 524 PlayRequests 521. The resultant PlayRequest 521 can then be routed by the UserRequestHandler. Typically the UserRequestHandler "plays" a phone-number by sending the request to a device capable of dialling the phone number.

PlayRequest created by merging contents of clipboard:

| | | |
|---|---|---|
| target | | |
| operation | play | |
| values | phone-number | "555 1287" |

The second case uses the operation first model:

```
Push operation
operation { play }
Push value
operation { play }
value { phone-number, "555 1287" }
```

At this point, the clipboard 615 determines that the PlayRequest 521 can be produced by combining the operation 523 and value 524 PlayRequests 521.

4.4.3 Ambiguous Usage

One problem associated with this mechanism of pushing values 524 or operations 523 to the clipboard 615 is a value 529 or operation 523 can remain in the clipboard 615 indefinitely. As such, it is easy for a user 525 to forget that an object 601 is in the clipboard 615 and for unexpected results to emerge. This is particularly the case if we simultaneously allow both the value first and operation first models. As an example, suppose the user performs the following actions:

1. Push "play" operation to the clipboard
2. Push a phone number (the number is dialled)
3. An hour later, click on another phone number.

Using the state machine indicated by FIG. 50, step (3) would cause the number to be dialled. This may not be what the user expected as they have likely forgotten the fact that the "play" operation is currently residing in the clipboard.

There are a number of approaches to addressing these useability concerns:

Single Use Clipboard Entries

Clipboard Timeouts 4.4.4. Single Use Clipboard Entries

Figure 51:
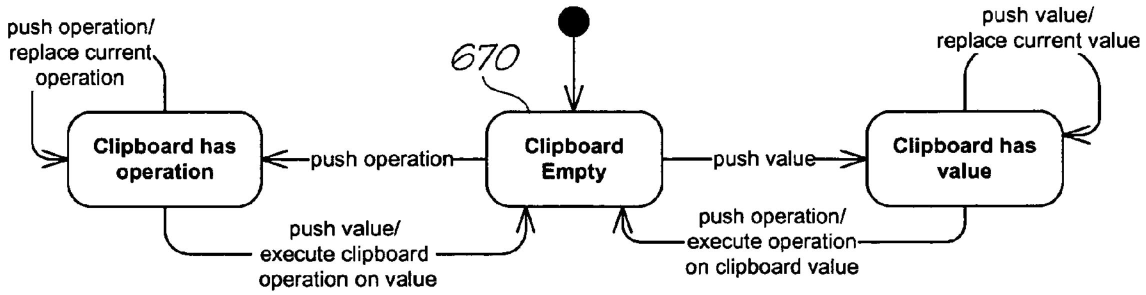
FIG. 51 illustrates example Single use clipboard entries.

FIG. 51 provides an alternate model to that previously described. In this model, using an item in the clipboard 615 at either of steps 525 or 626 results in that item being removed from the clipboard 615 at state 670. That is, operations 523 and values 524 only remain in the clipboard 615 for a single use after which the clipboard 615 is returned to the Clipboard Empty state 627. This model largely avoids the useability concerns described above, although not completely, as will be described in further detail.

4.4.5 Clipboard Timeouts

While a single-use clipboard model improves the useability of the Netpage clipboard 615, there are still problematic scenarios which result from allowing both value first and operation first models to coexist. Consider the following steps:

Push "play" operation to the clipboard 615

An hour later, push a phone number

In the above, it is not clear whether the user 525 has indicated that they would like to apply the "play" command to the phone number, or whether they had forgotten that they had pushed the "play" operation an hour ago and were actually attempting to simply push a phone number to the clipboard 615.

Figure 52:
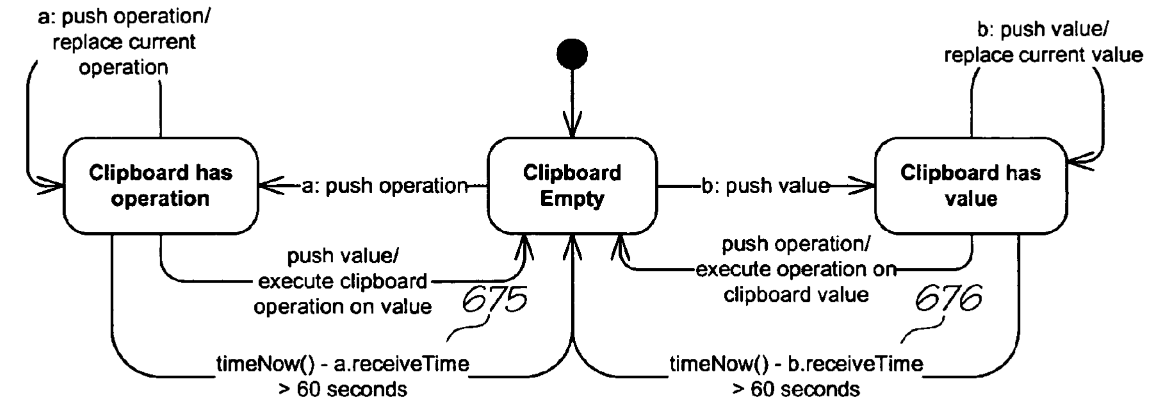
FIG. 52 illustrates an example Single-use clipboard with timeouts.

In order to address the ambiguity, the concept of clipboard timeouts can be introduced, as shown in FIG. 52. In this model, objects only remain in the clipboard for a limited duration, 60 seconds in the example for steps 675 and 676, but the exact value could be user configurable.

Figure 53:
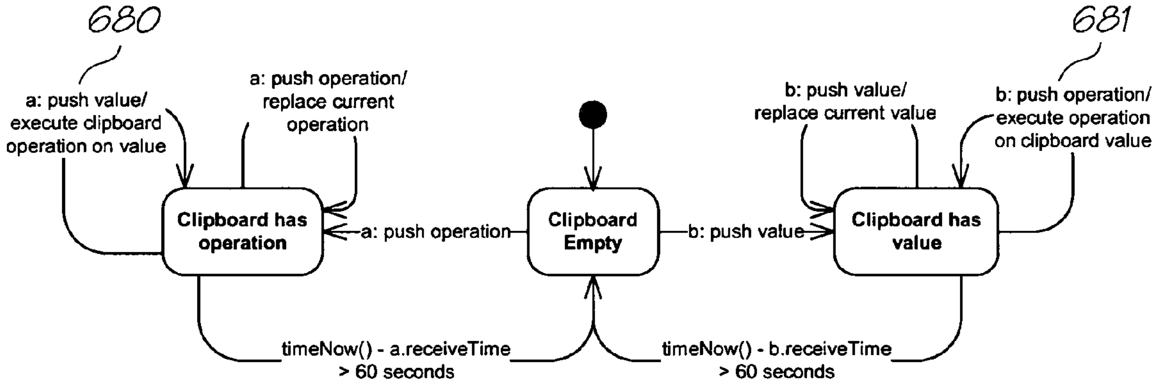
FIG. 53 illustrates an example Multi-use clipboard with timeouts.

FIG. 52 shows clipboard timeouts in the context of a single-use clipboard. It is also possible to introduce clipboard timeouts within a multi-use clipboard, as shown in FIG. 53. Each application of an operation to a value at steps 680 and 681 resets the timeout period which allows for multiple values to be applied to an operation without having to push the operation each time. Similarly, it allows multiple operations to be applied to a value without having to push the value each time.

4.4.6 Multi Value Operations

The clipboard 615 concept can be extended to support operations that require more than one parameter 524. The basic approach is to allow multiple values 524 to be pushed to the clipboard 615. The clipboard 615 can then combine the values 524 with a pushed operation 523 to create a PlayRequest 521 with multiple parameters.

4.4.7 Adding Targets to the Clipboard

Consider the command sheet already shown in FIG. 48. Clicking on each operation with a Netpage pointer 533 causes the corresponding operation 523 to be pushed to the clipboard 615. The operation 523 does not necessarily take effect immediately. The operation takes effect when there is sufficient information available in order to determine the full details of the PlayRequest 621 being requested by the user 525. There are cases in which it proves valuable to allow the user 525 to be able to specify the target 522 of an operation 623. For example, suppose a user wishes to print a photo from their digital camera, but does not wish to print it to their default printer.

Figure 54:
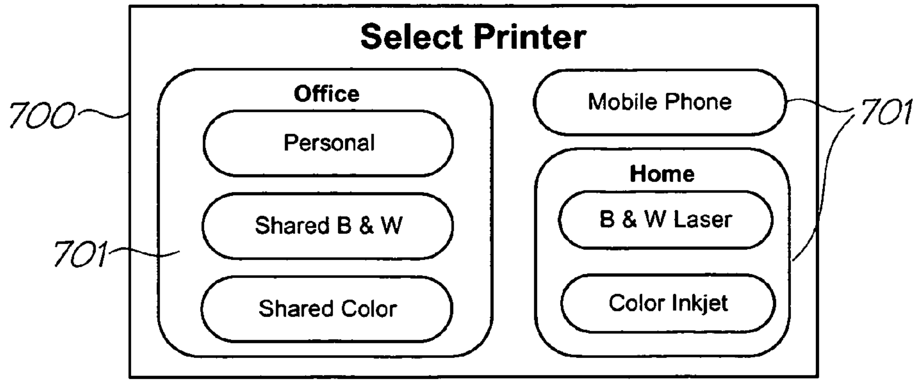
FIG. 54 illustrates an example Interactive card for selecting a printer.

Selection of the printer can be achieved by selecting the printer from a list of printers printed on a Netpage card 700 as shown in FIG. 54. Clicking on a printer 707 on the card simply causes the details of that printer to be pushed to the Netpage clipboard 615.

Figure 55:
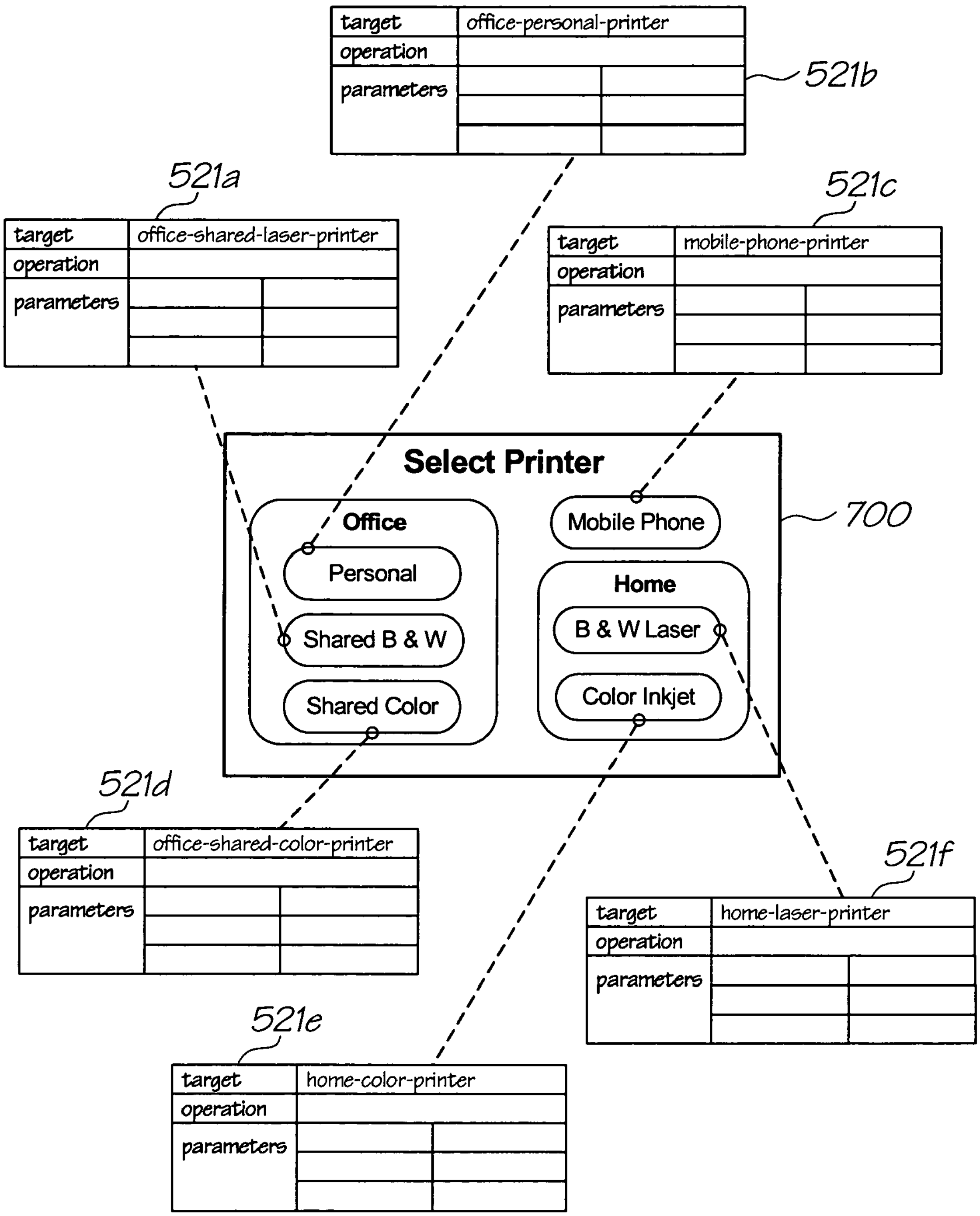
FIG. 55 illustrates example Field details of printer selection card.

FIG. 55 shows the details of each of the fields on the card. Each field corresponds to a PlayRequest (521*a*, 521*b*, 521*c*, 521*d*, 521*e*, 521*f*, 521*g*) that specifies a target 522 and nothing else.

The following steps provide an example in which the user pushes a target to the clipboard.

1. Push photo of family dog to clipboard
value { image/png category ="photo", <contents of photo of dog> }
2. Select printer by clicking on card
value { image/png category ="photo", <contents of photo of dog> }
target { home-color-printer }
3. Push "print" command to clipboard (e.g. using printed command sheet shown in FIG. 3
value { image/png category ="photo", <contents of photo of dog> }
target { home-color-printer }
operation { print }

At this point, a PlayRequest 521 can be constructed that combines all the elements from the clipboard 515 as shown in FIG. 52.

| PlayRequest created by merging contents of clipboard | | |
|---|---|---|
| target | home-color-printer | |
| operation | print | |
| values | image/png category ="photo" | <contents of photo of dog> |

Once the full PlayRequest 521 is determined, it is performed and, depending on the clipboard model being used, the clipboard 615 would either be cleared of all contents (the single-use model), or left as is in readiness for future related requests 521 (the multi-use model). In the latter case, the subsequent act of pushing another photo (say of the family cat) to the clipboard 615 would leave the clipboard 615 in the following state:

target { home-color-printer }
operation { print }
value { image/png category ="photo", <contents of photo of cat> }

At this point, the clipboard contents indicate that the user wishes to print the newly selected photo on the color inkjet printer at home. This approach allows the user to request the printout of a number of photos on a particular printer, without having to specify the target 522 or the operation 523 each time, by simply clicking on each required photo.

Even in the multi-use case, if the user is inactive for some configurable period of time, then a clipboard timeout causes the clipboard 615 to be cleared.

4.4.8 Pushing More Fully Specified PlayRequests

Figure 56:
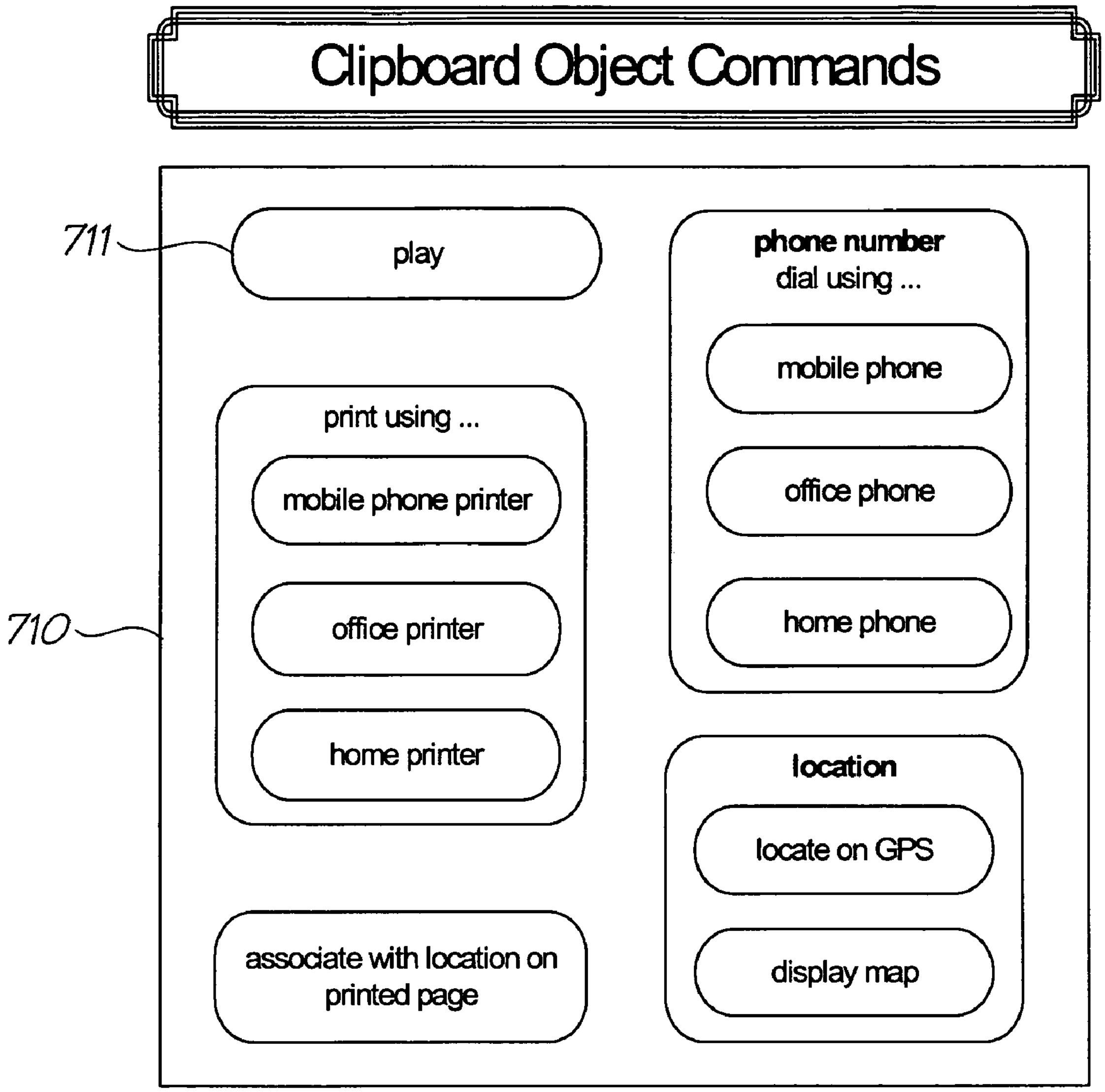
FIG. 56 illustrates an example Netpage form containing various commands.

As the clipboard 615 supports the pushing of PlayRequests 521, the application author is not limited to pushing values 524, operations 523, and targets 522. It is also possible to push PlayRequests 521 that are more fully specified. For example, consider the printed command sheet 710 shown in FIG. 56. It contains various commands 711 that can be invoked by clicking on the sheet with a Netpage pointer 533.

Figure 57:
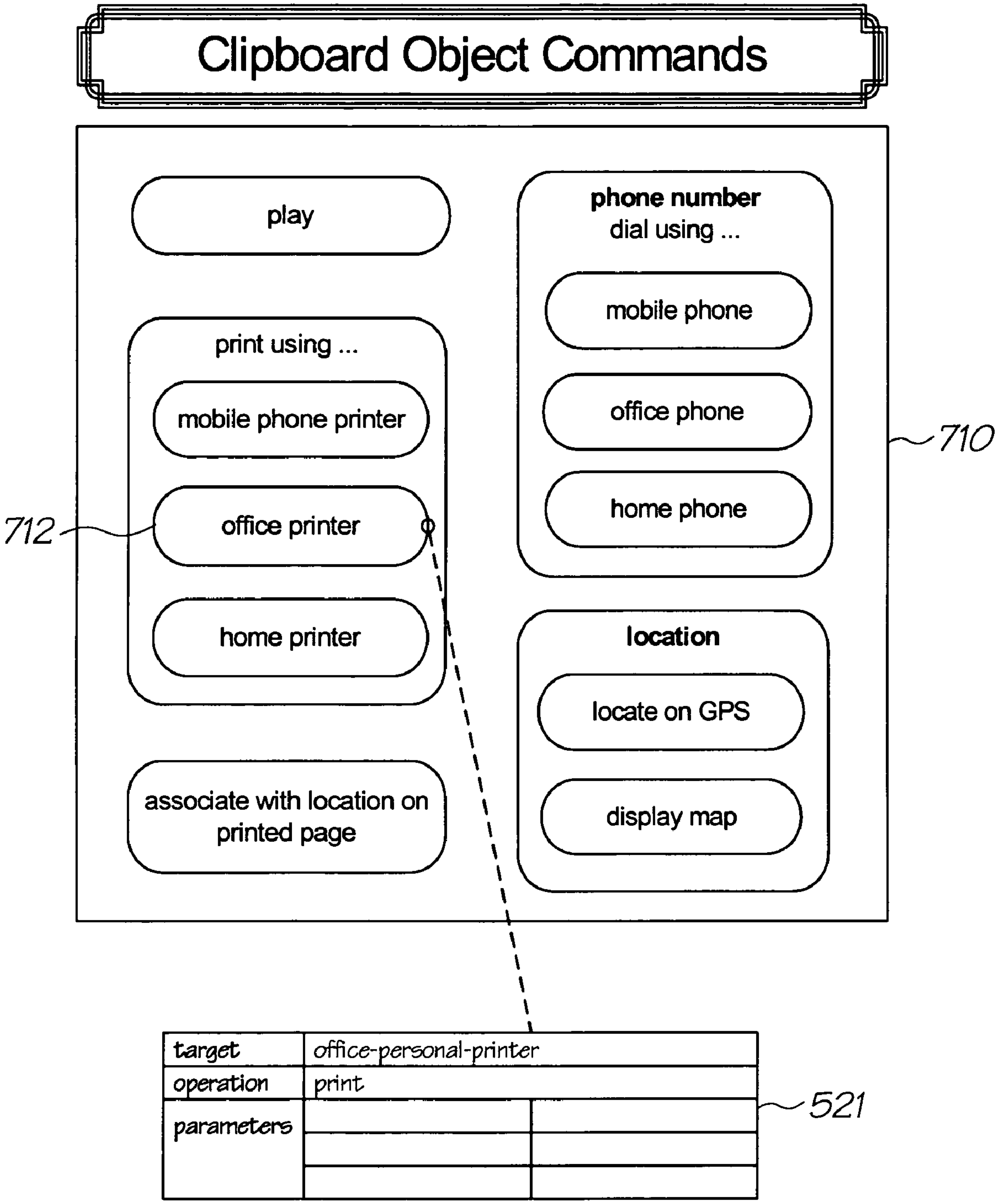
FIG. 57 illustrates an example Command form showing details of office printer field.

FIG. 57 shows the configuration of one of the commands. Namely, the "print using . . . office printer" command 712. As can be seen, it corresponds to a PlayRequest 521 that specifies both a target 522 and a command 712.

1. Push photo of family dog to clipboard
value { image/png category ="photo", <contents of photo of dog> }
2. Click on "print using ... office printer" field
value { image/png category ="photo", <contents of photo of dog> }
target { office-personal-printer }
operation { print }

At this point, a PlayRequest 521 can be constructed that combines all the elements from the clipboard 615 as shown in FIG. 52. As such, the "print using . . . office printer" command 711 has reduced the number of clicks required by the user to perform the action from three clicks to two.

| PlayRequest created by merging contents of clipboard | | |
|---|---|---|
| target | office-personal-printer | |
| operation | print | |
| values | image/png category ="photo" | <contents of photo of dog> |

4.4.9 Communicating Status to the User

At times the mechanisms described may require communication of status information (often errors) to the user. One method is to make use of the Netpage Player infrastructure. Special operations (eg. show-status-ok-message and show-status-error-message) can be designated for transmitting status information to the user. The player architecture would determine, for each message, the appropriate device (or devices) on which to display the message and the way in which to display it. For example, it may be that in certain situations the pointer 533 is the only available player in which case an error status might be "played" by illuminating a red LED on the pointer 533 or playing a short sound.

5. Downloadable Content Billing 5.1 Overview

There is already an existing market place for purchasing and downloading products to mobile devices. Products such as: ringtones (monophone, polyphonic and real tone); wallpapers; games and other applications; music; music videos; films and TV. The printing capabilities of M-Print can add further to this list of products.

Figure 58:
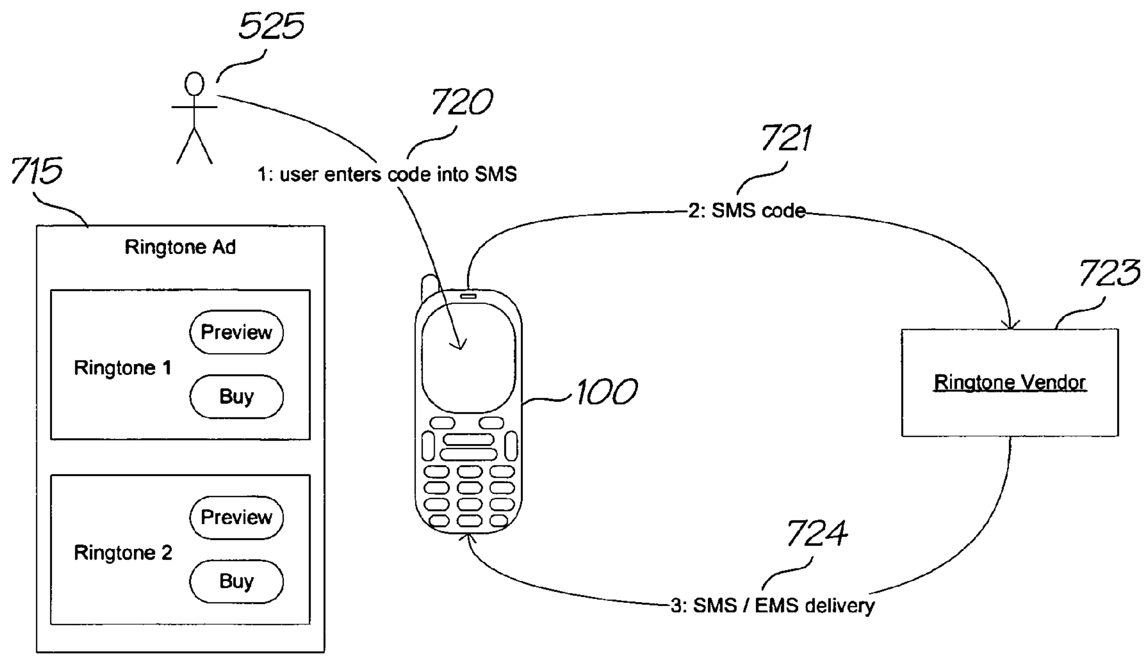
FIG. 58 illustrates an example SMS Based Downloadable Content Purchase.

The traditional methods for purchasing and downloading such products are based around web browsing and SMS to initiate the download and EMS or MMS to deliver the product to the phone 100, see FIG. 58. The user enters and sends a product code via SMS at steps 720 and 721 to a vendor 723 who then delivers the product to the originating handset 100, or to the mobile number supplied with the product code at step 724.

Netpage and M-Print technologies have the ability to simplify the user experience in accessing and purchasing these products, while also being able to utilise the existing infrastructure for the billing and delivery of the products.

Figure 59:
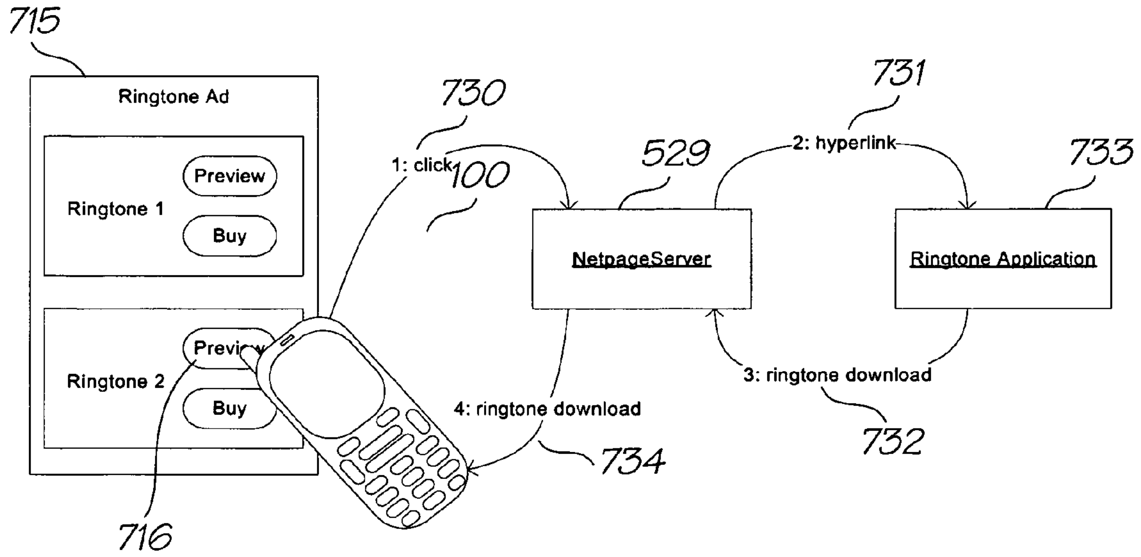
FIG. 59 illustrates an example Netpage Play Sequence for Previewing a Ringtone.

FIG. 59 shows the typical sequence of events for a Netpage play sequence, cast in terms of downloading a preview of a ringtone. In the general Netpage play sequence a Netpage click at step 730 triggers a form submission which in turn results in a general "play" event being routed at steps 732 and 734 to a Netpage player via the Netpage Player Architecture. For downloadable content the form submission is shown as a simple hyperlink 731 and the "play" event is shown as a download of content, in this case a ringtone.

Using a Netpage pen or pointer 533 the user 525 can click on a printed advertisement 715 in a magazine, newspaper, direct mail, on a product's packaging or possibly on a product itself. This can automatically deliver some content to the user's preferred Netpage Player 520 for that content. Most likely the Netpage Player 520 is the user's mobile phone 100, as is shown in FIG. 59. Alternatively it can commence a dialogue with the user via the device's UI to determine what the user wants to do with the product they selected via their click. For content like ringtones or phone themes, this provides a more convenient interface than the existing SMS interfaces in use today.

M-Print devices can provide a Netpage scan operation, and this can also be used to initiate a product download or purchase as above. The card that is scanned could have been printed on a M-Print printer 4 or it could be provided along with another product, e.g. a card in a breakfast cereal box.

Combining the abilities of M-Print and Netpage can lead to a powerful suite of new product promotion and sales tools. For example, a user can use a Netpage pointer 533 in a mobile phone 100 to click on the latest ringtone advertisement in their favourite magazine. This results in purchasing the ringtone, charging it to their mobile phone account, download and install it on their phone 100. It can also print on their phone a promotional card that allows a one time download of the same ringtone for them to give a friend. When their friend scans the card they receive the same ringtone downloaded and installed on their phone. Depending on the promotion running at the time the friend may receive the ringtone for free or at a discounted rate.

5.2 Downloading Content

FIG. 59 shows the typical Netpage player sequence of events that are involved in downloading a product, in this case a ringtone, from a Netpage based application. In the diagram the ringtone download event being routed to the phone in steps 732 and 734 consist of a ringtone, with the play operation of preview 716. It may have the target handset specified or it may rely on the Netpage player request routing mechanisms to determine the appropriate target 522 for the play request 521.

It has already been noted that the mobile computing environment already has some well established mechanisms for satisfying on-line product purchases. Below are three possible ways Netpage player requests can be integrated into the existing mechanisms to provide the user with a simpler user experience. In each of the cases the request to purchase or preview the product is instigated via a Netpage stroke, click or scan The differences arise in how the Netpage application 733 procures the product and delivers it to the user.

5.3 Netpage as Middle Man

Figure 60:
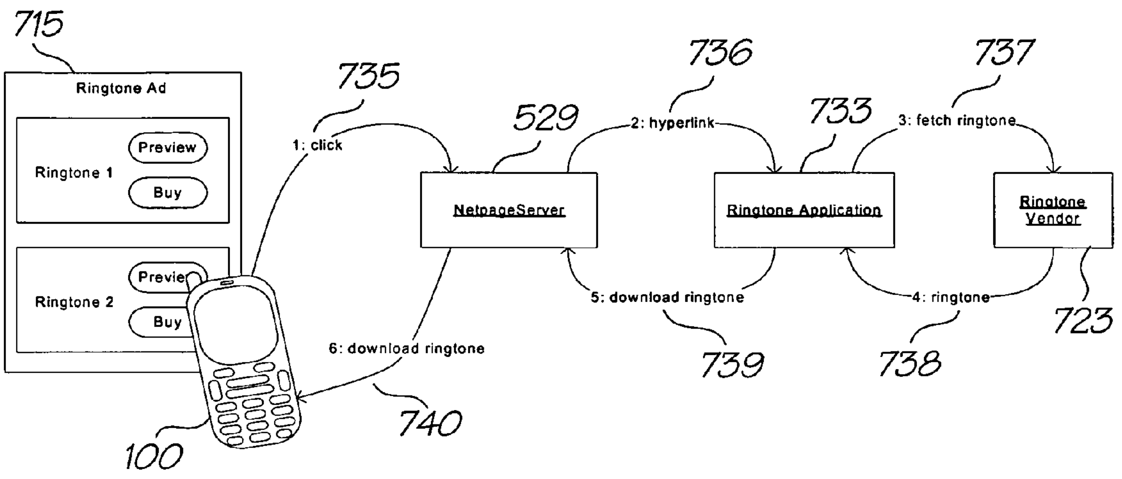
FIG. 60 illustrates an example Using play requests to deliver the product.

FIG. 60 shows a scenario where the Netpage ringtone application is used as an alternative interface and delivery mechanism to an existing ringtone vendor 723. The Netpage application 733 does not own the rights to the products it is providing. Instead it is acting as a middleman, forwarding the requests at step 736 onto the product vendor 723 on behalf of the Netpage user and routing the requested product at step 739 back to the Netpage user via the Netpage player mechanism.

This approach allows the user to benefit from the Netpage Player Architecture, which allows the user to customize the way they want the product to be routed after they have received it from the vendor. It also allows for the Netpage Player to provide extended handling of products on the mobile device. For example, the player may prompt the user if they wish to back up their existing ringtone before installing a new ringtone or it may guide the user through installing the ringtone as a custom ringtone for a particular phone number or set of phone numbers.

5.4 Netpage as a Sales Agent

Figure 61:
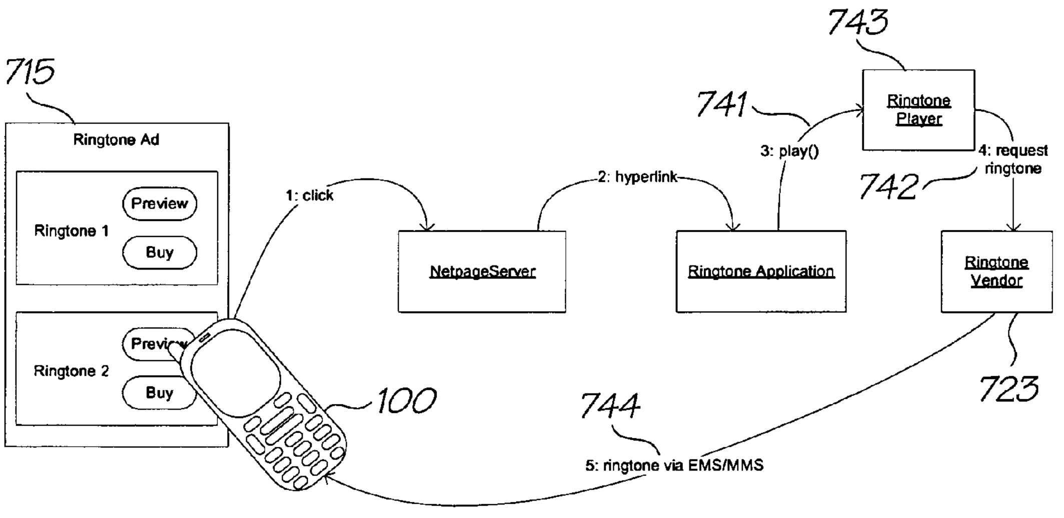
FIG. 61 illustrates an example Using play requests to purchase the product, and traditional delivery.

FIG. 61 shows the Netpage application 733 acting as a sales agent for the product vendor 723. The play request 521 contains the user information and the product ID, and is routed to a special player 743 at step 741 that passes the request onto the vendor 725 at step 742. The vendor 723 then delivers the product in its normal way, in this case via EMS/MMS at step 744.

5.6 Hybrid Approach

Figure 62:
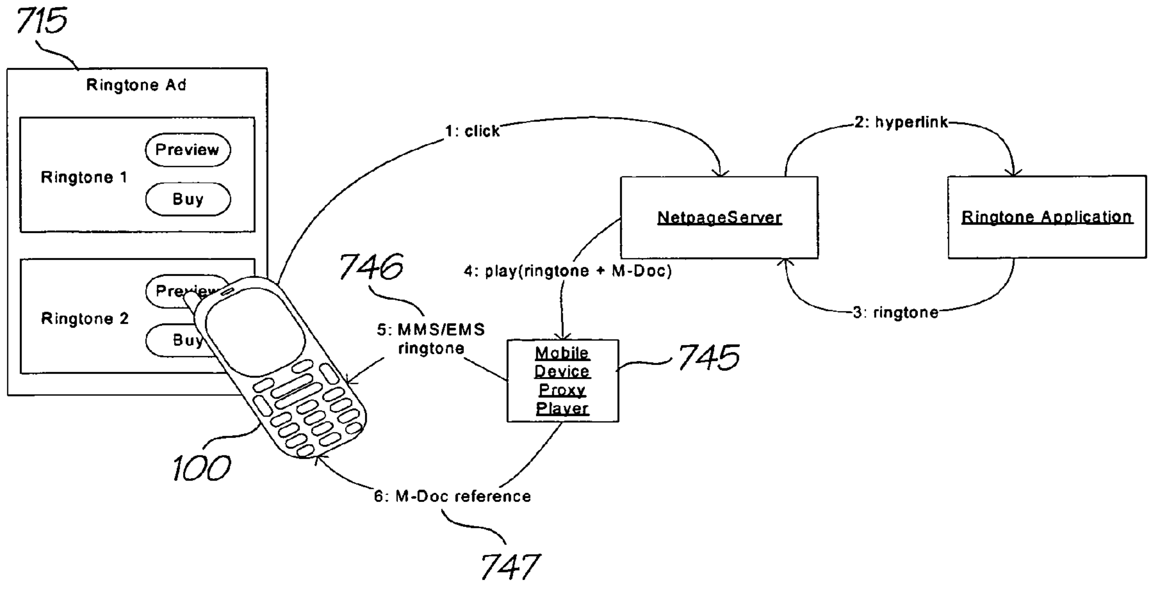
FIG. 62 illustrates an example Hybrid approach using traditional delivery on the last hop to the handset.

FIG. 62 shows a hybrid scenario where the both the Netpage Player Architecture and the existing mobile technologies are used to deliver the purchased product. The request 521 to purchase the product may be satisfied by the ringtone application 733 either internally as a pure Netpage application or acting as a middle man. The play request is dispatched containing both the purchased product and a voucher to be printed.

The play request 521 is routed as a Netpage player request and when it reaches a player 745 deployed within the mobile network, acting a mobile device proxy, it is split into a product delivery and a print job. The product is sent out via an EMS/MMS message at step 746 and delivered to the mobile device 100 in the same way as a traditionally purchased product at step 747. The print job in the form of an M-Doc reference 507 is delivered to the phone 100 via one of the mechanisms initiating a print job on the mobile device 100.

5.7 Billing for Downloaded Content

The ability to bill or charge for services and products is at the heart of all businesses. To be able to bill you need to be able to:

1. identify a party to bill;
2. have a mechanism to deliver and ensure payment of a bill; and,
3. be able to justify the bill based on records of services or products provided.

When accessing a service or purchasing a product over a mobile network the user is typically charged for both the data or call traffic involved in making the transaction and also for the product or service purchased. For example, if a ringtone was purchased via Netpage, there is a charge for the ringtone and also a charge the data traffic used to download the content to the mobile device. It is possible for a 3rd party vendor to enter into a commercial relationship with the carrier whereby the carrier waives or reduces the data transfer costs, in return for a payment from the vendor. Mobile carriers play a central role in billing. They own the private networks used by mobile devices to connect to both the public telephone and data networks and it is at their discretion that a mobile device has access to any services. They already have a billing relationship with each of their customers and hence are able to identify them and bill them. Over time the billing options offered by carriers have evolved from the simple post-pay phone bill to include pre-paid, post-paid and plan-based billing, where customers are committed to paying a certain amount per period for which they can access a range of services. Carriers also have the ability to adjust or waive billing based on a user's activity over a billing period, for example, if you send more than certain number of SMSs in a day then all SMSs is to be charged at a different rate.

For pre-paid accounts the account balance is checked before the transaction is commenced to ensure it has sufficient credit to pay for the service. Not all services can predict the total cost before they are delivered and in those cases it is up to the individual carriers to decide whether those services are to be made available to pre-paid customers or not.

Mobile carriers recognise the value of their ability to identify and bill customers and make it available to third parties on a commercial basis. They do not make it freely available. The ability to integrate into a carrier's billing system is typically offered in a number of different ways, of which some are:

1. SMS/MMS-based services
2. Hosting of 3rd party applications and billing the traffic for those applications differently
3. Billing of data traffic to nominated servers at different rates
4. The ability to bill on behalf of a third party, based on billing records provided by the third party.

To bill for products or services attained via Netpage interactions it is necessary to identify where in the sequence of events it makes sense to generate billing records and which party in the transaction is responsible for maintaining and acting on those billing records. To make these services available to users with pre-paid mobile accounts it may be necessary to be able to predict ahead of time the total cost of the transaction. If we consider the SMS-based content download scenario, FIG. 58, there are three billing opportunities:

1. The SMS to initiate the transaction may be a billable SMS
2. The purchase of the content from the vendor
3. The delivery of the content via a SMS or MMS.

The first SMS is a standard SMS that the user may be billed for, it may be billed differently given that it is destined for a vendor who has a business relationship with the carrier. The second SMS/MMS is not billed to the sender, as would normally happen, but it is billed to the receiver, via an agreement between the vendor and mobile carrier. In both of these cases the mobile carrier generates and manages the billing records. The purchase cost for the content is also billed to the receiver and the vendor is responsible for generating the billing record. In most cases this billing record is forwarded onto the mobile carrier, typically once a day via a batch transfer. The carrier accumulates these records and includes them on the user's phone bill as a service for the vendor. The carrier then makes a periodic payment of funds collected on the vendor's behalf to the vendor. This alleviates the need for the vendor to establish a billing relationship with each of its customers and also allows the mobile carrier to derive more revenue from its existing billing relationship with the customer.

For the vendor to be able to generate billing records that a mobile carrier can incorporate into a customer's bill the mobile carrier needs to provide the vendor with a "customer id" or "billing id" per transaction that the carrier can use to link a billing record with a customer. The provision of customer id and the ability to generate billing records needs to be done in a secure way to reduce the possibility of fraud. To ensure the required security is maintained each vendor enters into a contractual relationship with each mobile carrier before the "customer id" data is shared with them.

In situations where a vendor cannot or does not want to work with a mobile carrier they need to implement their own means of identifying and billing their customers. Identifying a user of a mobile device without the assistance of the mobile carrier in a uniform way across all mobile devices is non-trivial.

Introducing Netpage and M-Print technologies provide a number of new billing opportunities for all parties involved. If we consider the case where Netpage acts a middle man, there are two billing opportunities:

1. When Netpage application retrieves the content from the content vendor;
2. For the network traffic used to deliver the click and the ringtone.

The Netpage application fetching the content from the vendor generates a billing record for the customer. As for the SMS case above, it is possible to arrange with a mobile vendor to accept these billing records and to bill on the application's behalf. To do this the-data traffic associated with the hyperlink activation is to be tagged with a "customer id" to be associated with the billing record.

The mobile carrier tracks the data traffic used to send the click event and deliver the play request. By default that traffic would be billed in the same way as all other data traffic to and from the device. In a situation were the Netpage application is billing via the carrier it may be possible to strike a deal with the mobile carrier where by they waive the data traffic costs in return for a payment per transaction.

In the case of Netpage acting as a Sales Agent, the Netpage system is not involved in delivering the product but only in making the sale. In this case there are four billing opportunities:

1. The data traffic for the Netpage click;
2. The forwarding of the purchase request to the vendor;
3. The purchase of the content;
4. The delivery of the content The mobile carrier tracks and generate billing records for the data traffic and the delivery of the content. As in the SMS case the delivery message is charged to the receiver rather than the sender, via an agreement with the carrier.

In this case the billing record for the content purchase generated by the ringtone vendor and would be handled in same way as for the SMS case above. It would be possible to have an agreement with the carrier whereby the cost of the data traffic and the delivery message are waived in return for a payment from the vendor.

In most cases the Netpage application would be managed by the vendor as an alternative interface to their existing business and as such it does not need to bill for its forwarding services. If it is run by a different business then it generates a billing record for the forwarding service. This may be delivered either to the user or to the vendor who has agreed to pay for forwarded requests.

The billing options for the hybrid approach are essentially the same as for when Netpage is a middle man but the number of deliveries, and hence billable events, to the mobile device is increased. In this case the bill for delivering the M-Doc may be changed to the vendor rather than the customer since it is an unsolicited promotion. Each of these billable events could be filtered by the mobile carrier based on later billing records that enter the system. For example, the cost of delivering the M-Doc may be waived or credited back, if the offer on the printout is taken up by another user.

5.8 Digital Rights Management

Closely related to billing is ensuring that the product or service is only used for the purpose(s) it was purchased for, eg. a ringtone purchased for one phone, can not be installed on more than one phone, or a music file that is downloaded as a sample can only be played X times before being purchased.

Digital Rights Management (DRM) schemes are being adopted by mobile device manufactures and mobile carriers. Where content is being delivered via the existing mobile mechanisms DRM is automatically triggered. The Netpage Player on a mobile device is implemented to hook into the DRM mechanisms on the mobile device. It prevents a user by-passing DRM restrictions on downloaded content.

5.9 Identifying the User

Mobile carriers identify the user of a mobile device when the device negotiates access to the network, either at boot time or when it comes within range of a base station. For GSM and CDMA networks a user's identity is determined by matching the International Mobile Subscriber Identity (IMSI) with a user's records held by the carrier. The IMSI is not sent during negotiation but rather an identity derived from it called a Temporary Mobile Subscriber Identifier (TMSI) is sent. Access to the IMSI can be protected by a PIN and most phones can be set up to prompt the user for a PIN when it is turned on. This is used to gain access to protected data, such as the IMSI. During the connection time negotiations the International Mobile Equipment Identity (IMEI) is also transmitted. This is not used to determine who the user is, but it is used to filter out mobile devices that are blocked from the network, e.g. stolen mobiles can be blocked based on their IMEI.

When a mobile network allows a user on a GSM network, they assign the user a SIM card and then activate the SIM card. For a non-pre-paid SIM card the user needs to present sufficient identification information that the carrier is satisfied they know who the person is, that they are able to pay their bill, and where to send the bill. For a pre-paid account the carrier does not need such information, but some countries do require carriers to collect user identity information even for pre-paid accounts. Once the user has an activated SIM card it can be used from any handset and the correct account is billed for usage. Users are encouraged to protect their SIM cards with a PIN, so that it cannot be used until a PIN is supplied. However this is not enforced by the carriers, as it is a user choice.

The Netpage system, includes the concept of a Netpage user, each of whom has a Netpage account. Some Netpage applications require knowledge of the user. To be able to access those applications via a Netpage pointer or scanner built into a mobile device, a link between the mobile device and a Netpage user is established. To do this there is a configuration and activation step, similar to a SIM card activation where the Netpage sub-systems on the mobile device are configured and a mapping is setup between the user identity for the mobile device and a Netpage user. If the Netpage account is being established for the first time then, as with a mobile carrier, the user identifies themselves so that the Netpage network operator is able to bill the user for any Netpage related costs incurred.

There are times where a mobile user's identity cannot be determined via a mobile carrier: possibly a company does not want to or cannot get the information from a carrier; the mobile device may be connecting to the network without a carrier being involved; or the carrier may not have the information required, eg. anonymous pre-paid accounts. In these situations the functionality available to the user can be reduced to functionality that does not require knowledge of the user's identity or additional Netpage specific information can be used to establish the user's identity to the satisfaction of the Netpage system.

Netpage-specific user identity information is stored on the device during the Netpage registration/activation process. To give the same level of user identity portability as a SIM card the information can be stored on the SIM card, if it is present. If that is not possible, due to a mobile carrier denying access to it or it not being present, it can be stored in a secure store within the device and if that is not possible, on the normal file system of the device. If the identity information is stored on the SIM card, it can automatically move with the user's carrier identity when they swap SIM cards.

6. Use Cases 6.1 M-Print Blanks

The M-Print printer 4 is able to print on special M-Print blanks that are specially designed to provide optimal print quality in a M-Print printer 4. The blanks are purchased by a user in packs and loaded one-by-one into the printer when a print is being made.

To ensure valid blanks are loaded into the printer 4, a mechanism for validating the supplied blanks and rejecting imitations can be supplied. This can be done by reading an ID from the blank during printing and validating that ID either locally or via a network service.

The blanks are pre-tagged. For Netpage to be able to correctly register a printout an ImpressionID is determined from the pre-tagged blank when the printout is printed. This implies the M-Print printer is able to read the ImpressionID from the blank.

Both cases can use the ID encoded on the blank. The proposed scheme for validating the ID involves reading a second number from the blank called the signature. The signature and ID can then be validated as a pair. The proposed mechanism for this is to consult a network based service that securely stores the ID and signature pairs that have been manufactured.

Both the ID and the signature are readable by the printer 4 and in the Netpage case by a Netpage pointer 533. The M-Print printer 4 does not contain a Netpage pointer 533, but it includes a bar code reader. This means the ID and the signature are provided on the back of the blank as a linear bar code, most likely in IR ink, for the printer 4 and on the front of the blank encoded in the Netpage tag encoding for the Netpage pointer 533.

In some circumstances, validation of the ID may not be possible in real time before the printout completes. Thus, users are informed if non-genuine blanks are being loaded into the printer and warn the user that loaded non-genuine blanks may decrease the lifetime of the printer's printhead.

While complete validation of the ID may not be possible before printing, coding on the blank can be detected that indicates the orientation of the blank and also the start of the timing codes that allow the printer 4 to detect the speed at which the blank is moving through the printer 4. If these can not be detected the blank may be rejected before printing commences.

6.1.1 Loading a Card

Figure 63:
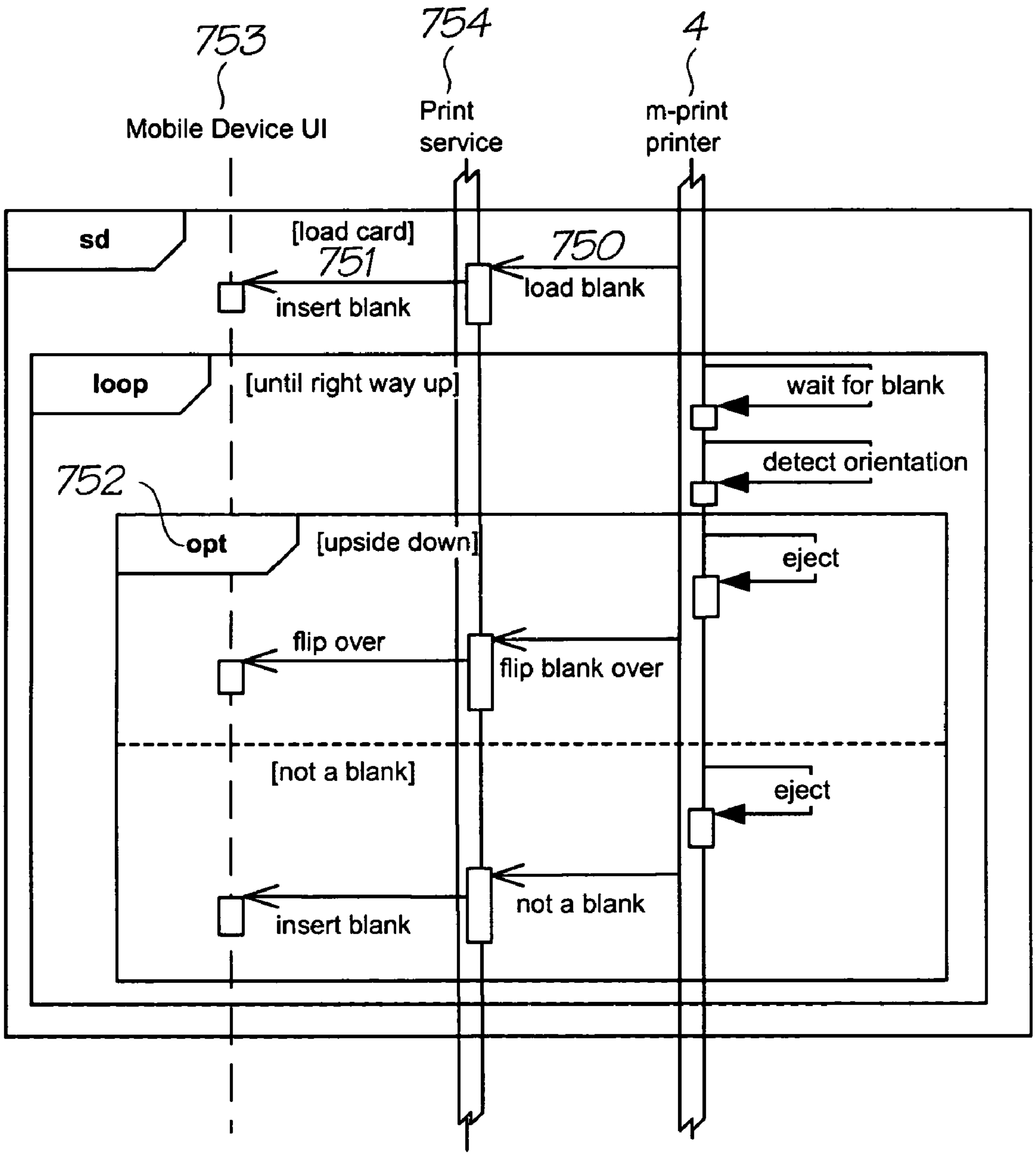
FIG. 63 illustrates an example Load card.

Referring to FIG. 63, a print job has been submitted to the printer 4, before it can commence it must be supplied with a valid blank the right way up.

1. The user is prompted to insert a blank (step 750)
2. The user inserts a blank (step 751)

If the user inserts the paper upside down at option 752, the user is prompted to re-insert the blank the other way. If the loaded paper is uncoded or incorrectly coded, the user is prompted to insert a genuine M-Print blank.

6.1.2 Validate an ID

Figure 64:
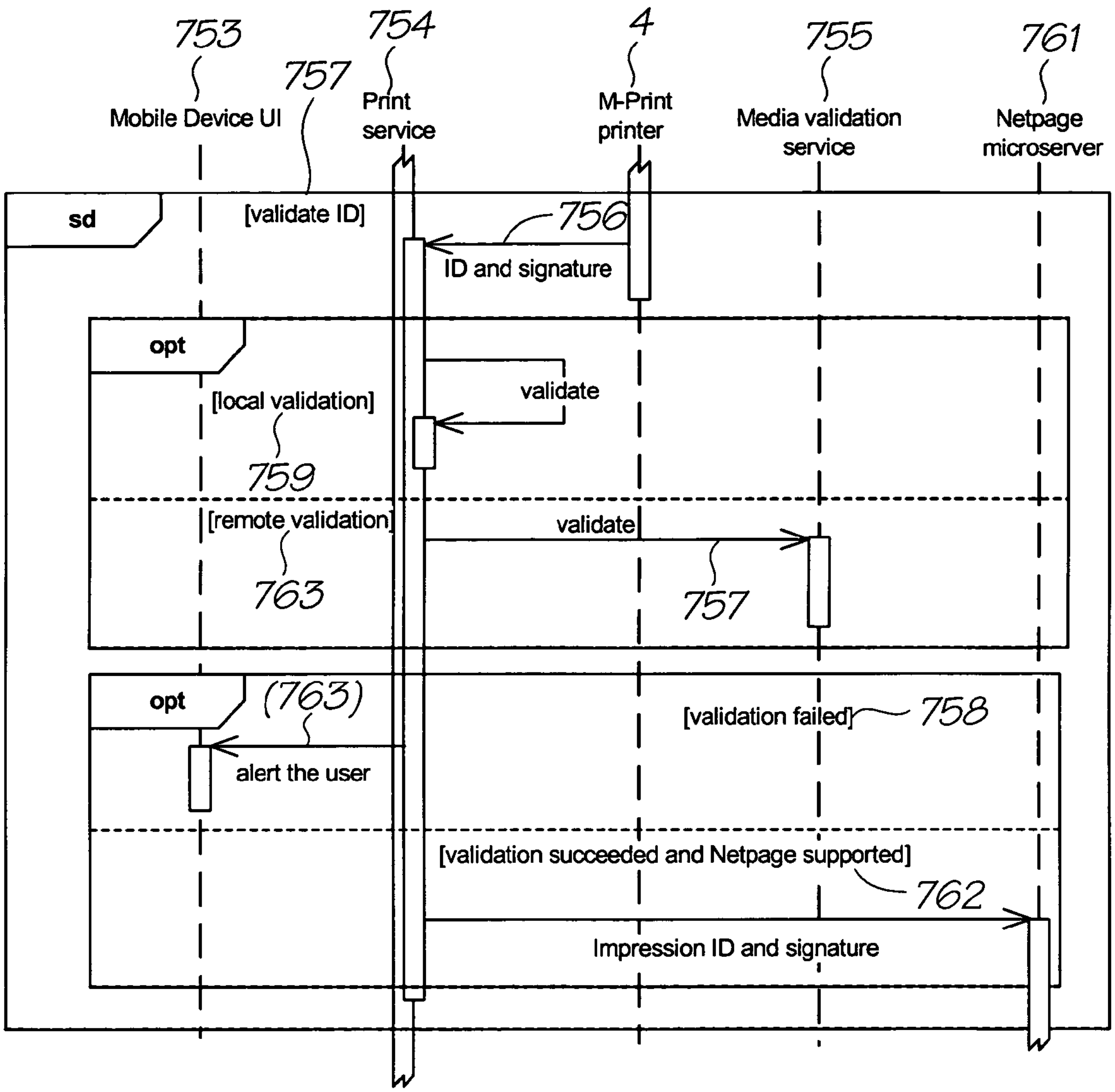
FIG. 64 illustrates an example Validating an ID.

Referring to FIG. 64, during or immediately after printing the printer 4 sends back the ID and possibly the signature of the blank at step 750. In the background the M-Print services on the mobile device validates the ID at step 757, either locally at step 759 or via a network service at step 758, and if the validation fails it informs the user at step 763. There is a timing issue here in that the user may no longer be looking at the mobile device 100 when the result of validation is known, to alert the user that the blank they have printed on is not valid and that using that media shortens the life of the printhead the M-Print service on the device can deliver the message as a local SMS causing the device to alert the user of a new message.

Once the ID and signature have been validated it is passed at step 762 onto a Netpage microserver 761 for processing as the ImpressionID of the printout. The user is alerted that the last print was done on an invalid blank and continuing to use such blanks shortens the life of the printer 4.

6.2 Printing

Common to all the use cases present below is printing. From a users perspective, printing normally has two stages, a third may be added if an error occurs or the blank is invalid:

1. Loading the blank
2. Printing
3. Error reporting

The user view of loading the blank and reporting an invalid blank are covered above. The user's view of printing is both: a progress dialog that allows the user to view the progress of the print and cancel the print; and being able to see the blank move through the printer and emerge from the device.

Cancelling the print stops the printer using any more ink, but the ID and signature from the blank may still be read for validation.

6.2.1 Print

1. The user is prompted to load a card.
2. A print progress dialogue is displayed, with a cancel button
3. The blank is drawn fully through the printer and the print progress dialogue is removed If the user wants to cancel the print job the user presses cancel on the print progress bar which results in the print job stopping and the blank being ejected. If an error occurs such as a paper jam, an error message may be provided to alert the user. The user may then dismiss the dialog of the error message and progress dialogs are removed. If a blank fails validation, the user is alerted of the failure.

Figure 65:
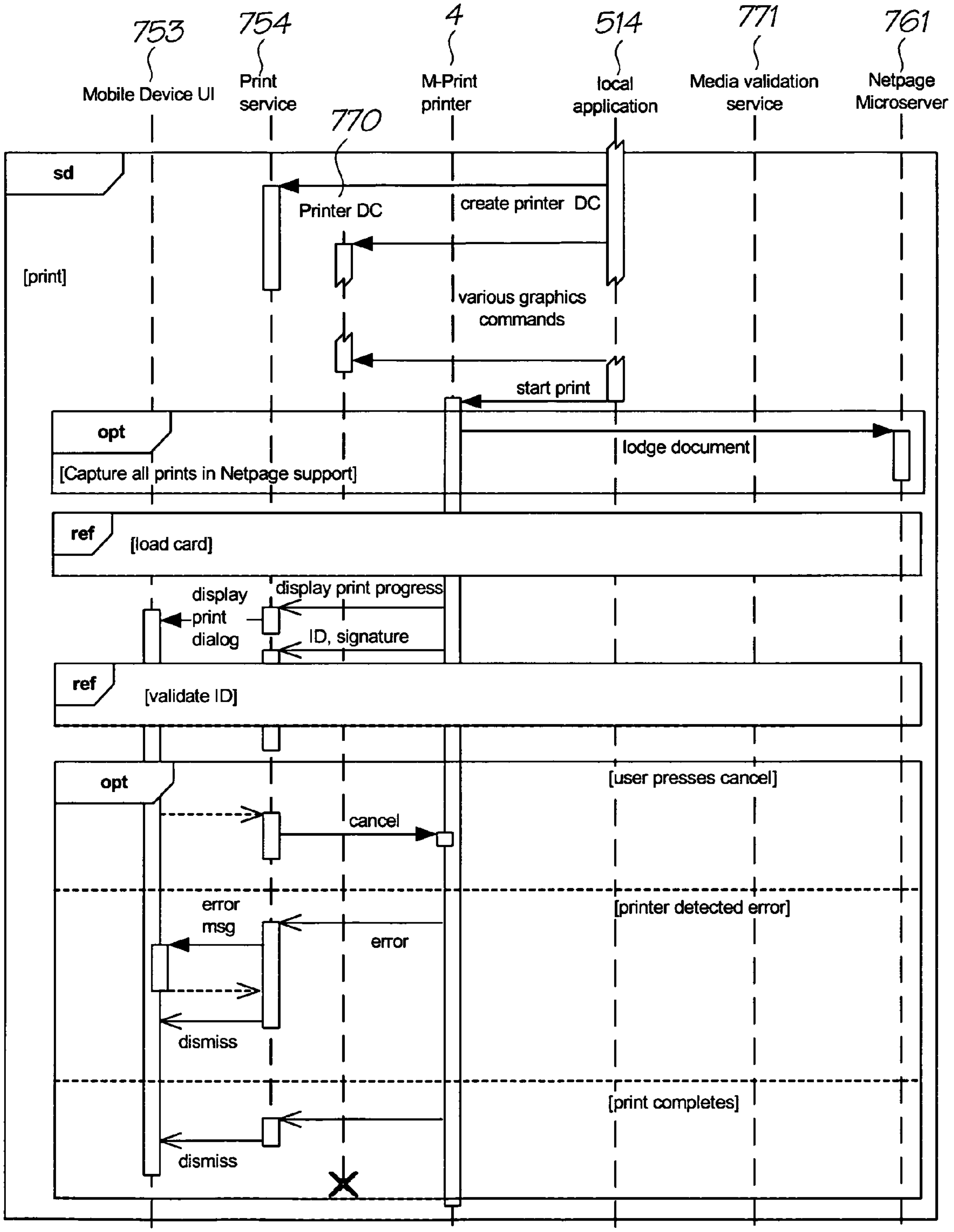
FIG. 65 illustrates an example High level printing sequence.

FIG. 65 shows a Printer DC 770 as the object that exposes the graphics model used by applications 514 to build up the printed image. It shows the printing following after the application 514 has completed drawing the page. On some systems these operations may overlap or the application 514 may be requested to draw the page multiple times with different clipping regions, eg. rendering in bands, either way the logical flow should still be the same. If capturing all printed documents as Netpage documents is supported then fully composed page is lodged with the Microserver 761, the Microserver 761 treats this a document lodgement, and records a printout for that document, when the ID and signature are successfully validated and passed onto the microserver 761.

FIG. 65 shows the ID and signature being passed out from the printer 4 soon after printing has commenced, the timing of the transmission of the ID and signature is not significant for the user since they only know about it if the validation fails which occurs after the print has completed. For Netpage enabled printouts, this timing is more critical, since a situation can occur where a printout is immediately handed to another user who clicks on it with a Netpage pointer or pen 733 and expects a result. Where the printing device does not have network connectivity this may not work at all. If the printing device does have network connectivity it still might not work, or at least have a perceivable latency, while the network validation and the ID and registration of the printout is completed.

6.3 Uploading and Downloading Data

Moving data on and off mobile devices via the wireless network reliably presents a number of challenges:

1. Wireless networks are inherently unreliable and the link can be lost at any point. This can occur due to signal loss or the mobile device having to disable the radio link to conserver power or to allow another power hungry activity to start up, eg. printing.
2. The bandwidth available on the existing 2.5G networks is limited and it could take up to several minutes to transmit a high resolution photo on or off the device
3. The cost of transferring data over a mobile network can vary and it may be significantly cheaper to delay the transfer to a non-peak time, e.g. late at night.
4. Mobile carriers might prefer non-urgent data transfers to happen during lulls in the network traffic.
5. It may be cost effective to support different means of transferring data. A HTTP Put over GPRS is the most obvious way, but it may be possible to take advantage of carrier price subsidies and send the same data via an MMS or SMS message.

Figure 66:
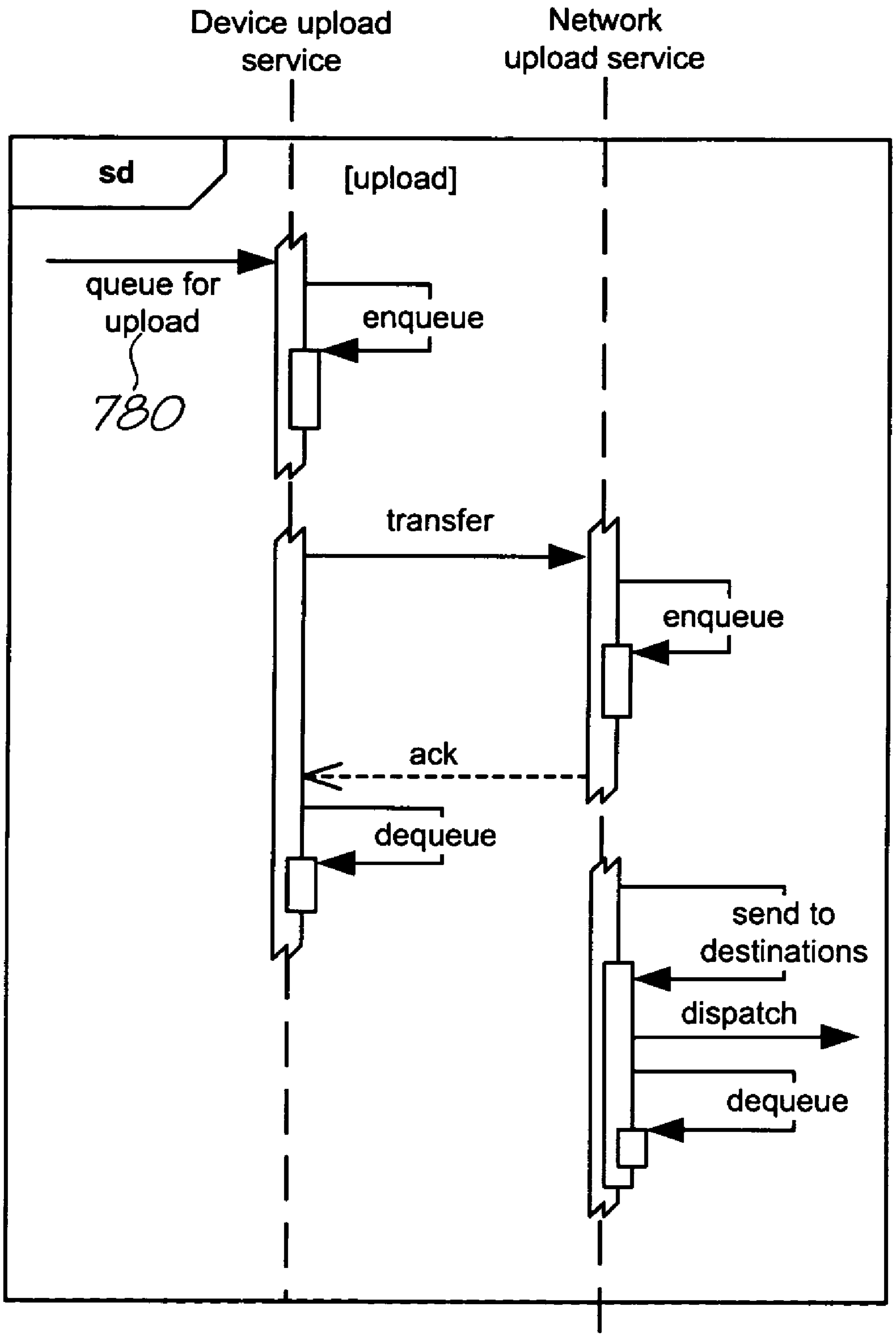
FIG. 66 illustrates an example High level sequence diagram for uploading from a mobile device.
Figure 67:
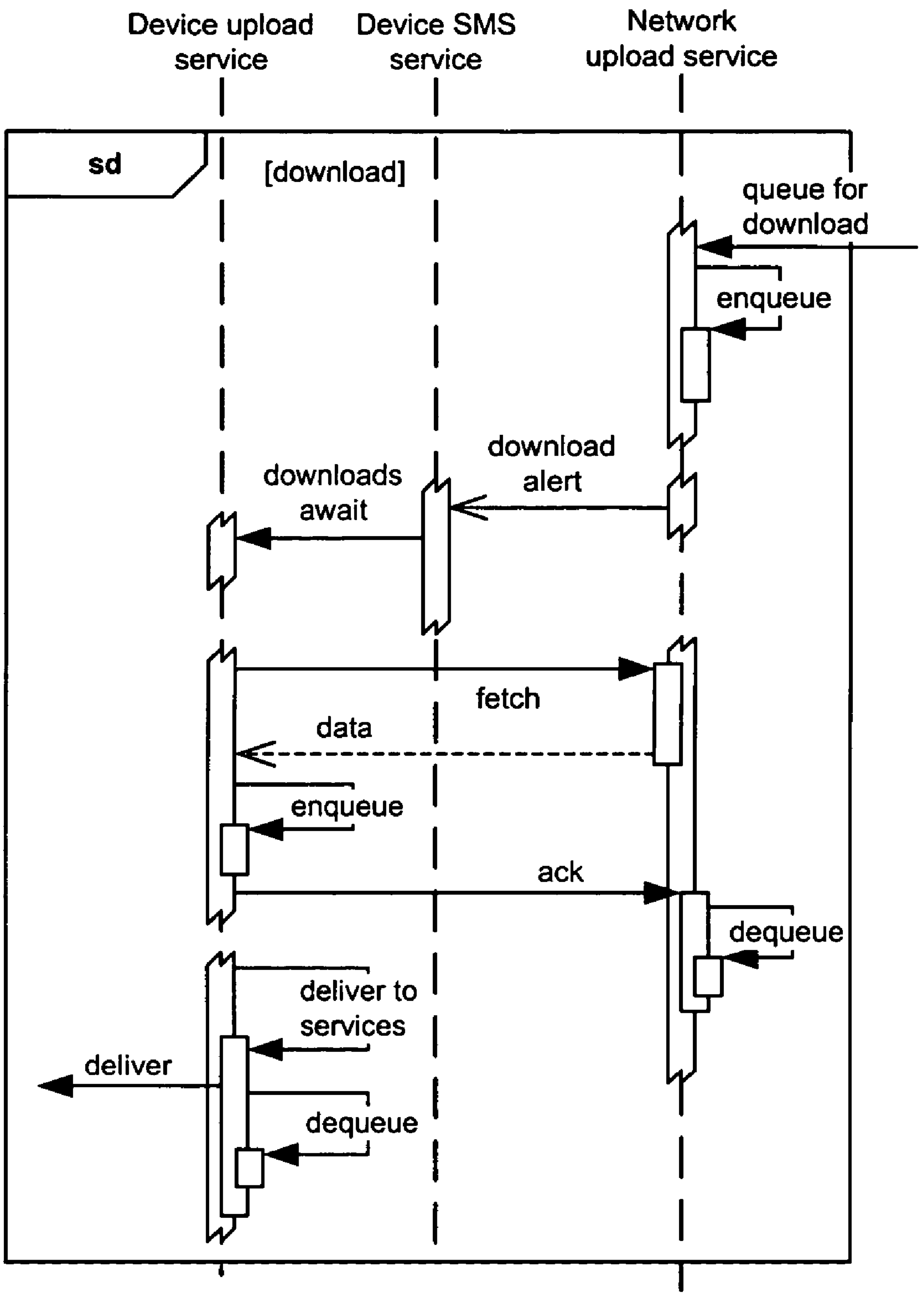
FIG. 67 illustrates an example High level sequence diagram for downloading to a mobile device, using a SMS alert to trigger the download.

Referring to FIGS. 66 and 67, to provide flexibility in how data uploading and downloading is achieved and to insulate the rest of the architecture from it, each mobile device 100 has a service responsible for delivering and receiving data from the network. It queues data transfer requests 780 and guarantees delivery of the data in the an efficient manner. It supports partial transfers and resumption of transfers after a break in the data link to minimise the data sent over a wireless network. An equivalent service can be located in the network to both receive data from the mobile device and forward it on to its destinations and also to queue data being sent to the mobile device.

The network based component of this service provides a carrier integration point. A carrier may choose to host this service and bill the traffic for it differently to encourage usage of the M-Print and Netpage services. It also provides a single point of modification to take advantage of new features in the carrier networks, eg. a new data push model not based on SMS.

The device based component of this service provides a simple interface to the device based M-Print and Netpage services, while providing the ability to exploit all the features of a mobile device 100 to access network based services. This may include taking advantage of WLAN connectivity where possible.

The download sequence shown in FIG. 67 illustrates how "data push" to a mobile device can be achieved which cannot be directly reached from the general internet. It shows a SMS message being sent to the device to inform the download service that there are downloads waiting to be fetched. The message may include some information about the urgency of the downloads, to allow the device side download service to decide when it should fetch the download(s).

6.4 Netpage Pointer/Scanner

In the printing scenario a blank's ID is read during printing. This ID is used to both facilitate validation of the blank as a valid M-Print blank and also as an Impression ID for Netpage. The Impression ID is used by the Netpage server 529 to associate the M-Print printout with the document that was printed onto the blank.

An M-Print blank has the ID encoded on the back of the blank in a way that is readable by the paper feed mechanism. If the blank has been pre-tagged with Netpage tags then the ID is also embedded in the Netpage tags. To initiate a Netpage interaction the first step is for the user to perform an action that retrieves the ID and supplies it to a Netpage server. The ID can be retrieved by:

1. A stroke or click with a Netpage Pen;
2. A click with a Netpage Pointer;
3. Scanning the ID on the back of the card.

The first two of these actions use Netpage specific devices to read the Netpage tags. The pen 533 provides a stream of digital ink along with the ID and the pointer provides a position on the printout along with the ID. The last uses a scanning mechanism to read the ID from the back of the printout. It can be the same scanner as is used in the M-Print printer paper feed mechanism or it can be a dedicated scanner that the printout is feed into or passed over, similar to a bar code reader. This mechanism only provides the ID, it does not provide any positional information, but Netpage applications can be authored to support a "scan" of the printout as well as a click or a stroke on the printout.

6.4.1 Activate a Netpage Application via a Scan

The user passes an existing M-Print printout back through their M-Print printer to activate the associated Netpage application.

The printout is drawn through the printer and a Netpage application is launched. If there is no Netpage application for the printout, the user is told the printout has no associated application. If the printout fails validation, the user is alerted of the failure.

The effect the user sees as a result of a Netpage application being launched varies depending on the application, some examples are:

For a photo the use may see the photo displayed on the screen with the option to reprint it or send to someone.

For a business card the user may receive a vCard on their mobile device which can be processed in the normal way.

For a coupon a completed SMS/MMS/email may be displayed asking the user if they wish to send it off to enter the competition.

Any printout may be displayed on the mobile device showing the print image and allowing the user to navigate the hyperlinks and fields in the printout and activate them. If the device has a touch screen, the user can use a pointer to select fields and generate digital ink.

Figure 68:
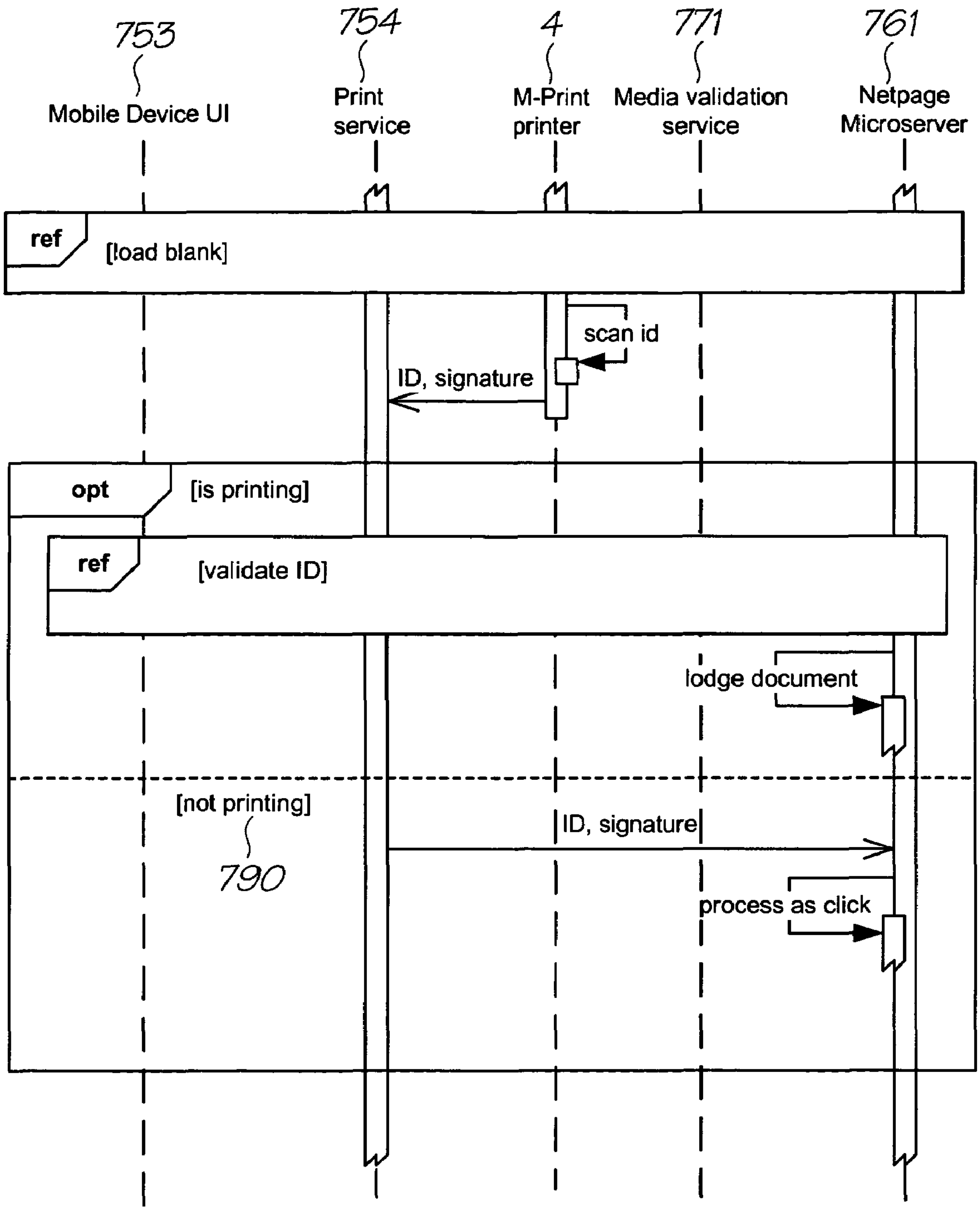
FIG. 68 illustrates an example Sequence fragment showing the processing of scanned ID.

FIG. 68 is a sequence fragment that shows the processing of a scanned ID from the paper feed mechanism in the printer. If a scanned ID and signature is returned to the Print Service while it is printing, see FIG. 65, it is validated and then passed onto the Netpage Microserver 761 triggering the submission of the Netpage document. The validation is performed by the Print Service 754 in this case to ensure the user can be warned about using invalid media as early as possible. If the Printer Service receives a scanned ID and signature while it is not printing at step 790 then it passes it directly to the Netpage Microserver 761 as a pseudo-click or scan. The Microserver 761 processes it in a similar way to the way it processes a Netpage pointer click.

7. Applications 7.1 Photo Printing

Photo printing is a major application for M-Print. In its simplest form, photo printing can be done completely locally, without any dependence on network services or interactions. Printing a photo can interact with a photo archive. If a photo is printed then it is likely the user may wish to access or print the photo again. When a photo is printed it can be pushed out to the photo archive making it available for on-line retrieval or access. Netpage functionality offers a convenient and natural way of interacting with a printed photo. A Netpage enabled photo can act as a permission token, giving the holder of the printout permission to retrieve and reprint the photo from the archive. Photo archiving from mobile devices is an independent application from photo printing. Users typically take more photos that they wish to keep in an archive than they wish to print.

7.1.1 Local Photo Printing

Figure 69:
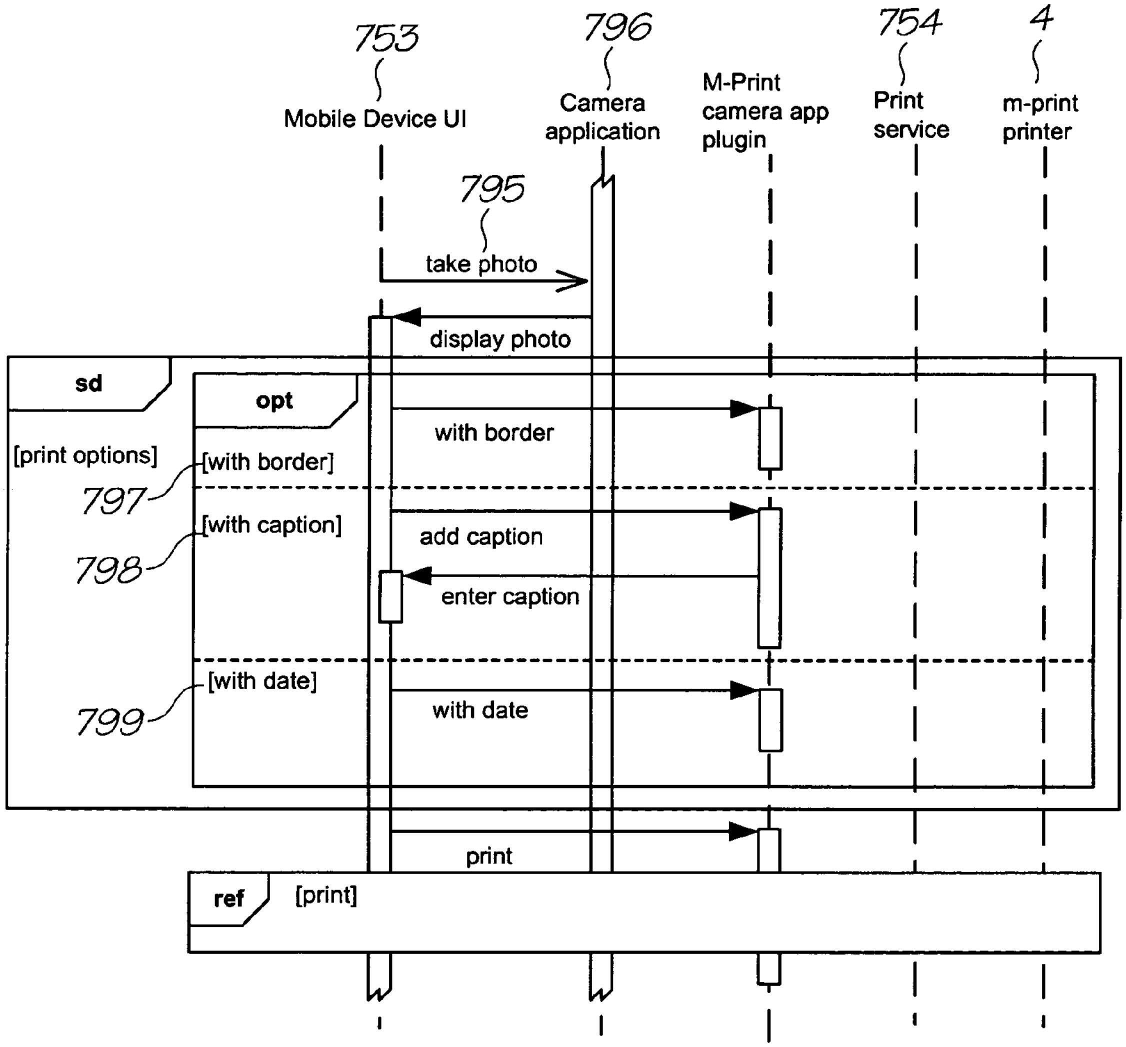
FIG. 69 illustrates an example Local Photo Printing Sequence.

Referring to FIG. 69, a camera phone user takes a photo at step 795 and elects to print it.

1. The user uses the default photo application 796 on their device and takes a photo at step 795
2. The user selects print from the applications menu
3. The user is prompted to load a blank
4. The print is produced Other options include:

The user prints with a border at step 797 by selecting print options from the menu before printing and selects to print with a border, and the user can then select print from the applications menu.

The user requests the date is printed with the photo at step 798 by selecting print options from the menu and selecting the print date and time option, and the user can then select print from the applications menu.

Figure 70:
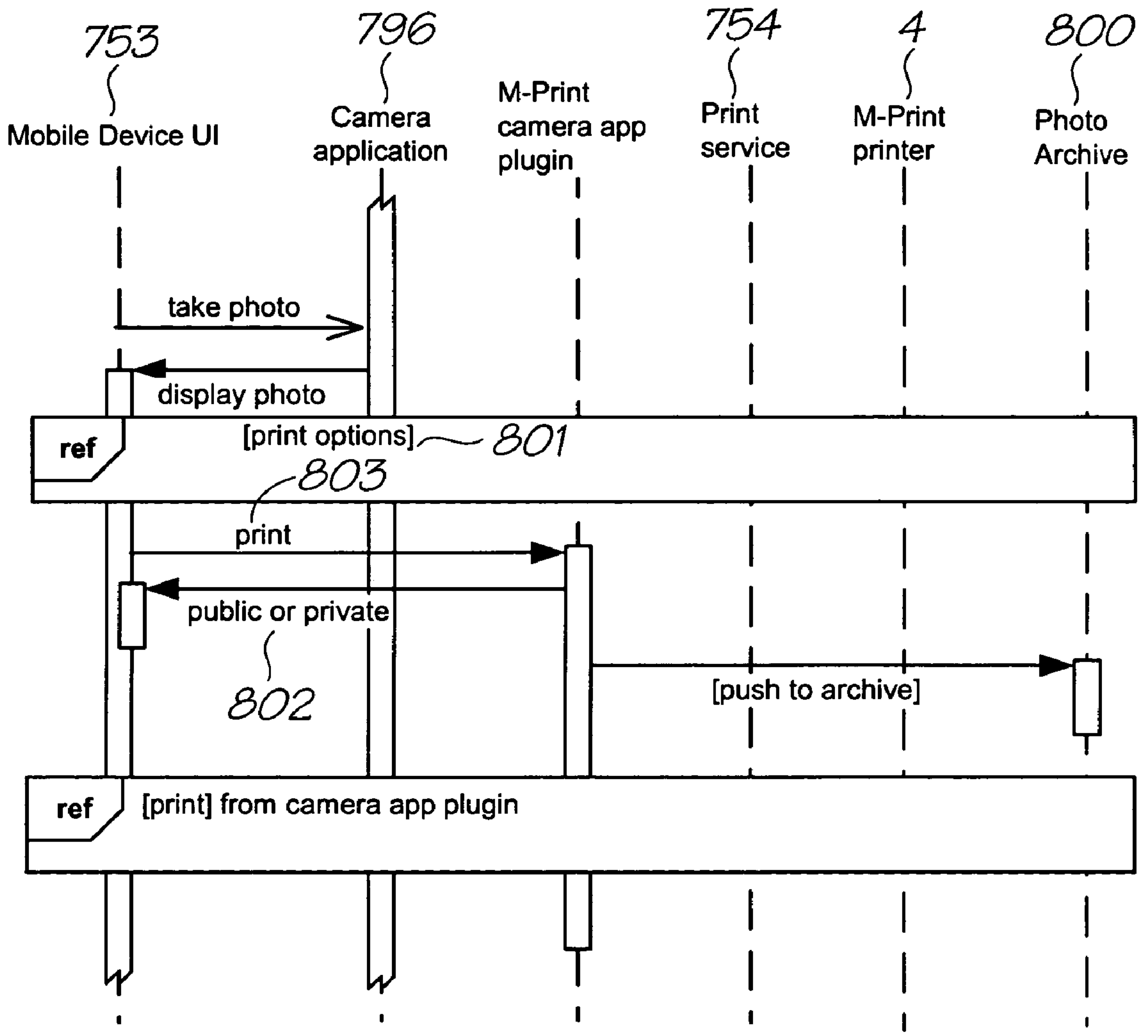
FIG. 70 illustrates an example Printing Uploads to a Photo Archive.

The user adds a caption at step 799 where the user selects photo options from the menu and selects add caption, wherein the user is prompted to enter a caption and the user selects print from the applications menu. 7.1.2 Printing a Photo Archives the Photo Referring to FIG. 70, printing a photo generally implies that the photo has more worth to the user than the photos the user has taken and not printed, it is more likely to be shared and hence more likely to be referred to in an archive. This scenario describes pushing a photo that is printed to the photo archive on the mobile device 100 to give it priority in being transferred off the device 100 and into the archive 800.

When the photo is pushed to the archive the user is given the opportunity to specify what access permission's should be applied to the photo at step 801 in the archive 800. In this scenario it is kept to public or private 802 for simplicity, but it could easily be a more complex selection from various ACLs (Access Control Lists) maintained by the user.

1. The user uses the default photo application 796 on their device 100 and takes a photo.
2. The user may set some print options 801
3. The user selects print from the applications menu 803
4. The user is prompted whether the photo should be public or private in the archive 802
5. The user is prompted to load a blank
6. The print is produced.

Optionally, default settings may be applied for archiving the images where the user may not be prompted if the default settings indicate whether all photos should be public or private.

This sequence diagram shows the most likely case, where uploading the photo to the archive occurs after printing has finished. This is the most likely case, since power demands of printing require the network connectivity section of the phone to be powered down, or at least avoided. Some devices may be able to support both, in which case the upload could occur during the print. The photo archive is accessible from both a browser on a mobile device 100 or a desktop browser. The user is able to print a photo from the archive to either a desktop printer or the printer in their mobile device.

7.1.3 Printing Archives a Netpage Enabled Photo

In this use case the user interactions are the same as for "Printing a Photo Archives the Photo", but in the background, the document, the printout, and the impression ID are registered with the Netpage infrastructure. The printout can be interacted with via a Netpage pointer 533 immediately on the device it was printed on, but it is not be active for other pointers or pens until it has been successfully uploaded to the network based Netpage services.

Figure 71:
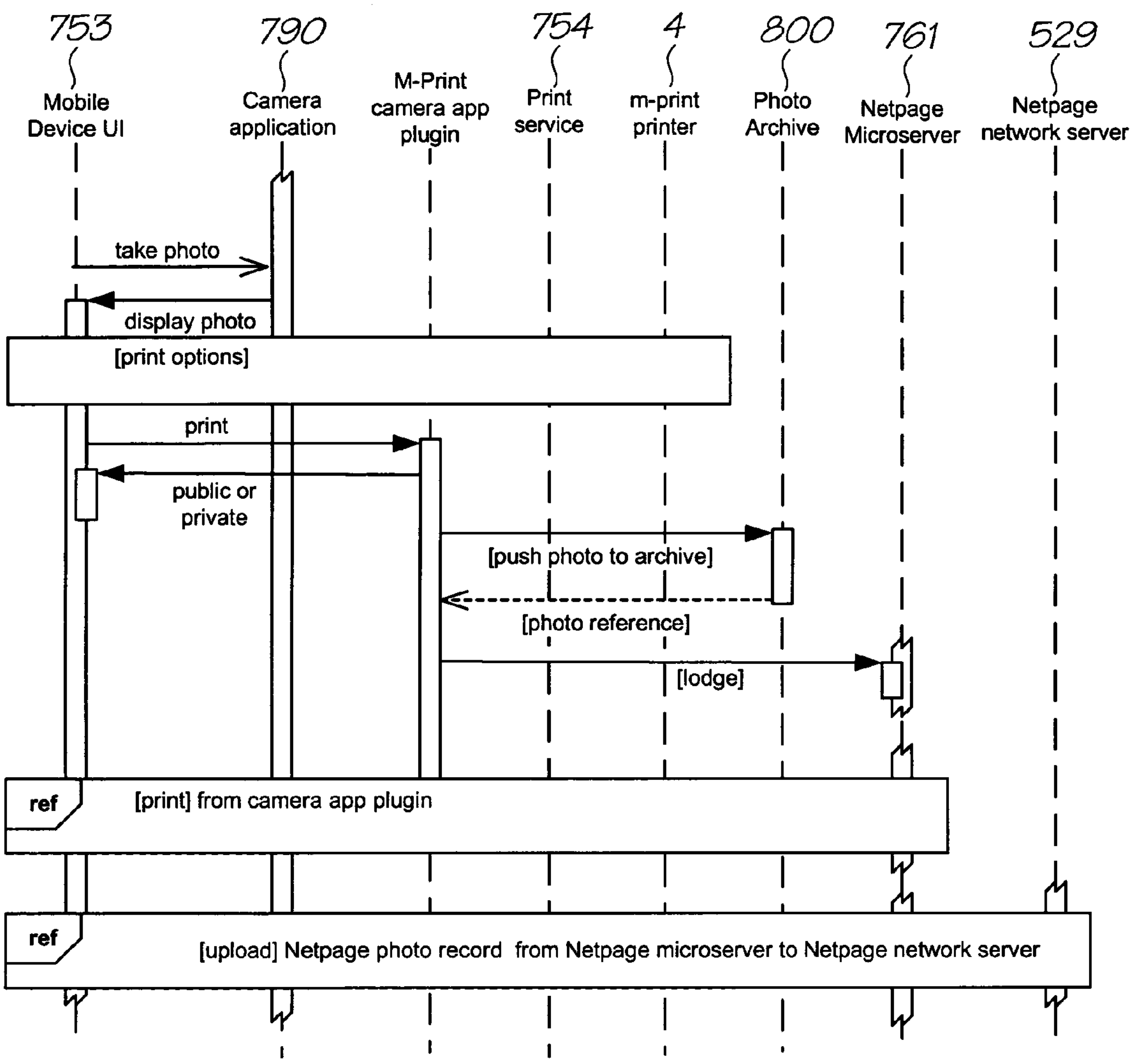
FIG. 71 illustrates an example Capturing a Netpage document via printing.

Referring to FIG. 71, for Netpage enabled photos that already are being archived in a general purpose photo archive it is not desirable for the Netpage server 529 to also store the photo, so the Netpage server 529 stores a reference to the photo in the archive 800, allowing it to be retrieved when necessary. The Netpage server 529 still tracks user interactions with the photo: reprints, digital ink, etc but it generally does not store the actual image itself. When the photo is pushed to the archive the pusher receives-a reference to the photo that can be used to retrieve the photo when it is required.

The need to move the photo and the Netpage document associations out into the network to enable general Netpage interactive on the printed photo, gives the pushing of the photo to the photo archive more importance. In this case the push to the archive includes a flag indicating the photo should be moved to the off device archive as soon as possible. The registering of a printout with the Netpage services can not complete until the blank has been validated since the ID is used as the Netpage impression ID.

In this case the photo reference rather than the photo is lodged with the Netpage microserver. The printout can be interacted with via a Netpage pointer on the same device after the ID and signature have been validated, but other pointers and pens can only interact with the document after it has been successfully uploaded to the Netpage network server.

8. Player Use Cases 8.1 Business Card Application

Figure 72:
FIG. 72 illustrates an example Business Card.

This section covers the Netpage Player PlayRequests 521 used in the interactive Netpage Business Card and describes the behaviour of the Player Agents 537 handling such objects and commands. FIG. 72 shows the sample business card 810. The fields (text 811 and images 812) are generally associated with PlayRequests 521 that (partially) specify what action is required when a user clicks on one of the fields with a Netpage pointer 533.

8.1.1 Phone Number

Figure 73:
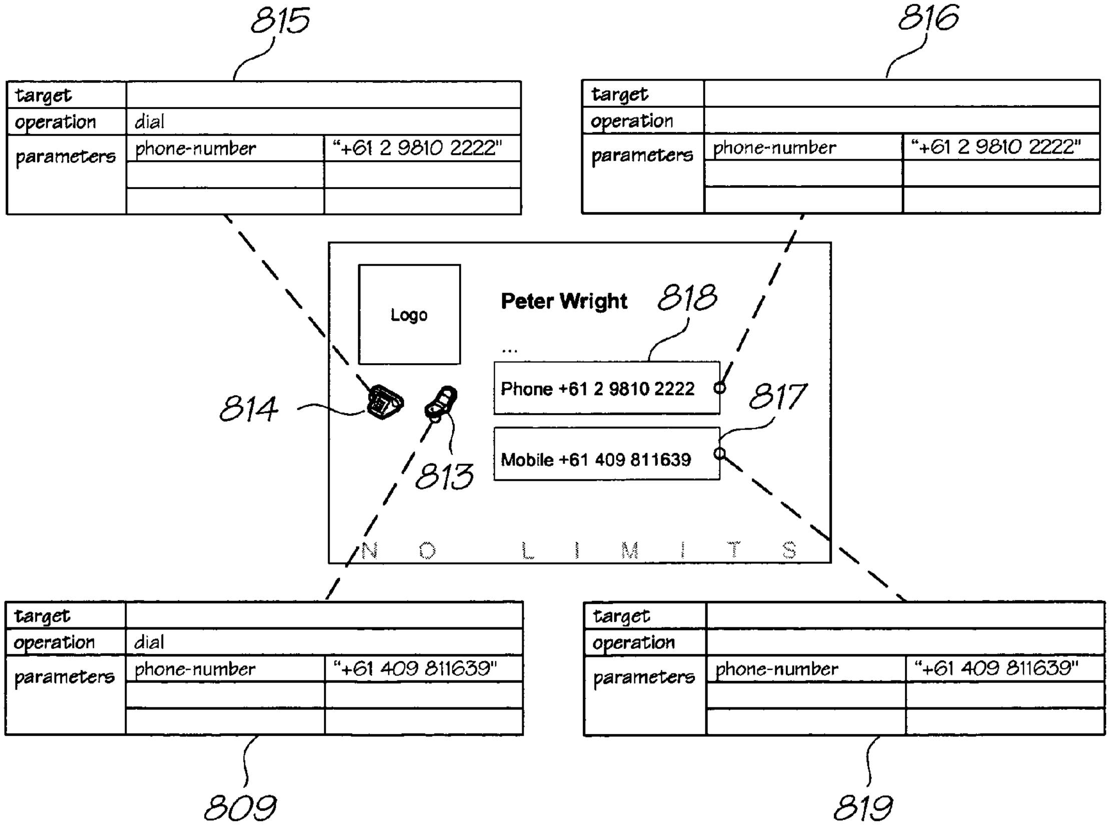
FIG. 73 illustrates example Business Card Phone Number Fields.

Referring to FIG. 73, the phone number fields 817, 818 on the business card 810 are associated with PlayRequests 816, 819 that simply specify a phone number, without specifying the operation to be performed or the target of the operation. The author of the business card 810 is thus providing maximum freedom to the receiver of the business card 810 to make use of the phone number fields as they see fit. For example, one user may have their system configured to react to such PlayRequests 816, 819 by having their mobile phone dial the specified number, while another user may prefer to have such PlayRequests 816, 819 simply pushed to the Netpage Clipboard 615 for later use.

The mobile phone icon 813 is configured with a more fully specified PlayRequest 809 than the phone number fields 817, 818. The PlayRequest 809 specifies an operation ("dial") that should be performed when that field is selected. The operation overrides the default handling of phone-number values that might otherwise be performed in the absence of an explicit operation. Note that the target of the request is still left unspecified. This gives the routing system the freedom to determine the most appropriate device with which to make the call. This is especially appropriate for a business card 810 which might be handed out to hundreds of users who each typically have their own phone. Placing a specific target in the PlayRequest would have been possible, although inappropriate in this case. The landline telephone icon 813 is configured similarly to the mobile phone icon, but with a different value for the phone number.

8.1.2 Fax Number

Figure 74:
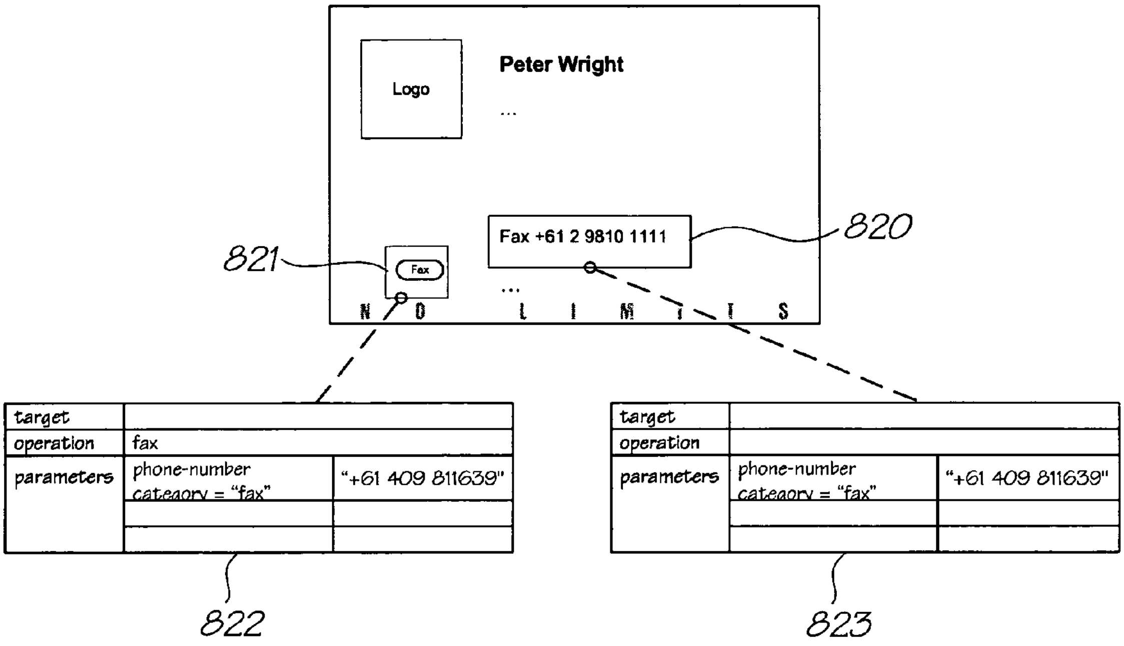
FIG. 74 illustrates an example Business Card Fax Field.

Referring to FIG. 74, the Fax phone number field 820 is configured exactly as for the phone number fields except that the phone number value is now also marked as belonging to the "fax" category 823. This additional information can potentially be used during request routing in order to select targets which specifically cater for "fax" phone numbers rather than targets which simply specify that they cater for phone numbers in general. The "fax" button field 821 specifies an operation ("fax") in the PlayRequest 822. The exact semantics of that operation are target dependant. For example, on a mobile phone, the Fax Agent might launch the Fax editor with the destination fax number pre-configured.

8.1.3 Web Address

Figure 75:
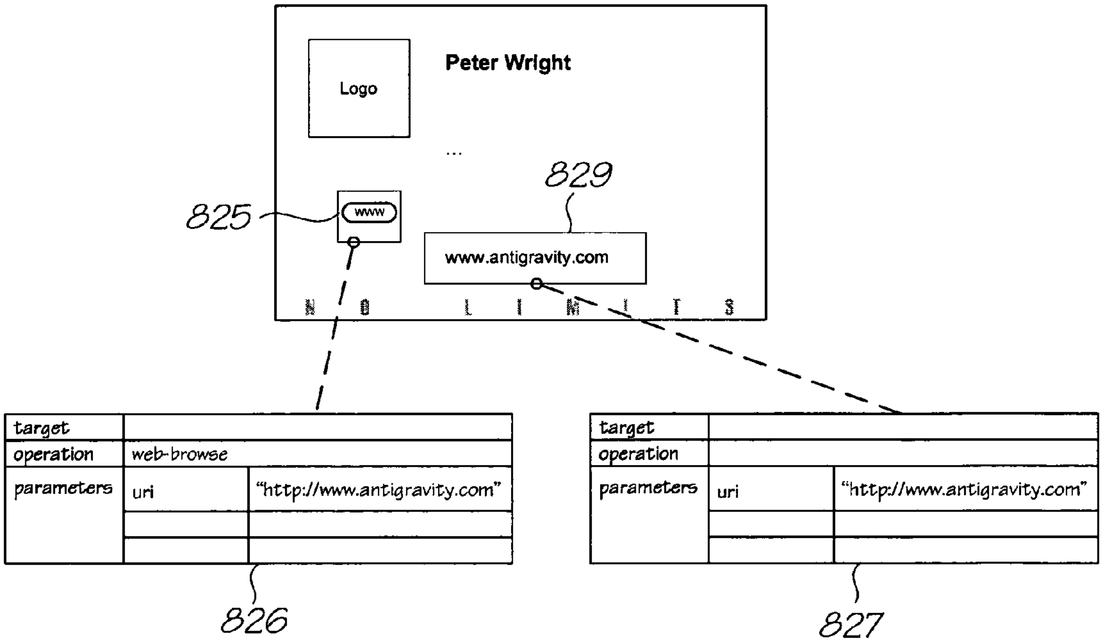
FIG. 75 illustrates an example Business Card Web URL Field.

Referring to FIG. 75, the web URL field 824 and "WWW" icon 825 are configured similarly to the phone number field and phone icons. The icon 825 is specifically configured to cause a web browser to be invoked 826 on the specified URL, whereas the PlayRequest 827 for the URL field is less fully specified and is therefore more flexible in terms of its possible interpretations.

8.1.4 SMS and MMS Fields

Figure 76:
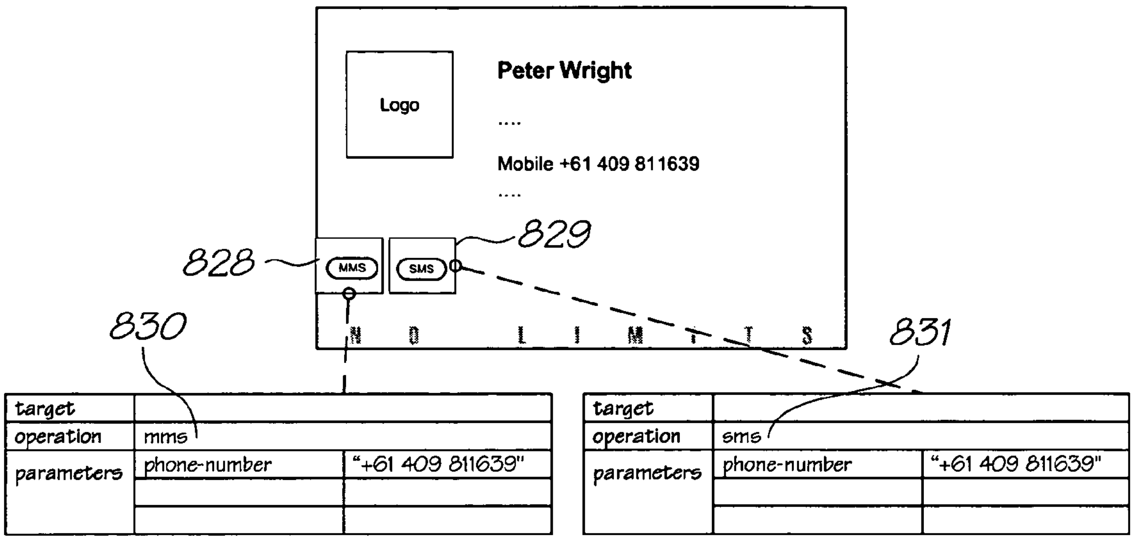
FIG. 76 illustrates example Business Card SMS and MMS Fields.

Referring to FIG. 76, the "SMS" field 829 is configured to invoke an "SMS" operation 831. This request could be routed to an SMS Agent running on the user's mobile phone which would launch the SMS editor with the destination phone number filled in. The "MMS" field 828 is configured similarly to the "SMS" field.

8.1.5 Email Address

Figure 77:
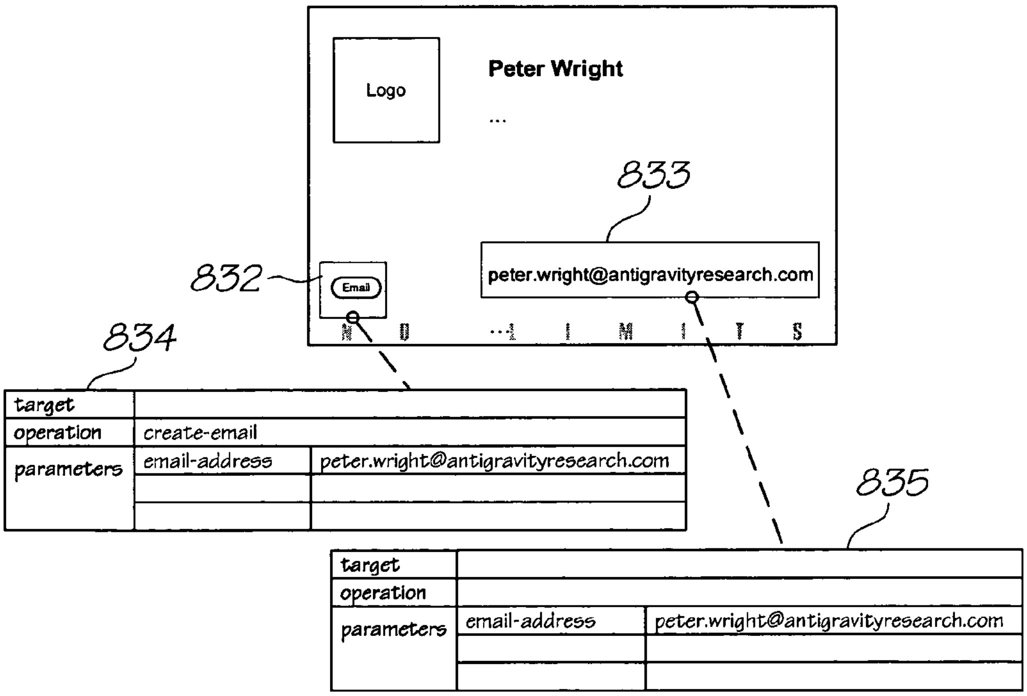
FIG. 77 illustrates an example Business Card Email Field.

Referring to FIG. 77, the web email address field 833 and "Email" icon 832 are configured similarly to the phone number field and phone icons. The icon 832 is specifically configured to perform a "create-email" operation 834, which can typically be handled routing the request to an agent which is capable of launching email tool with the destination email address pre-configured. The email address field 833 is less fully specified and is therefore more flexible in terms of its possible interpretations.

8.1.6 Street Address

Figure 78:
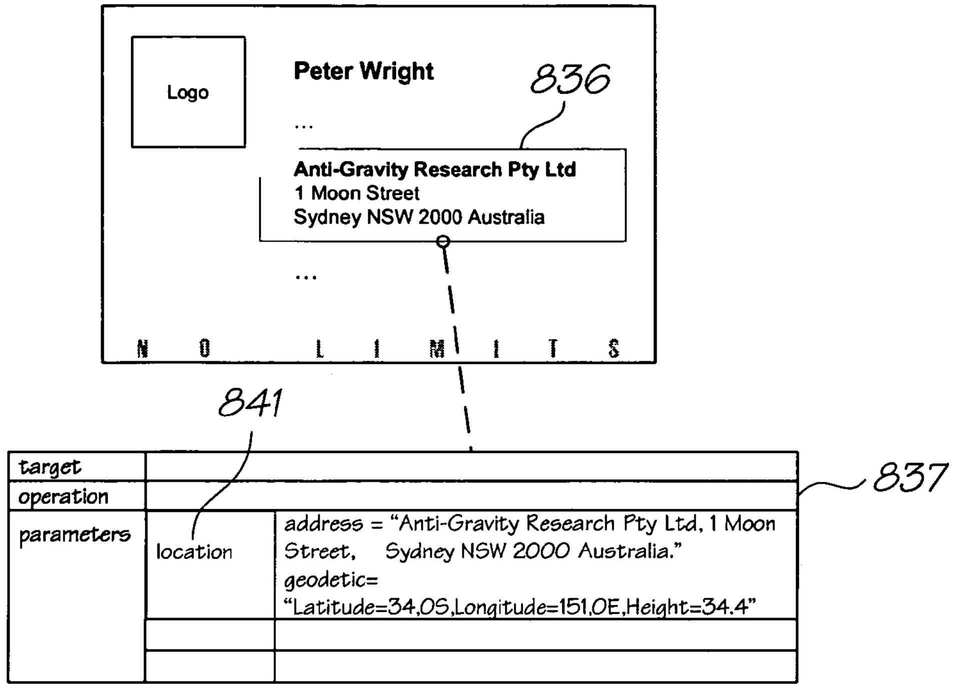
FIG. 78 illustrates an example Street Address Field.

Referring to FIG. 78, the Street Address field 836 is configured to map to a PlayRequest 837 that contains a location value 841 specified using a type of location. The specific details of this type are not specified in this document. The important thing to note is that it stores information that specifies the location in various ways. As such, the value can be handled differently by a large number of agents. Examples might be:

A Web A MP Search Agent which presents the location in a web browser by accessing a web-based map search facility A Print Agent on an m-print phone which prints the location details (and possibly directions) on an m-print card.

A GPS Navigator Agent which displays the location in a handheld GPS device.

8.1.7 Photo

Figure 79:
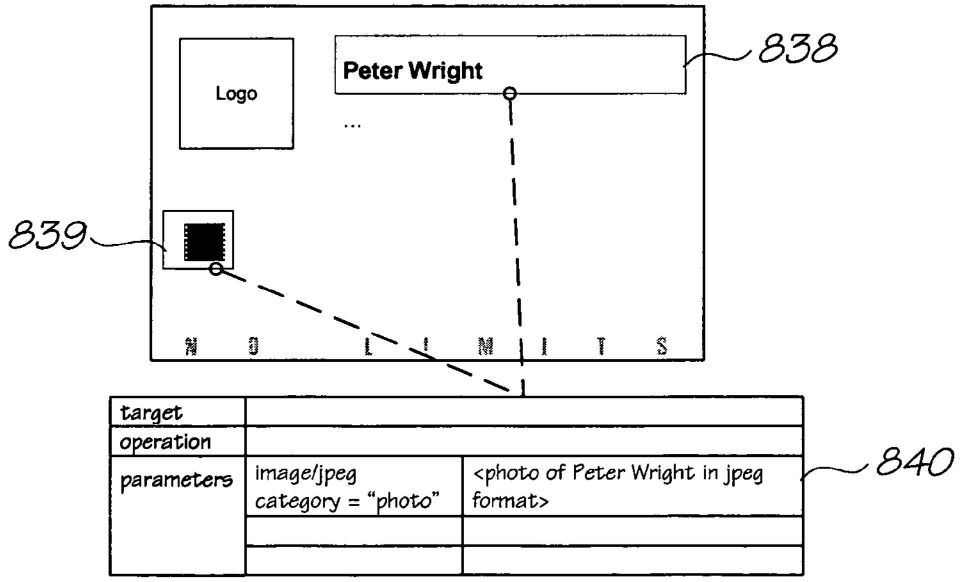
FIG. 79 illustrates an example Business Card Photo and Name Field.

Referring to FIG. 79, the Name field 838 and "Photo" icon 839 are configured to map to a PlayRequest 840 that specifies a jpeg photograph. Typically, this request can be routed to an agent capable of displaying the image.

8.2 Scanning Support

Figure 80:
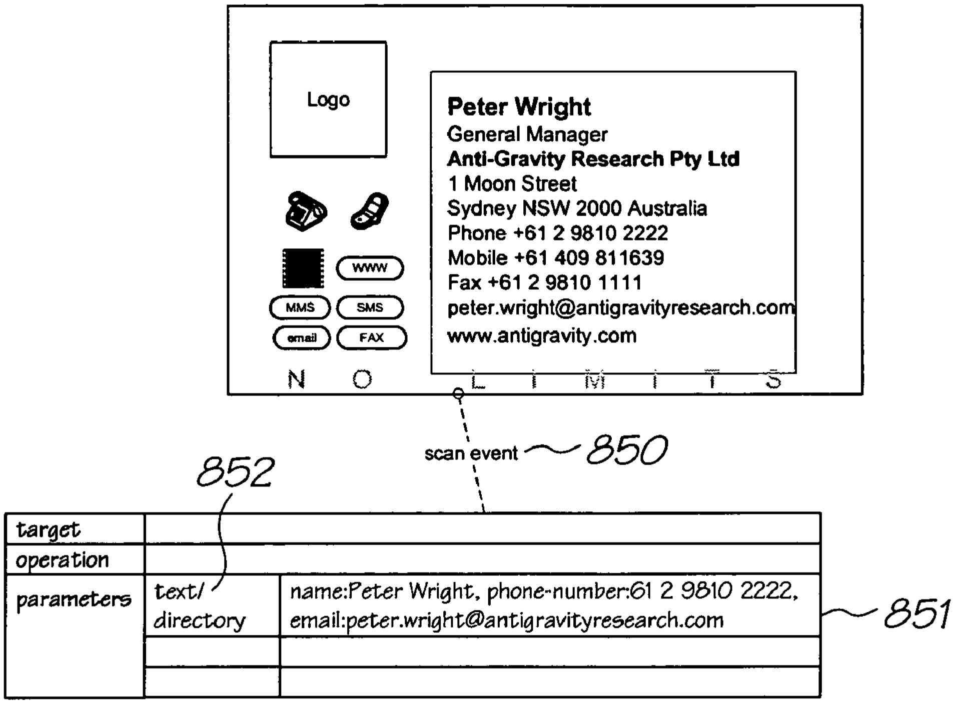
FIG. 80 illustrates an example Business Card Identifier Field.

Referring to FIG. 80, interactive Netpage documents can be authored to specify an action upon reception of a scan event. A scan event simply contains the ID of the printed document without any {x,y} coordinate information. In the m-print context, a scan is achieved by feeding a printed card back through the paper feed mechanism. This enables the m-print device to determine the ID of the card and to transmit a scan-hit to the Netpage Server 529. Upon reception of a scan-hit, the server 529 invokes any scan action that has been registered for the identified printout.

The printed business card 820 can be authored to invoke a PlayRequest 851 in response to a scan event. Typically, such a PlayRequest 851 provides information pertaining to the entire content of the printout. In the case of the business card, the document can be authored to invoke a PlayRequest 851 that contains a text/directory object 852 that specifies most of the details from the card. Such a PlayRequest 851 would typically be routed to a Contacts Application (such as vCard Agent) which would then modify its database to include the details from the business card.

8.2.1 M-Print Photo Cards Including Scan support

Figure 81:
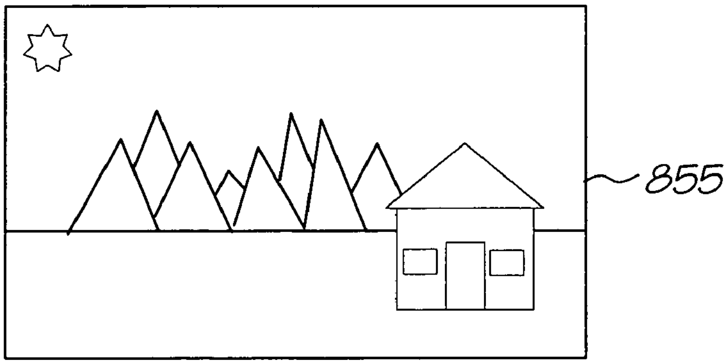
FIG. 81 illustrates an example Printed photo card.
Figure 82:
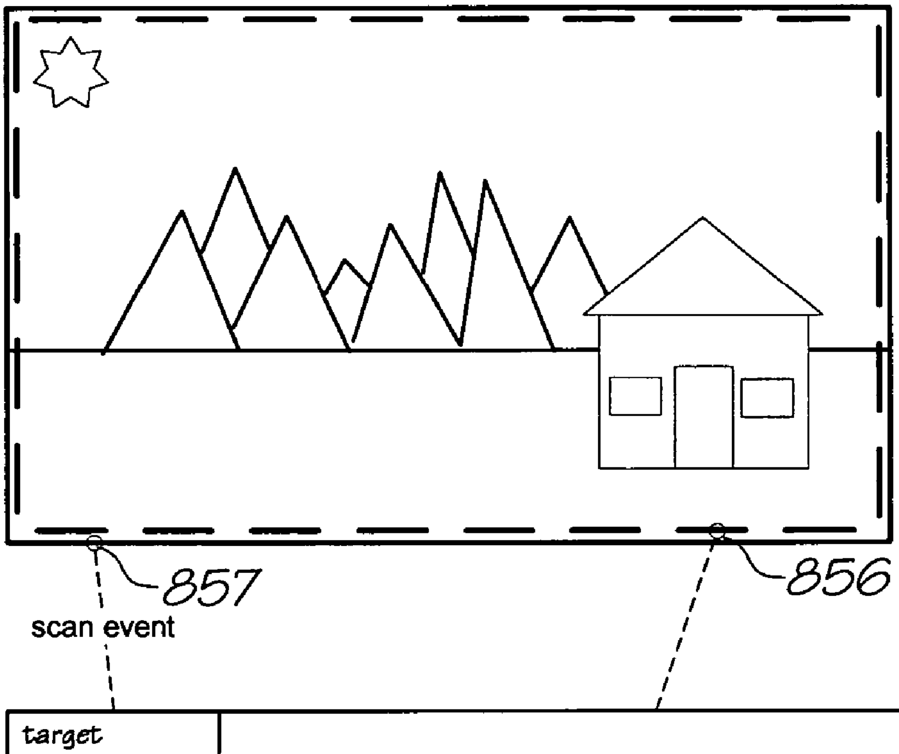
FIG. 82 illustrates example Interactive fields for photo card.

FIG. 81 shows a printed photo card 855. The card 855 can be made to be interactive as shown in FIG. 82. The card 855 contains two fields. The first field is a standard Netpage field 856, while the second is the scan event field 857. Both fields 856, 857 are configured to map to a PlayRequest 858 that contains the contents of the photo in electronic form (in this case as a jpeg image). Typically, this request 858 is routed to an agent capable of displaying the image, although the fact that the request is only partially specified (the target and operation field are empty) gives the request router (and therefore the user) more freedom to interpret the request as appropriate. For example, previous actions by the user may mean that clicking on the photo is interpreted as a request to associate the photo with a particular location on printed Netpage document.

8.3 Printout Interactivity on the Mobile Device GUI

When a scan of an M-Print printout is performed on a mobile device 100 the action taken can vary. One possible action is to display the printout on the mobile device's GUI with the hyperlinks and form fields active so that a user can navigate between them and fill them in or activate them, in the same way a Netpage user can on a printout using a Netpage pen or pointer.

If the mobile device has a touch screen and a stylus then it is possible to support all the interactions that a user with a Netpage pen could have with the printout. If the mobile device doesn't support a touch screen and stylus then it is possible to tab through the hyperlinks and submit fields on the form and activate them in the same way that a user with Netpage pointer and a printout could.

Figure 83:
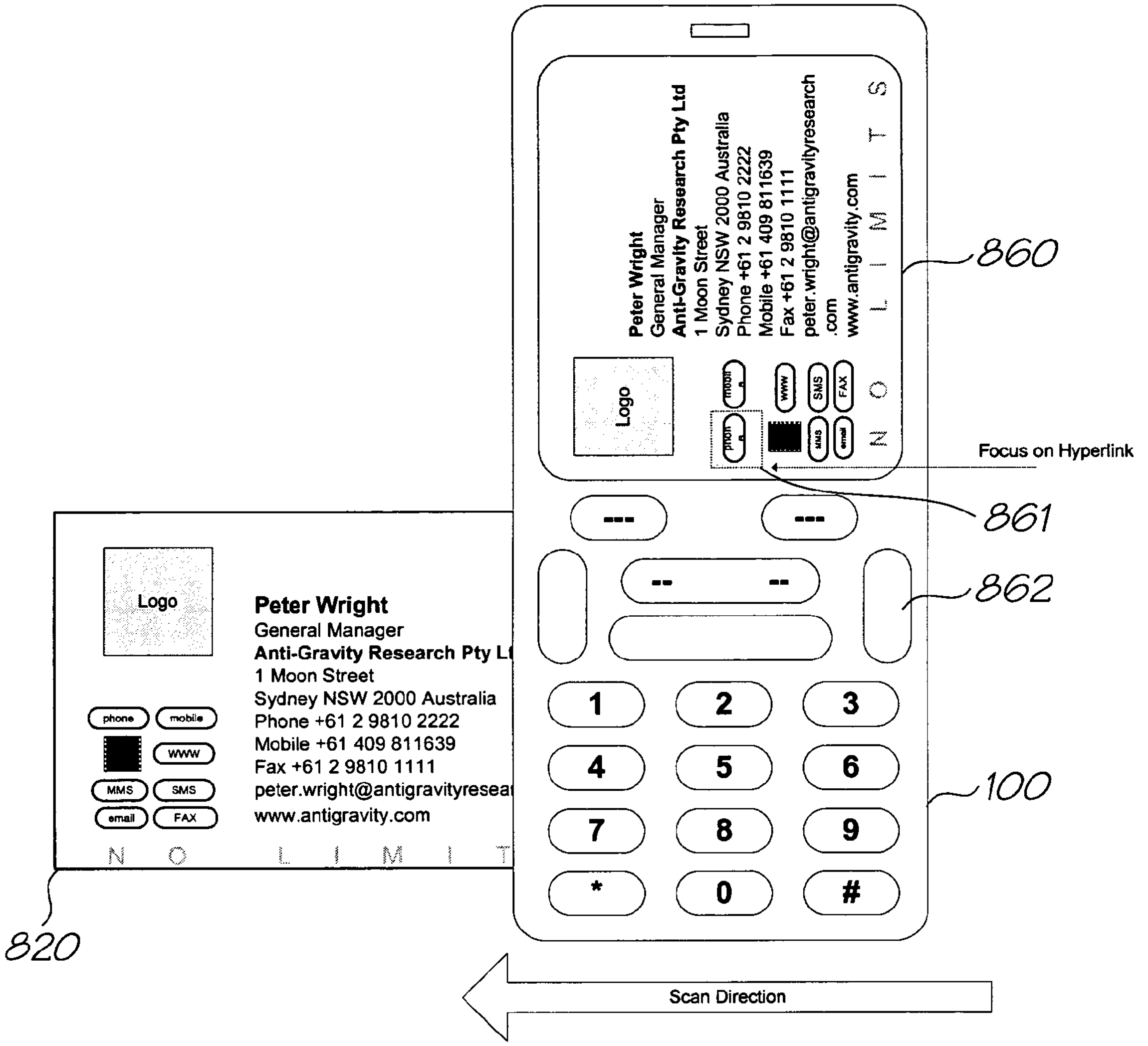
FIG. 83 illustrates an example Scanning of an M-Print printout.

FIG. 83 shows a mobile phone 100 where an M-Print printout of a business card 820 has been scanned and the printout is now displayed on the phone's screen 860 with the first hyperlink 861 highlighted ready to be selected. The user can move through the active areas using standard navigation keys 862 on the mobile device 100, in the same way they can navigate the hyperlinks on a web page. Selecting a hyperlink in this way via the GUI is the same as clicking a Netpage Pointer 533 on the printout of the business card 820.

Below is a use case illustrating the sequence of events for a user to activate a hyperlink by scanning the printout.

8.3.1 Scan a Business Card and Send an MMS to the Person

1. The user inserts a printout into the paper feed slot on the mobile device (870)
2. The printout is drawn through the mobile device
3. The image on the printout is displayed on the mobile device (880), the first hyperlink has a focus region drawn around it
4. The user moves focus to the MMS hyperlink and selects it
5. The MMS editor on the device is displayed with the address filled out from the details on the business card (890).

Figure 84:
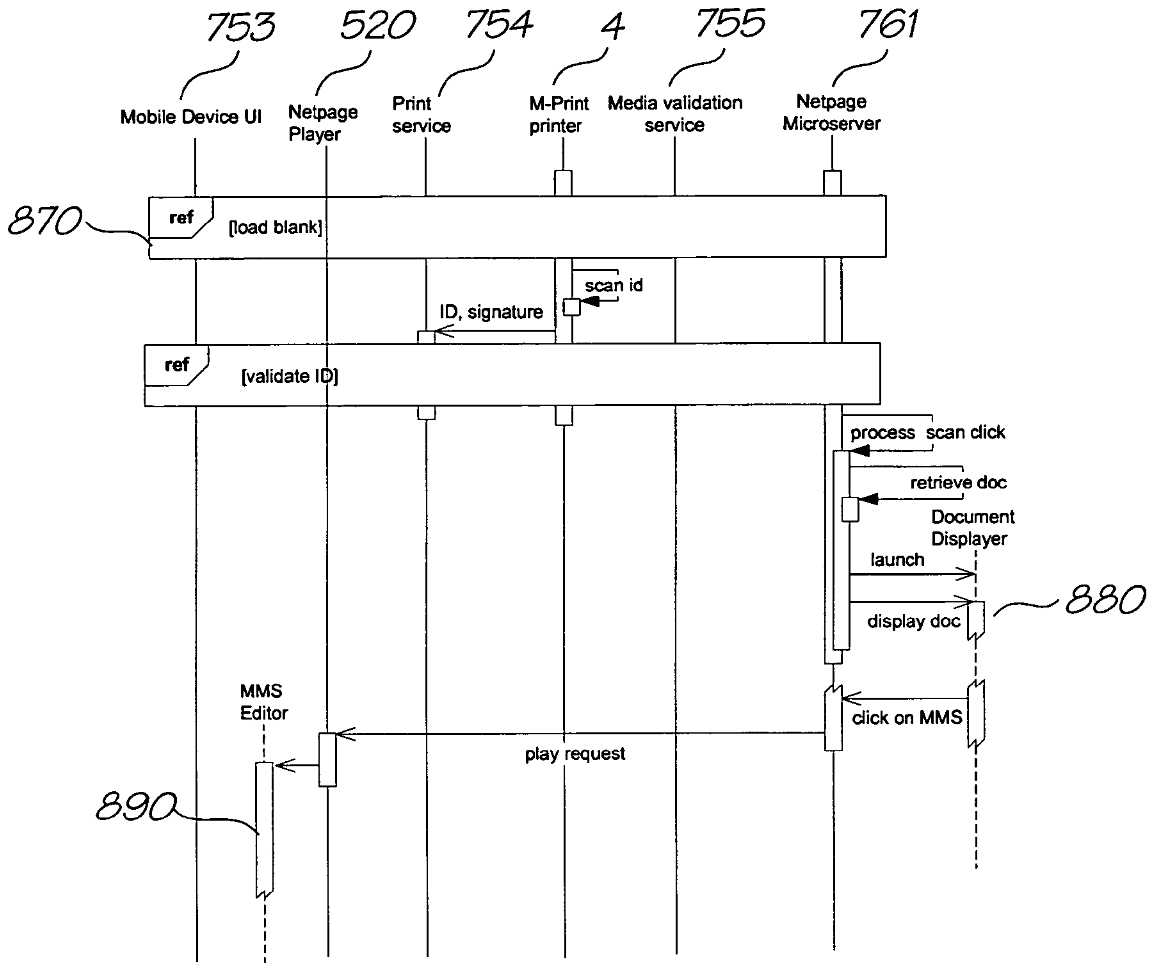
FIG. 84 illustrates an example Sequence diagram for generating Netpage clicks from a mobile device GUI.

The upper portion of the sequence diagram in FIG. 84 is a repeat of the sequence for the case where a scan is occurring. When the Netpage Microserver receives the "scan click" it retrieves the document and displays it on the screen using the Document Displayer. The Document Displayer allows the user to step through the hyperlinks and fields and select them. When one is selected the Netpage Microserver is sent a click event, just as if it had come from a Netpage pointer. The Netpage processing results in a play request being sent to the Netpage Player on the device, which responds by opening up the MMS editor with the message already addressed to the recipient identified by the business card that was scanned in.

9.0 Mobile Telecommunications Device Overview

Whilst the main embodiment includes both Netpage and printing functionality, only one or the other of these features is provided in other embodiments.

Figure 85:
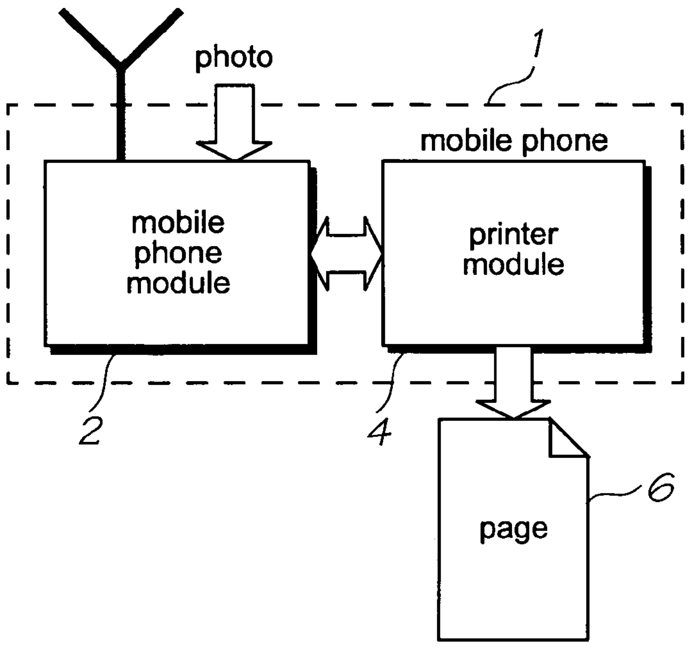
FIG. 85 illustrates a schematic representation of the modular interaction in a printer/mobile phone.

One such embodiment is shown in FIG. 85, in which a mobile telecommunications device in the form of a mobile phone 1 (also known as a "cellphone") includes a mobile phone module 2 and a printer module 4. The mobile 30 phone module is configured to send and receive voice and data via a telecommunications network (not shown) in a conventional manner known to those skilled in the art. The printer module 4 is configured to print a page 6. Depending upon the particular implementation, the printer module 4 can be configured to print the page 6 in color or monochrome.

The mobile telecommunications device can use any of a variety of known operating systems, such as Symbian (with UIQ and Series 60 GUIs), Windows Mobile, PalmOS, and Linux.

In the preferred embodiment (described in more detail below), the print media is pre-printed with tags, and the printer module 4 prints visible information onto the page 6 in registration with the tags. In other embodiments, Netpage tags are printed by the printer module onto the page 6 along with the other information. The tags can be printed using either the same visible ink as used to print visible information, or using an infrared or other substantially invisible ink.

The information printed by the printer module 4 can include user data stored in the mobile phone 1 (including phonebook and appointment data) or text and images received via the telecommunications network or from another device via a communication mechanism such as Bluetooth™ or infrared transmission. If the. mobile phone 1 includes a camera, the printer module 4 can be configured to print the captured images. In the preferred form, the mobile phone module 2 provides at least basic editing capabilities to enable cropping, filtering or addition of text or other image data to the captured image before printing. The configuration and operation of the printer module 4 is described in more detail below in the context of various types of mobile telecommunication device that incorporate a printhead.

Figure 86:
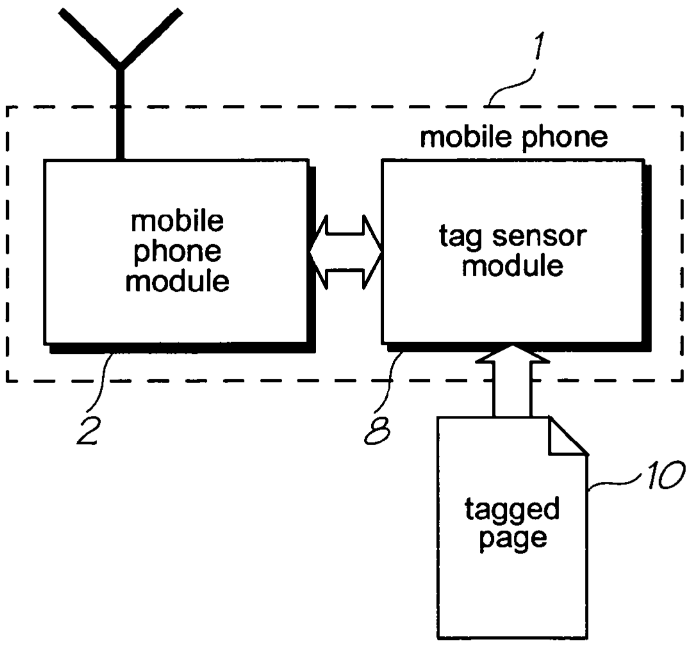
FIG. 86 illustrates a schematic representation of the modular interaction in a tag sensor/mobile phone.

FIG. 86 shows another embodiment of a mobile telecommunications device, in which the printer module 4 is omitted, and a Netpage tag sensor module 8 is included. The Netpage module 8 enables interaction between the mobile phone 1 and a page 10 including Netpage tags. The configuration and operation of the Netpage pointer in a mobile phone 1 is described in more detail below. Although not shown, the mobile phone 1 with Netpage module 8 can include a camera.

Figure 87:
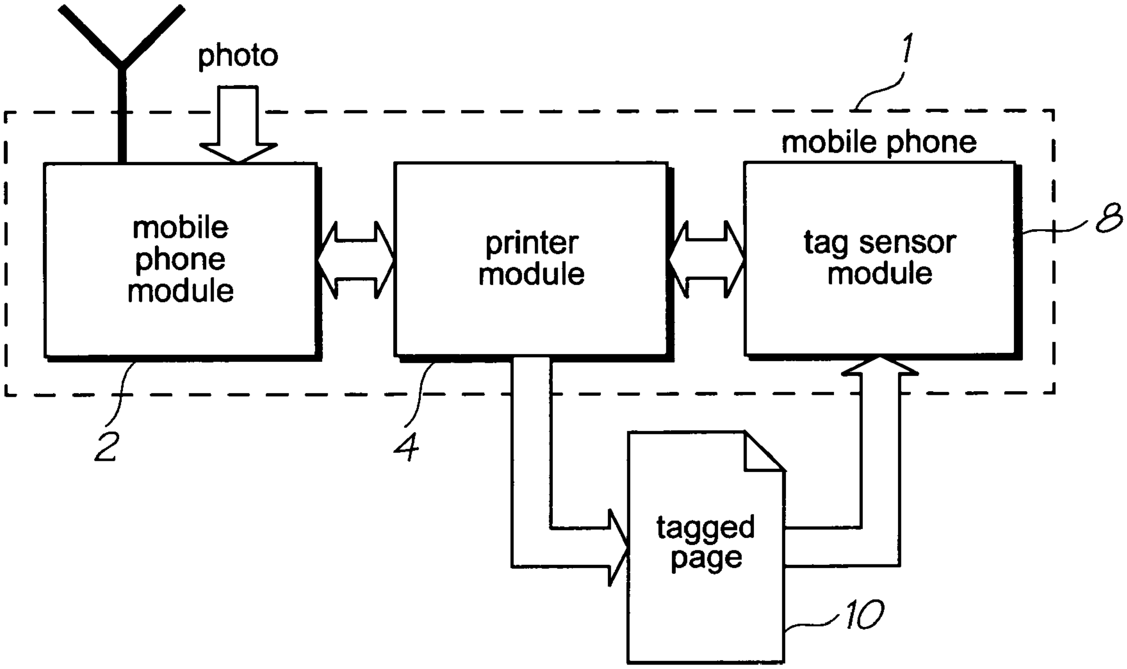
FIG. 87 illustrates a schematic representation of the modular interaction in a printer/tag sensor/mobile phone.

FIG. 87 shows a mobile phone 1 that includes both a printer module 4, and a Netpage tag sensor module 8. As with the embodiment of FIG. 86, the printer module 4 can be configured to print tagged or untagged pages. As shown in FIG. 87, where tagged pages 10 are produced (and irrespective of whether the tags were pre-printed or printed by the printer module 4), the Netpage tag sensor module 8 can be used to interact with the resultant printed media.

Figure 88:
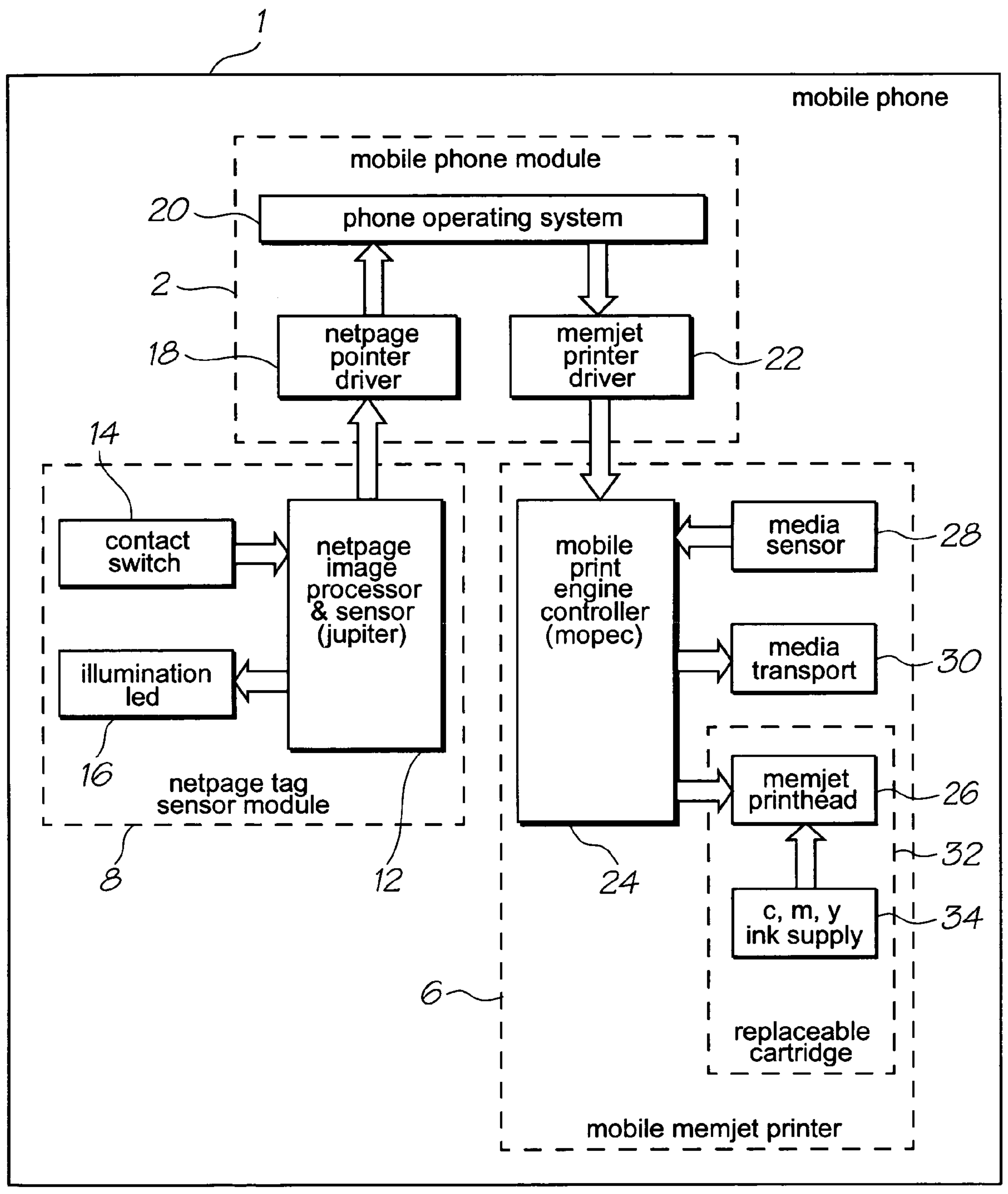
FIG. 88 is a more detailed schematic representation of the architecture within the mobile phone of FIG. 87.

A more detailed architectural view of the mobile phone 1 of FIG. 87 is shown in FIG. 88, in which features corresponding to those shown in FIG. 87 are indicated with the same reference numerals. It will be appreciated that FIG. 88 deals only with communication between various electronic components in the mobile telecommunications device and omits mechanical features. These are described in more detail below.

The Netpage tag sensor module 8 includes a monolithically integrated Netpage image sensor and processor 12 that captures image data and receives a signal from a contact switch 14. The contact switch 14 is connected to a nib (not shown) to determine when the nib is pressed into contact with a surface. The sensor and processor 12 also outputs a signal to control illumination of an infrared LED 16 in response to the stylus being pressed against the surface. The image sensor and processor 12 outputs processed tag information to a Netpage pointer driver 18 that interfaces with the phone operating system 20 running on the mobile telecommunications device's processor (not shown).

Output to be printed is sent by the phone operating system 20 to a printer driver 22, which passes it on to a MoPEC chip 24. The MoPEC chip processes the output to generate dot data for supply to the printhead 26, as described in more detail below. The MoPEC chip 24 also receives a signal from a media sensor 28 indicating when the media is in position to be printed, and outputs a control signal to a media transport 30. The printhead 26 is disposed within a replaceable cartridge 32, which also includes ink 34 for supply to the printhead.

9.1 Mobile Telecommunications Device Module

Figure 89:
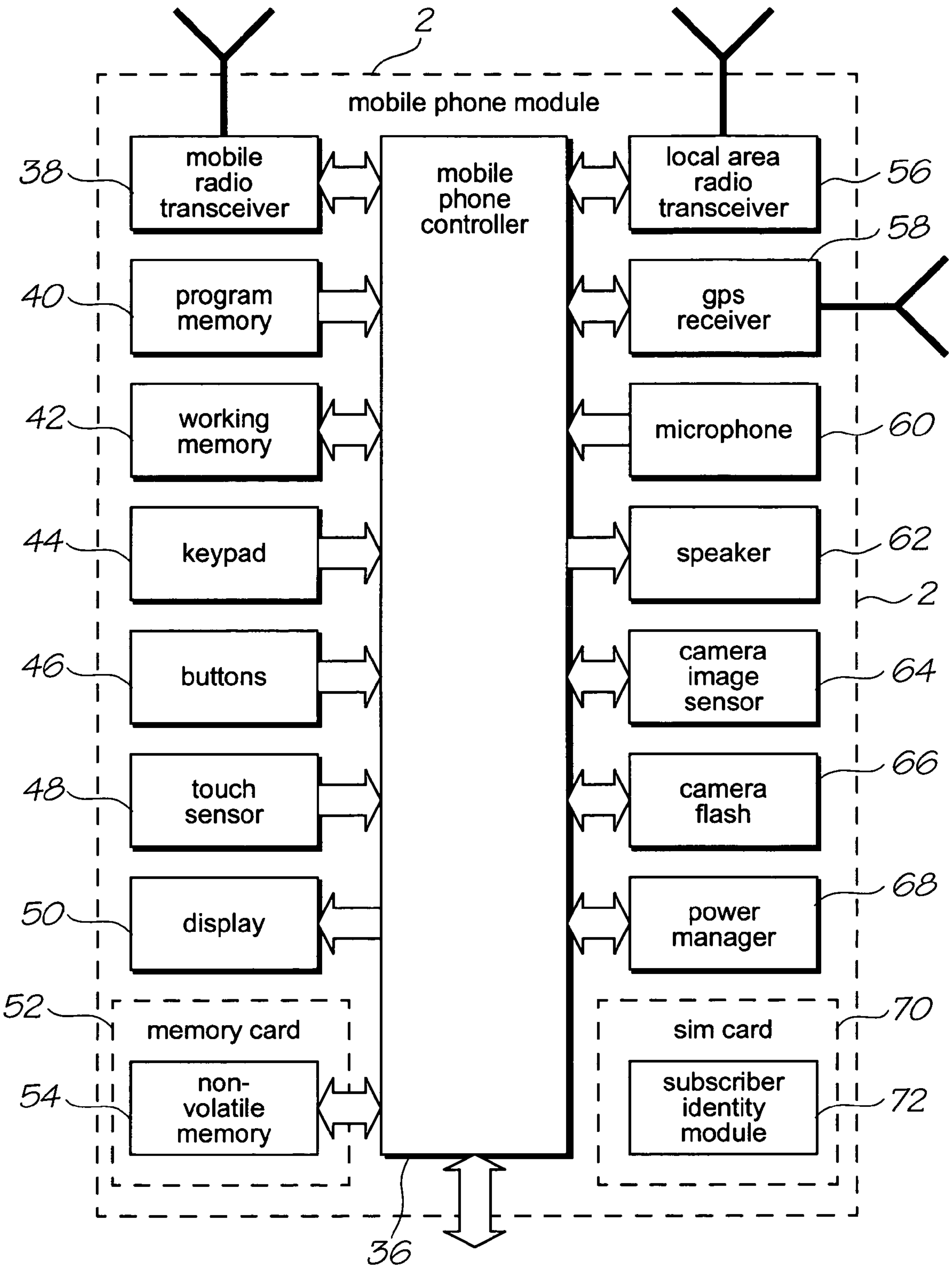
FIG. 89 is a more detailed schematic representation of the architecture within the mobile phone module of FIG. 88.

FIG. 89 shows the mobile phone module 2 in more detail. The majority of the components other than those directly related to printing and Netpage tag sensing are standard and well known to those in the art. Depending upon the specific implementation of the mobile phone 1, any number of the illustrated components can be included as part of one or more integrated circuits.

Operation of, and communication between, the mobile phone module 2 components is controlled by a mobile phone controller 36. The components include:

- mobile radio transceiver 38 for wireless communication with a mobile telecommunications network;
- program memory 40 for storing program code for execution on the mobile phone controller 36;
- working memory 42 for storing data used and generated by the program code during execution. Although shown as separate from the mobile phone controller 36, either or both memories 40 and 42 may be incorporated in the package or silicon of the controller;
- keypad 44 and buttons 46 for accepting numerical and other user input;
- touch sensor 48 which overlays display 50 for accepting user input via a stylus or fingertip pressure;
- removable memory card 52 containing non-volatile memory 54 for storing arbitrary user data, such as digital photographs or files;
- local area radio transceiver 56, such as a Bluetoothrm transceiver;
- GPS receiver 58 for enabling determination of the location of the mobile telecommunications device (alternatively the phone may rely on mobile network mechanisms for determining its location);
- microphone 60 for capturing a user's speech;
- speaker 62 for outputting sounds, including voice during a phone call;
- camera image sensor 64 including a CCD for capturing images;
- camera flash 66;
- power manager 68 for monitoring and controlling power consumption of the mobile telecommunications device and its components; and
- SIM (subscriber Identity Module) card 70 including SIM 72 for identifying the subscriber to mobile networks.

The mobile phone controller 36 implements the baseband functions of mobile voice and data communications protocols such as GSM, GSM modem for data, GPRS and CDMA, as well as higher-level messaging protocols such as SMS and MMS. The one or more local-area radio transceivers 56 enable wireless communication with peripherals such as headsets and Netpage pens, and hosts such as personal computers. The mobile phone controller 36 also implements the baseband functions of local-area voice and data communications protocols such as IEEE 802.11, IEEE 802.15, and Bluetooth™.

Figure 90:
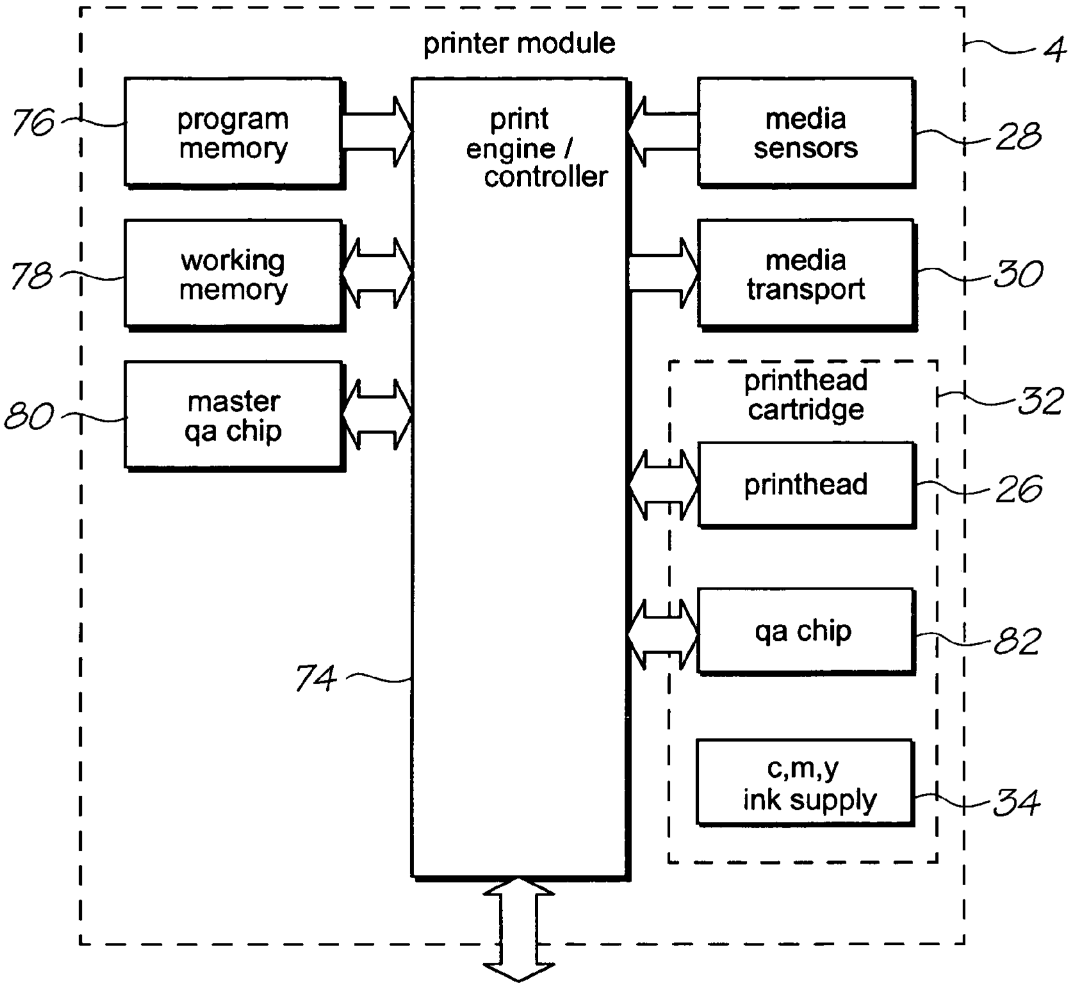
FIG. 90 is a more detailed schematic representation of the architecture within the printer module of FIG. 88.

The mobile phone module 2 may also include sensors and/or motors (not shown) for electronically adjusting zoom, focus, aperture and exposure in relation to the digital camera. Similarly, as shown in FIG. 90, components of the printer module 4 include:

- print engine controller (PEC) 74 in the form of a MoPEC device;
- program memory 76 for storing program code for execution by the print engine controller 74;
- working memory 78 for storing data used and generated by the program code during execution by the print engine controller 74; and
- a master QA chip 80 for authenticating printhead cartridge 32 via its QA chip 82.

Whilst the printhead cartridge in the preferred form includes the ink supply 34, the ink reservoirs can be housed in a separate cartridge in alternative embodiments.

Figure 91:
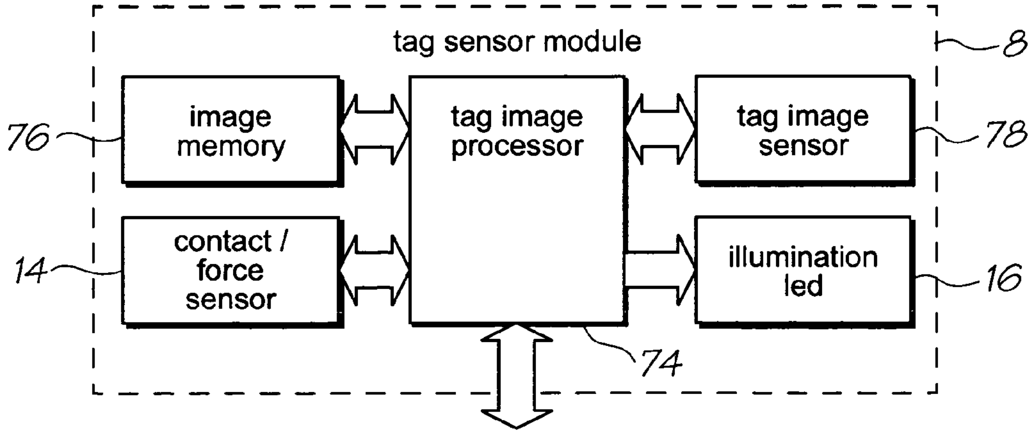
FIG. 91 is a more detailed schematic representation of the architecture within the tag sensor module of FIG. 88.

FIG. 91 shows the components of the tag sensor module 8, which includes a CMOS tag image processor 74 that communicates with image memory 76. A CMOS tag image sensor 78 sends captured image data to the processor 74 for processing. The contact sensor 14 indicates when a nib (not shown) is brought into contact with a surface with sufficient force to close a switch within the contact sensor 14. Once the switch is closed, the infrared LED 16 illuminates the surface, and the image sensor 78 captures at least one image and sends it to the image processor 74 for processing. Once processed (as described below in more detail), image data is sent to the mobile phone controller 36 for decoding.

Figure 92:
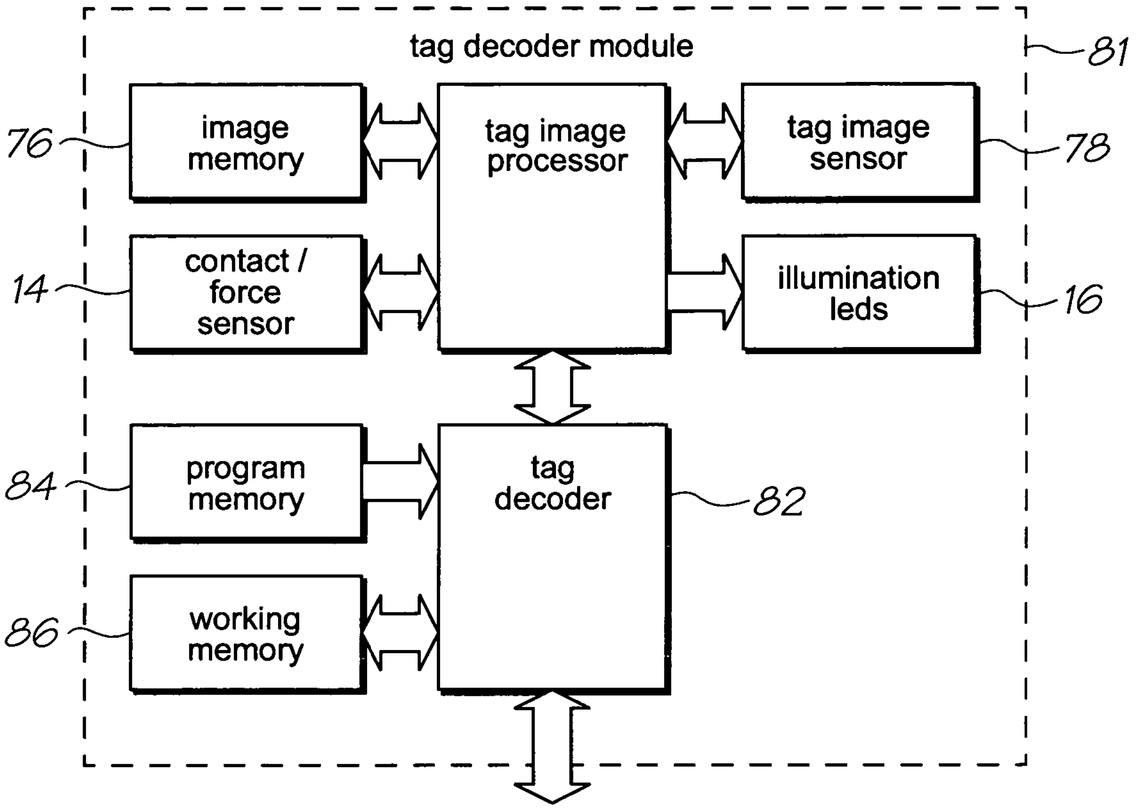
FIG. 92 is a schematic representation of the architecture within a tag decoder module for use instead of the tag sensor module of FIG. 88.

In an alternative embodiment, shown in FIG. 92, the tag sensor module 8 is replaced by a tag decoder module 81. The tag decoder module 81 includes all the elements of the tag sensor module 8, but adds a hardware-based tag decoder 82, as well as program memory 84 and working memory 86 for the tag decoder. This arrangement reduces the computational load placed on the mobile phone controller, with a corresponding increase in chip area compared to using the tag sensor module 8.

The Netpage sensor module can be incorporated in the form of a Netpage pointer, which is a simplified Netpage pen suitable mostly for activating hyperlinks. It preferably incorporates a non-marking stylus in place of the pen's marking nib (described in detail later in the specification); it uses a surface contact sensor in place of the pen's continuous force sensor; and it preferably operates at a lower position sampling rate, making it unsuitable for capturing drawings and handwriting. A Netpage pointer is less expensive to implement than a Netpage pen, and tag image processing and tag decoding can potentially be performed by software without hardware support, depending on sampling rate.

The various aspects of the invention can be embodied in any of a number of mobile telecommunications device types. Several different devices are described here, but in the interests of brevity, the detailed description will concentrate on the mobile telecommunications device embodiment.

9.2 Mobile Device

One preferred embodiment is the non-Netpage enabled 'candy bar' mobile telecommunications device in the form of a mobile phone shown in FIGS. 92 to 98. While a candy bar style phone is described here, it could equally take the form of a "flip" style phone, which includes a pair of body sections that are hinged to each other. Typically, the display is disposed on one of the body sections, and the keypad is disposed on the other, such that the display and keypad are positioned adjacent to each other when the device is in the closed position.

In further embodiments, the device can have two body sections that rotate or slide relative to each other. Typically, the aim of these mechanical relationships between first and second body sections is to protect the display from scratches and/or the keypad from accidental activation. Photo printing is considered one of the most compelling uses of the mobile Memjet printer. A preferred embodiment of the invention therefore includes a camera, with its attendant processing power and memory capacity.

Figure 93:
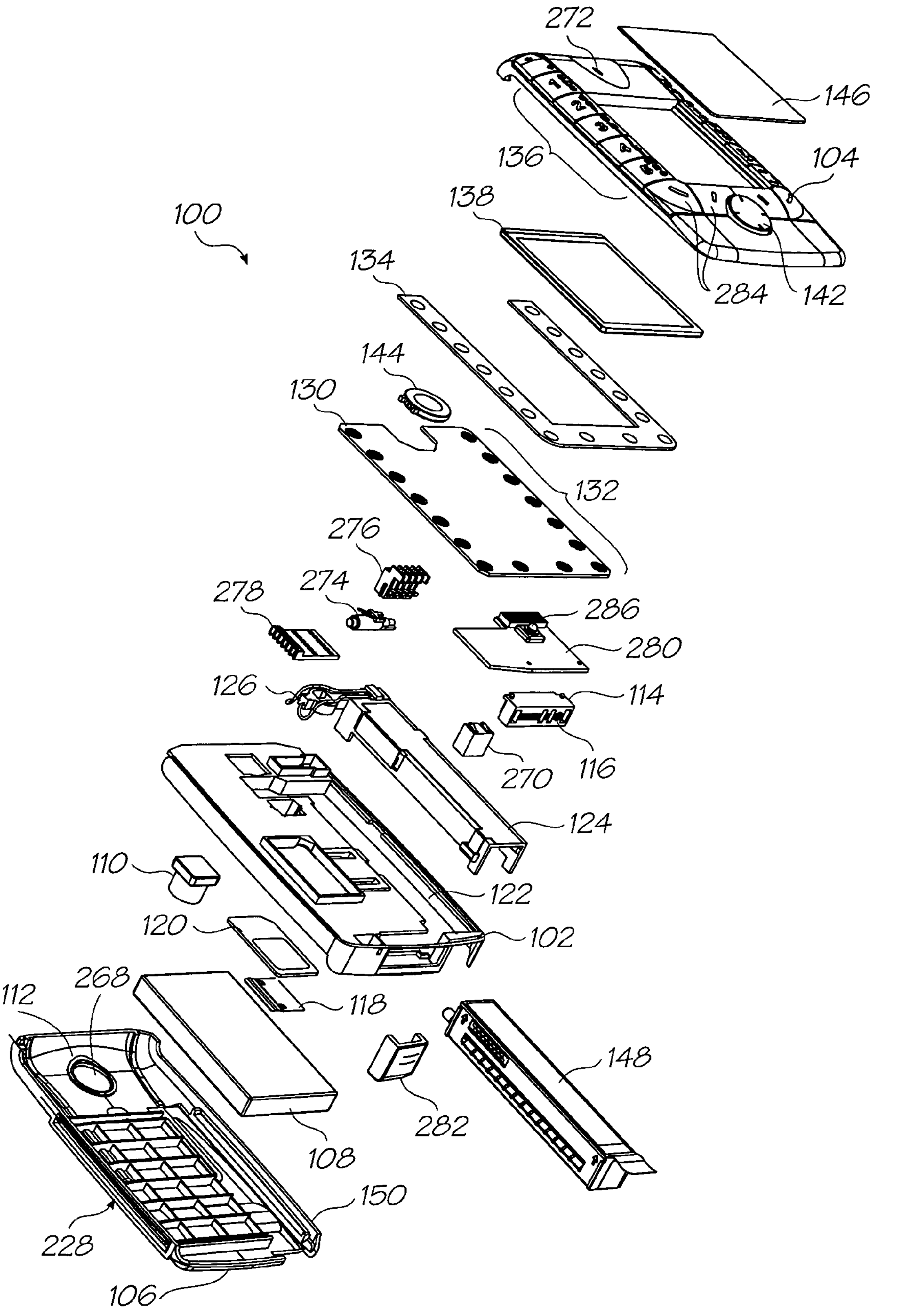
FIG. 93 illustrates an exploded perspective view of a “candy bar” type mobile phone embodiment.
Figure 94:
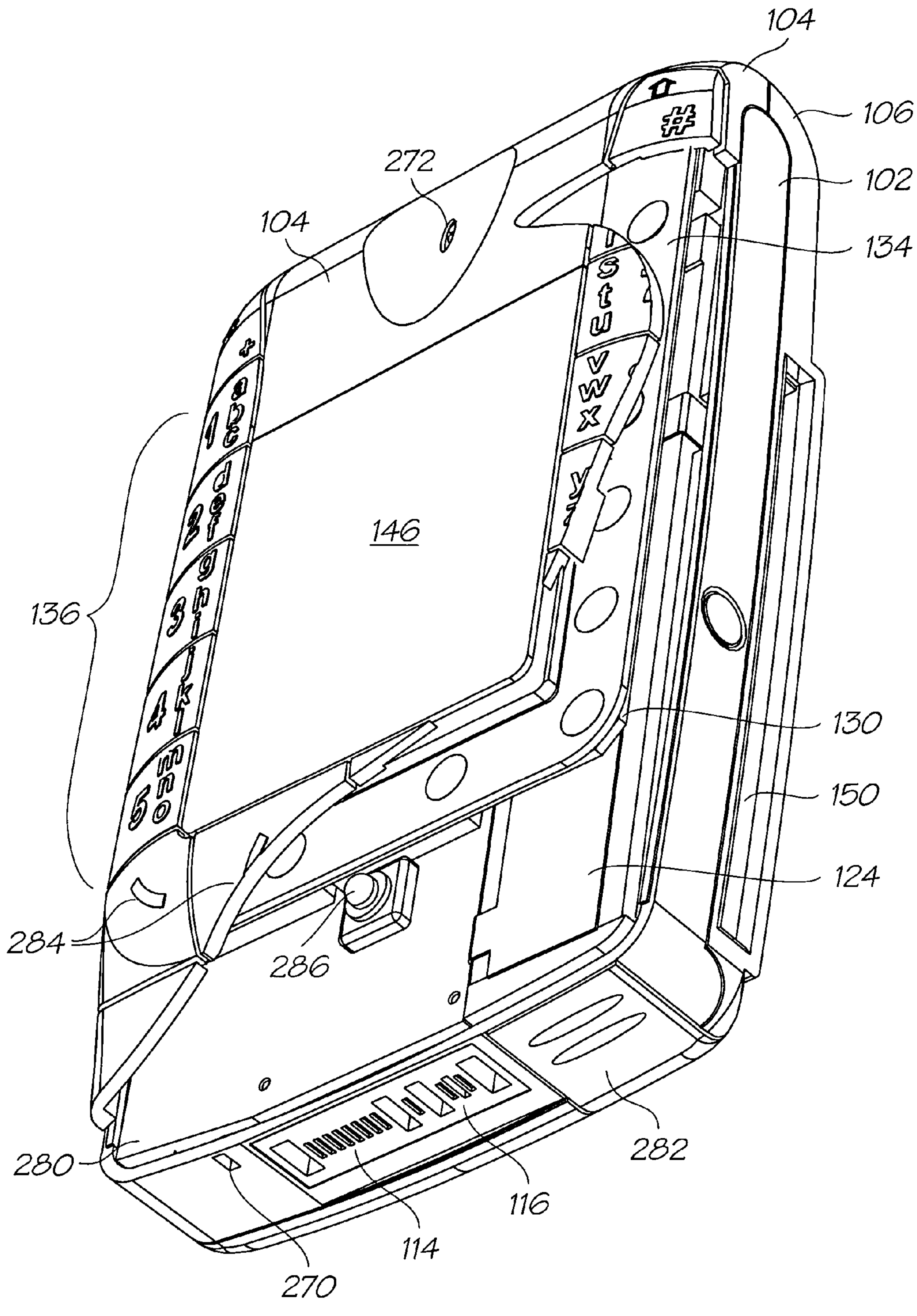
FIG. 94 illustrates a partially cut away front and bottom view of the embodiment shown in FIG. 93.
Figure 95:
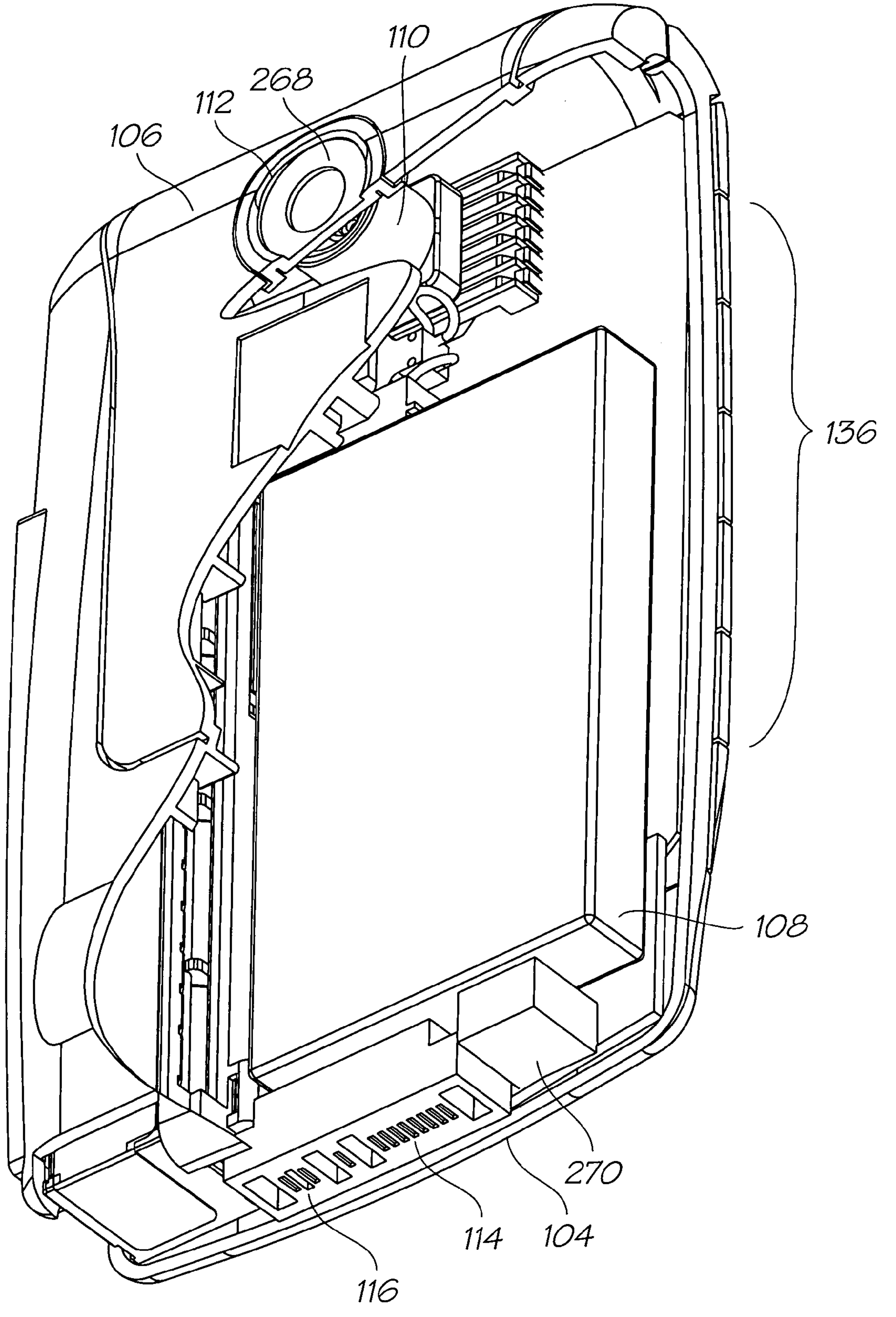
FIG. 95 illustrates a partially cut away rear and bottom view of the embodiment shown in FIG. 93.
Figure 96:
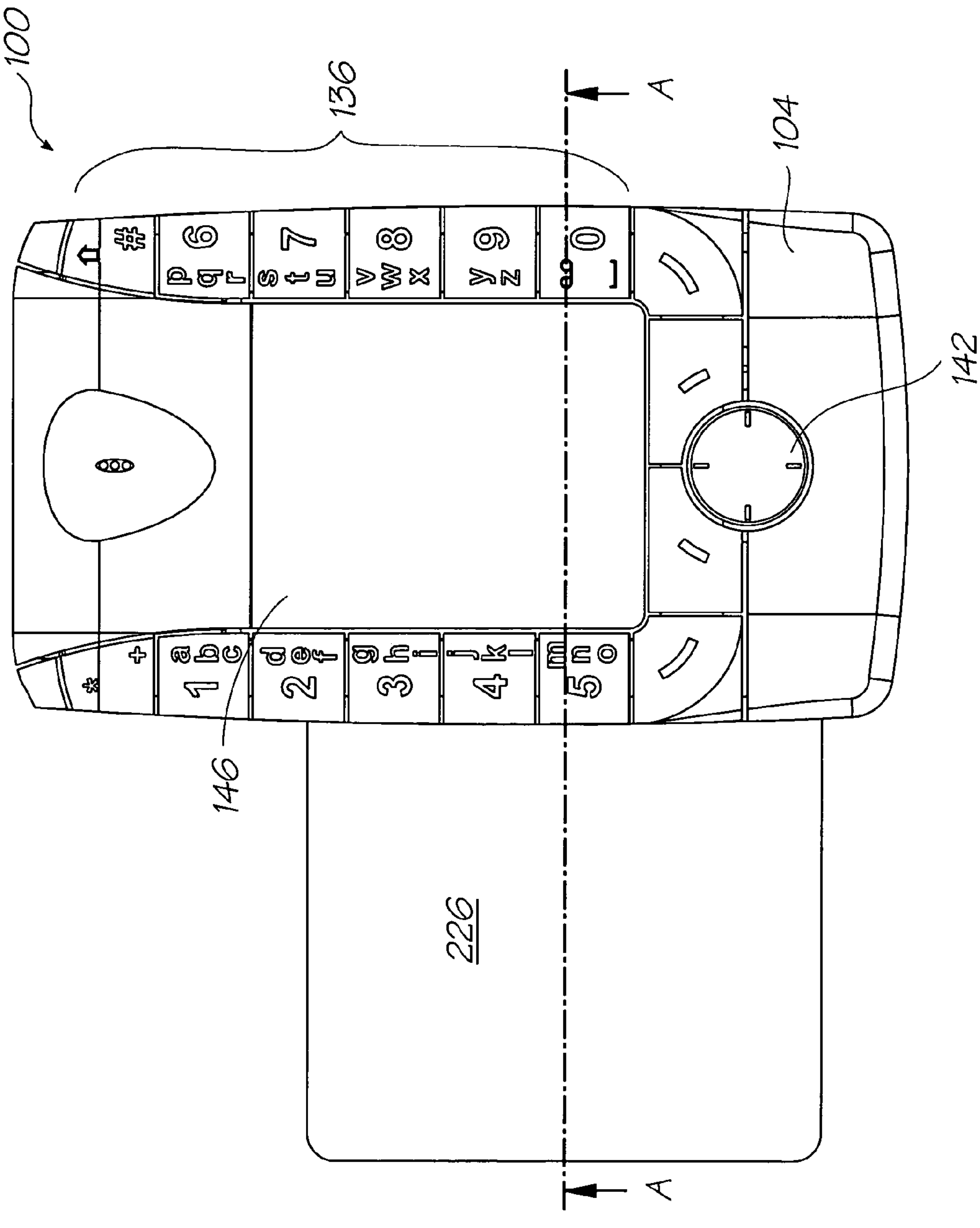
FIG. 96 illustrates a front elevation of the embodiment shown in FIG. 93 with a card being fed into the entry slot.
Figure 97:
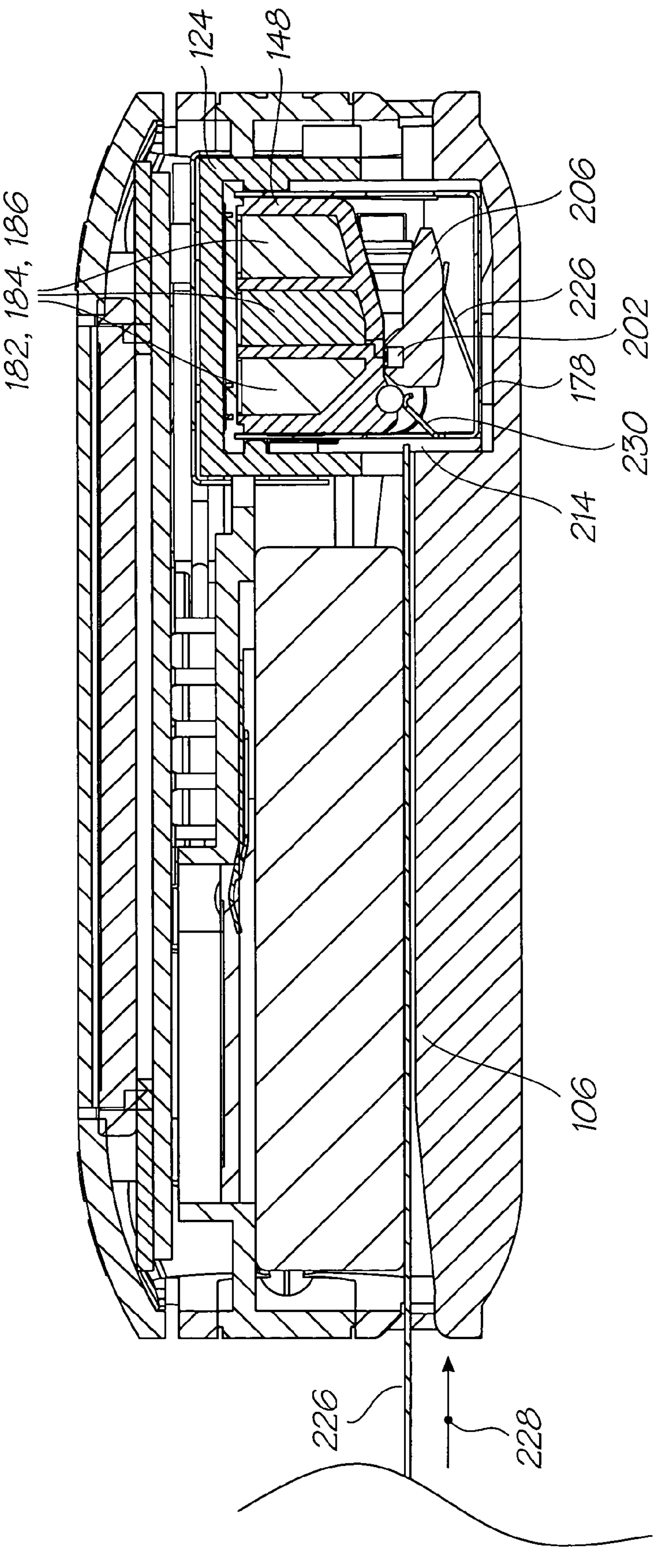
FIG. 97 illustrates a cross section view taken along line A-A of FIG. 96.

The elements of the mobile telecommunications device are best shown in FIG. 93, which (for clarity) omits minor details such as wires and hardware that operatively connect the various elements of the mobile telecommunications device together. The wires and other hardware will be well known to those skilled in the art. The mobile phone 100 comprises a chassis moulding 102, a front moulding 104 and a rear cover moulding 106. A rechargeable battery 108, such as a lithium ion or nickel metal hydride battery, is mounted to the chassis moulding 102 and covered by the rear cover moulding 106. The battery 108 powers the various components of the mobile phone 100 via battery connector 276 and the camera and speaker connector 278.

The front moulding 104 mounts to the emphasis to enclose the various components, and includes numerical interface buttons 136 positioned in vertical rows on each side of the display 138. A multi-directional control pad 142 and other control buttons 284 enable menu navigation and other control inputs. A daughterboard 280 is mounted to the chassis moulding 102 and includes a directional switch 286 for the multi directional control pad 142. The mobile telecommunications device includes a cartridge access cover 132 that protects the interior of the mobile telecommunications device from dust and other foreign objects when a print cartridge 148 is not inserted in the cradle 124.

An optional camera module 110 is also mounted to the chassis moulding 102, to enable image capture through a hole 112 in the rear cover moulding 106. The camera module 110 includes a lens assembly and a CCD image sensor for capturing images. A lens cover 268 in the hole 112 protects the lens of the camera module 110. The rear cover moulding 106 also includes an inlet slot 228 and an outlet slot 150 through which print media passes.

The chassis moulding 102 supports a data/recharge connector 114, which enables a proprietary data cable to be plugged into the mobile telecommunications device for uploading and downloading data such as address book information, photographs, messages, and any type of information that might be sent or received by the mobile telecommunications device. The data/recharge connector 114 is configured to engage a corresponding interface in a desktop stand (not shown), which holds the mobile telecommunications device in a generally upright position whilst data is being sent or received by the mobile telecommunications device. The data/recharge connector also includes contacts that enable recharging of the battery 108 via the desktop stand. A separate recharge socket 116 in the data/recharge connector 114 is configured to receive a complimentary recharge plug for enabling recharging of the battery when the desktop stand is not in use.

A microphone 170 is mounted to the chassis moulding 102 for converting sound, such as a user's voice, into an electronic signal to be sampled by the mobile telecommunications device's analog to digital conversion circuitry. This conversion is well known to those skilled in the art and so is not described in more detail here. A SIM (Subscriber Identity Module) holder 118 is formed in the chassis moulding 102, to receive a SIM card 120. The chassis moulding is also configured to support a print cartridge cradle 124 and a drive mechanism 126, which receive a replaceable print cartridge 148. These features are described in more detail below. Another moulding in the chassis moulding 102 supports an aerial (not shown) for sending and receiving RF signals to and from a mobile telecommunications network.

A main printed circuit board (PCB) 130 is supported by the chassis moulding 102, and includes a number of momentary pushbuttons 132. The various integrated and discrete components that support the communications and processing (including printing processing) functions are mounted to the main PCB, but for clarity are not shown in the diagram.

A conductive elastomeric overlay 134 is positioned on the main PCB 130 beneath the keys 136 on the front 40 moulding 104. The elastomer incorporates a carbon impregnated pill on a flexible profile. When one of the keys 136 is pressed, it pushes the carbon pill to a 2-wire open circuit pattern 132 on the PCB surface. This provides a low impedance closed circuit. Alternatively, a small dome is formed on the overlay corresponding to each key 132.

Polyester film is screen printed with carbon paint and used in a similar manner to the carbon pills. Thin adhesive film with berrylium copper domes can also be used. A loudspeaker 144 is installed adjacent apertures 272 in the front moulding 104 to enable a user to hear sound such as voice communication and other audible signals.

A color display 138 is also mounted to the main PCB 130, to enable visual feedback to a user of the mobile telecommunications device. A transparent lens moulding 146 protects the display 138. In one form, the transparent lens is touch-sensitive (or is omitted and the display 138 is touch sensitive), enabling a user to interact with icons and input text displayed on the display 138, with a finger or stylus.

A vibration assembly 274 is also mounted to the chassis moulding 102, and includes a motor that drives an eccentrically mounted weight to cause vibration. The vibration is transmitted to the chassis 102 and provides tactile feedback to a user, which is useful in noisy environments where ringtones are not audible.

10. Print Media Printing

A Netpage printer normally prints the tags which make up the surface coding on demand, i.e. at the same time as it prints graphic page content. As an alternative, in a Netpage printer not capable of printing tags such as the preferred embodiment, pre-tagged but otherwise blank Netpages can be used. The printer, instead of being capable of tag printing, typically incorporates a Netpage tag sensor. The printer senses the tags and hence the region ID of a blank either prior to, during, or after the printing of the graphic page content onto the blank. It communicates the region ID to the Netpage server, and the server associates the page content and the region ID in the usual way.

A particular Netpage surface coding scheme allocates a minimum number of bits to the representation of spatial coordinates within a surface region. If a particular media size is significantly smaller than the maximum size representable in the minimum number of bits, then the Netpage code space may be inefficiently utilised. It can therefore be of interest to allocate different sub-areas of a region to a collection of blanks. Although this makes the associations maintained by the Netpage server more complex, and makes subsequent routing of interactions more complex, it leads to more efficient code space utilisation. In the limit case the surface coding may utilise a single region with a single coordinate space, i.e. without explicit region IDs.

If regions are sub-divided in this way, then the Netpage printer uses the tag sensor to determine not only the region ID but also the surface coding location of a known physical position on the print medium, i.e. relative to two edges of the medium. From the surface coding location and its corresponding physical position on the medium, and the known (or determined) size of the medium, it then determines the spatial extent of the medium in the region's coordinate space, and communicates both the region ID and the spatial extent to the server. The server associates the page content with the specified sub-area of the region.

A number of mechanisms can be used to read tag data from a blank. A conventional Netpage tag sensor incorporating a two-dimensional image sensor can be used to capture an image of the tagged surface of the blank at any convenient point in the printer's paper path. As an alternative, a linear image sensor can be used to capture successive line images of the tagged surface of the blank during transport. The line images can be used to create a two-dimensional image which is processed in the usual way. As a further alternative, region ID data and other salient data can be encoded linearly on the blank, and a simple photodetector and ADC can be used to acquire samples of the linear encoding during transport.

One important advantage of using a two-dimensional image sensor is that tag sensing can occur before motorised transport of the print medium commences. For example, if the print medium is manually inserted by the user, then tag sensing can occur during insertion. This has the further advantage that if the tag data is validated by the device, then the print medium can be rejected and possibly ejected before printing commences. For example, the print medium may have been pre-printed with advertising or other graphic content on the reverse side from the intended printing side. The device can use the tag data to detect incorrect media insertion, i.e. upside-down or back-to-front. The device can also prevent accidental overprinting of an already-printed medium. And it can detect the attempted use of an invalid print medium and refuse printing, eg. to protect print quality. The device can also derive print medium characteristics from the tag data, to allow it to perform optimal print preparation.

If a linear image sensor is used, or if a photodetector is used, then image sensing must occur during motorised transport of the print medium to ensure accurate imaging. Unless there are at least two points of contact between the transport mechanism and the print medium in the printing path, separated by a minimum distance equal to the tag data acquisition distance, tag data cannot be extracted before printing commences, and the validation advantages discussed above do not obtain. In the case of a linear image sensor, the tag data acquisition distance equals the diameter of the normal tag imaging field of view. In the case of a photodetector, the tag data acquisition distance is as long as the required linear encoding.

If the tag sensor is operable during the entire printing phase at a sufficiently high sampling rate, then it can also be used to perform accurate motion sensing, with the motion data being used to provide a line synchronisation signal to the print engine. This can be used to eliminate the effects of jitter in the transport mechanism.

FIGS. 100 to 106 show one embodiment of the encoded medium and the media sensing and printing system within the mobile telecommunications device. While the encoding of the cards is briefly discussed here, it is described in detail in the Coded Media sub-section of this specification.

Figure 100:
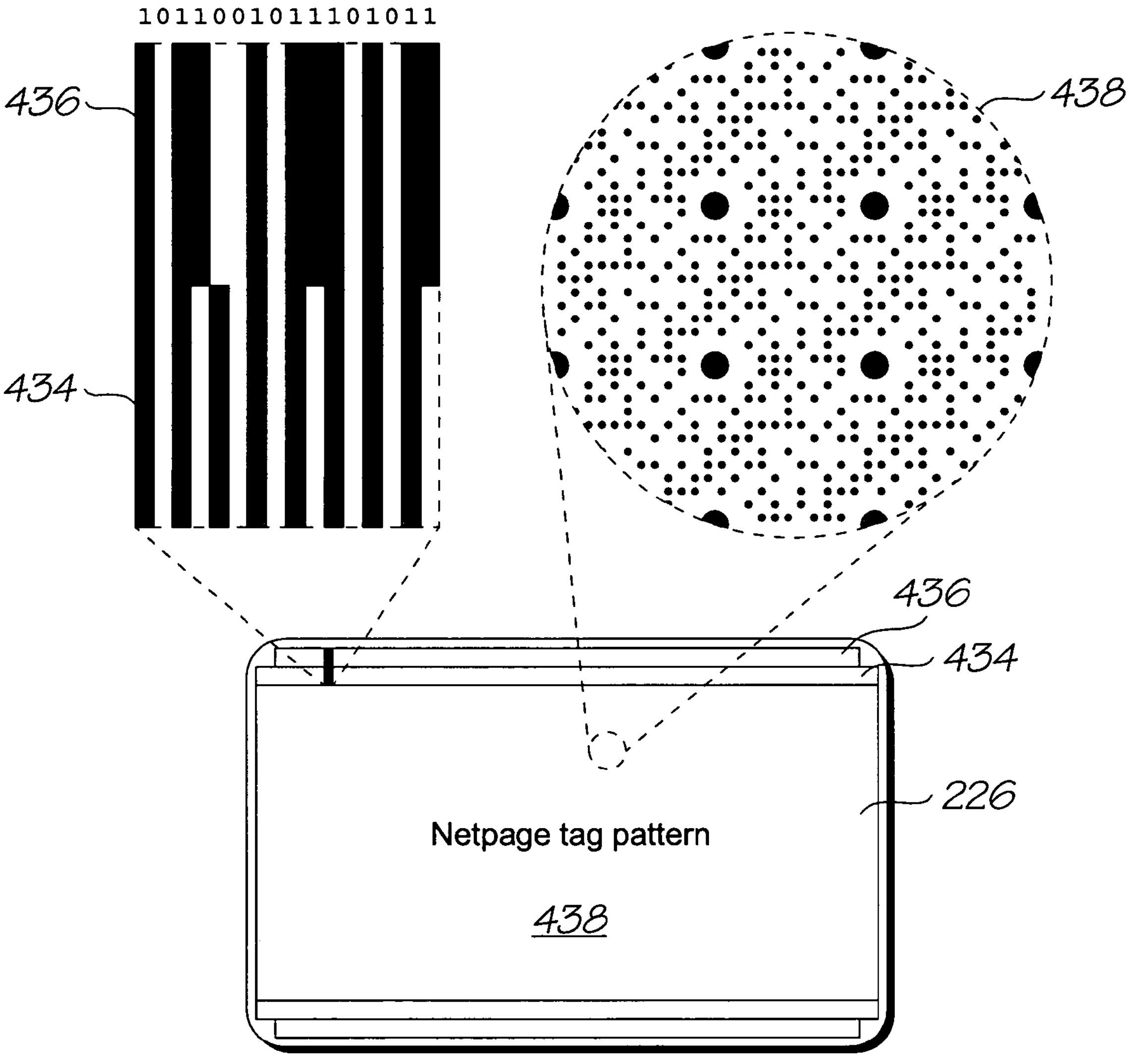
FIG. 100 illustrates the media coding on the card with separate clock and data tracks.

Referring to FIG. 100, the 'back-side' of one of the cards 226 is shown. The back-side of the card has two coded data tracks: a 'clock track' 434 and a 'data track' 436 running along the longitudinal sides of the cards. The coded data may be in the form of a two-dimensional grid or pattern. The cards are encoded with data indicating, inter alia:

the orientation of the card;
the media type and authenticity;
the longitudinal size;
the pre-printed side;
detection of prior printing on the card; and,
the position of the card relative to the printhead IC.

In one form, the encoded data is printed in IR ink so that it is invisible and does not encroach on the space available for printing visible images.

In a basic form, the M-Print cards 226 are only encoded with a data track and clocking (as a separate clock track or a self- clocking data track). However, in the more sophisticated embodiment shown in the figures, the cards 226 have a pre-printed Netpage tag pattern 438 covering the majority of the back-side. The front side may also have a pre-printed tag pattern. It is preferred in these embodiments that the data track encodes first information that is at least indicative of second information encoded in the tags. Most preferably, the first information is simply the document identity that is encoded in each of the tags.

The clock track 434 allows the MoPEC 326 (see FIG. 101) to determine, by its presence, that the front of the card 226 is facing the printhead 202, and allows the printer to sense the motion of the card 226 during printing. The clock track 434 also provides a clock for the densely coded data track 436.

The data track 436 provides the Netpage identifier and optionally associated digital signatures which allows MoPEC 326 to reject fraudulent or un-authorised media 226, and to report the Netpage identifier of the front-side Netpage tag pattern to a Netpage server. It should be noted that a fragment of a digital signature can also be considered a digital signature in its own right.

Figure 101:
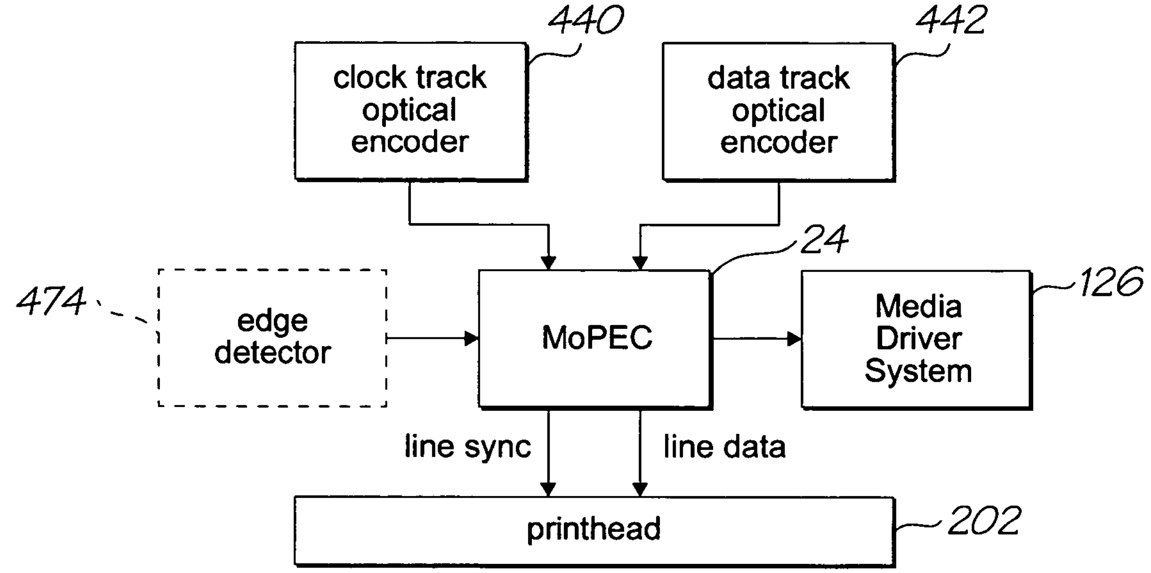
FIG. 101 illustrates a block diagram of an M-print system that uses media with separate clock and data tracks.

FIG. 101 shows a block diagram of an M-Print system that uses media encoded with separate clock and data tracks. The clock and data tracks are read by separate optical encoders. The system may optionally have an explicit edge detector 474 which is discussed in more detail below in relation to FIG. 104.

Figure 102:
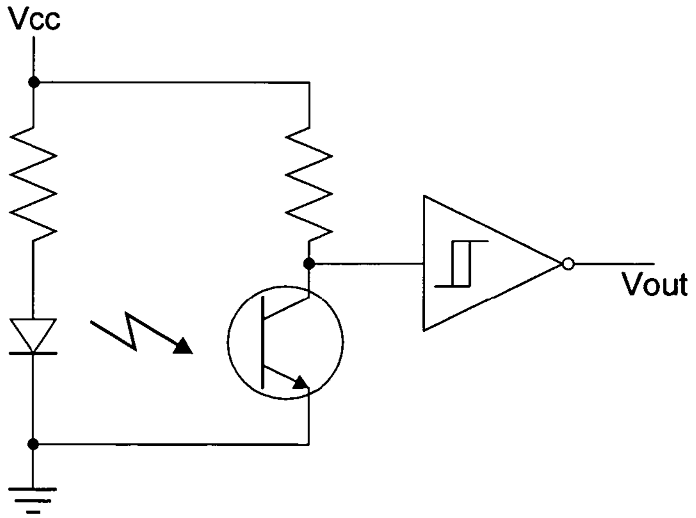
FIG. 102 illustrates a simplified circuit diagram for an optical encoder.

FIG. 102 shows a simplified circuit for an optical encoder which may be used as the clock track or data track optical encoder. It incorporates a Schmitt trigger 466 to provide the MoPEC 326 with an essentially binary signal representative of the marks and spaces encountered by the encoder in the clock or data track. An IR LED 472 is configured to illuminate a mark-sized area of the card 226 and a phototransistor 468 is configured to capture the light 470 reflected by the card. The LED 472 has a peak wavelength matched to the peak absorption wavelength of the infrared ink used to print the media coding.

As an alternative, the optical encoders can sense the direction of media movement by configuring them to be 'quadrature encoders'. A quadrature encoder contains a pair of optical encoders spatially positioned to read the clock track 90 degrees out of phase. Its in-phase and quadrature outputs allow the MoPEC 326 to identify not just the motion of the clock track 434 but also the direction of the motion. A quadrature encoder is generally not required, since the media transport direction is known a priori because the printer controller also controls the transport motor. However, the use of a quadrature encoder can help decouple a bi-directional motion sensing mechanism from the motion control mechanism.

Figure 103:
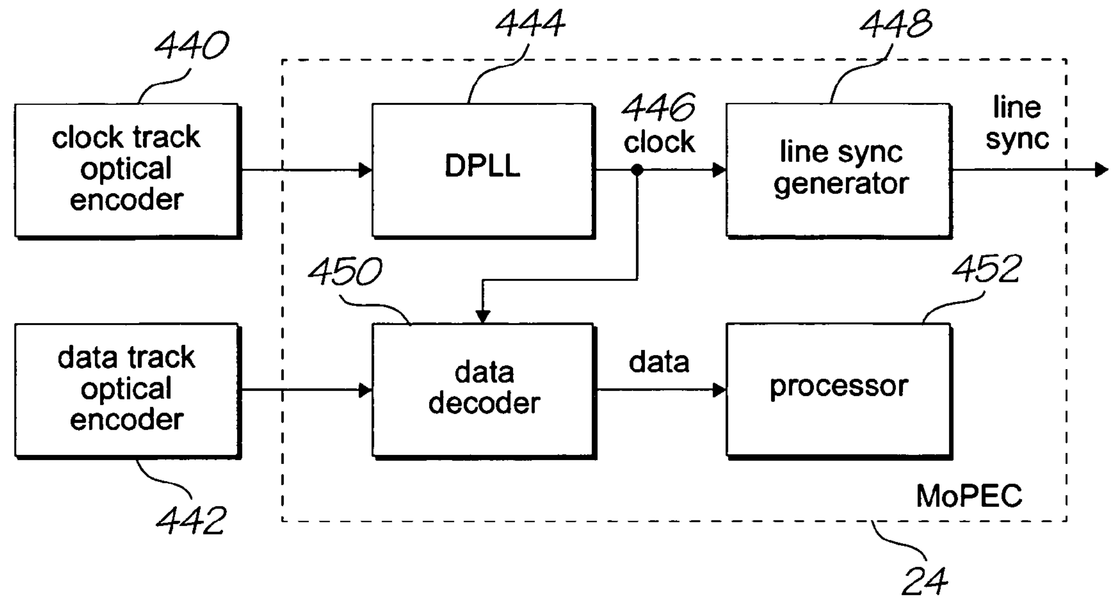
FIG. 103 illustrates a block diagram of the MoPEC with the clock and data inputs.

FIG. 103 shows a block diagram of the MoPEC 326. It incorporates a digital phase lock loop (DPLL) 444 to track the clock inherent in the clock track 434 (see FIG. 100), a line sync generator 448 to generate the line sync signal 476 from the clock 446, and a data decoder 450 to decode the data in the data track 436. De-framing, error detection and error correction may be performed by software running on MoPEC's general-purpose processor 452, or it may be performed by dedicated hardware in MoPEC.

The data decoder 450 uses the clock 446 recovered by the DPLL 444 to sample the signal from the data track optical encoder 442. It may either sample the continuous signal from the data track optical encoder 442, or it may actually 5 trigger the LED of the data track optical encoder 442 for the duration of the sample period, thereby reducing the total power consumption of the LED. The DPLL 444 may be a PLL, or it may simply measure and filter the period between successive clock pulses.

The line sync generator 456 consists of a numerically-controlled oscillator which generates line sync pulses 476 at a rate which is a multiple of the rate of the clock 446 recovered from the clock track 434.

Figure 104:
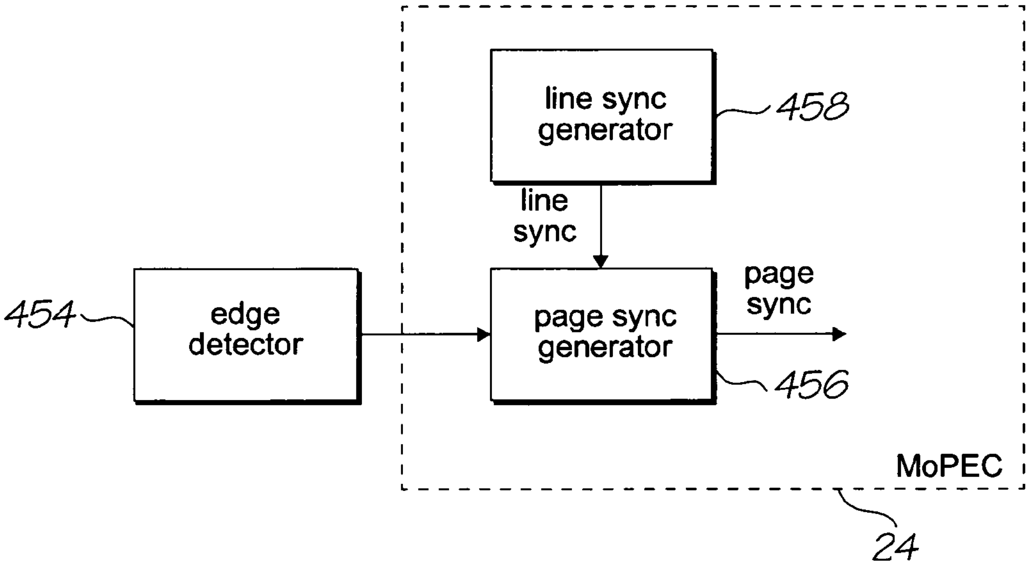
FIG. 104 illustrates a block diagram of the optional edge detector and page sync generator for the M-print system of FIG. 101.

As shown in FIG. 101, the print engine may optionally incorporate an explicit edge detector 474 to provide longitudinal registration of the card 226 with the operation of the printhead 202. In this case, as shown in FIG. 104, it generates a page sync signal 478 to signal the start of printing after counting a fixed number of line syncs 476 after edge detection. Longitudinal registration may also be achieved by other card-in detection mechanisms ranging from opto-sensors, decapping mechanical switches, drive shaft/tension spring contact switch and motor load detection.

Figure 105:
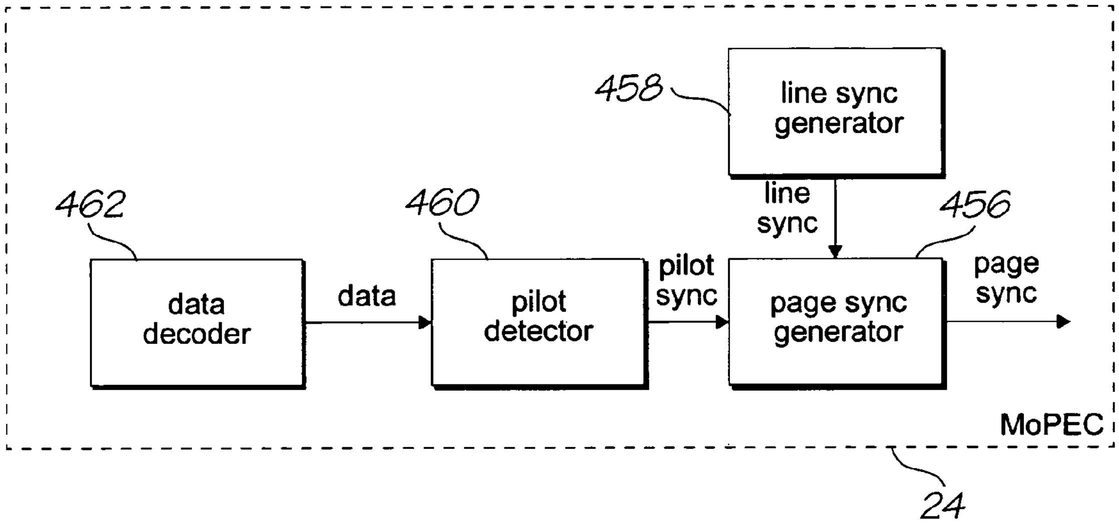
FIG. 105 illustrates a block diagram of a MoPEC that uses media with a pilot sequence in the data track to generate a page sync signal.

Optionally, the printer can rely on the media coding itself to obtain longitudinal registration. For example, it may rely on acquisition of a pilot sequence on the data track 436 to obtain registration. In this case, as shown in FIG. 105, it generates a page sync signal 478 to signal the start of printing after counting a fixed number of line syncs 476 after pilot detection. The pilot detector 460 consists of a shift register and combinatorial logic to recognise the pilot sequence 480 provided by the data decoder 450, and generate the pilot sync signal 482. Relying on the media coding itself can provide superior information for registering printed content with the Netpage tag pattern 438 (FIG. 100).

Figure 106:
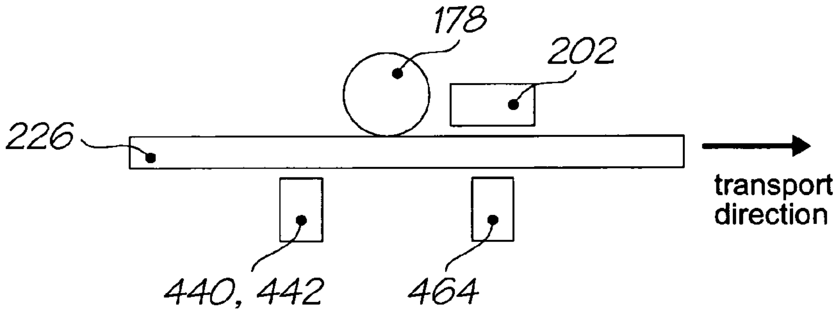
FIG. 106 illustrates a schematic representation of the position of the encoders along the media feed path.

As shown in FIG. 106, the data track optical encoder 442 is positioned adjacent to the first clock data encoder 440, so that the data track 436 (see FIG. 100) can be decoded as early as possible and using the recovered clock signal 446. The clock must be acquired before printing can commence, so a first optical encoder 440 is positioned before the printhead 202 in the media feed path. However, as the clock needs to be tracked throughout the print, a second clock optical encoder 464 is positioned coincident with or downstream of the printhead 202. This is described in more detail below.

Figure 99:
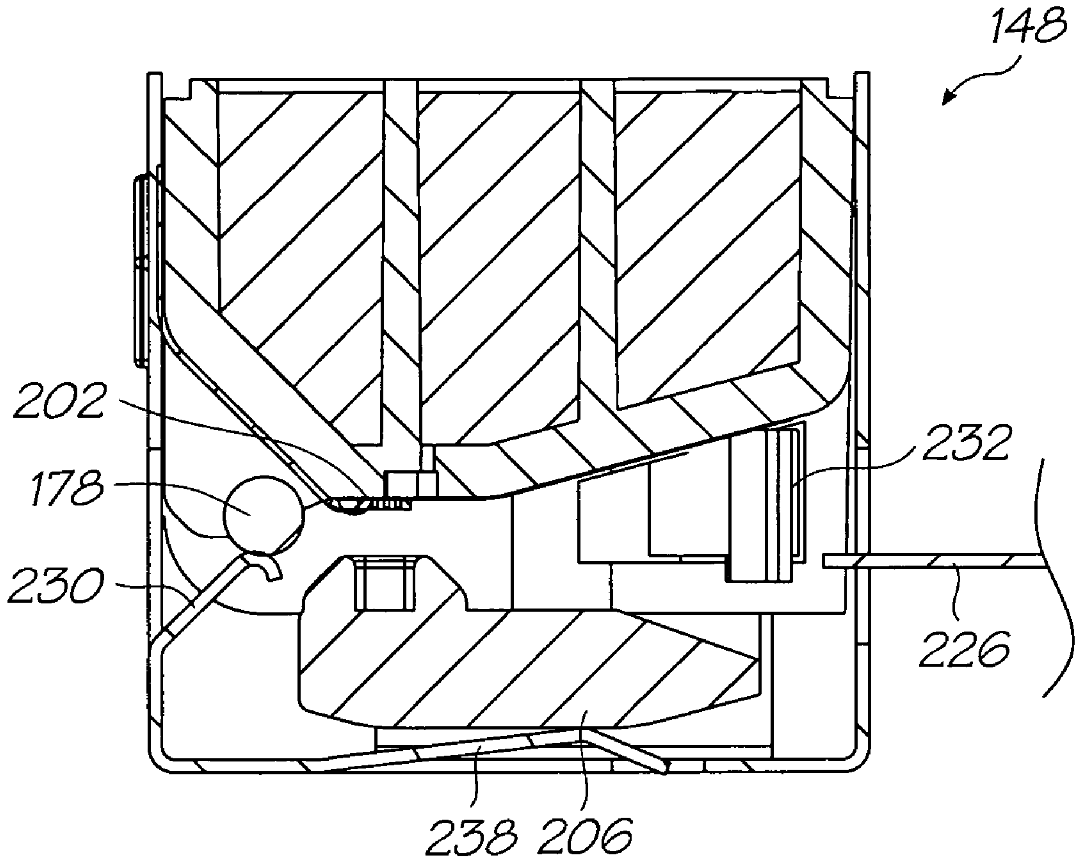
FIG. 99 illustrates a lateral cross section through a print cartridge.

FIG. 99 shows the printed card 226 being withdrawn from the print cartridge, 148. It will be appreciated that the printed card 226 needs to be manually withdrawn by the user. Once the trailing edge of the card 226 has passed between the drive shaft 178 and the spring fingers 238, it is no longer driven along the media feed path. However, as the printhead 202 is less than 2 mm from the drive shaft 178, the momentum of the card 226 projects the trailing edge of past the printhead 202.

Figure 98:
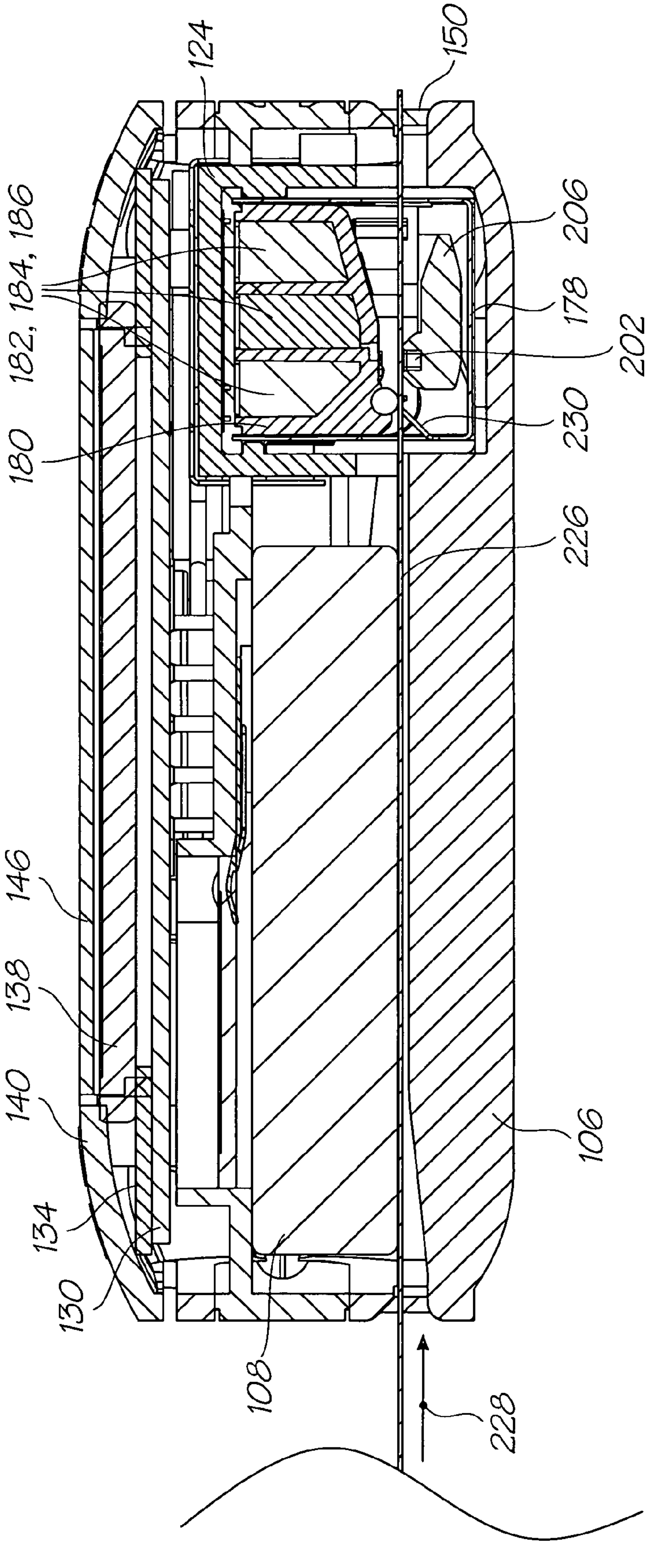
FIG. 98 illustrates a cross section view taken along line A-A of FIG. 96 with the card emerging from the media exit slot of the mobile phone.

While the momentum of the card is sufficient to carry the trailing edge past the printhead, it is not enough to fling it out of the exit slot 150 (FIG. 98). Instead, the card 226 is lightly gripped by the opposed lock actuator arms 232 as it protrudes from the exit slot 150 in the side of the mobile phone 100. This retains the card 226 so it does not simply fall from exit slot 150, but rather allows users to manually remove the printed card 226 from the mobile phone 100 at their convenience. This is important to the practicality of the mobile telecommunications device because the card 226 is fed into one side of the mobile telecommunications device and retrieved from the other, so users will typically want to swap the hand that holds the mobile telecommunications device when collecting the printed card. By lightly retaining the printed card, users do not need to swap hands and be ready to collect the card before completion of the print job (approximately 1-2 secs). Alternatively, the velocity of the card as it leaves the roller can be made high enough that the card exits the outlet slot 123 under its own inertia.

10.1 M-Print Flip Printing

One can allow a previously printed m-print Netpage card to be re-inserted into the printing mechanism "flipped-over", so that the side not previously printed on (i.e. the back of the card) is now facing towards the print head. The printer would detect such an insertion and would automatically print additional information on to the back of the card. The additional information would typically, but not necessarily, be application and context specific. That is:

the application which created the original printout would determine what is printed onto the back side of the card, and would be able to take into account context specific information such as the impression ID of the card.

This allows applications to print information onto the back side of the card which is specific to the original printout on the front side of the card. There are many potential uses for such a mechanism. For the sake of discussion, one such case is described below.

10.1.1 Camera Use-case

1. User takes a photo using an m-print enabled camera phone
2. User prints photo onto Netpage tagged card
3. User feeds card back through printer flipped-over
4. Various details about the photo would then be printed onto the back of the card. Examples of details might be:
   - The date and time the photo was taken;
   - Location where photo was taken, either automatically determined by a geographical positioning system within the phone (eg. GPS or cell-based location detection), or manually entered after the fact by the user; and/or
   - Arbitrary textual information entered by the user (perhaps entered on the phone itself or via a web-based photo archiving application sometime after the photo was taken).

The time duration between the user taking the original photo and inserting the flipped-over card could be arbitrarily long. As such, the mechanism can act as a "what is this photo that I just found?" facility. Another advantage is that it removes the need to have text obscuring parts of the photo in order to provide date/time information.

11. General Netpage Overview

Netpage interactivity can be used to provide printed user interfaces to various phone functions and applications, such as enabling particular operational modes of the mobile telecommunications device or interacting with a calculator application, as well as providing general "keypad", "keyboard" and "tablet" input to the mobile telecommunications device. Such interfaces can be pre-printed and bundled with a phone, purchased separately (as a way of customizing phone operation, similar to ringtones and themes) or printed on demand where the phone incorporates a printer.

A printed Netpage business card provides a good example of how a variety of functions can be usefully combined in a single interface, including:

loading contact details into an address book
displaying a Web page
displaying an image
dialing a contact number
bringing up an e-mail, SMS or MMS form
loading location info into a navigation system
activating a promotion or special offer Any of these functions can be made single-use only. A business card may be printed by the mobile telecommunications device user for presentation to someone else, or may be printed from a Web page relating to a business for the mobile telecommunications device user's own use. It may also be pre-printed.

As described below, the primary benefit of incorporating a Netpage pointer or pen in another device is synergy. A Netpage pointer or pen incorporated in a mobile phone, smartphone or telecommunications-enabled PDA, for example, allows the device to act as both a Netpage pointer and as a relay between the pointer and the mobile phone network and hence a Netpage server. When the pointer is used to interact with a page, the target application of the interaction can display information on the phone display and initiate further interaction with the user via the phone touchscreen. The pointer is most usefully configured so that its "nib" is in a corner of the phone body, allowing the user to easily manipulate the phone to designate a tagged surface. The phone can incorporate a marking nib and optionally a continuous force sensor to provide full Netpage pen functionality.

An exemplary Netpage interaction will now be described to show how a sensing device in the form of a Netpage enabled mobile device interacts with the coded data on a print medium in the form of a card. Whilst in the preferred form the print medium is a card generated by the mobile device or another mobile device, it can also be a commercially pre-printed card that is purchased or otherwise provided as part of a commercial transaction. The print medium can also be a page of a book, magazine, newspaper or brochure, for example. The print medium can be provided with coded data in a variety of formats, the coded data encoding a range of information, preferably, at least some of the information being indicative of the print media identifier. The information can be indicative of a two-dimensional coordinate grid, and the format can be a two-dimensional pattern.

For example, the print medium can be provided with first coded data in a first format and second coded data in a second format, the first coded data encoding first information and the second coded data encoding second information, with at least some of the first information being indicative of the print media identifier, the first format being a linear pattern, and with at least some of the second information being indicative of the print media identifier and of a two-dimensional coordinate grid, the second format being a two-dimensional pattern. In a particular example form, the information is further indicative of at least part of a digital signature associated with the print media identifier, the sensor module determining, by reading at least some of the coded data, at least part of the digital signature, and the printer module can then print, if the digital signature is authentic, content on the print media.

The mobile device senses a tag using an area image sensor and detects tag data. The mobile device uses the sensed data tag to generate interaction data, which is sent via a mobile telecommunications network to a document server. The document server uses the ID to access the document description, and interpret the interaction. In appropriate circumstances, the document server sends a corresponding message to an application server, which can then perform a corresponding action.

Typically Netpage pen and Netpage-enabled mobile device users register with a registration server, which associates the user with an identifier stored in the respective Netpage pen or Netpage enabled mobile device. By providing the sensing device identifier as part of the interaction data, this allows users to be identified, allowing transactions or the like to be performed. Netpage documents are generated by having an ID server generate an ID which is transferred to the document server. The document server determines a document description and then records an association between the document description and the ID, to allow subsequent retrieval of the document description using the ID. The ID is then used to generate the tag data, as will be described in more detail below, before the document is printed by a suitable printer, using the page description and the tag map.

Each tag is represented by a pattern which contains two kinds of elements. The first kind of element is a target. Targets allow a tag to be located in an image of a coded surface, and allow the perspective distortion of the tag to be inferred. The second kind of element is a macrodot. Each macrodot encodes the value of a bit by its presence or absence. The pattern is represented on the coded surface in such a way as to allow it to be acquired by an optical imaging system, and in particular by an optical system with a narrowband response in the near-infrared. The pattern is typically printed onto the surface using a narrowband near-infrared ink.

In the preferred embodiment, the region typically corresponds to the entire surface of an M-Print card, and the region ID corresponds to the unique M-Print card ID. For clarity in the following discussion we refer to items and IDs, with the understanding that the ID corresponds to the region ID. The surface coding is designed so that an acquisition field of view large enough to guarantee acquisition of an entire tag is large enough to guarantee acquisition of the ID of the region containing the tag. Acquisition of the tag itself guarantees acquisition of the tag's two-dimensional position within the region, as well as other tag-specific data. The surface coding therefore allows a sensing device to acquire a region ID and a tag position during a purely local interaction with a coded surface, e.g. during a "click" or tap on a coded surface with a pen.

Optional embodiments of the present invention may also be said to broadly consist in the parts, elements and features referred to or indicated herein, individually or collectively, in any or all combinations of two or more of the parts, elements or features, and wherein specific integers -are mentioned herein which have known equivalents in the art to which the invention relates, such known equivalents are deemed to be incorporated herein as if individually set forth.

Although a preferred embodiment has been described in detail, it should be understood that various changes, substitutions, and alterations can be made by one of ordinary skill in the art without departing from the scope of the present invention.

12. Further Example Applications—Lifestyle Services

12.1 Membership Subscription Services

A push application can be defined as any digital content that is sent to a consumer as a result of a subscription. Push application content can be broadly categorized as belonging to several different groups, including: News and mass media, including current affairs news, breaking news and sports news; Global and regional economic, market and industry information; and Specialized niche market information.

Most digital content that is sent to subscribers is in the form of email newsletters. An increasing number of mobile operators, including Japanese DoCoMo and European operators Vodafone and O2, provide news and business information subscription information in the form of text alerts. Many push application services are fee-based, whereby users pay a monthly or annual subscription fee.

Some push services are provided on a complimentary basis to consumers, often because push content providers find it profitable to sell email newsletter advertising space to other businesses. For consumers, this can become a disadvantage: relevant digital content is accompanied by significant advertising content. In recent years, the sale of email address lists, an increase in spam, and overflowing email inboxes has also made many lists far less attractive.

Consumers want push application services to provide quality rather than quantity: Current, concise information; In a timely and efficient manner; Relevant to their information requirements. It is envisaged that the delivery of digital content from personalized push applications can be based on individual user-defined preferences. Consumers will be able to subscribe to digital content services that should provide them with the ability to:

- Choose the news, magazine and journal sources;
- Define topics of interest;
- Define keywords within topics of interest;
- Choose the receive abstract or full article;
- Choose to select information that includes digital media content or text only;
- Select the delivery: frequency, time and method of delivery;
- Change their preferences at any time.

Consumers will increasingly be afforded the opportunity to exercise more control over the type of digital content they receive. For example, a consumer may seek information on 'movies' from the '1950s' that starred 'Gene Kelly'. When the consumer has received sufficient relevant information, they may choose to change their preferences or unsubscribe from the service. As push application service providers implement new delivery systems in order to provide consumers with their preferred digital content, they are also using additional digital communications channels, such as SMS and MMS. Trends in consumers' digital content requirements mean that more and more businesses are choosing to send SMS messages to consumers that contain only the specific information that the consumer has requested.

Printing provides a familiar way of sharing subscription information, whether this includes breaking news or niche data. Push subscriptions can be designed to integrate with print applications, such as calendars. Daily appointments diaries or task lists can be combined with daily subscription content, including photographic art, impressionist or other art, daily quotes, jokes, cartoons or thoughts.

Interactive paper allows subscribers to interact with printed content to generate additional on-screen and printable content. Subscribers can follow printed links, and share paper copies of reports and material with friends and colleagues.

Figure 107:
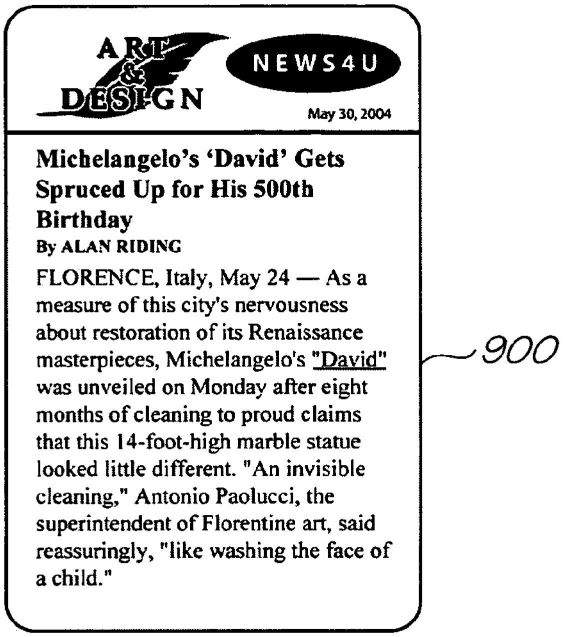
FIG. 107 illustrates an example news item printed on a print medium.

Referring to FIG. 107, the printed News4U example demonstrates printing of a news item 900 including the following possible interactions:

- Click on the 'Art & Design' logo to visit the Art & Design main web page.
- Click on the 'NEWS4U' logo to visit the web site.
- Click on the underlined text 'David' to view a photo of the painting.

Figure 108:
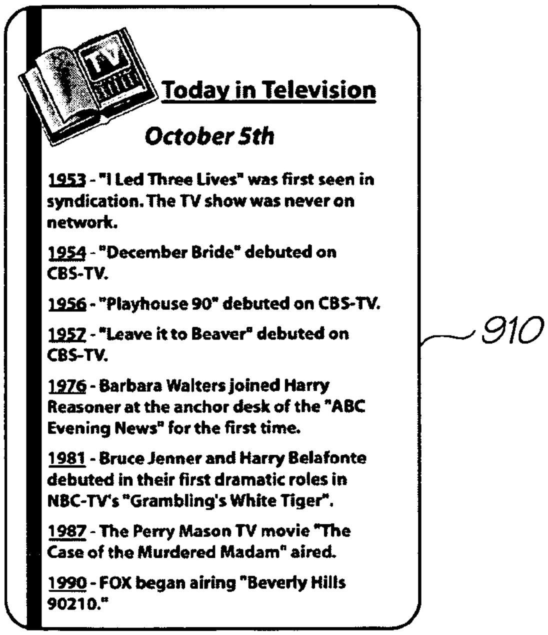
FIG. 108 illustrates an example information item for television history printed on a print medium.

Referring to FIG. 108, the printed Today in Television 910 example demonstrates the following interactive possibilities:

- Click on the 'TV' logo to visit the web site.
- Click on the 'TodaysHistory.com' link to visit the web site.
- Click on the 'Today in Television' link to view the top shows for the day.
- Click on each of the 'year' links to view additional information about each listed program.

The printed subscription may a permission token readable using the sensor module to at least one of: retrieve information associated with the subscription from the archive; verify payment of the subscription; initiate payment of the subscription; and gain access to a resource. Printing the subscription may cause information associated with the subscription to be archived. Information associated with the subscription may include one or more of: the subscription; a visual description of the subscription; an image of the subscription; an interactive description of the subscription; contents of the subscription; delivery of the subject of the subscription; renewal of the subscription; and subscription details. The subscription may be for at least one of: magazines; books; medical items; wine;

goods; and newspapers. The subscription may include at least one of: a name; an address; a telephone number; a facsimile number; an e-mail address; a web address; a photograph; and contact details.

12.2 Greetings and Gift Cards

Greetings cards can be segmented according to occasion, for example:

Religious or seasonal holidays, such as Christmas, Easter, Passover and Eid;

Annual events, like Valentine's Day, Mother's Day, Father's Day;

Everyday events, like birthdays, new babies, wedding anniversaries, congratulations, good luck, get well and thank you cards.

The UK greetings card industry is worth over US $2.17 billion annually, according to Mintel, making it the most successful such industry in the world. Market reports puts the average number of cards sent at 55 per person per year, more than one a week. In the United States, 90% of households buy greeting cards, purchasing an average 35 cards a year. Approximately 7 billion greeting cards are purchased annually, generating more than US $7.5 billion in retail sales. According to a recent study for the US Greeting Card Association, 64% of Americans still prefer traditional methods of personal communication, such as sending and receiving paper and ink greetings cards. Although people rely on a variety of ways to stay connected, when it comes to a special touch, items such as greetings cards are valued and tangible in a way that purely digital content is not. In 2003, the Greeting Card Association of Canada reported that electronic greetings cards, or e-cards, have had only a nominal effect, capturing only around 1 or 2 percent of the market.

Jupiter Research states that paid e-cards represent around 0.7% of the US market with 20% annual growth. Statistics for usage of free e-cards appear unavailable, while some providers—like BlueMountain.com—use an annual subscription model, rather than pay per card. E-card site users skew heavily female, and toward relatively high income and education levels that reflect high-speed Internet access and a degree of comfort with sending and receiving online cards. Growth rates and demographics for e-cards are viewed favourably, and the market may develop, with publishers like Hallmark able to rapidly introduce new themes, as well as enabling personalised greetings cards' with consumer input.

12.2.1 Personalization Software

Software to customize, or personalize, greetings cards may be pre-installed, installed directly over the air, or installed from another device such as a computer. Templates can be designed using a computer, downloaded, or sent via MMS. To design a greeting card a user may be required to:

1. Click the greeting card icon from the phone menu
2. Select a template to modify
3. Edit text
4. Add any other special effects or images
5. Save the greetings card.

12.2.2 Print Opportunities

Card designers and manufacturers should benefit from shorter time to market, and a better match between supply and demand. Consumers will be able to design and print greetings and gift cards on demand. Design and personalisation software can be purchased and installed on the mobile phone. Personalisation can create a 'designer' look by adding photographs, special effects and personalized language and prose at a low cost. Mobile phone users may send e-cards for a recipient to print at their convenience. The medium is better suited to spontaneous events and experiences rather than the main annual events. Design templates could take advantage of this, being targeted to the 'congratulations on your achievement', 'cheer up', or 'get well soon' experiences where immediacy is an advantage.

12.2.3 Interactivity Opportunities

Figure 109:
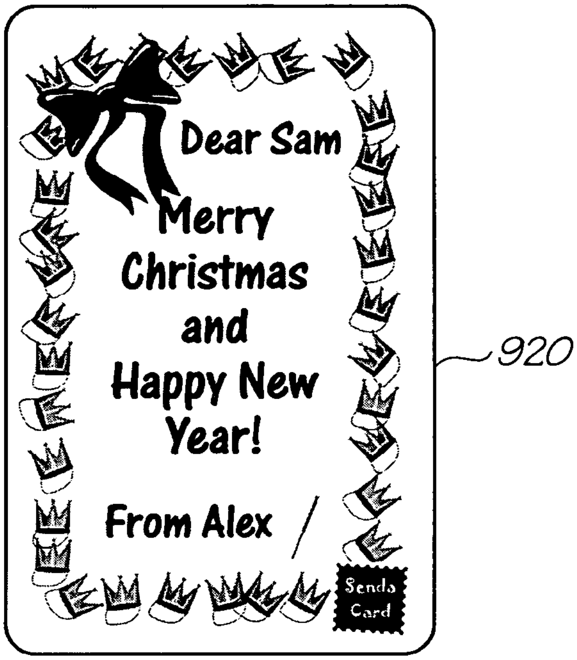
FIG. 109 illustrates an example greeting card printed on a print medium.

Interactivity may assist in generating demand for value added services by facilitating responses by card recipients, including 'thank you' cards and MMS messages. Referring to FIG. 109, the printed Christmas & New Year card 920 example shows how a card recipient can click a logo to send a reply: Click on the 'SendaCard' logo to visit the web site to send a card.

The printed greeting card may be a permission token readable using the sensor module to retrieve information associated with the greeting card, the information including at least one of: a name; an address; a telephone number; a facsimile number; an e-mail address; a web address; a photograph; and contact details. Printing the greeting card may cause information associated with the greeting card to be archived. Information associated with the greeting card may include one or more of: the greeting card; a visual description of the greeting card; an image of the greeting card; an interactive description of the greeting card; contents of the greeting card; and greeting card details. The greeting card may include at least one of: a message; a name; an address; a telephone number; a facsimile number; an e-mail address; a web address; a photograph; and contact details printed on the print medium. The greeting card may be printed periodically by the mobile communications device.

12.3 Education

A wide range of institutions and trainers can provide digital educational content:

Primary and secondary education;

Higher educational institutions such as colleges and universities, including trade and vocational colleges;

Business soft skills such as time management and presentation skills;

Computer and IT related courses;

Personal self-development and recreational courses such as first aid and pre-natal courses.

Developments in distance learning and web-based delivery methods mean that classrooms are evolving beyond the traditional learning environment, and institutions are spreading beyond their campuses. CNN have reported that "although brick and mortar institutions still dominate the educational landscape, a new form of schooling—called online or e-learning—has skyrocketed in popularity in recent years" Eduventures, predict that the US online distance learning market will grow by more than 38% in 2004, taking US $5.1 billion in revenue". In higher education, CNN report that "90 percent of four-year public schools and more than half of four-year private schools offer some form of online education, according to the United States Distance Learning Association". Primary and secondary institutions also offer online content. The Organisation for Economic Co-operation and Development (OECD, 2004) define the different types of 'online learning' or 'e-learning' as:

Web supplemented—including course outlines and lecture notes online, use of email and links to external online resources.

Web dependent—where students are required to use the internet for key 'active' elements of a program, such as online discussions, assessment, online project/collaborative work.

Mixed mode—where students are required to participate in online activities, such as online discussions and assessment that replace face-to-face classroom learning.

Fully online.

Educational institutions, businesses and students alike could use printed content for:

Examination and course information;

Class timetables and re-scheduling events;

Newsletters;

Online forum participation;

Submission of 'Blogs' (web logs—an instant publishing application);

Requests for information;

Examination results.

The internet is an important channel for the dissemination and distribution of digital education content, including: Flashcards; Tutorials; Quizzes, games and tests; Presentations; Video and audio; and Reference sources. Digital educational content can be obtained in two ways: Downloaded from the internet, or Electronically sent to a person from an educational institution or business. Browser-enabled mobile phones provide users with the ability to receive educational content on their handsets and download content from the web.

12.3.1 Print Opportunities

The initial paper size is likely to be well suited for the printing of flash cards, exercise and tests in, for example, learning a language. The format can also suit the dissemination of scheduling information, examination results and other administrative materials.

12.3.2 Interactivity Opportunities

A user can click a question to download a printable answer or explanation, or view the response on-screen.

Figure 110:
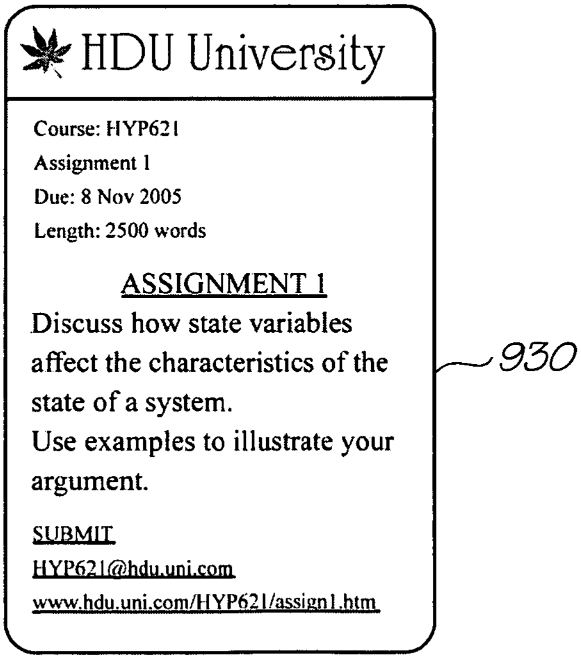
FIG. 110 illustrates an example university assignment printed on a print medium.

Referring to FIG. 110, the printed HDU University Assignment 930 example demonstrates the following interactive possibilities:

Click on the 'HDU University' logo to visit the university website.

Click on the 'assignment' link to view additional information about the assignment.

Click on the 'submit' link to send the assignment.

Click on the email address link to send an email about the assignment.

Click on the web site link to visit the assignment web page.

Figure 111:
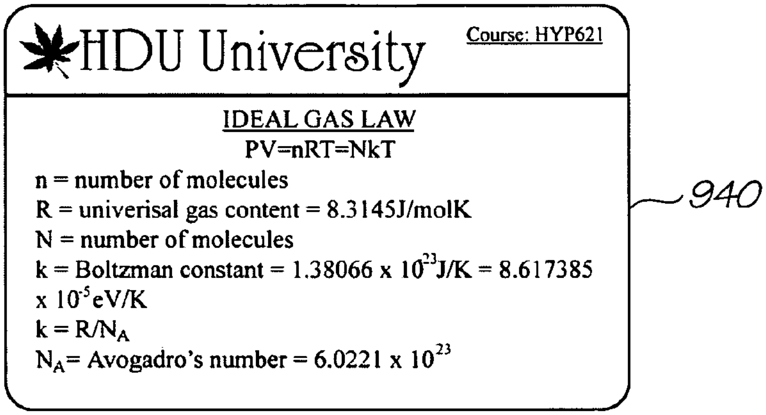
FIG. 111 illustrates an example physics flash card printed on a print medium.

Referring to FIG. 111, the printed HDU University Flash Card 940 example demonstrates the following interactive uses:

Click on the 'HDU University' logo to visit the web site.

Click on the 'Course: HYP621' link to view additional course information.

Click on the 'IDEAL GAS LAW' link to view additional information on the topic.

Figure 112:
FIG. 112 illustrates an example language flash card printed on a print medium.

Referring to FIG. 112, the printed HDU University Spanish Flashcard 950 example demonstrates how a user can:

Click on the 'HDU Universidad' logo to visit the university's Spanish school website.

Click on the 'get clue' link to download or print a clue to the meaning of the Spanish text.

Click on the 'get answer' link to view the correct answer.

The printed educational material may be a permission token readable using the sensor module to at least one of: retrieve information associated with the educational material from the archive; and gain access to a resource. Printing the educational material may cause information associated with the educational material to be archived. Information associated with the educational material may include one or more of: the educational material; a visual description of the educational material; an image of the educational material; an interactive description of the educational material; contents of the educational material; and educational material details. The educational material may be at least one of: classroom material; lecture notes; a test; test results; instructions; a lesson plan; a tutorial; and homework. The educational material may be printed periodically.

12.4 Trading Cards

Collecting product or collectable trading cards began as a by-product of product advertising. Trading cards are divided into two broad categories: Sports and Collectables. In the United States alone there are an estimated 60 million sports fans, of which 3 million are sports collectors. Sports' collecting is the most actively traded item on the internet. Over US $5 billion in sports items is traded annually and trading cards are the top performer. Collectable trading cards are an integral part of many products' merchandising, positioned alongside toys, comics, movies and television. Collectable trading cards include products such as Pokemon, Buffy the Vampire Slayer, Teenage Ninja Turtles, Twilight Zone and Harry Potter. Trading cards are distributed through newsagents, supermarkets, toy stores, department stores, mail order catalogues, over the web and through trading card clubs.

The collector's main objective is to collect a complete set of cards. A complete set may include between 150 and 250 cards. A small percentage of trading cards are sold as boxed sets; however, most are sold as individual packets of cards that include between say 5 and 7 cards. Individual packets of cards typically include regular cards and perhaps a 'chaser card'; chaser cards are harder to find and are therefore more valuable. Collectors unavoidably end up with duplicate cards because, even though individual packets do not contain duplicates, there may be duplication between packets. Some collectors trade their duplicate or unwanted cards over the web, through exchanges or auction sites such as EBay. Over the past several years, this new secondary market has become an important part of increasing the traditional sales of trading cards. To extend revenue from boxed trading card sets, manufacturers and games producers have released trading card games. The main advantage is that new cards are periodically released to add new players or features. These are purchased as individual packets.

The existing trading card sales and distribution network has created the following problems for consumers:

Not being able to buy cards at their convenience, as the reseller may not be local.

Complicated ordering and purchasing processes when using mail order catalogues or the internet.

Lengthy waiting periods for the delivery of purchased cards. All cards not bought directly from an outlet are sent by mail.

No guarantee of delivery.

The authenticity of purchased cards, as many cards sold are counterfeit.

When problems arise with the contents of a delivery, such as missing or incorrect cards, the return mail costs are normally paid by the consumer.

When cards are not thought to be authentic, the consumer may pay to send card to an authentication dealer for evaluation.

Financial loss as a result of having purchased counterfeit cards.

12.4.1 Print Opportunities

Most distribution problems are due to counterfeit and delivery issues. Mobile phone printing will eliminate many of these issues. The delivery system is simplified because the consumer is able to print authentic cards immediately after purchase, delivered directly to a handset. Mobile phone printing of trading cards makes the purchasing process more dynamic and instantaneous for consumers. Manufacturers and resellers benefit from reduced print costs and shipping costs. Manufacturers can better match supply and demand, and reduce time-to-market lifecycles. The randomness of packet distribution and chaser cards can be replicated in online systems. A user could receive an unseen, set number of cards per transaction, including both regular and chaser cards. As with current distribution methods, consumers can be expected to trade their surplus cards in pursuit of those they seek. New market opportunities for trading cards may arise as the mobile phone printing and distribution method will make smaller scale, niche markets more cost effective.

It is envisaged that mail order and web purchases will function differently using mobile phone printing. To purchase over the web or over the air:

1. Select the cards to order.
2. Pay for the cards using the shopping cart.
3. Select the 'mobile phone delivery' shipping option.
4. Enter the mobile phone number (for web-based delivery).
5. Select the 'confirm order' option, to complete the purchase.

To purchase by mail order:

1. Using product information from an advert or catalogue, select the cards to order. Each card is identified with a unique product code.
2. SMS the unique product codes of the cards to the relevant sales phone number.
3. Check the order details, for example, that the correct cards are displayed on screen.
4. Select the 'confirm order' option to complete the purchase.

The purchased trading cards are automatically debited to the consumer's mobile phone credit card or bank account, depending on stored payment details. After purchase, the consumer receives the cards on their mobile phone as an MMS message.

12.4.2 Interactivity Opportunities

Interactivity can help to eliminate the issue of card counterfeiting by providing a simple method of authenticating a valid trading card. Clicking a card could enable a simple database check to ensure that a card is genuine.

Figure 113:
FIG. 113 illustrates an example sports trading card printed on a print medium.

Referring to FIG. 113, the printed Soccer Collectibles card 960 example demonstrates the following interactive uses:

Click on the 'web site' link to visit the web site.

Click anywhere to check the authenticity of the card.

Figure 114:
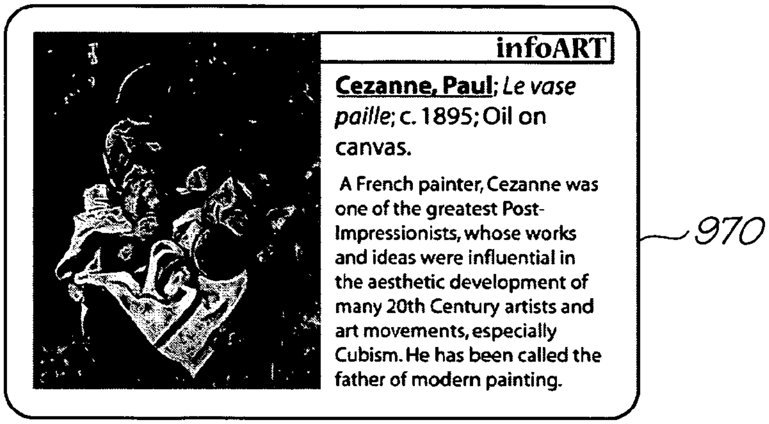
FIG. 114 illustrates an example art history card printed on a print medium.

Referring to FIG. 114, the printed Art History card 970 example demonstrates similar uses:

Click on the 'infoART' logo to visit the web site.

Click on the 'Cezanne, Paul' link to visit the painter's web site.

Click anywhere to determine the authenticity of the card.

The printed trading card may be a permission token readable using the sensor module to retrieve information associated with the trading card, the information including at least one of: trading card authenticity; a name; an address; a telephone number; a facsimile number; an e-mail address; a web address; a photograph; and contact details. Printing the trading card may cause information associated with the trading card to be archived. Information associated with the trading card may include one or more of: the trading card; a visual description of the trading card; an image of the trading card; an interactive description of the trading card; contents of the trading card; and trading card details. The trading card may include at least one of: a message; an image; a photograph; a personality; a sportsperson; a sports personality; a television personality; an actor; a movie star; a cartoon character; a celebrity; a musician; a rock star; a product; a quotation; a cartoon strip; a graphic design; and a character printed on the print medium. The trading card may be printed periodically by the mobile communications device.

12.5 Health and Beauty

Printing from print-enabled mobile phones provides consumers with a range of print opportunities.

12.5.1 Mobile Health

Health and fitness concerns are high on the agenda in most developed economies. In the US, the weight control products and services market is worth US $15.2 billion in 2004, and are estimated to grow 6.7% annually to 2008. Health and fitness systems are focused on a combination of planning and journaling a user's calorie intake and exercise program. Consumers can use these systems online or offline from their mobile phone handsets. Operators such as Vodafone predict that a new wave of technology will see more mobile phones being used to monitor vital body signals such as heart rate, stress levels and blood pressure. This is likely to be integrated with applications to utilise the data, and increase the usage of such facilities. Current medical trials already include the use of mobile phones by UK hospitals to record information from diabetic patients, enabling rapid analysis and advice.

12.5.2 Online Health & Fitness Services

Websites either offer online calculators for free, pay-per-use or periodic site membership. Most applications require that a consumer enters their information online and then receives the results online. The different types of online calculators include: Calories burned; BMI (Body Mass Index); Food calories and nutritional values; A combination of the above factors.

12.5.3 Offline Health & Fitness Services

Offline health and fitness applications are available for mobile devices, including Fitness Coach, and Weight-By-Date. Fitness Coach for Nokia 5140 is a fitness planner and journal that tracks fitness progress as the user progresses though a fitness program and records data such a heart rate. The user can then save this information, wirelessly transfer it to a PC, or send it to a coach or trainer for assessment.

Weight-By-Date Mobile is a PDA software solution for measuring the results of diet and exercise. Features include: Journals for exercise and calories burned; Exercise plans; Track body measurement changes; Track nutritional intake; Create recipes; Record weight loss; View and print colourful progress charts; Calculate body fat percentage.

12.5.4 Beauty

The beauty industry is generally divided into four categories (The Economist, 2003): Skincare: Goldman Sachs estimates that this has a global value of US $24 billion; Haircare: US $18 billion; Cosmetics: US $38 billion; Perfume: US $15 billion. The sector is growing at up to 7% a year; more than twice the rate of the developed world's GDP. L'Oreal, the sector's market leader, has recorded annual compound profit growth of 14% for the past 13 years. Growth in this sector is being driven by increased discretionary incomes among ageing populations in the West, and by the-growing incomes of people in developing countries. China, Russia and South Korea have become important markets. In India, the sales of anti-aging products are growing by 40% a year.

12.5.5 Offline Beauty Services

Virtual makeover software programs are one of the most popular offline beauty applications. Virtual makeovers allow consumers to try out new hairstyles, make up and accessories using their own photographs, in order to experiment with their overall appearance. Cosmopolitan's Virtual Makeover is a popular PC application that has sold over one million copies. The program allows the user to experiment with a large variety of hairstyles, makeup and accessories; and to then print, save and email their favourites. A common issue experienced by users of virtual makeovers is getting a photo of themselves into digital format. Accessing online services from browsers on camera phones, or emailing photographs from camera phones, can help to resolve this problem.

12.5.6 Online Beauty Services

Tens of thousands of websites offer beauty advice and instructions. Beauty advice can range from 'how to put on makeup' to 'how make your own facial mask from common kitchen products'. Many beauty advice websites are related to a beauty product or brand such as L'Oreal, or a magazine such as Cosmopolitan. The L'Oreal Beauty Club (Australia) is a free subscription newsletter. Consumers can sign up for the newsletter at the L'Oreal website, registering their details and answering questions about L'Oreal products. The newsletter: Informs readers of new L'Oreal products; Informs readers of makeup, beauty and hairstyling techniques and trends; Advertises special offers and provides coupons; Offers competitions to win L'Oreal products.

12.5.7 Print Opportunities

Mobile phone health and beauty content services can consist of preloaded or downloaded software applications; online informational content; and subscription based content. Printed health and fitness results can act as an incentive for many consumers, offering a visual reminder of successes (and failures) to keep on-target and help track performance. Camera phones are ideal for obtaining digital images for virtual makeover applications. Printing 'virtual makeover' looks means that different looks can be compared—not necessarily possible on handset screens. Makeover looks can be taken to the hairdresser or beautician to have the makeover performed. They can also be taken to a store to assist in selecting the right products to buy.

12.5.8 Interactivity Opportunities

Interactivity should encourage the use of new value added interactive services:

- selecting a colour swatch for hair colours;
- selecting clothing clothing;
- downloading and printing recipes;
- selecting a complementary wine.

Figure 115:
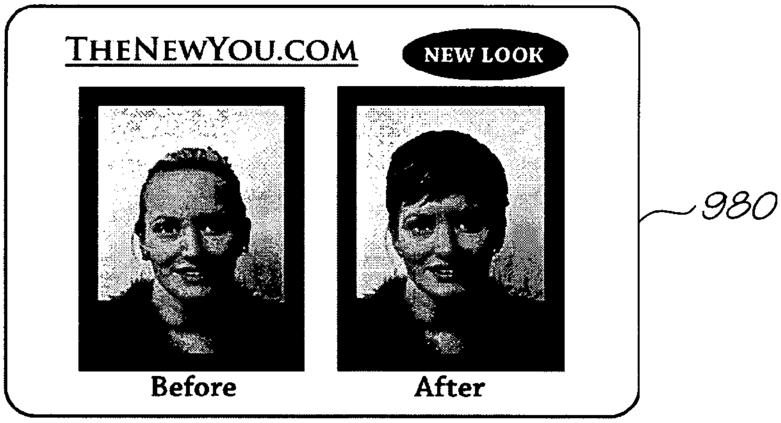
FIG. 115 illustrates an example virtual makeover printed on a print medium.

Referring to FIG. 115, the printed Virtual Makeover 980 example enables the user to:

- Click on the 'TheNewYou.com' logo to visit the website.
- Click on the 'new look' link to visit the virtual makeover web page.

Figure 116:
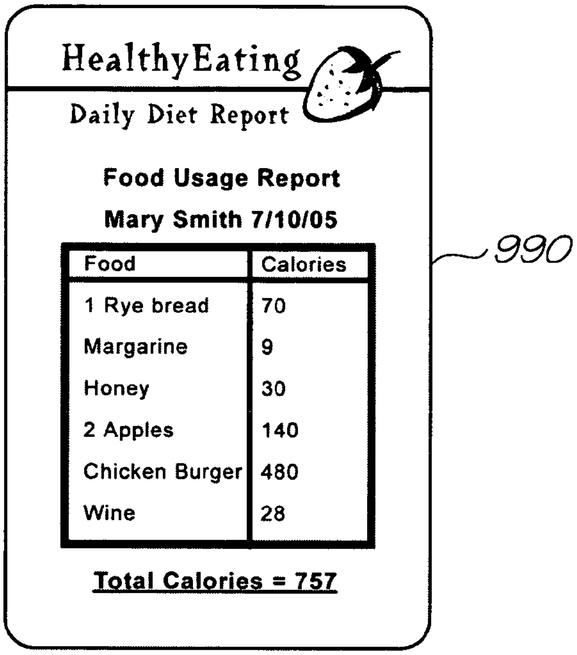
FIG. 116 illustrates an example daily diet report printed on a print medium.

Referring to FIG. 116, the printed Daily Diet Report 990 example demonstrates the following:

- Click on the 'Healthy Eating' logo to launch the software application.
- Click on the 'total calories' link to view the full reports.
- Click the 'wine' text to select an appropriate wine.

The printed health report may be a permission token readable using the sensor module to at least one of: retrieve information associated with the health report from the archive; initiate payment for the health report; transmit the health report to a health professional; obtain a copy of the health report; and gain access to a resource. Printing the health report may cause information associated with the health report to be archived. Information associated with the health report may include one or more of: the health report; a visual description of the health report; an image of the health report; an interactive description of the health report; contents of the health report; and health report details. The health report may include at least one of: medical information; fitness information; cosmetic information; allergy information; genetic information; drug information; medicinal information; medicine information; and mental information. The health report may include at least one of: weight; height; body mass index (BMI); age; blood type; gender; a name; an address; a telephone number; a facsimile number; an e-mail address; a web address; a photograph; and contact details.

12.6 Dating Services

Online dating services have become an accepted part of single life for people of all ages, backgrounds and interests. In May 2003, more than 45 million people accessed online dating sites in the US. In the UK, 3.5 million people are accessing online dating services a month. In the US, spending on personals and dating has enjoyed steady growth since early 2001. In 2003, it was the largest paid content category with consumers spending US $449.5 million, ahead of Business/Investment and Entertainment/Lifestyles spending. As with book buying and auctioning used toys, the web has reduced the costs of engaging with romantic prospects and provided a new channel to exchange personal information, including: Pictures; Text, including email and chat or instant messaging; Video clips. The success of online dating services reflects the significance of the internet in many people's daily lives. It especially appeals to time-poor, young, urban professionals who want to meet new people outside of their social circle.

Furthermore, growth in online dating is underpinned by social factors such as a growing acceptance of being single, delayed marriage, having children later in life, rising divorce rates and increasing acceptance of the medium. Match.com has been a global leader in online dating services for the past few years, with a global membership and 27 localised dating sites in 18 local languages. Match.com members can see and read about their most likely matches, based upon criteria that they can specify, and can elect to contact or reply to messages from members, as they prefer. The Personals division of Yahoo is a major player in the online dating services market. In December 2003, Yahoo Personals was the second most popular such site with 4.1 million visitors, up 28% from December 2002. Together with smaller, and special interest sites such as "GothicMatch.com", the sector generated more than $400 million in 2004. Most of the large dating websites, including Yahoo and Match.com, allow users to browse member profiles and post a profile for free. Paid subscription membership is required to contact other members. Instant Messaging capabilities, together with audio and video, transform static profiles and email into actual real time conversations and experiences.

12.6.1 Mobile Dating Services

A growing number of dating services offer SMS communication services. Lavalife Mobile is a service where users can search profiles and exchange text messages from mobile phones either via SMS or WAP. Users register by sending an SMS to Lavalife, and they can then create a profile online via a computer, SMS or a 2.5G service. Depending on the user's location, the service costs around US $0.50 per message sent or received. Online dating service providers believe that mobile technologies, such as location-based applications, camera phones and the use of video, will drive future growth.

MMS messaging and video clips are expected to become a mainstream part of mobile phone dating services.

12.6.2 Print Opportunities

The initial paper size provides a handy wallet- or purse-sized photograph or photo/text combination. Printing from print-enabled mobile phones provides opportunities for printing photos, profiles and information about an online friend. Printing of membership cards, invitations and tickets for offline events, date cards and reminders. Printing special emails or IM sessions for sentimental value. Printing of coupons and offers from the dating service and related partners.

12.6.3 Interactivity Opportunities

The initial paper size provides an interactive wallet- or purse-sized photograph or photo/text combination. Printing from print-enabled mobile phones provides opportunities to interact with data and easily use a variety of communications modes.

Figure 117:
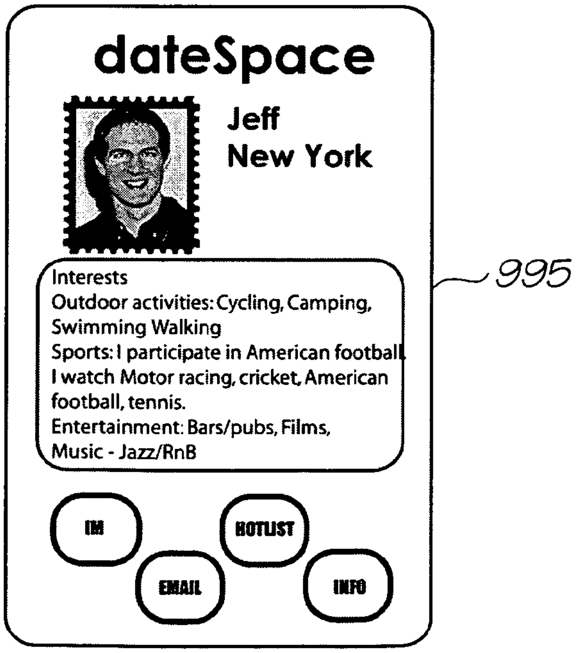
FIG. 117 illustrates an example date card printed on a print medium.

Referring to FIG. 117, the printed dateSpace Profile 995 example enables a user to:

Click on the 'IM' link to send an instant message.

Click on the 'email' link to send an email.

Click on the 'hotlist' link to add the profile to a personal hotlist.

Click on the 'info' link to view additional information about the profiled person.

Figure 118:
FIG. 118 illustrates an example dating event card printed on a print medium.

Referring to FIG. 118, the printed dateSpace Invitation 999 example demonstrates an interactive event invitation:

Click on the 'spring ball' link to view the dateSpace Spring Ball web page.

Click on the 'RSVP' link to send an email confirmation.

The printed dating information may be a permission token readable using the sensor module to at least one of: retrieve information associated with the dating information from the archive; retrieve personal information about a date; retrieve personal information about a potential date; accept a date; reject a date; initiate payment for the dating information; transmit the dating information to a dating services professional; obtain a copy of the dating information; and gain access to a resource. Printing the dating information may cause information associated with the dating information to be archived. Information associated with the dating information may include one or more of: the dating information; a visual description of the dating information; an image of the dating information; an interactive description of the dating information; contents of the dating information; and dating information details. The dating information may include at least one of: personal interests; musical interests; sporting interests; political interests; movie interests; leisure interests; professional interests; food preferences; personality preferences; physical appearance preferences; and sexual preferences. The dating information may include at least one of: weight; height; body mass index (BMI); age; eye color; hair color; ethnicity; gender; a name; an address; a telephone number; a facsimile number; an e-mail address; a web address; a photograph; and contact details.

The invention claimed is:

1. A system for printing a greeting card on a print medium, the system comprising:

a mobile phone device which comprises:

a sensor module to sense a print media identifier of the print medium, the print medium identifier uniquely identifying the print medium;

a printer module to print the greeting card on the print medium; and a processor operatively connected to the sensor module and printer module, and configured to, in response to the printer module printing the greeting card, prompt a user regarding selling an access permission, receive an access permission setting from the user, and store information associated with the greeting card in an archive, the information being stored in association with the print medium identifier and with the access permission setting.

2. The system as claimed in claim 1, wherein the print medium is provided with coded data in a format, the coded data encoding information at least indicative of the print media identifier.

3. The system as claimed in claim 2, wherein the format is a linear pattern.

4. The system as claimed in claim 2, wherein the information is further indicative of a two-dimensional coordinate grid, and the format is a two-dimensional pattern.

5. The system as claimed in claim 2, wherein the printer module prints at least some of the coded data on the print medium.

6. The system as claimed in claim 1, wherein the print medium is provided with first coded data in a first format and second coded data in a second format, the first coded data encoding first information and the second coded data encoding second information, at least some of the first information being indicative of the print media identifier, the first format being a linear pattern, at least some of the second information being indicative of the print media identifier and of a two-dimensional coordinate grid, the second format being a two-dimensional pattern.

7. The system as claimed in claim 2, the mobile phone device including:

a media feed path, such that when the print medium is presented in the media feed path at least some of the coded data is read using the sensor module, and the print media identifier is determined using the at least some read coded data.

8. The system as claimed in claim 1, wherein the information associated with the greeting card is retrievable from the archive using the print media identifier.

9. The system as claimed in claim 6, wherein the print medium includes at least one interactive element associated with a linked object, and the linked object is associated with a region of the print medium using the second coded data, and the linked object is stored in an object repository.

10. The system as claimed in claim 1, wherein printing requires paying for the greeting card using the mobile phone device.

11. The system as claimed in claim 2, wherein the information is further indicative of at least part of a digital signature associated with the print media identifier, wherein the sensor module determines at least part of the digital signature by reading at least some of the coded data and the printer module prints the greeting card if the digital signature is authentic.

12. The system as claimed in claim 1, wherein the printed greeting card is a permission token readable using the sensor module to retrieve information associated with the greeting card, the information including at least one of: a name; an address; a telephone number; a facsimile number; an e-mail address; a web address; a photograph; and contact details.

13. The system as claimed in claim 1, wherein the information associated with the greeting card includes one or more of: the greeting card; a visual description of the greeting card;

an image of the greeting card; an interactive description of the greeting card; contents of the greeting card; and greeting card details.

14. The system as claimed in claim 1, wherein the greeting card includes at least one of: a message; a name; an address; a telephone number; a facsimile number; an e-mail address; a web address; a photograph; and contact details printed on the print medium.

15. The system as claimed in claim 1, wherein the greeting card is printed periodically by the mobile phone device.

16. The system as claimed in claim 1, wherein at least some of the coded data is indicative of at least one of an orientation of the greeting card;

a pre-printed side of the greeting card; and an indication of prior printing on the greeting card.

17. The system as claimed in claim 1, wherein the print medium is provided with coded data encoding information, at least some of the coded data being coincident with at least some visual information of the greeting card.

* * * * *